(12) United States Patent
Jürgensen

(10) Patent No.: US 6,888,853 B1
(45) Date of Patent: May 3, 2005

(54) LASER RADIATION SOURCE

(75) Inventor: Heinrich Jürgensen, Raisdorf (DE)

(73) Assignee: Hell Gravure Systems GmbH, Kiel (DE)

( * ) Notice: Subject to any disclaimer, the term of this patent is extended or adjusted under 35 U.S.C. 154(b) by 0 days.

(21) Appl. No.: 09/786,742

(22) PCT Filed: Sep. 1, 1999

(86) PCT No.: PCT/DE99/02721

§ 371 (c)(1),
(2), (4) Date: Sep. 14, 2001

(87) PCT Pub. No.: WO00/13839

PCT Pub. Date: Mar. 16, 2000

(30) Foreign Application Priority Data

Sep. 8, 1998 (DE) .......................................... 198 40 926

(51) Int. Cl.[7] ............................ H01S 3/067; B41F 9/00;
G03F 7/00; B41J 2/435
(52) U.S. Cl. ................................. 372/6; 372/9; 372/24;
101/150; 101/153; 430/269; 430/300; 430/307;
347/224; 347/233; 347/238; 347/241
(58) Field of Search ........................... 372/6, 9, 24, 26,
372/69; 101/150, 153; 430/269, 300, 307;
347/224, 233, 238, 241

(56) References Cited

U.S. PATENT DOCUMENTS

| 3,931,458 | A | * | 1/1976 | Dini .............................. 358/3.29 |
| RE32,139 | E | * | 5/1986 | Taudt et al. ................... 358/524 |
| 4,729,037 | A | * | 3/1988 | Doelves ......................... 358/3.29 |
| 5,202,893 | A | * | 4/1993 | Kubota et al. ................. 372/34 |
| 5,363,233 | A | * | 11/1994 | Pernick ......................... 359/316 |
| 5,369,661 | A | * | 11/1994 | Yamaguchi et al. ........... 372/69 |
| 5,373,526 | A | * | 12/1994 | Lam et al. ..................... 372/69 |
| 5,654,125 | A | | 8/1997 | Fan et al. ..................... 430/306 |
| 5,719,009 | A | * | 2/1998 | Fan .............................. 430/306 |
| 5,760,880 | A | | 6/1998 | Fan et al. ....................... 355/67 |
| 5,780,200 | A | * | 7/1998 | Kitaguchi et al. ........ 430/270.1 |
| 5,798,202 | A | * | 8/1998 | Cushner et al. .............. 430/306 |
| 5,829,881 | A | * | 11/1998 | Furlani et al. ................. 384/42 |
| 5,867,305 | A | * | 2/1999 | Waarts et al. ................ 359/341 |
| 5,900,109 | A | * | 5/1999 | Sanders et al. .............. 156/552 |
| 5,949,466 | A | * | 9/1999 | Kerr et al. .................... 347/213 |
| 5,953,036 | A | * | 9/1999 | Furlani et al. ............... 347/139 |
| 6,106,627 | A | * | 8/2000 | Yializis ........................ 118/724 |
| 6,136,375 | A | * | 10/2000 | Bressler et al. .............. 427/277 |
| 6,167,075 | A | * | 12/2000 | Craig et al. .................... 372/75 |
| 6,283,022 | B1 | * | 9/2001 | Kamen et al. ............... 101/129 |

FOREIGN PATENT DOCUMENTS

EP    0 741 335    10/2000

OTHER PUBLICATIONS

Fiber Technology Ushers In New Laser Devices—Feature: Fiber Lasers May 1991 Laser Focus World—pp. 231–238.
1998 Semiconductor Laser Product Catalog—SDL Copyright 1997 SDL, Inc. pp. 40–45.

* cited by examiner

Primary Examiner—Don Wong
Assistant Examiner—James Menefee
(74) Attorney, Agent, or Firm—Schiff Hardin LLP

(57) ABSTRACT

A system and method for selectively process material on a processing surface of a printing form to create a fine structure or pattern for images or text. At least one fiber laser comprising a pump source and a laser fiber is provided. A laser gun is mounted adjacent the printing form and has at least a focusing optics. The fiber laser outputs a laser beam which is diffraction-limited to permit the focusing optics to focus the laser beam onto the processing surface of the printing form as a spot having a spot size sufficiently small to process the processing surface to create the fine structure or pattern images or text.

296 Claims, 39 Drawing Sheets

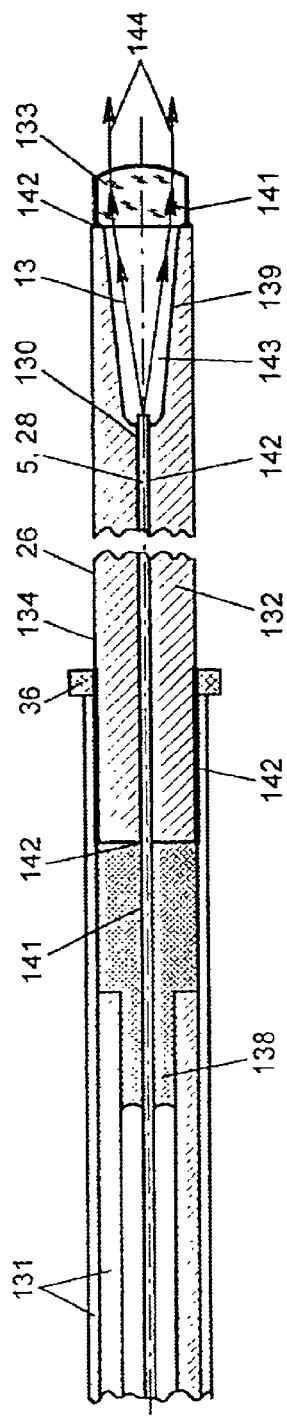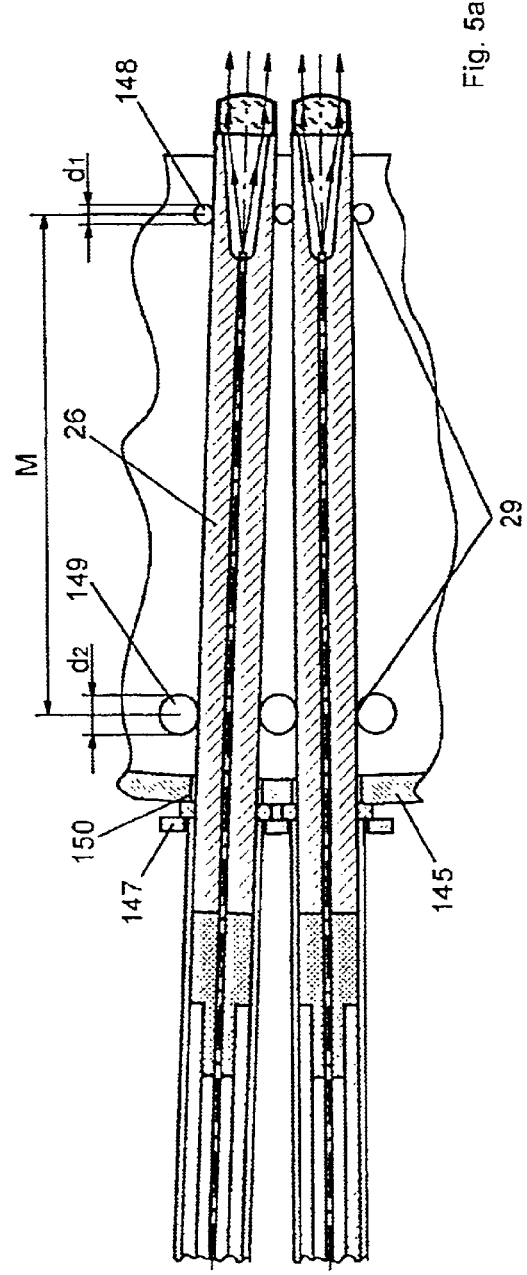
Fig. 5
Fig. 5a

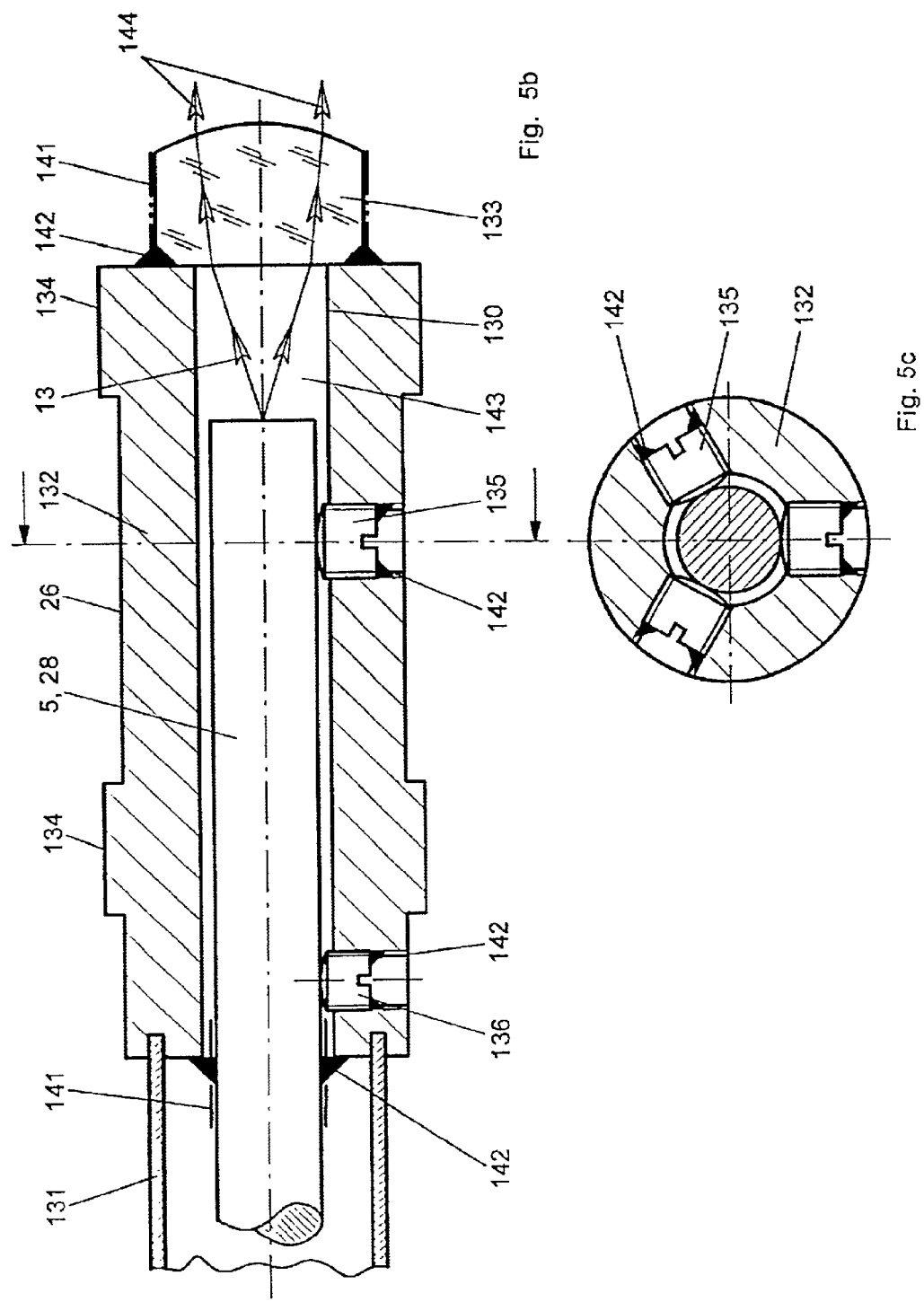

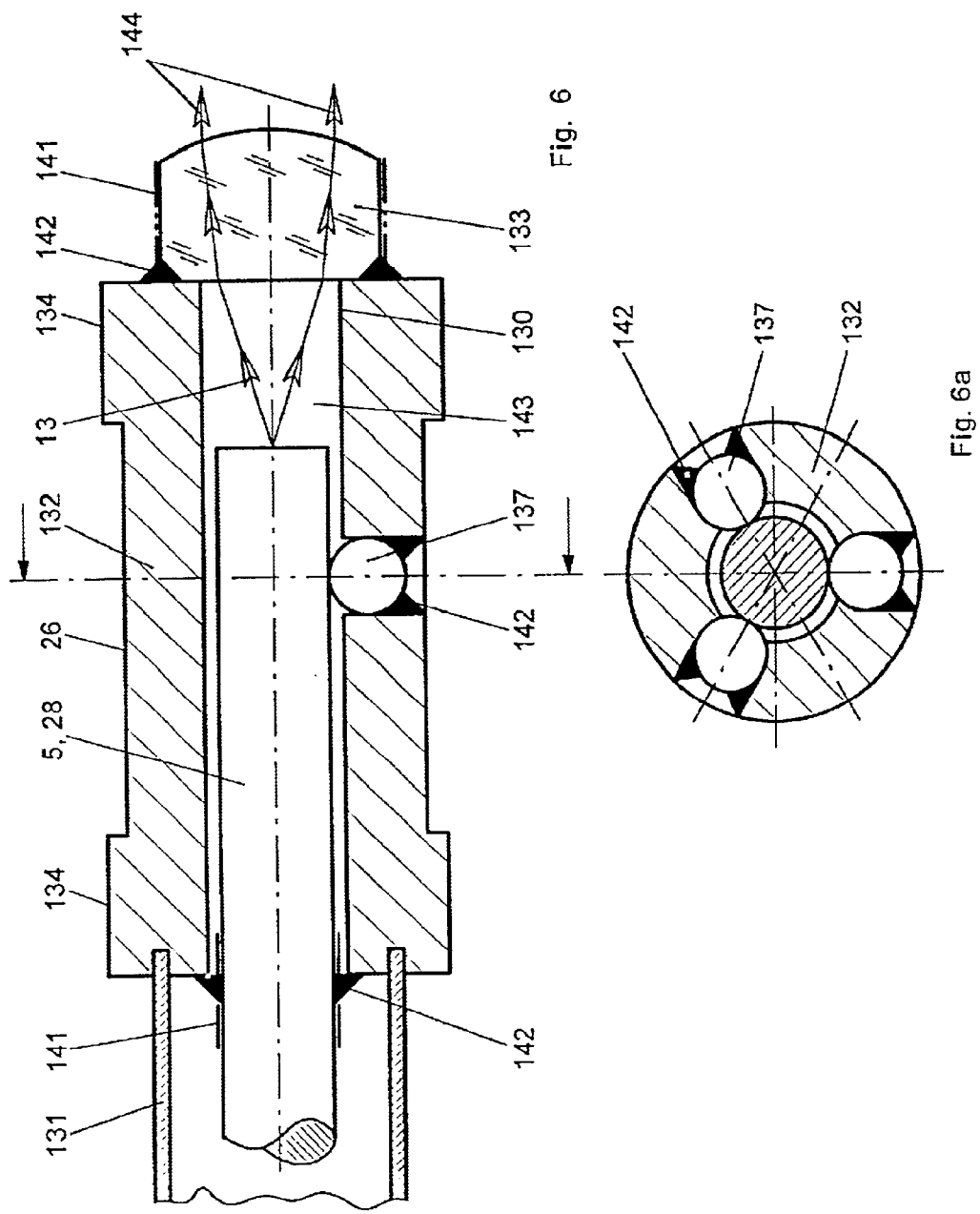

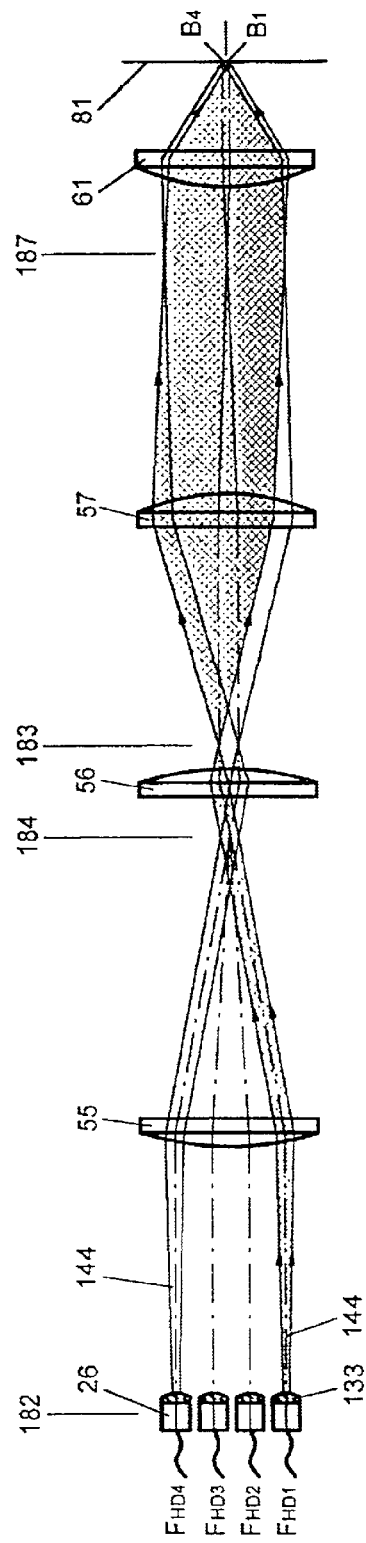
Fig. 20
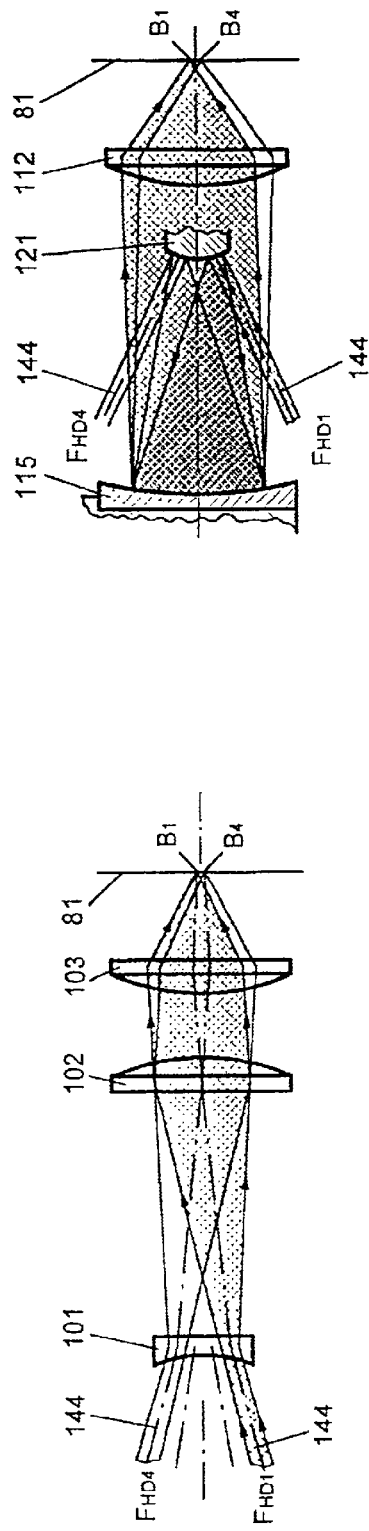
Fig. 22
Fig. 21

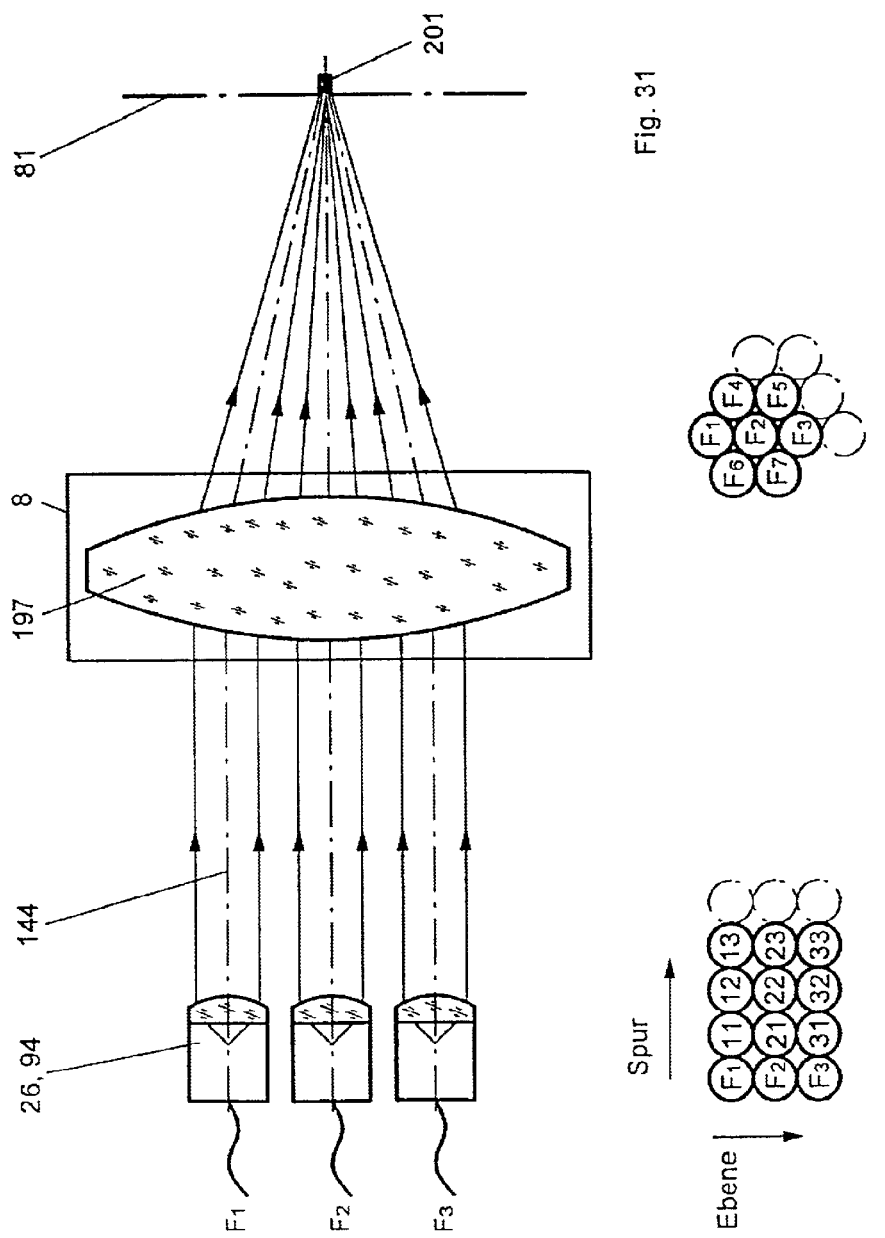

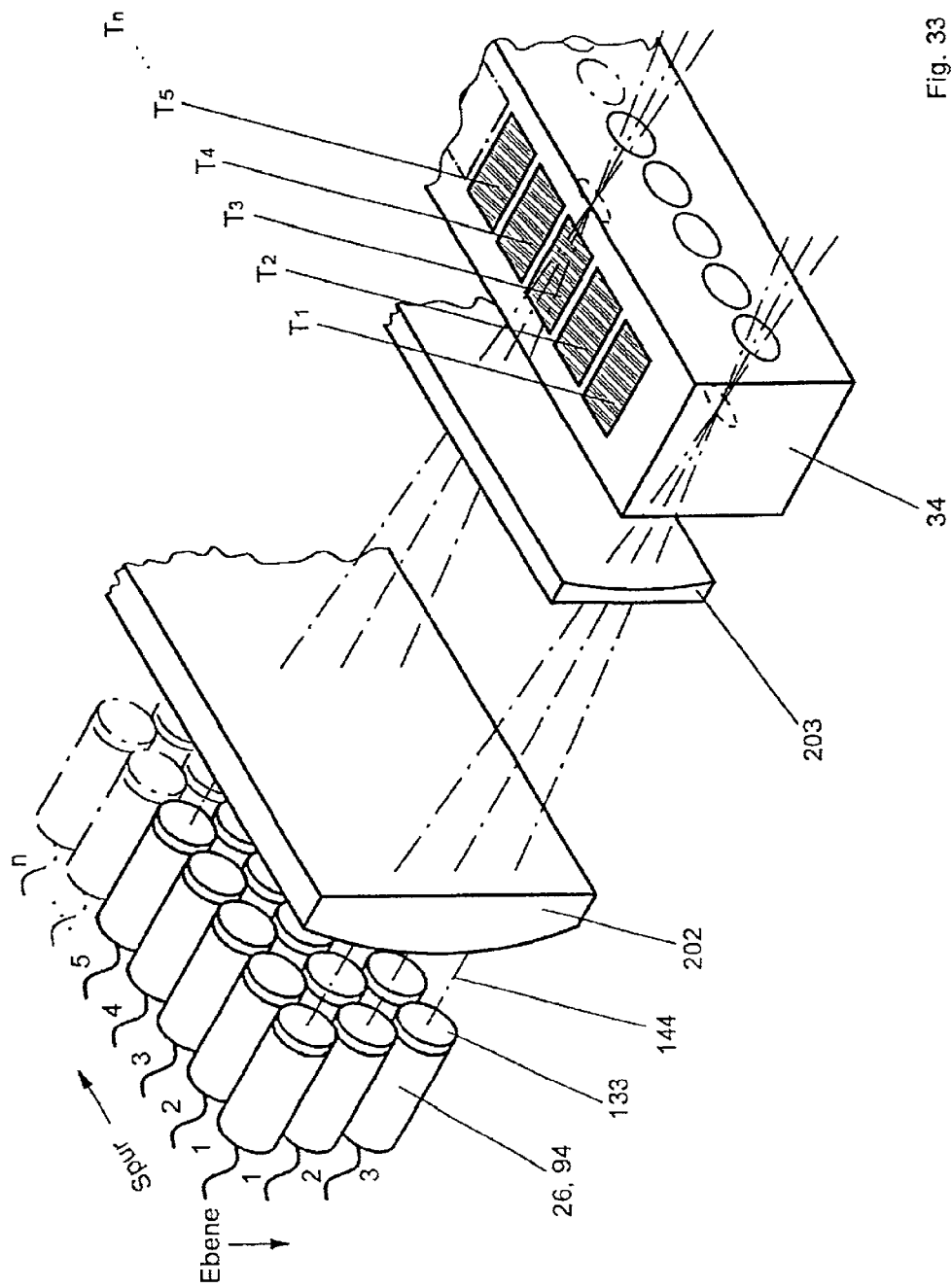

Bearbeitungsspur

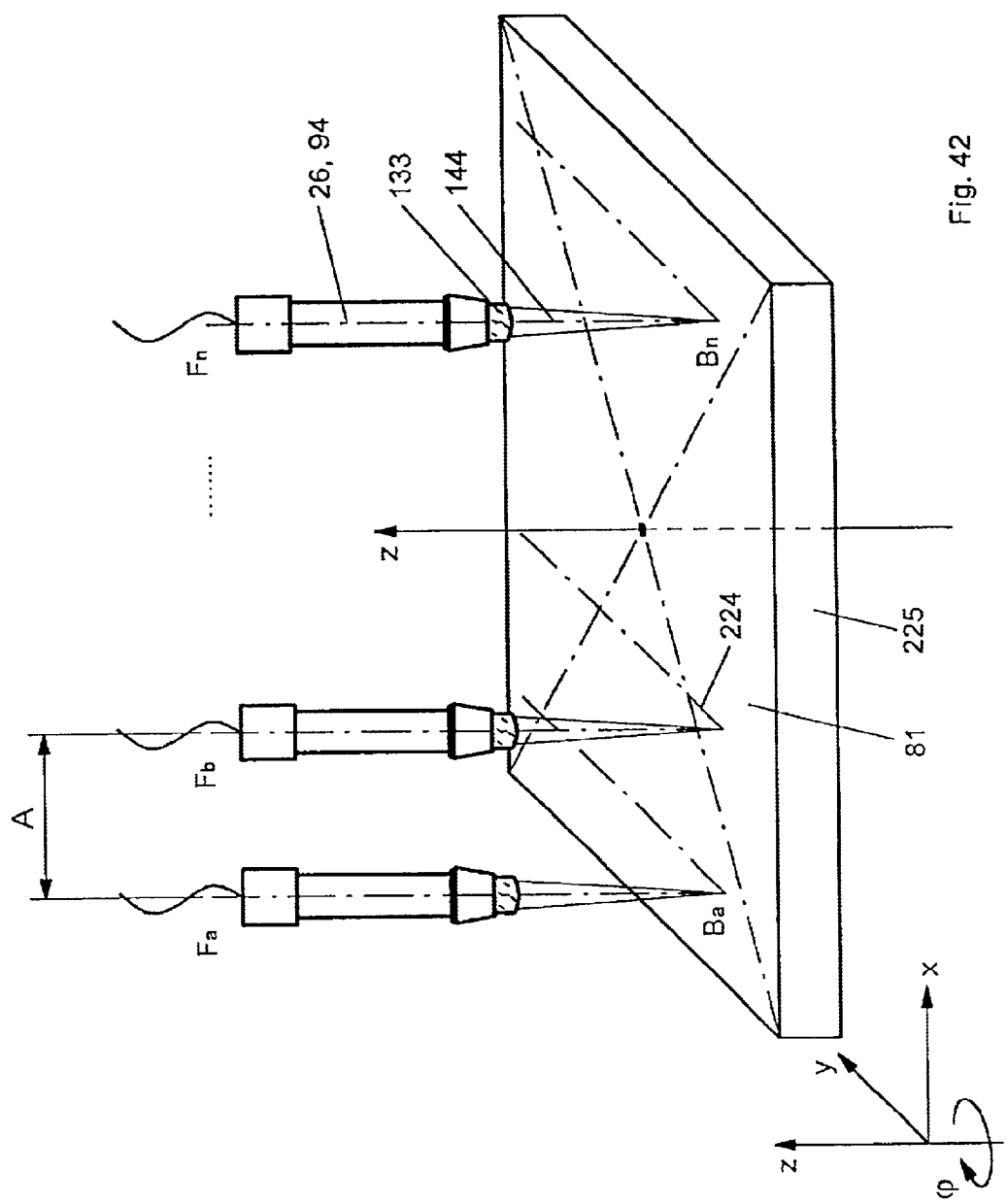

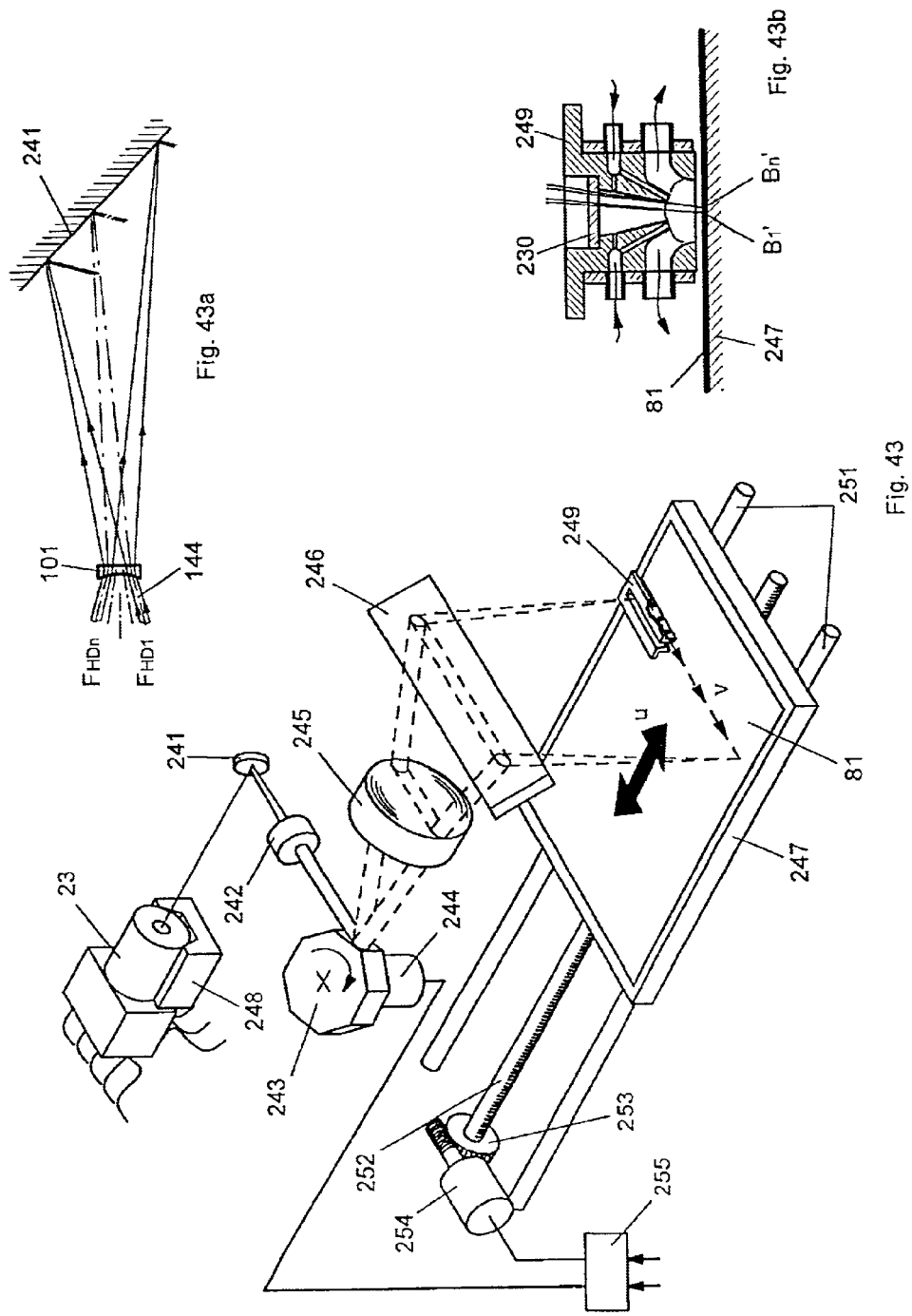

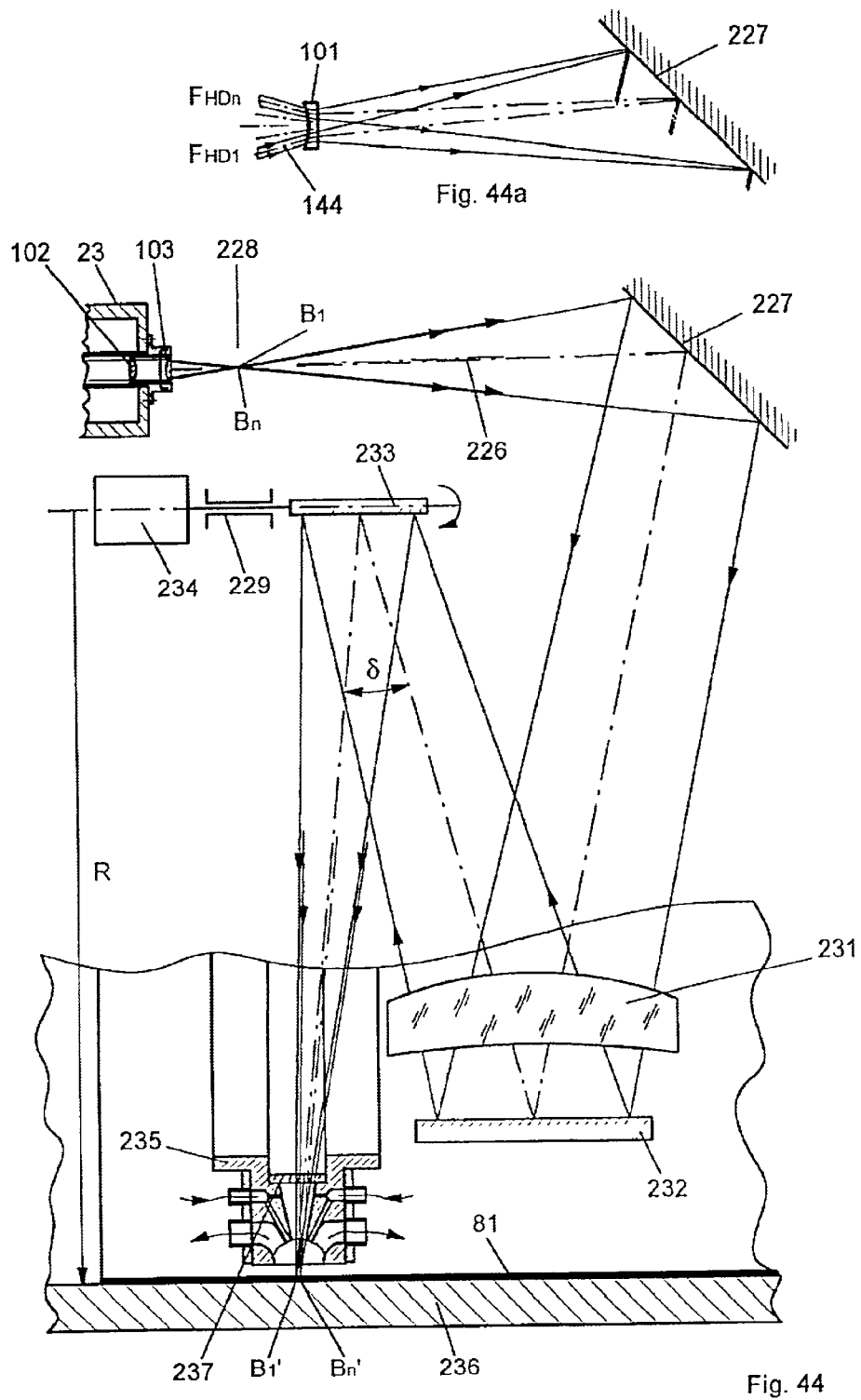

LASER RADIATION SOURCE

BACKGROUND OF THE INVENTION

The invention is directed to a laser radiation source, preferably for processing materials, as well as to an arrangement for processing material comprising a laser radiation source and to the operation thereof.

When processing materials with focused energy beams such as, for example, electron beams or laser beams, there are applications wherein structures must be produced that make high demands of the focused energy beam with respect of its beam geometry and the focusability of the beam. At the same time, however, a high beam power is required.

A typical case wherein extremely fine structures must be produced on a processing surface is the production of printing forms, whether for rotogravure, offset printing, letter press printing, silk screening or flexo-printing or for other printing processes. In the production of printing forms, it is necessary to produce extremely fine structures on the surface of the printing forms, since highly resolved image information such as text, screened images, graphics and line work must be reproduced with the surface of the printing forms.

In rotogravure, the printing forms were produced in the past with etching, which had led to good results; the etching, however, was replaced over the course of time by more environmentally friendly engraving with electromagnetically driven diamond styli. Printing cylinders whose surface is composed of copper are normally employed as printing forms in rotogravure, these fine structures required for the printing being engraved thereinto in the form of cups with the diamond stylus. The printing cylinders are introduced into a printing press after they are produced, the cups being filled with ink therein. Subsequently, the excess ink is removed with a doctor blade and the remaining ink is transferred onto the printed matter during the printing process. Copper cylinders are thereby employed because of their long service life in the printing process. A long service life is required given large editions, for example, in particular, in magazine printing or packaging printing, since the surface of the printing form wears in the printing process as a result of the influence of the doctor blade and of the printed matter. In order to extend the service life even further, the printing cylinders are provided with a copper layer that has been galvanized on; on the other hand, solid cylinders of copper are employed. Another possibility of making the service life even longer is comprised in galvanically chrome plating the copper surface after the engraving. In order to achieve an even longer service life, what is referred to as "hot chrome plating" is additionally applied, whereby the galvanic process is carried out under elevated temperature. The longest service lives that could previously be obtained were achieved therewith. Deriving therefrom is that copper is the most suitable as the material for the surface of rotogravure cylinders. Materials other than copper have not hitherto proven themselves for large editions.

When producing the cups, the drive of the diamond stylus occurs via an electromechanically driven magnet system having an oscillating armature to which the diamond stylus is secured. Such an electromechanical oscillatory system cannot be made arbitrarily fast because of the forces that must be exerted in order to engrave the cups. This magnet system is therefore operated above its resonant frequency so that the highest engraving frequency, i.e. the highest engraving speed can be achieved. In order to increase the engraving speed even further, a number of such engraving systems have been arranged side-by-side in the axial direction of the copper cylinder in given current engraving machines. This, however, still does not suffice for the short engraving time of the printing cylinders required currently, since the engraving time directly influences the actuality of the printing result. For this reason, rotogravure is not employed for newspaper printing but mainly for magazine printing.

Upon utilization of a plurality of engraving systems, a plurality of what are referred to as lanes are simultaneously engraved into the surface of the printing cylinder. For example, such a lane contains one or more entire magazine pages. One problem that thereby arises is that cups having different volumes are generated in the individual lanes given the same tone value to be engraved, this occurring because of the different engraving systems that are driven independently of one another and leading to differences in the individual lanes that the eye detects during later observation. For this reason, for example in packaging printing, only one engraving system is employed so that these errors, which are tolerated in magazine printing, do not occur.

When engraving the cups, the cup volume is varied dependent on the image content of the master to be printed. The respective tone value of the master should thereby be reproduced as exactly as possible during printing. When scanning the masters, the analog-to-digital converters having, for example, a resolution of 12 bits are utilized for recognizing the tone value gradations for reasons of image signal processing (for example, gradation settings), this corresponding to a resolution of 4096 tone values in this case. The signal for the drive of the electromagnetic engraving system is acquired from this high-resolution image information, said signal usually being an 8-bit signal corresponding to a resolution into 256 tone value gradations. In order to generate the corresponding volumes that are required for achieving this scope of gradations, the penetration depth of the diamond stylus into the copper surface is varied with the drive of the magnet system, whereby the geometry of the cups changes between approximately 120 $\mu$m diameter given a depth of 40 $\mu$m and approximately 30 $\mu$m diameter given a depth of 3 $\mu$m. Because only an extremely small range of variation in the depth of the cups between 40 $\mu$m and 3 $\mu$m is available, the penetration depth of the stylus with which the cups are engraved must be exactly driven to fractions of a $\mu$m in order to reproducibly achieve the desired range of gradation. As can be seen therefrom, an extremely high precision is required in the engraving of the cups, at least as regard to the generation of the required diameters and depths of the cups. Since the geometry of the engraved cups is directly dependent on the shape of the stylus, extremely high demands are also made of the geometry of the diamond stylus which, as has been shown, can only be achieved with extremely high expense and with a high rejection rate in the manufacture of the styli. Moreover, the diamond stylus is subject to wear since, when engraving a large printing cylinder having fourteen lanes, a circumference of 1.8 m and a length of 3.6 m given a screen of 70 lines/cm—which corresponds to a plurality of 4900 cups/cm$^2$, a stylus must engrave approximately 20 million cups. When one of the diamond styli breaks off during the engraving of a printing cylinder, then the entire printing cylinder is unuseable. On the one hand, this causes a considerable financial loss and, on the other hand, represents a serious loss of time since a new cylinder must be engraved, postponing the start of printing by hours. For this reason, users frequently replace styli earlier than necessary. As can also be seen therefrom, the endurance of the diamond styli is also a critical concern.

All in all, electromagnetic engraving is well-suited for producing high-quality rotogravure cylinders; however, it has a number of weak points and is extremely complicated and one would like to eliminate these disadvantages with a different method.

The cups produced in this way, which are intended to accept the ink later, are also arranged on the surface of the printing form in conformity with a fine, regular screen, namely the printing screen, whereby a separate printing cylinder is produced for each ink, and whereby a different screen having a different angle and different screen width is respectively employed. When printing in the printing press, given these screens, narrow bridges remain between the individual cups, these supporting the doctor blade that removes the excess ink after the inking. Another disadvantage of this operating mode of this electromechanical engraving is that texts and lines must also be reproduced in screened fashion, which leads to step-patterns in the contours of the written characters and the lines that the eye perceives as being disturbing. This is one disadvantage compared to the widespread offset printing wherein this stepping can be kept an order of magnitude lower, which can then no longer be perceived by the eye, and which leads to a better quality that rotogravure could hitherto not achieve. This is a serious disadvantage of the rotogravure process.

In rotogravure, no stochastic screens can be generated wherein the size of the cups and the position of the cups can be randomly distributed corresponding to the tone value; this is not possible when engraving with the diamond stylus. Such stochastic screens are also frequently referred to as "frequency-modulated screens" that have the advantage that details can be reproduced far better with no Moirè, this also leading to a better image quality than in rotogravure.

It is also known to utilize the electron beam engraving method applied in the processing of materials for generating the cups, this having exhibited extremely good results because of the high energy of the electron beam and the incredible precision with respect to the beam deflection and beam geometry.

This method is described in the publication, "Schnelles Elektronenstrahlgravierverfahren zur Gravur von Metallzylindem", Optik 77, No. 2 (1987) pages 83–92, Wissenschaftliche Verlagsgesellschaft mbH Stuttgart. Due to the extremely high expense that is required for the hardware and electronics, electron beam engraving has hitherto not prevailed in practice for the engraving of copper cylinders for rotogravure but only in the steel industry for surface engraving of what are referred to as textured drums for sheet metal manufacture wherein textures are rolled into the sheets.

It has been repeatedly proposed in the trade literature as well as in the patent literature to engrave copper cylinders with lasers. Since copper, however, is an extremely good reflector for laser radiation, extremely high powers and, in particular, extremely high power densities of the lasers to be employed are required in order to penetrate into the copper and melt it. There has hitherto not been any laser engraving unit with laser radiation sources having a correspondingly high power density and energy with which one succeeds in providing the copper cylinders for rotogravure with the required cup structure in the copper surface.

Attempts have nonetheless been made to utilize lasers for rotogravure in that a switch has been made to materials other than copper. Thus, for example, the publication DE-A-19 20 323 has proposed to prepare copper cylinders with chemical etching such that the surface of the copper cylinder already comprises cups that have a volume that corresponds to the maximum printing density. These cups are filled with a solid filler material, for example plastic. Much of the filler material is then removed with a laser until the desired cup volume has been achieved. This method in fact manages with a lower laser power than would be necessary in order to melt and evaporate the copper as in electron beam engraving. In this method, however, the remaining plastic is attacked by the solvent of the ink in the printing process and is decomposed, so that only a low print run is possible. This method has not proven itself in practice and has thus not been utilized.

The publication of the VDD Seminar Series, "Direktes Lasergravierverfahren für metallbeschichtete Tiefdruckzylinder", published within the framework of a "Kolloquium vom Verein Deutscher Druckingenieure e.V. und dem Fachgebiet Druckmaschinen und Druckverfahren, Fachbereich Maschinenbau, Technische Hochschule Darmstadt", by Dr. phil. Nat. Jakob Frauchiger, M D C Max Dätwyler, A G, Darmstadt, 12 Dec. 1996, has proposed that rotogravure cylinders plated with zinc be engraved by a quality-switched Nd:YAG high-power solid-state laser pumped with arc lamps. In this method, the volume of the cups is defined by the optical power of the laser. The laser power required for the engraving is transmitted onto the cylinder surface via an optical fiber whose output is imaged onto the cylinder surface through a variable focusing optics. One disadvantage of this method is that the arc lamps required for pumping the laser have a relatively short service life and must be replaced after approximately 500 hours of operation. The engraving cylinder becomes unuseable given a failure of the pump light source during the engraving. This corresponds to a failure of the diamond stylus in electromechanical engraving and results in the same disadvantages. A preventative replacement of the arc lamps is cost-intensive and work-intensive, particularly since one must count on the fact that the laser beam must be readjusted in position after the replacement of the lamps. These lamp-pumped solid-state lasers also have a very poor efficiency since the laser-active material absorbs only a slight fraction of the available energy from the pump source, i.e. from the arc lamp here, and converts into laser light. Particularly given high laser powers, this means a high electrical connection cost, high operating costs for electrical energy and cooling and, in particular, a considerable expense for structural measures due to the size of the laser and the cooling unit. The space requirements are so high that the laser unit must be located outside the machine for space reasons, this in turn being accompanied by problems in bringing the laser output onto the surface of the printing cylinder.

A critical disadvantage of this method is that zinc is significantly softer than copper and is not suitable as a surface material for printing cylinders. Since the doctor blade with which the excess ink is removed before printing in the printing press is a steel blade, the zinc surface is damaged after a certain time and the printing cylinder becomes unuseable. A printing cylinder having a surface of zinc therefore does not even begin to approach as long a service life in printing as a printing cylinder having a surface of copper. Printing forms having a zinc surface are therefore not suitable for high press runs.

Even if the zinc surface is chrome-plated after the engraving, as has been also proposed in order to lengthen the service life, the durability does not come close to that of normal copper cylinders. Chrome does not adhere to zinc as well as it adheres to copper and what is referred to as "hot chrome plating", which is successfully employed given copper cylinders in order to achieve an optimum adhesion of the chromium on the copper, is not possible given zinc since the zinc would thereby melt. Since the chrome layer does not adhere very well on the zinc, it is likewise attacked by the doctor blade, which leads to a relatively early failure of the printing cylinders. When, in contrast thereto, copper cylinders are chrome-plated according to this method, then incredibly high press runs are possible since the chromium firmly adheres on the copper surface, so that these copper cylinders out perform the chrome-plate zinc cylinders by far.

It proceeds from the publication EP-B-0 473 973, which is likewise directed to the method described above, that an energy of 6 mWsec is required in this method given zinc for cutting a cup having a diameter of 120 μm and a depth of 30 μm. An energy of 165 mWsec is recited in this publication for copper, this amounting to a factor of 27.5 for the required laser power. Lasers having a continuous-wave performance of several kilowatts given good beam quality are thus required in order to produce cups in copper with a speed that is accessible for the printing industry. Such a power, however, cannot be produced with the laser arrangement described above. For this reason, it is likewise only possible to engrave a zinc surface.

Such a laser arrangement, which is composed of a single solid-state laser, in fact makes it possible to process rotogravure cylinders having a zinc surface; if, however, one wishes to utilize the advantages of the copper surface and stay with copper cylinders and engrave these with a laser, the high power density required for penetration into the surface of the copper and the high energy required for melting the copper must be inevitably exerted. This, however, has not hitherto been successfully done with a solid-state laser.

It is known that the beam quality in solid-state lasers, i.e. the focusability, decreases with increasing power. Even if the power of the solid-state lasers were to be driven up or if a plurality of solid-state lasers were directed onto the same cup or parts thereof, it would therefore not be possible to satisfactorily engrave copper cylinders for rotogravure with such a laser because the precision of the laser beam, as offered by the electron beam, required for generating the fine structures cannot be achieved. If the laser power were increased given this apparatus, then a further problem would arise: the focusing of high radiant intensity into optical fibers is, as known, difficult. The fibers burn at high power as a consequence of misadjustment at the infeed location. If one wishes to avoid this, however, the fiber diameter would have to be enlarged which, however, in turn has the disadvantage that the fiber diameter would have to be imaged onto the processing material with even greater demagnification. A demagnified imaging, however, leads to an increase in the numerical aperture on the processing surface and, consequently, to a reduced depth of field on the processing surface. As proposed, the distance from the processing surface could be kept constant. When, however, the beam penetrates into the surface of the material, then a defocusing automatically derives. This has a disadvantageous influence on the required power density and on the exact dot size. Since, however, the diameter of the processing spot and the energy of the beam determine the size of the cup, it then becomes difficult to make the cup size as exactly as required by the desired tone value. For this purpose, it would also be necessary that the laser power is exactly constant and also remains constant over the entire time that is required for a cylinder engraving. When this is not the case, the cup size changes and the cylinder becomes unuseable. This cannot be compensated by varying the size of the processing spot since it is not possible to adequately vary the processing spot in shape.

Further, a complicated modulator is required given such an arrangement. As known, modulators for extremely high laser powers are slow, this leading to a reduction of the modulation frequency and, thus, of the engraving frequency. When, however, the engraving frequency is too low, the energy diffuses into the environment of the processing spot on the processing surface without cutting out a cup. It is therefore necessary to also exert a high power in addition to the high energy for the cutting.

The publication "Der Laser in der Druckindustrie", by Werner Hülsbusch, page 540, Verlag W. Hülsbusch, Konstanz, describes that it is particularly a matter of a high power density in processing materials. Given power densities of typically above $10^7$ through $10^8$ W/cm$^2$, a spontaneous evaporation of the material occurs in all materials, this being accompanied by a sudden absorption rise, which is especially advantageous since the laser power is then no longer reflected from the metal surface. When, for example, a laser source of 100 W is available, then the processing spot diameter may not be larger than 10 μm in order to arrive at these values in the region, as proceeds from the following equation: 100 W:(0.001 cm×0.001 cm)=$10^8$ W/cm$^2$.

SUMMARY OF THE INVENTION

One object of the present invention is to improve a laser radiation source, preferably for processing materials, such as in the rotogravure, flexo, and offset printing arts, as well as an arrangement for processing materials having a laser radiation source and the operation thereof such that an extremely high power density and energy are achieved in a cost-beneficial way, and such that both the beam shape with respect to flexibility, precision and beam positioning as well as the beam power can be exactly controlled even given significantly higher laser powers.

According to at least one aspect of the present invention, a system and method are provided for selectively processing material on a processing surface of a printing form to create a fine structure or pattern for images or text. At least one fiber laser comprising a pump source and a laser fiber is provided. A laser gun is mounted adjacent the printing form and has at least a focusing optics. The fiber laser outputs a laser beam which is diffraction-limited to permit the focusing optics to focus the laser beam onto the processing surface of the printing form as a spot having a spot size sufficiently small to process the processing surface to create the fine structure or pattern for images or text.

BRIEF DESCRIPTION OF THE DRAWINGS

FIG. 5b is an example of a terminator having adjustment screws;

FIG. 5c is a cross-section through the terminator according to FIG. 5b in the region of the adjustment screws;

FIG. 6 is an example of a terminator having spherical adjustment elements;

FIG. 6a is a cross-section through the terminator according to FIG. 6 in the region of the spherical adjustment elements;

FIG. 20 is a schematic beam path for a plan view for FIG. 4;

FIG. 21 is a schematic beam path for a plan view for FIG. 4b;

FIG. 22 is a schematic beam path for a plan view for FIG. 4c;

FIG. 29 is an arrangement of a plurality of terminators in a plurality of tracks and in a plurality of planes;

FIG. 30 is an arrangement of a plurality of terminators in a bundle;

FIG. 31 is a sectional view through the beam bundle from the terminators of the fiber lasers F1 through F3 according to FIG. 29 or FIG. 30;

FIG. 36b is an expanded embodiment related to FIG. 36a;

FIG. 42 shows a further embodiment of the laser radiation source;

FIG. 42b is a sectional view of FIG. 42a;

FIG. 43 shows a flat bed arrangement having one preferred embodiment of a laser beam source;

FIG. 43a is an addition to FIG. 43;

FIG. 43b is a sectional drawing through an arrangement for removing the material released during the processing;

FIG. 44 is a hollow bed arrangement having one preferred embodiment of a laser beam source; and FIG. 44a shows an addition to FIG. 44.

DESCRIPTION OF THE PREFERRED EMBODIMENTS

Figure 1:
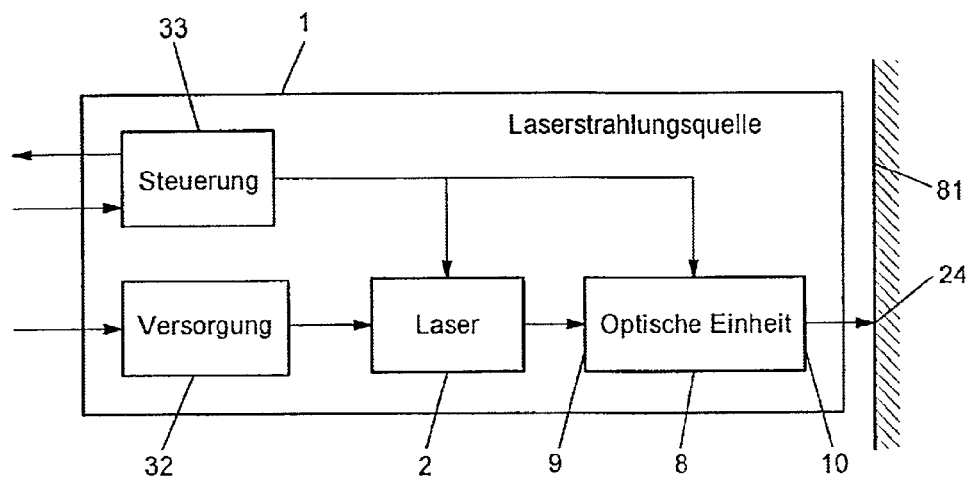
FIG. 1 is a schematic illustration of the laser radiation source.

For the purposes of promoting an understanding of the principles of the invention, reference will now be made to preferred embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The laser radiation source comprises at least one diode-pumped fiber laser, or a plurality of diode-pumped fiber lasers whose output radiation beams impinge the processing location next to one another and/or over one another or in a point or bundle and thus enables the generation of a processing spot that is designationally variable in shape and size, even given extremely high laser powers and extremely high power densities. According to preferred embodiments, these fiber lasers can be implemented as continuous wave lasers or as quality-switched lasers, also referred to as Q-switch lasers, whereby they are advantageously internally or externally modulated and/or comprise an additional modulator. Q-switch lasers have an optical modulator available to them within the laser resonator, for example an acousto-optical modulator, that, in its opened condition, interrupts the laser effect given a pump radiation that continues to exist. As a result thereof, energy is stored within the laser resonator, this being output as a short laser pulse having high power when the modulator is closed in response to a control signal. Q-switch lasers have the advantage that they emit short pulses having high power, which briefly leads to a high power density. An advantageous elimination of the molten and evaporated material is enabled in the pulsed mode due to the brief-term interruptions in the processing event. Instead of switching the quality, a pulsed mode can also be generated with internal or external modulation.

The processing spot can be designationally modified in shape and size in that different numbers of lasers are provided that can be switched on for shaping the processing spot. It is thereby especially advantageous that the depth of the cut cup can be determined by the laser energy independently of its shape and size. Further, a control of the energy of the individual lasers can also generate any arbitrary beam profile within the processing spot and, thus, any arbitrary profile within the cup as well.

Further advantages of the present preferred embodiments compared to known laser radiation sources are comprised therein that the infeed of the radiant power from a solid-state laser into an optical fiber can be eliminated but the exit of the fiber laser supplies diffraction-limited radiation that, according to the preferred embodiments can be focused onto less than a 10 $\mu$m diameter, as a result whereof an extremely high power density is achieved given the greatest possible depth of field.

Given a traditional arrangement with solid-state lasers, the size of the processing spot lies in the region of approximately 100 $\mu$m. Given the present preferred embodiments, thus a power density that is improved by the factor 100 derives, and a design possibility in the area of the processing spot that is improved by the factor 100 derives.

Due to the high precision and due to the shape of the processing spot that can be designed in very fine fashion, extremely fine screens, also including the stochastic screens that are also called frequency-modulated screens (FM screens) and, thus extremely smooth edges in lines and written characters can be economically produced, so that rotogravure no longer need be inferior to offset printing in terms of printing quality.

Due to the operating mode of the laser radiation source of the preferred embodiments, it is also possible to link arbitrary raster widths to arbitrary screen angles and apply arbitrary different screen widths and arbitrary different screen angles at arbitrary locations on the same printing cylinder. Line patterns and text can also be applied independently of the printing screen as long as one sees to sufficient supporting locations for the doctor blade.

One advantage of the preferred embodiments is that the differences in the data editing for the production of the printing form are reduced to a minimum between rotogravure and offset printing, this yielding substantial cost and time savings. Up to now, the data for the rotogravure are acquired by conversion from the data already present for the offset printing because a signal is required for the drive of the engraving system that defines the volume of a cup, whereby the area of a screen dot is determined in offset printing. As a result of the multiple arrangement of lasers, the laser beam source of the preferred embodiments makes it possible to vary the area of a cup given constant depth, for which reason it is no longer required to convert the data for offset printing into data for the rotogravure. The data for the offset printing can be directly employed for engraving the rotogravure forms.

Another advantage of the preferred embodiments is that both the area of a cup as well as the depth can be controlled independently of one another with this laser radiation source, this leading to a greater number of tone value gradations that can be reproducibly generated, this leading to a more stable manufacturing process for the printing cylinders and to an improved printing result.

It is also an essential advantage that the energy can be unproblemmatically transported from the pump source to the processing point with the fiber, namely the fiber laser itself, or with a fiber that is welded on or, respectively, attached in some other way, this yielding an especially simple and space-saving structure.

Another advantage of the preferred embodiments is that the efficiency of such an arrangement with fiber lasers is significantly higher than the efficiency of solid-state lasers, since absorption efficiencies of more than 60% are achieved for fiber lasers, these lying only at approximately half given traditional diode-pumped solid-state lasers and being even far lower given lamp-pumped solid-state lasers. Given the required power of several kilowatts for an efficient engraving of rotogravure cylinders, the efficiency of the lasers is of incredible significance for the system costs and the operating costs.

Further, a multiple arrangement of lasers yields the advantage that the outage of a laser is less critical than given a single-channel arrangement. When the only laser that is present given the single-channel arrangement fails during the engraving of a printing cylinder, the entire printing cylinder is unuseable. When, however, a laser fails given a multiple arrangement, then the power of the remaining lasers can, for example, be slightly boosted in order to compensate the failure. After the end of the engraving, the laser that has failed can then be replaced.

The dissertation, "Leistungsskalierung von Faserlasern", Physics Department of the University of Hannover, Dipl.-Phys. Holger Zellmer 20 Jun. 1996, fiber lasers are discussed as being known. These lasers, however, had already been proposed in 1963 by Snitzer and Köster, without these having been previously utilized for processing materials given high powers. Although powers of up to 100 W can be fundamentally achieved with the lasers described in this dissertation, no useable arrangements are known for utilizing these lasers for purposes of the present preferred embodiments.

The publication WO-A-95/16294 has already disclosed phase-coupled fiber lasers; however, these are extremely involved in terms of manufacture and are not suitable for industrial employment. It had hitherto not been recognized to bring lasers of this simple type to high power density and energy in the proposed, simple way and to utilize them for erosive processing of materials.

For example, the resonator length of the individual lasers must be kept exactly constant to the fraction of a micrometer, for which purpose what are referred to as "piezoelectric fiber stretchers" are utilized. As a result of the complex structure, it is likewise not possible to construct the laser unit modularly, i.e. of components that are simple to assemble and to be multiply employed or to replace individual laser components as needed on site as a consequence of the great number of optical components within a phase-coupled laser. Moreover, the optical losses are extremely high, and the pump radiation absorption of the laser-active medium is low, which results in a low efficiency of the arrangement. Although fiber lasers are not particularly susceptible to back-reflections in and of themselves, phase-coupled lasers exhibit a great sensitivity to back-reflections due to their very principle, i.e. when portions of the emitted radiation proceed back into the laser resonator due to reflection or dispersion, as is unavoidable when processing materials. These back-reflections lead to uncontrolled output amplitudes and cause the laser to shut down. Although what are referred to as optical isolators are known, these being intended to attenuate such back-reflections, these involve a number of disadvantages in practice, which, for example, include the optical losses, the high price and the inadequate attenuation properties. The lasers for the purpose of the present preferred embodiments of processing materials need not only exhibit a high power density but also must be able to supply the required energy for cutting out the cups, must be extremely stable in terms of the emitted radiation and must have a very good efficiency.

Further, U.S. Pat. No. 5,694,408 has disclosed a laser system wherein a master oscillator generates low-power radiation energy at a specific wavelength, this being optically intensified and it being distributed for further post-amplification onto a plurality of post-amplifiers, in order to then be in turn united to form a common beam, a precise phase readjustment of the individual post-amplified signals being required for this purpose in order to avoid interferences in the output signal. This requires complicated measuring and control procedures and involved actuating elements, for which purpose, for example, electro-optical phase modulators must be utilized, these being extremely expensive and having to be operated with extremely high voltages.

Further, U.S. Pat. No. 5,084,882 discloses a phase-coupled laser system that employs a plurality of fibers or fiber cores in a bundle, the core thereof being, on the one hand, large compared to its cladding or its spacing in order to achieve the phase coupling; on the other hand, this should only have a diameter of a few micrometers since it is a matter of single-mode fibers. This system is mainly provided as an optical intensifier.

Another phase-coupled laser system that is likewise implemented in an extremely complex way and that is composed of a plurality of what are referred to as "sub-oscillators" is disclosed by GB-A-21 54 364 under the title "Laser Assemblies", having already been disclosed in 1984; however, no industrial realizations with such phase-coupled laser systems have become known up to now.

It has also not been previously proposed to combine a number of the initially cited fiber lasers in a simple way, i.e. without a complex phase coupling or the like, to form a compact, rugged and service-friendly radiation source for processing materials and, for example, to employ this for multi-track recording. A multiple arrangement of such simple lasers that can be cost-beneficially manufactured in quantity in several tracks and levels yields enormous advantages for the purposes of the preferred embodiments that would certainly not have escaped attention if the preferred embodiments solution had been known.

A further advantage of fiber lasers is their clearly lower tendency to oscillate when energy proceeds back into the laser. Compared to traditional solid-state lasers, fiber lasers have a resonance overshooting that is lower by an order of magnitude in terms of its transfer function, this having been very positively proven during operation. When processing materials, namely, one cannot always prevent energy from being reflected from the processing location back into the laser because the melting material is explosively hurled in unpredictable directions and thereby flies through the laser beam before it can be removed and neutralized by particular techniques that are presented in one embodiment of the invention.

An essential advantage of the multiple arrangement of fiber lasers without phase coupling is that the individual lasers behave differently in case of a back-reflection. This is related to the fact that, for example, some of the lasers are not affected at all by a back-reflection and others may possibly be effected only with a delay. The probability is therefore high that oscillations of the individual lasers, if they occur at all, are superimposed such that they have no negative influence on the quality of the results of the engraving.

The laser radiation source of the preferred embodiments can also be advantageously utilized for all other types of processing materials or transferring materials wherein high power density, high energy and great precision or, too, high optical resolution are important. In addition to engraving rotogravure cylinders having a copper surface, other materials such as, for example, all metals, ceramics, glass, semiconductor materials, rubber or plastics can be processed and/or materials can be stripped from more specifically prepared carrier materials and transferred onto other materials at high speed and with high precision. In addition to those that are uncoated, moreover, rotogravure cylinders, printing plates or printing cylinders that are coated with masks as well as all types of printing forms can also be produced or, respectively, processed at high speed and with high resolution for offset printing, letter press printing, silk screening, flexo-printing and all other printing processes. For example, the offset printing plates having metal coating (bi-metal plates) that are employed for printing extremely large print runs in offset printing and similar materials can be provided with images in an environmentally friendly way, this having been hitherto possible only with etching.

Further, materials can be processed that contain a magnetizable surface, in that the parts of the material magnetized in large-area fashion by a pre-magnetization process are de-magnetized by briefly heating selected processing points to temperatures that lie above the Curie point, when heated with the laser radiation source of the preferred embodiments. The material provided with images in this way for applications in printing technology can serve as a print master in conjunction with a corresponding toner.

As a result of the high power density of the inventive laser radiation source of the preferred embodiments, it is also possible to directly process chromium. Thus, for example, printing cylinders of copper can already be chrome-plated for rotogravure before the laser engraving, this eliminating a work step after the engraving and benefiting the timeliness. Since the printout behavior of a cup engraved in copper is also better than that of a chrome-plated cup and its volume is more precise, this method also yields even better printing results in addition to the high service life as a result of the remaining chromium layer and the improved timeliness.

The employment of the laser radiation source of the preferred embodiments, however, is not limited to employments in printing technology but can be utilized anywhere that it is important to erode material or change the properties of the material by energy irradiation with lasers given high resolution and high speed. Thus, for example, the aforementioned texture drums can also be produced with the radiation source of the preferred embodiments. Further, the patterns of interconnects for printed circuit boards, including the boards for the components, preferably for multi-layer printed circuit boards, can be produced by eroding the copper laminate and allowing the interconnects to stand, and by eroding copper laminate and carriers at the locations of the bores. Further, the surface structure of material surfaces can be partially modified by partial heating. For example, extremely fine structures in the hardness of material surfaces can be produced in large-area fashion in this way, this being particularly advantageous for bearing surfaces since the bearing properties can be intentionally influenced in this way. Further, there are non-conductive ceramic materials at whose surface metal crystallizes out due to energy irradiation, this being capable of being utilized in conjunction with the laser radiation source of the preferred embodiments for applications that require a high resolution, for example for producing interconnects.

The laser beams can thereby be guided to the processing spot and can be moved across the material in the greatest variety of ways for example, the material to be processed can be located on a rotating drum past which the radiation source is conducted in relative fashion. However, the material can also be located in a plane over which the laser radiation source or its output radiation is conducted past in relative fashion. In a flat bed arrangement as presented in the aforementioned publication "Der Laser in der Druckindustrie" von W. Hülsbusch, FIGS. 7–28 on page 431 and as likewise disclosed in the publication EP-A-0 041 241, the radiation source presented therein as argon or He Ne laser or, respectively, as laser light source (4) in FIG. 3 of the publication can be replaced by the laser radiation source of the preferred embodiments in order to utilize the advantages of the laser radiation source of the preferred embodiments. Further, the material to be processed can be located within a hollow cylinder over which the laser radiation source or its output radiation sweeps in a relative motion.

The output of the laser radiation source can also be implemented with a variable number of tracks whose mutual spacings are variable, preferably similar to a long comb, this moving relative to the material to be provided with images. Such an arrangement is disclosed by U.S. Pat. No. 5,430,816. It is disclosed therein to direct the radiation of an excimer laser having a strength of approximately 50 watts onto a bundle of what are referred to as stepped index fibers having diameters of 50 through 800 micrometers and to respectively couple a part of the radiation into the individual fibers. The exit of each fiber is then imaged onto the work piece via a respective positive lens having a diameter of 60 mm, whereby the spacing between the individual processing points must amount to at least 60 mm and a protective mechanism to prevent contamination is required per positive lens. What is disadvantageous is that only a fraction of the laser energy thus proceeds into the respective fibers. The energy distribution turns out very differently and changes in the exit power derive given movement of the fibers, for which reason what are referred to as scramblers must be utilized in order to avoid this. These scramblers, however, disadvantageously influence the efficiency of the system and increase the costs. Only relatively imprecise bores having a diameter of approximately 130 micrometers can be produced in plastic with such an arrangement. The pulse rate of the laser is the same for all simultaneously produced bores, so that all bores must be implemented of the same size. Moreover, the system is relatively slow since a boring processing lies between one and two seconds. An arrangement having fiber lasers yields tremendous advantages compared thereto: the speed can be increased by several orders of magnitude and metals can also be processed; the precision is substantially greater since fiber lasers also exhibit a stable output power given movement of the laser fibers; and bores having diameters below 10 micrometers can also be unproblemmatically produced. Since each fiber laser can be separately modulated, different processing patterns are possible. Further, the end sections of the fiber lasers can be unproblemmatically implemented smaller than 2.5 mm in diameter, this enabling a clearly smaller spacing between the processing tracks. As a result thereof, it is also possible to employ a shared protective mechanism to prevent contamination of the optics.

Another example for the application of the laser beam source of the preferred embodiments wherein the material is preferably arranged in a plane derives in the semiconductor industry in the processing of what are referred to as wafers, i.e. usually circular disks of suitable semiconductor material that, for example, are incised or cut or can be provided with all conceivable patterns in the surface, of a type that could previously be manufactured only by time-consuming chemical etching processes that were also not environmentally friendly.

For the multi-channel cutting and in sizing of materials, a simplified embodiment of the laser radiation source is possible, as disclosed in the German Patent Application P 198 40 936.2 of the assignee, "Anordnung zum mehrkanaligen Schneiden und Ritzen von Materialien mittels Laserstrahlen".

A further application of the laser radiation source is established in the manufacture of monitors and displays. For example, the apertured masks for color picture screens as well as the masks of what are referred to as flat picture screens or LCD displays can be manufactured in a more environmentally friendly way with laser processing than with the chemical etching processes that were previously employed, in that the laser radiation source is applied.

A considerable advantage of the laser radiation source is that it has a small volume and has a flexible connection, namely the laser fibers-or fibers connected thereto between the pump source and the exit of the radiation at the processing location and thus allows all conceivable operating positions of the laser radiation source or of its beam exit. There are therefore also no limitations for the spatial arrangement of the processing surface, since they can be arranged in an arbitrary attitude in space.

Another advantage of the preferred embodiments is comprised therein that the radiation beam of the individual lasers with defined values in beam diameter, beam divergence centering and angular direction can be exactly and durably acquired in a terminating section (terminator), as a result whereof a fabrication-suited and service-suited arrangement for forwarding the laser radiation onto the processing surface can be created. The radiation beams can thereby be coupled into the fiber dependent on the application, for example as pump spot and/or can be coupled out as parallel laser beam, can diverge at the exit location or, for example, can be focused in a certain distance from the exit point. There is thus a desire to fashion the terminator as small as possible and to provide it with one or more fits as a reference surface or reference surfaces for the alignment of the laser beam.

According to the preferred embodiments, this is achieved in that the optical fibers are set in the terminator and the position of the optical fibers and/or the position of the emerging radiation beam is exactly adjusted. On the basis of the exact adjustment and of a correspondingly spatially small embodiment of the terminators which can also be attached to one another in an especially simple way as a result of a special shaping, it becomes possible to combine the radiation beams of a plurality of fiber lasers and focus them such that the respectively encountered object is achieved and, at the same time, an economical manufacture as well as a cost-beneficial maintenance of the laser radiation source is enabled.

FIG. 1 shows a laser radiation source 1 that is comprised of at least one or a plurality of diode-pumped fiber lasers 2, also called fiber lasers, implemented preferably as modules, these being charged with electrical energy by a preferably modular supply 32 that is largely converted into laser radiation. Further, a controller 33 is provided via which the modulation of the radiation is undertaken and that provides to the interaction of the laser radiation source with its periphery. The output rays of the laser enter into an optical unit 8 at the radiation entry 9 and emerge from the optical unit at the radiation exit 10. The job of the optical unit 8 is to shape the laser radiation to form a processing spot 24 on a processing surface 81; however, the laser radiation can also be directly directed on to the processing surface without the optical unit.

Figure 2:
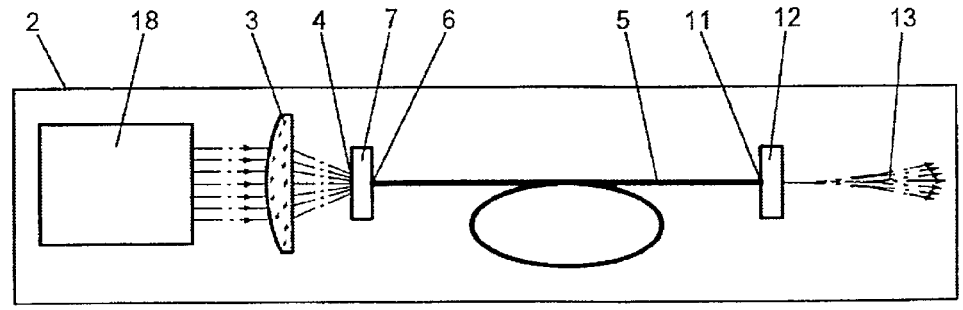
FIG. 2 is a fundamental illustration of the fiber laser (prior art)
Figure 2A:
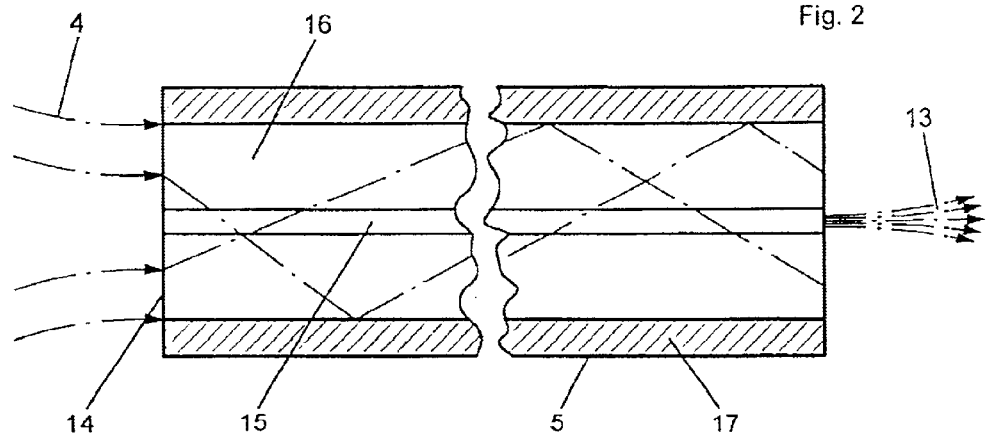
FIG. 2a is a truncated illustration of the fiber of the fiber laser (prior art)

FIGS. 2 and 2a show the fundamental structure of a fiber laser arrangement 2. In FIG. 2, the energy of a pump source such as, for example, a laser diode, called a pump source 18 here, is shaped via an infeed optics 3 to form a suitable pump spot 4 and is coupled in to the laser fiber 5. Such pump sources are disclosed, for example, in German Patent Application P 196 03 704 of the assignee. Typical pump cross-sections of the laser fibers lie approximately between 100 $\mu$m and 600 $\mu$m in diameter given a numerical aperture of approximately 0.4. The laser fiber 5 is provided with an infeed mirror 7 at the infeed side 6 that allows the pump radiation to pass unimpeded but which exhibits 100% reflection for the laser radiation. The infeed mirror 7 can be secured to the fiber end with a suitable mount or by gluing; however, it can also be realized on the fiber end by direct vapor-deposition of a suitable layer as employed given infeed mirrors for lasers. An outfeed mirror 12 that is partially reflective for the laser radiation is attached to the outfeed side 11 of the laser fiber 5, the laser radiation 13 being coupled out through the outfeed mirror 12. Advantageously, the outfeed mirror exhibits 100% reflection for the pump radiation. As a result thereof, the remaining pump radiation is reflected back into the optical fiber, which is advantageous since the pump energy is utilized better and, further, does not represent a disturbing factor in the application of the laser radiation. The outfeed mirror can, like the infeed mirror, likewise be produced by vapor-deposition.

The infeed event of the pump radiation into the pump cross-section 14 of the laser fiber 5 is shown in greater detail in FIG. 2a. The energy in the pump spot 4 excites the laser radiation in the core 15 of the laser fiber 5 on its way through the fiber. The pump core 16 is surrounded by a cladding 17. The core of the laser fiber that is approximately 5 $\mu$m through 10 $\mu$m thick is doped mainly with rare earths.

Figure 13:
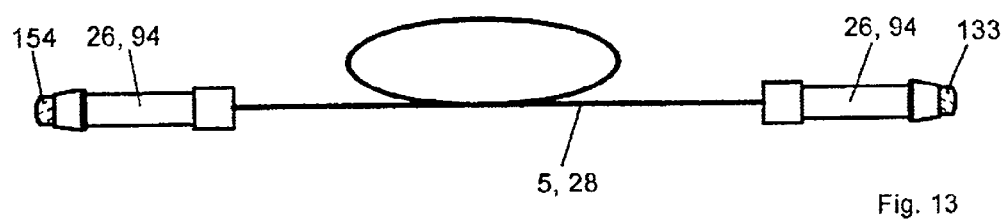
FIG. 13 is a modular implementation of the fibers of the fiber laser according to FIG. 1.
Figure 14:
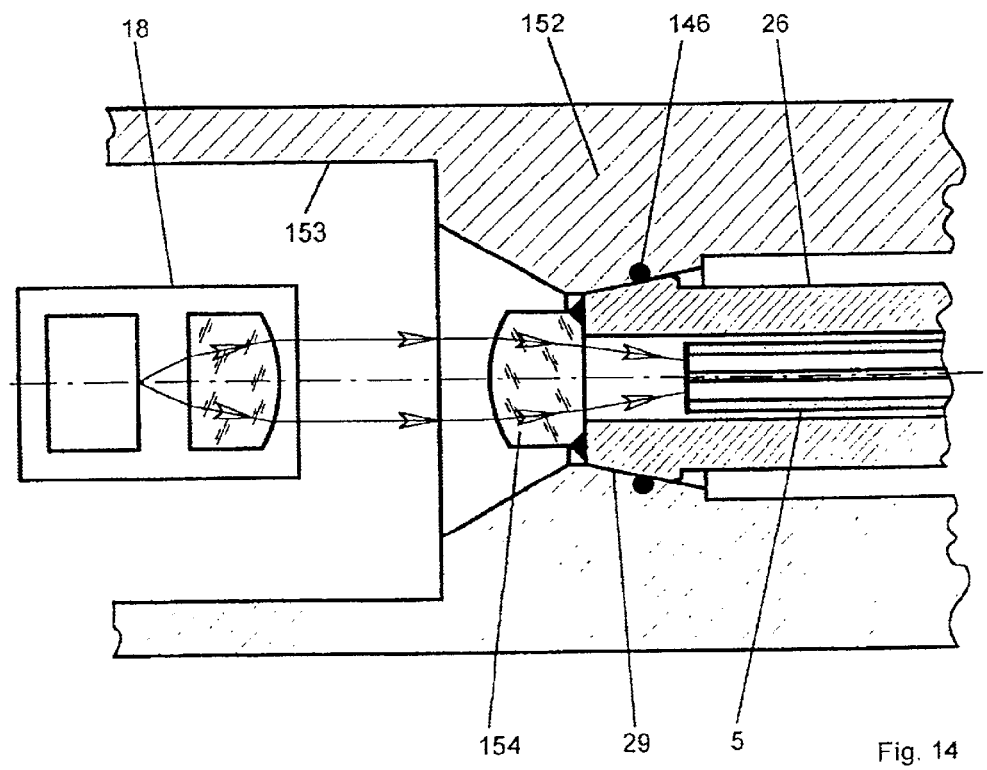
FIG. 14 is an example of the infeed of the pump energy into the fibers of the fiber laser according to FIG. 13.

The relatively large pump cross-section 14 simplifies the infeed of the pump energy and enables the use of a connection between pump source and laser fiber that is simple to release, as shown in FIGS. 13 and 14. The terminator of the laser fiber at the side of the pump source can thereby be advantageously structurally the same as the terminator at the outfeed side; however, it need not be. A precise plug-type connection between pump source and laser fiber offers considerable advantages in the manufacture of the fiber laser and in case of service. The laser fiber, however, can also be firmly connected to the pump source to form a laser module. As a result of the intentionally manufactured, extremely small fiber core diameter, the fiber laser supplies a practically diffraction-limited laser radiation 13 at the exit.

Figure 3:
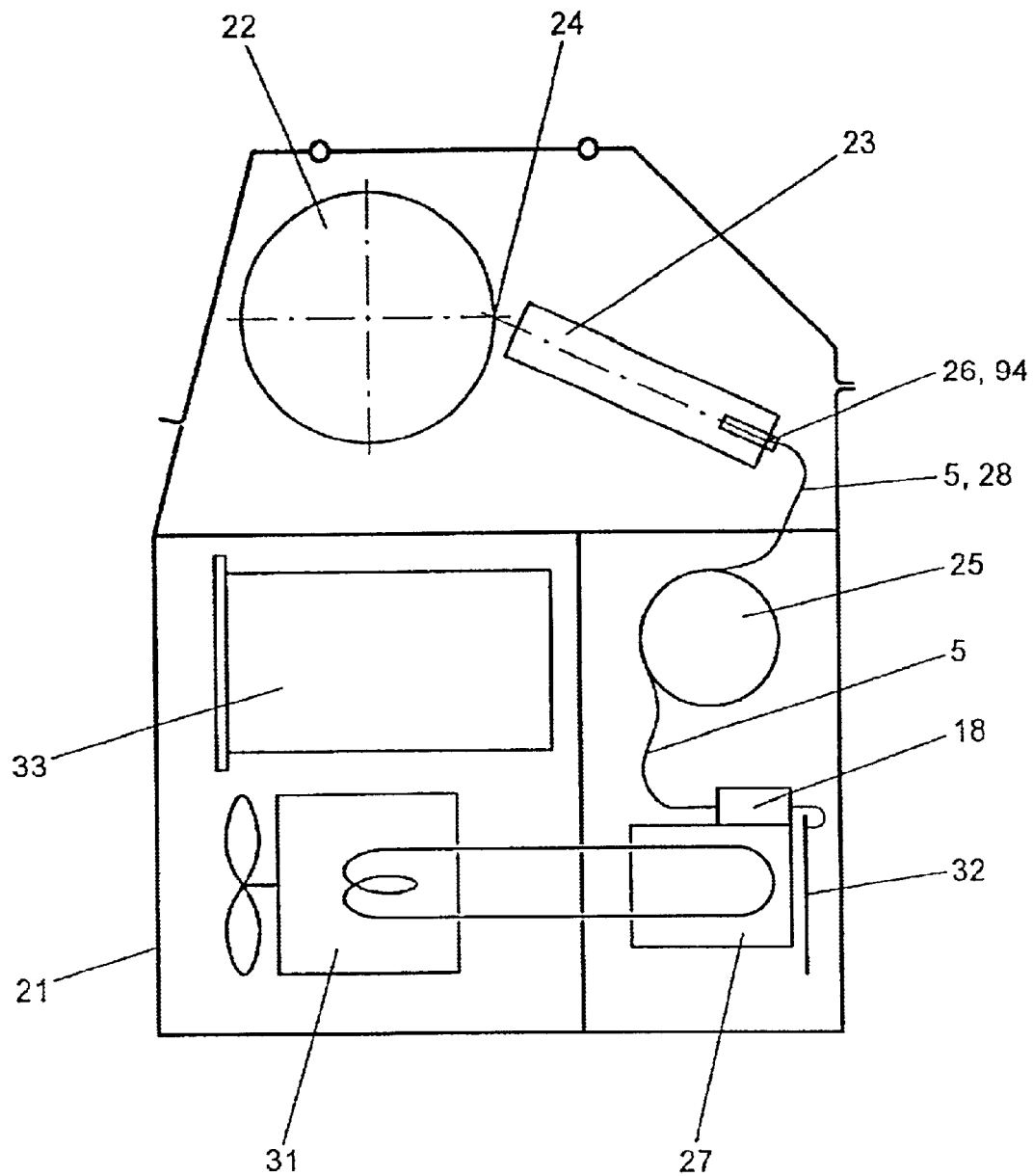
FIG. 3 is a cross-section through an arrangement for processing material with a laser radiation source of one preferred embodiment.

FIG. 3 shows a cross-section through one of the embodiments of an arrangement for processing materials with the inventive laser radiation source 1. A drum 22 is rotatably seated in a housing 21 and is placed into rotation by a drive (not shown). A laser gun 23, which is conducted along the drum in the axial direction with a carriage (not shown), is located on a prism (likewise not shown).

The laser radiation emerging from the laser gun 23 impinges the surface of the drum at the processing location in the processing spot 24. Either the surface of the drum as well as a material clamped onto the drum surface can be processed. The fiber lasers, whose laser fibers 5 are respectively wound to a form, for example, an air-permeated coil 25, are supplied into the laser gun 23 with the terminators 26, 94. Advantageously, however, passive single-mode fibers or other passive optical fibers, referred to in brief as fibers 28, can also be welded to the fiber lasers or coupled thereto in some other way before the terminators 26, 94 are attached, as described in FIGS. 15 and 16.

The pump sources 18 of the fiber lasers are attached on a cooling member 27 that diverts the waste heat via a cooling system 31. The cooling system 31 can be a matter of a heat exchanger that delivers the waste heat to the surrounding air; however, it can also be a matter of a cooling unit. The laser gun 23 can also be connected to the cooling system, but this is not shown. The driver electronics for the pump sources 18, which belong to the supply 32 (not shown in further detail), are preferably situated on the cooling member. A machine control is provided for the drives but is not shown in FIG. 3. The structure of the pump sources, fiber laser and corresponding power electronics is preferably modularly implemented, so that corresponding pump sources and power modules of the driver electronics that are separate or combined into groups belong to the individual fiber lasers, these being capable of being connected to one another via a bus system. As explained in greater detail in FIG. 13 and FIG. 14, the laser fibers 5 and the pump sources 18 can be connected to one another via a releasable connection. It is also possible to couple a slight part of the pump radiation out of the laser fiber 5, for example as a result of a slight injury to the cladding 14, and to conduct this via an optical fiber onto a measuring cell in order to offer a signal therefrom that can be employed for the control or, respectively, regulation of the pump radiation.

The modulation signals for the laser radiation are generated in the controller 33 and the interaction of the laser radiation source with the machine control and with the supply 32 as well as the executive sequence of the calibration events as well as of the control and regulation events are managed in the controller 33. A safety circuit (not shown), for example, switches the pump sources permanently off when there is danger.

Although a horizontally seated drum is shown in FIG. 3, the drum can be arranged in any arbitrary attitude since the laser radiation source is completely directionally insensitive in terms of its attitude and is very compact in terms of structure and, moreover, since the laser fibers 5 of the fiber laser or fibers 28 coupled to the laser fibers can be arbitrarily laid; for example, the shaft of the drum can also be seated vertically or inclined from the perpendicular, which yields an especially small floor space. As a result thereof, moreover, the operation of a plurality of arrangements or a system having a plurality of drums is possible on the same floor space as would be required by an arrangement having a horizontally seated drum. As a result thereof, the printing forms can be manufactured faster; in particular, all printing forms for a color set can be produced in a single, parallel pass, which is advantageous especially with respect to the uniformity of the final result. Further, an automatic charging with printing forms for provision with images can be realized better given a system erected on a small floor space than given a spatially larger system. One or more laser radiation sources and, additionally, one or more further lasers can be directed onto the same printing form in order to accelerate the production thereof. One advantage of the multi-track arrangement having the very fine and precise tracks is that potential seams are clearly less disturbing then when recording is carried out with coarser tracks. As described under FIG. 37, further, the position of the tracks can be precisely re-adjusted, so that residual errors become clearly smaller than a track width. The inventive laser radiation sources can thereby be preferably utilized for processing the finer contours and the further laser or lasers can be utilized for processing rougher contours, which can be particularly employed given printing forms that, for example, are composed of plastic or rubber.

Instead of one or each of the provided fiber lasers 2, it is conceivable to provide a laser system with a terminator into the laser radiation source and alternative supply to the laser gun 23, whereby the fiber laser described in detail under FIG. 2, however, represents the more cost-beneficial solution. When processing materials, namely, if the radiant power of a plurality of lasers that are not coupled to one another and that naturally emit with a slight wavelength difference are directed onto a processing spot, a phase equality of the individual lasers can be foregone and an expensive control and regulation technology for a phase coupling that is susceptible to malfunction can be avoided.

Such a laser system that, for example, is disclosed by U.S. Pat. No. 5,694,408 contains an optical post-amplification and comprises a radiation output composed of a fiber. A terminator is described in greater detail later in one of the FIG. 5, 5a, 5b, 5c, 6, 6a, 7, 9, 9a, 10, 10a, 10b, 11, 11a or 12.

Instead of employing the laser system disclosed by U.S. Pat. No. 5,694,408, it is also conceivable to employ a phase-coupled laser system according to U.S. Pat. No. 5,084,882. An image of the fiber bundle then results on the processing surface as the respective processing spot. Alternatively, a single-mode fiber could be welded to each fiber at the exit of the bundle, this being provided with the respective terminators, and supply the laser gun. However, it is extremely difficult and complicated to manufacture such phase-coupled laser systems and they would be correspondingly expensive. Up to now, such phase-coupled laser systems have also not been commercially available.

Figure 4:
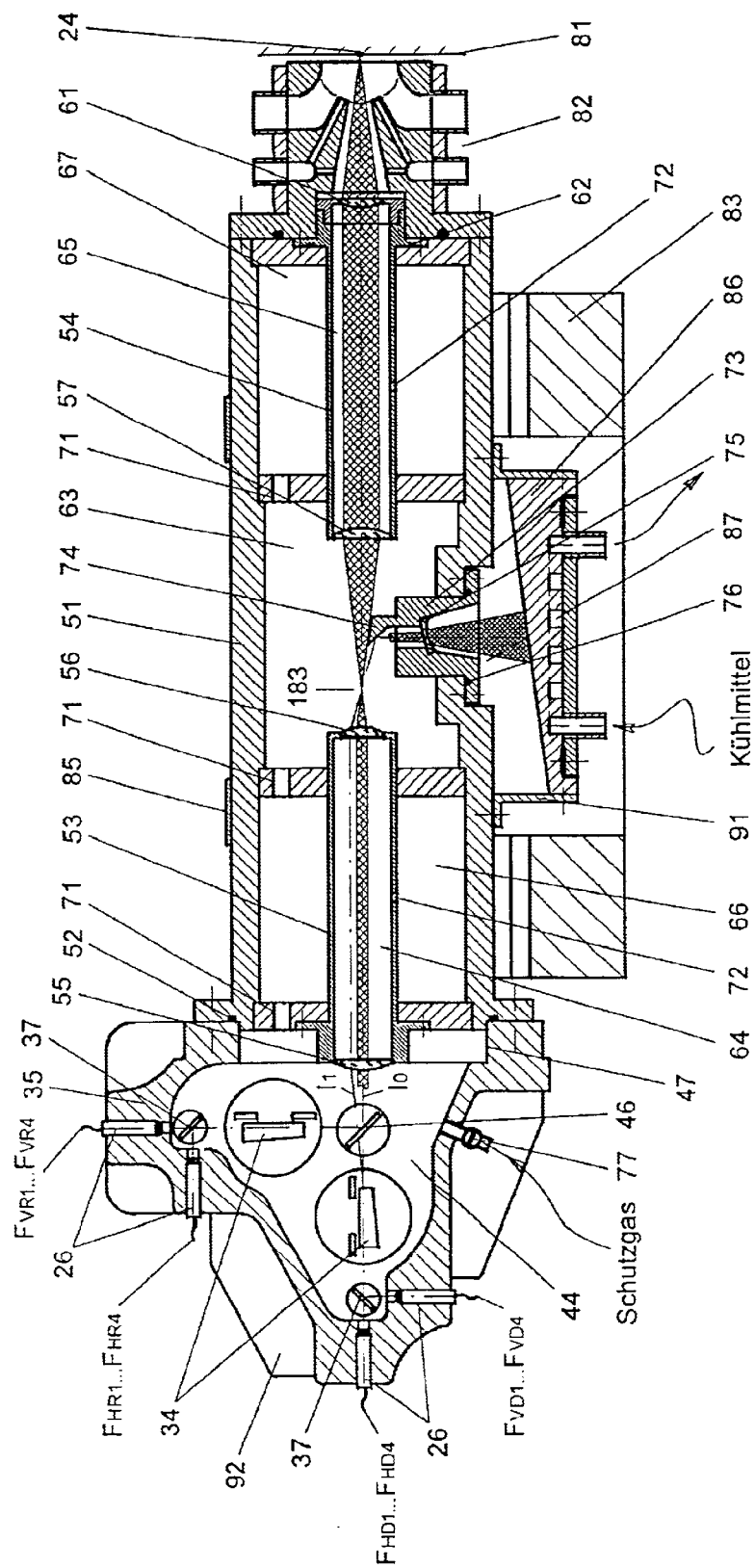
FIG. 4 is an illustration of a laser gun for the laser radiation source having a multiple arrangement of fiber lasers.

FIG. 4 is a section through an applied example of a laser gun having sixteen fiber lasers that are coupled via terminators 26 and having a modulation unit composed of two multi-channel acousto-optical modulators 34. The laser gun is a multi-part receptacle for the adaptation of the optical unit and contains mounts 29 (FIG. 4a) with fitting surfaces for the fits of the terminators 26, means for combining the individual laser beams, the modulation unit, a transmission unit for the transmission of the laser radiation that is intended to produce a processing effect onto the processing surface, and an arrangement for neutralizing the laser radiation that is not intended to produce a processing effect. An arrangement for removing the material eroded from the processing surface can be arranged at the laser gun; this, however, can also be arranged in the proximity of the processing surface in some other way.

Figure 4A:
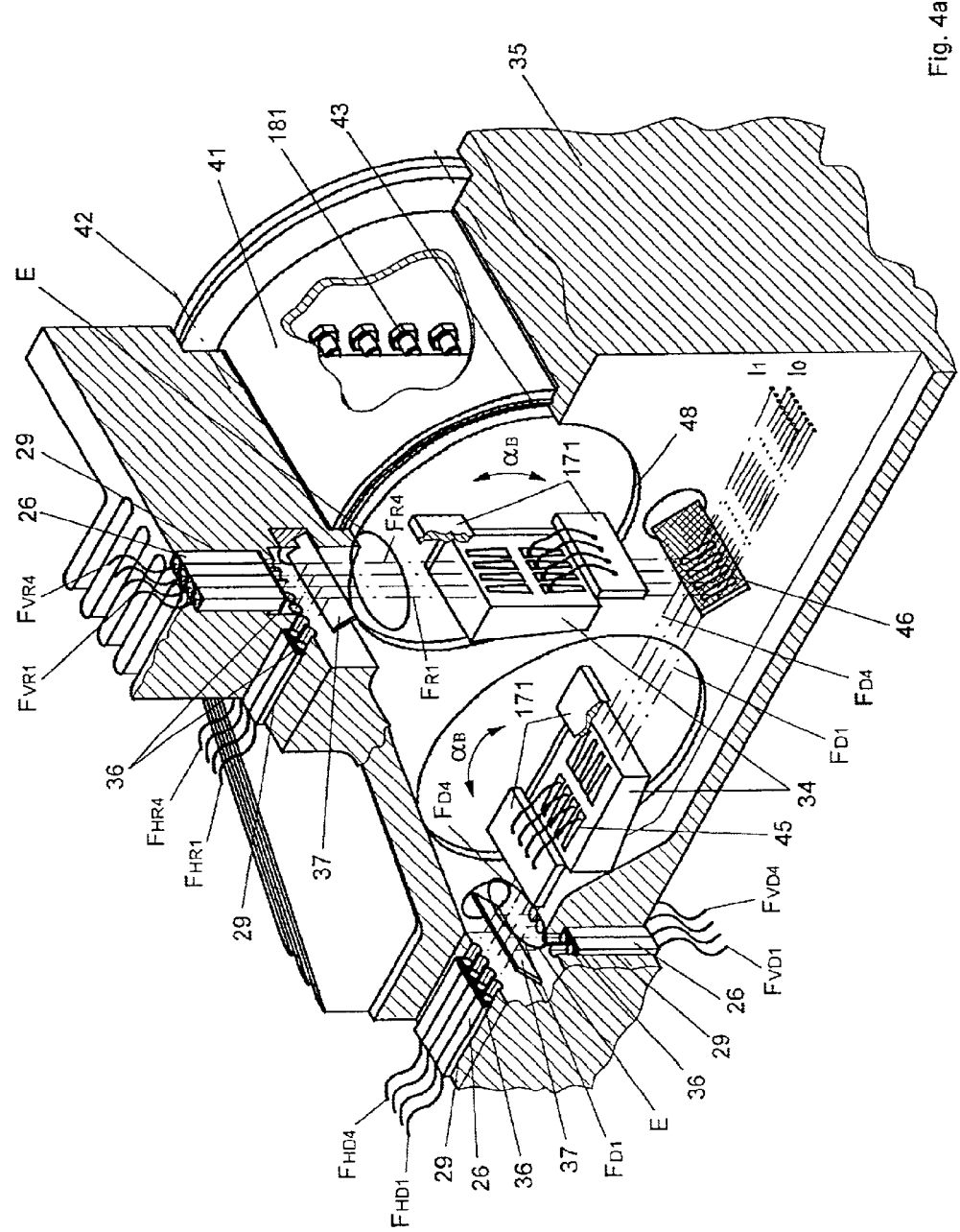
FIG. 4a is a perspective illustration relating to FIG. 4.

FIG. 4a shows a perspective illustration relating to FIG. 4.

Figure 4B:
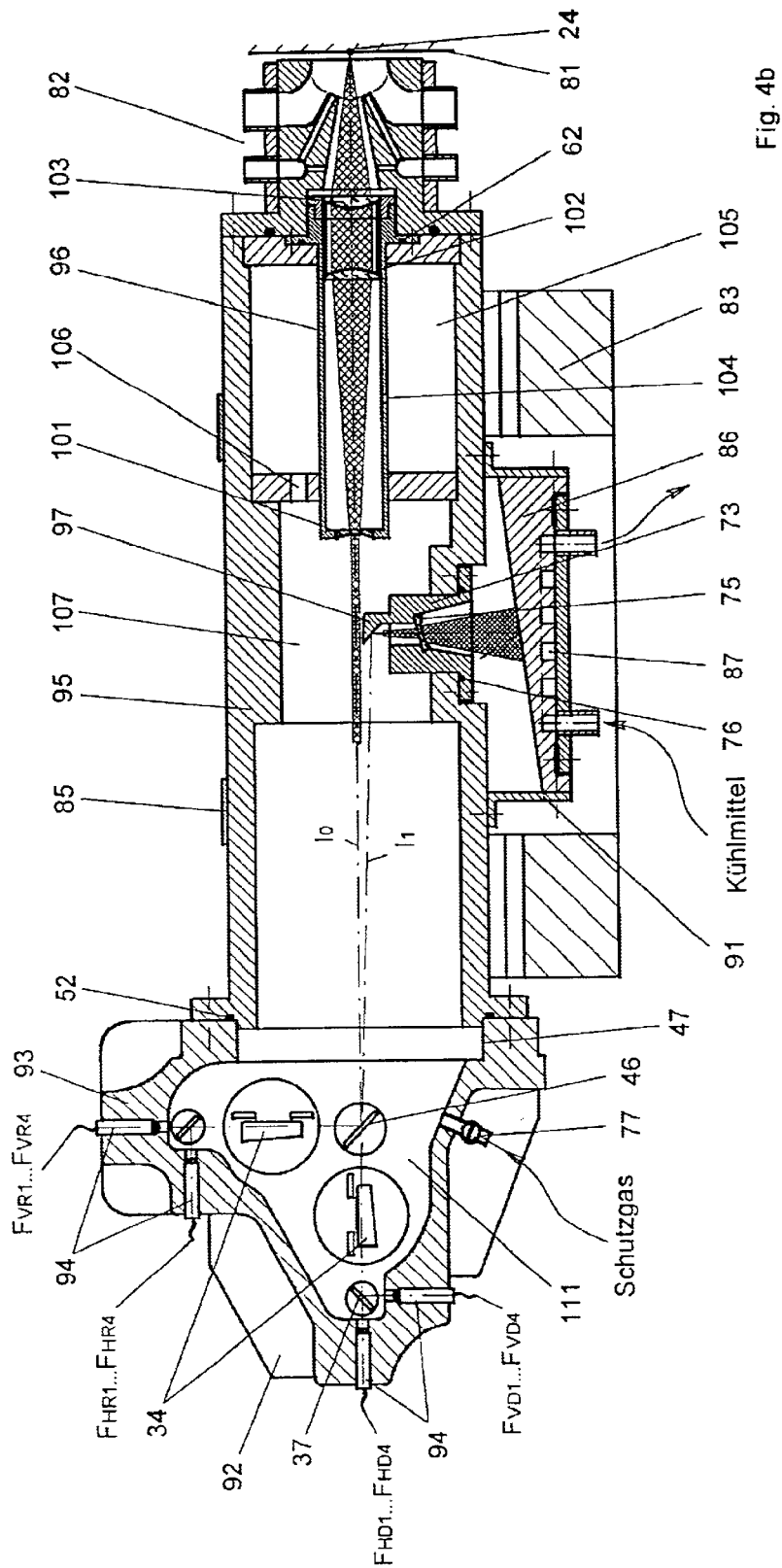
FIG. 4b is a version of FIG. 4.
Figure 24:
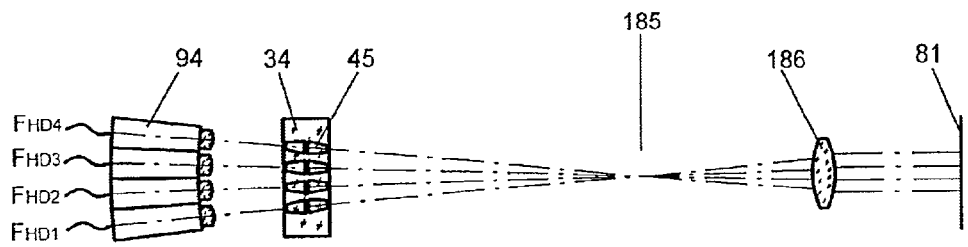
FIG. 24 is a version of FIG. 23 that contains a multi-channel acousto-optical modulator.

FIG. 4b shows a modification of FIG. 4 wherein the beam bundle of the individual fiber lasers do not proceed parallel as in FIG. 4 but at an angle relative to one another; this, however, cannot be seen from the sectional view in FIG. 4b and is therefore explained in greater detail in FIGS. 21, 22 and 24.

Figure 4C:
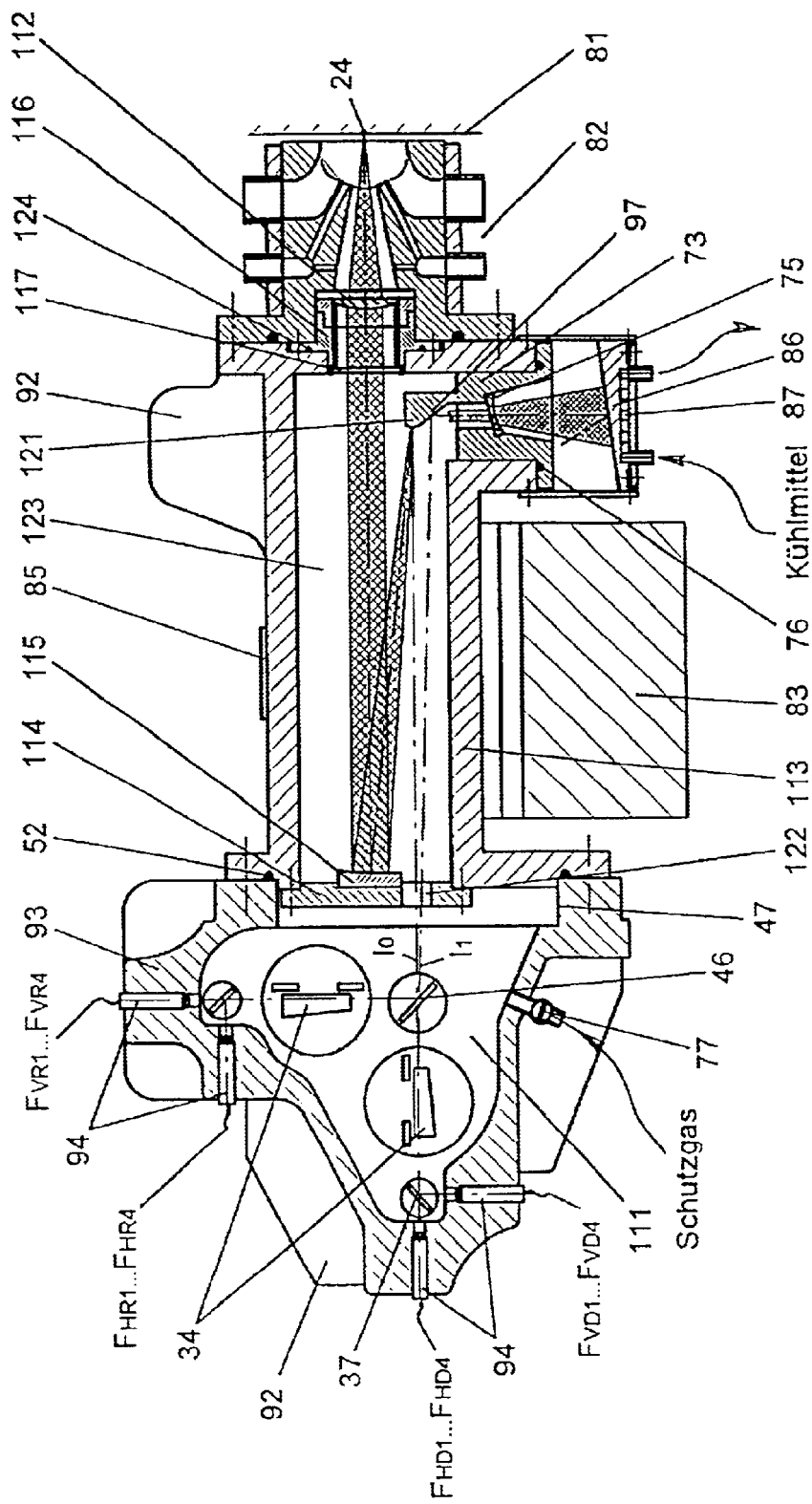
FIG. 4c is a further version of FIGS. 4 and 4b.

FIG. 4c shows a modification of FIG. that enables an advantageous, significantly more compact structure as a result of a differently implemented transmission unit.

FIG. 4 shall be explained in detail first with the assistance of FIG. 4a. These explanations apply analogously to FIGS. 4b and 4c.

In a housing 35, 4 fiber lasers $F_{HD1}$ through $F_{HD4}$, $F_{VD1}$ through $F_{VD4}$, $F_{HR1}$ through $F_{HR4}$, $F_{VR1}$ through $F_{VR4}$ via terminators 26 with mounts 29 (FIG. 4a) are arranged in respectively four tracks of one beam packet, being arranged side-by-side in a plane. The embodiment of the terminators 26 employed in FIG. 4 is described in greater detail in FIG. 9. The terminators should preferably be inserted gas-tight into the housing 35, to which end seals 36 (FIG. 4a) can be employed. Instead of the terminators shown in FIGS. 4 and 4a, differently shaped terminators can also be employed, as described in FIGS. 5, 5a, 5b, 5c, 6, 6a, 7, 9, 9a, 10, 10a, 10b, 11, 11a and 12, when corresponding mounts 29 are provided in the housing 35. However, as also described under FIG. 3, single-mode fibers or other fibers 28 can be attached to the fiber lasers before the terminators 26 are attached. However, an arrangement of the laser fibers 5 or fibers 28 according to FIGS. 40, 40a, 40b, 40c, 40d and 41 can also be employed. For example, the fiber lasers $F_{HD1}$ through $F_{HD4}$ or, respectively, $F_{VR1}$ through $F_{VR4}$ should have a different wavelength than the fiber lasers $F_{VD1}$ through $F_{VD4}$ or, respectively, $F_{HR1}$ through $F_{HR4}$. For example, $F_{HD1}$ through $F_{HD4}$ and $F_{VR1}$ through $F_{VR4}$ should have a wavelength of 1100 nm whereas $F_{VD1}$ through $F_{VD4}$ or, respectively, $F_{HR1}$ through $F_{HR4}$ should have a wavelength of 1060 nm, which can be achieved by a corresponding doping of the laser-active core material of the laser fibers 5. However, all fiber lasers can also exhibit different wavelengths when they are correspondingly compiled.

Figure 28:
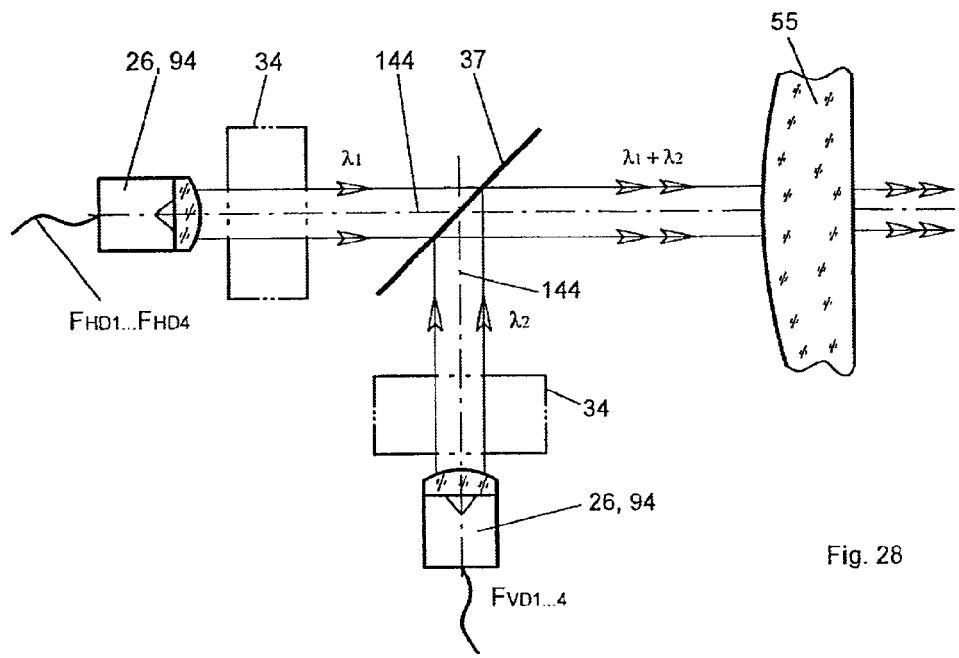
FIG. 28 shows the combining of twice four tracks of the beam bundle from terminators with a wavelength-dependent mirror.
Figure 28A:
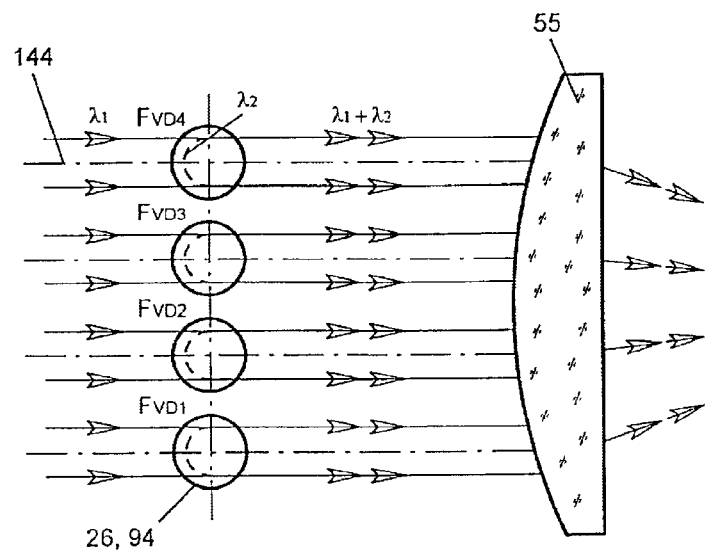
FIG. 28a is a plan view of FIG. 28.

As explained in greater detail in FIGS. 28 and 28a, the beam packets of the fiber lasers $F_{HD1}$ through $F_{HD4}$ are united with those of the fiber lasers $F_{VD1}$ through $F_{VD4}$ and the beam packets of the fiber lasers $F_{VRV}$ through $F_{VR4}$ are united with those of the fiber lasers $F_{HR1}$ through $F_{HR4}$ to form a respective beam packet $F_{D1}$ through $F_{D4}$ as well as $F_{R1}$ through $F_{R4}$ (FIG. 4a) via wavelength-dependent mirrors 37 as means for the combining. There are also other possibilities of influencing the wavelength of the fiber lasers; for example, wavelength-selecting elements such as Brewster plates, diffraction gratings or narrowband filters can be introduced in the region of the laser fibers between infeed mirror 7 and outfeed mirror 12. It is also possible to provide at least one of the two laser mirrors 7 or 12 with a mirror layer of a type that is adequately highly reflective only for the desired wavelength. The execution of the beam merging, however, is not limited to the employment of fiber lasers with different wavelengths. In addition to fiber lasers that have no privileged direction in the polarization of the laser emission that is output, fiber lasers can also be employed that output a polarized laser emission. When the wavelength-dependent mirror is replaced by a mirror that is polarization-dependent such that it allows one polarization direction to pass whereas it reflects the other polarization direction, only two differently polarized laser types need be employed in order to unite the two with the polarization-dependent mirror. In this case, the employment of the terminator 26 according to FIG. 9 having a quadratic cross-section is especially suitable, since the one or the other polarization direction can be respectively produced with the same fiber laser by turning the terminator by 90☐ before being mounted into the housing 35.

A particular advantage of the combining of a plurality of lasers to form a single spot, namely to each of the individual processing points $B_1$ through $B_n$ (for example $B_1$ through $B_4$ in FIGS. 20 through 22) is that a higher power density is achieved given a predetermined spot size on the processing surface 81.

Figure 15:
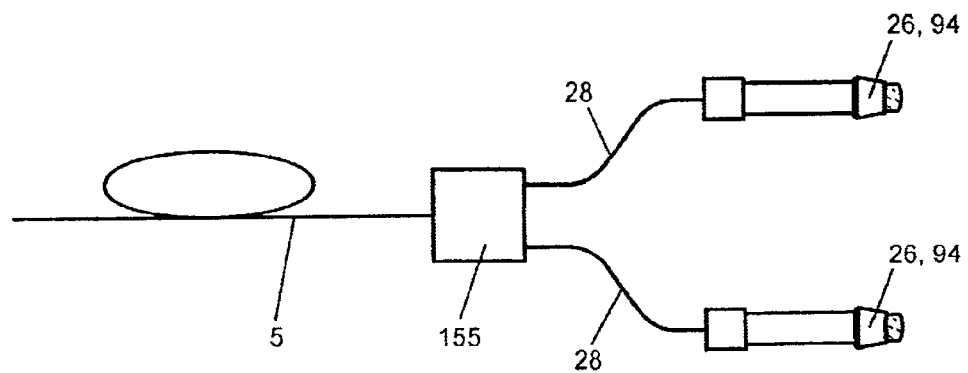
FIG. 15 is an example of a fiber laser having two outputs.

The laser emission of the individual fiber laser can also be distributed onto a plurality of terminators, this being described in FIG. 15. This is particularly useful when materials are to be processed that manage with a low laser power or when the power of an individual fiber laser is adequately high. In such a case, it is conceivable that a laser gun 23 is equipped with only four terminators, for example $F_{HD1}$ through $F_{HD4}$, for this purpose, $F_{HD1}$ and $F_{HD2}$ thereof, for example, being supplied by one fiber laser and $F_{HD3}$ and $F_{HD4}$ being supplied by a further fiber laser according to FIG. 15. When the principle described in FIG. 15 is applied twice, all four tracks $F_{HD1}$ through $F_{HD4}$ can be supplied by one fiber laser, this leading to an extremely cost-beneficial arrangement, particularly since further component parts such as wavelength-dependent mirrors and strip mirrors can be eliminated and, thus, an especially economical embodiment of the laser radiation source can be created.

By omitting fiber lasers or, respectively, tracks, further, the acquisition costs for such an arrangement can be lowered as needed and fiber lasers can be retrofitted later as needed. For example, one can begin with one fiber laser and one track. The lacking terminators of the fiber lasers that are not introduced are replaced for this purpose by structurally identical terminators that, however, do not contain a through opening and no laser fibers and only serve for termination in order to close the housing 35 as though it were equipped with all terminators.

Figure 16:
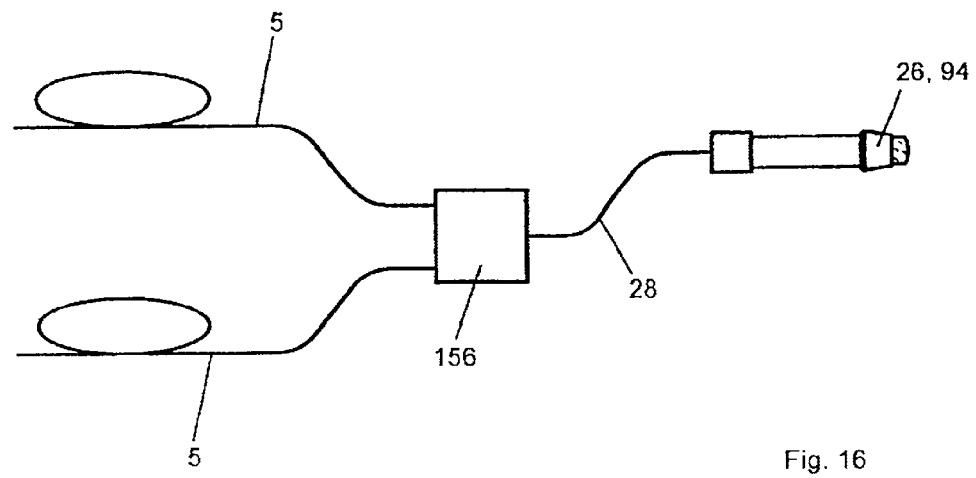
FIG. 16 is an example of the merging of two fiber lasers.

However, the laser radiation of a plurality of fiber lasers can also be combined and conducted into a single terminator, this being described in FIG. 16. For example, one can work with a plurality of fiber lasers combined in this way and with one track when, as described, the missing terminators are replaced by structurally identical terminators that, however, do not contain a through opening and no laser fibers in order to close the housing 35 as though it were equipped with all terminators.

Immediately after the beam bundle has left the respective terminator, a part of the laser emission can be coupled out via a beam splitter (which, however, is not shown) and can be conducted onto a measuring cell that is not shown in the FIGS. in order to produce a measured quantity therefrom that can be used as comparison value for a control of the output power of each and every fiber laser. However, laser emission can also already be coupled out of the laser fiber for the acquisition of a measured quantity before the terminator, this also not being shown.

Figure 38:
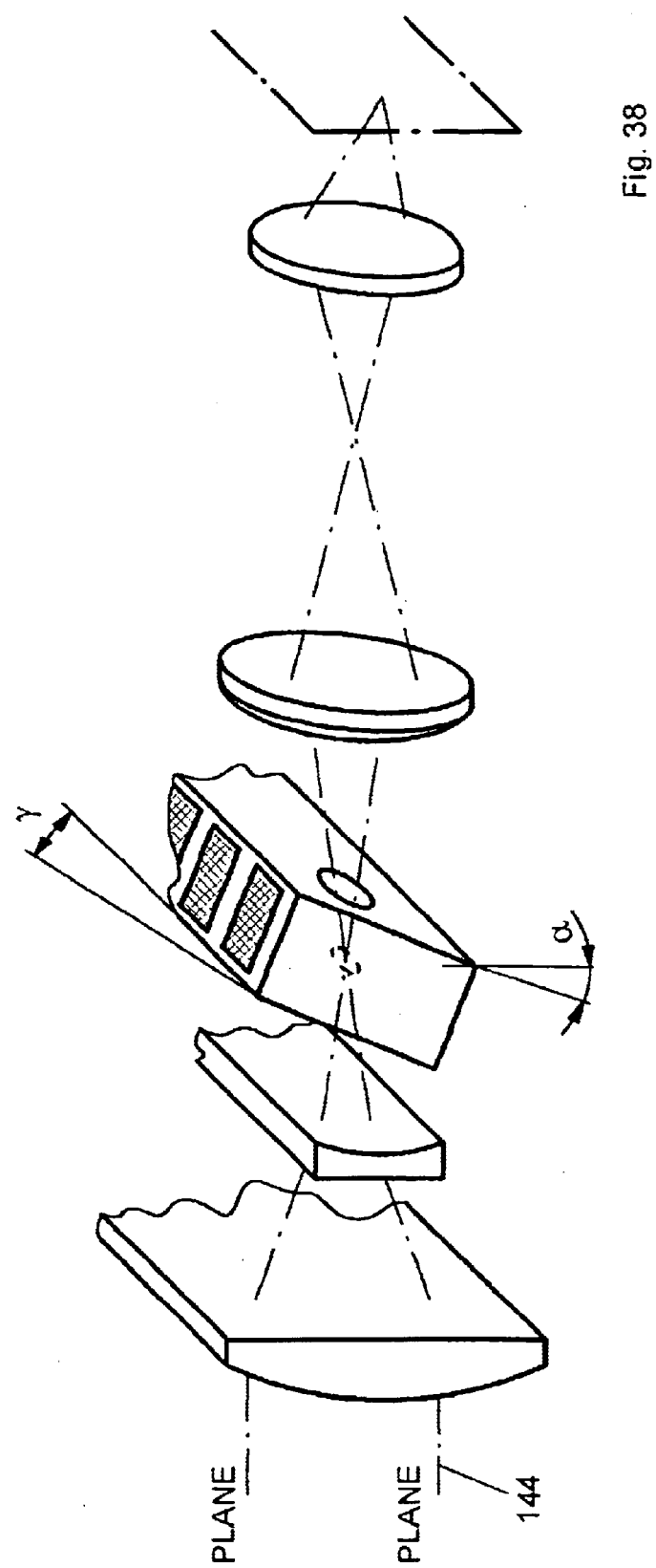
FIG. 38 is an advantageous arrangement for avoiding reflections back into the lasers.

The plurality of planes wherein the terminators are arranged is not limited to the one plane as described. For example, arrangements having three planes are recited in FIGS. 29, 32, 33 and 41. An arrangement having two planes is shown in FIG. 38.

The respective beam packets of the fiber lasers are modulated via a respective four-channel acousto-optical modulator 34 whose functioning and embodiment is explained in greater detail in FIGS. 17, 18, 19 and 19a. Using the acousto-optical modulator 34, which is a deflector in terms of principle, the unwanted energy in the case illustrated here is deflected out of the original beam direction 4 into the beam direction $l_1$ (FIG. 4a), so that it can be simply intercepted later in the beam path and neutralized. The modulation can preferably occur digitally, i.e. a distinction is made between only two conditions in the individual modulator channels, namely "on" and "off", this being especially simple to control; however, it can also occur in analog fashion since the laser power in each modulator channel can be set to arbitrary values. The modulation is not limited thereto that the energy from the beam direction $l_0$ is employed for the processing and the energy from the direction $l_1$ is neutralized. FIGS. 36, 36a, 36b, 36c and 37 recite examples wherein the beam direction $l_1$ that is diffracted off is employed for processing and the energy from the direction $l_0$ is neutralized. Further, a slight part of the modulated radiant power of the individual modulator channels can be forwarded onto a respective measuring cell via a beam splitter (not shown) in order to generate a measured quantity that is used as a comparison value in a control circuit for the exact regulation of the laser energy of each track on the processing surface.

The multi-channel acousto-optical modulator 34 is preferably secured on a cylindrical modulator housing 41 that is rotatably seated in an opening 48 in the housing 35. After the modulator housing has been adjusted to the required Bragg angle $\alpha_B$, the modulator housing is fixed with a connection 42. A seal 43 sees to it that each modulator housing terminates gas-tight relative to the housing 35. A specifically prepared printed circuit board 171 projects from the modulator housing 41 into the interior space 44 of the housing 35, electrical connections to the piezo-electric transducers 45 being produced thereover. The preferred embodiment of the modulators is described in greater detail in FIGS. 19 and 19a.

After passing through the acousto-optical modulators, the beam packets $F_{D1}$ through $F_{D4}$ and $F_{R1}$ through $F_{R4}$ are conducted to a strip mirror 46 that is described in greater detail in FIGS. 26, 26a, 27, 27a and 27b. The beam packet $F_{D1}$ through $F_{D4}$ is arranged with respect to the strip mirror 46 such that it can pass through the strip mirror unimpeded. The laser beam bundles of the beam packet $F_{R1}$ through $F_{R4}$, however, are offset by half a track spacing compared to the beam packet $F_{D1}$ through $F_{D4}$ and impinge the strips of the strip mirror arranged in strip-shaped fashion. As a result thereof, they are redirected in terms of their direction and now lie in one plane with the laser beam bundles $F_{D1}$ through $F_{D4}$. An eight-track arrangement thus derives, whereby two lasers of different wavelengths are also superimposed in each track, so that a total of sixteen lasers have been merged and take effect. The beams $l_1$ that have been diffracted off in the acousto-optical modulator 34 are located above this plane $l_0$. Given a different adjustment of the acousto-optical modulator 34, the rays that are diffracted off can also lie under the plane of $l_0$, as shown in FIGS. 4b and 4c.

A significant advantage of the arrangement is that the symmetry axis of the beam packets $F_{HD1}$ through $F_{HD4}$ and $F_{D1}$ through $F_{D4}$ lie on the axis of the housing 35 that is defined by the bore 47, and the beam axes of the corresponding beam packets respectively lie parallel or at a right angle to this axis, which allows a simple and precise manufacture. However, it is also possible to arrange the beam packets asymmetrically and at different angles. Further, it is possible to correct small differences in the position of the beam packets by adjusting the wavelength-dependent mirrors 37 and of the strip mirror 46. It is possible to still re-adjust the terminators in position after they are mounted and in terms of their angular allocation, for example for individual optimization of the Bragg angles in the individual channels; this, however, is not shown in the Figures.

It lies within the scope of the preferred embodiments that the plurality of tracks is reduced but can also be increased further; for example, by joining respectively eight instead of four terminators that are connected to fiber lasers to form a beam packet, a doubling of the number of tracks can be undertaken. For this purpose, two eight-channel acousto-optical modulators would have to be utilized. Acousto-optical modulators having 128 separate channels on a crystal can be commercially obtained.

Within the framework of the preferred embodiments, it is likewise possible to arrange the fiber lasers in different planes for increasing the power per track and to superimpose their power on the processing surface, this being explained in greater detail in FIGS. 29, 31, 32, 33 and 41 and/or to arrange a plurality of fiber lasers in bundles in order to superimpose their energy on the processing surface, this being described in FIGS. 30 and 31.

Figure 37:
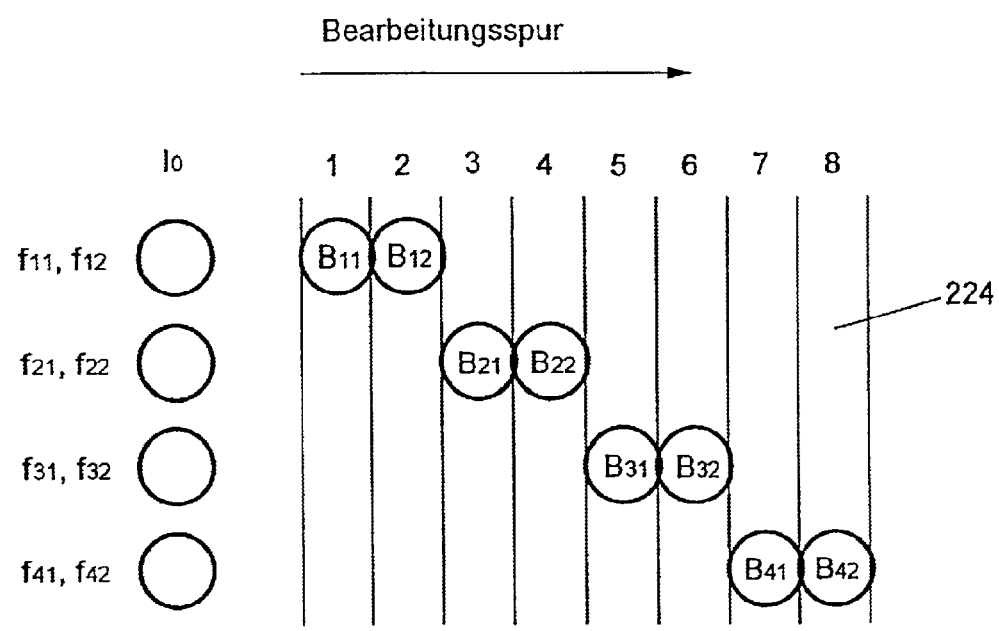
FIG. 37 is an illustration for generating multiple tracks with the assistance of an acousto-optical multiple deflector or multiple modulator.

Another possibility for increasing the number of tracks is described in FIG. 37.

Figure 23:
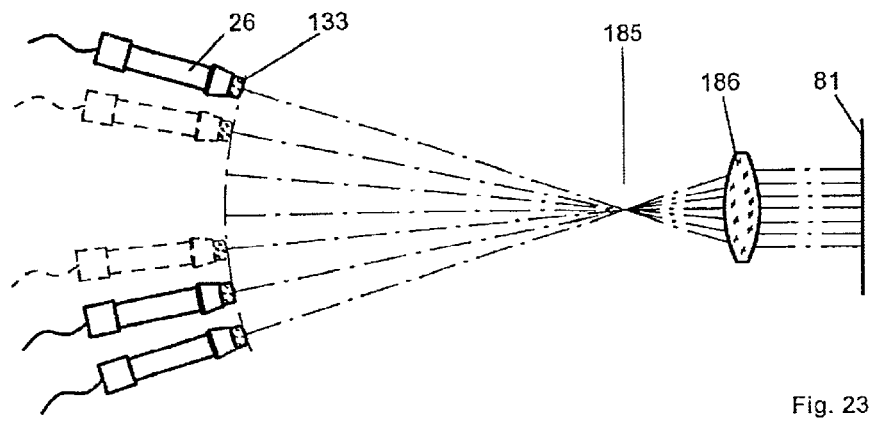
FIG. 23 shows a beam path for terminators that are arranged at an angle relative to one another.

Directly modulatable fiber lasers can also be utilized, this being described in greater detail in FIG. 23. In this case, the acousto-optical modulators are omitted and an especially simple structure derives.

Operation with a plurality of tracks of lasers and a plurality of lasers in a track enables high processing speeds given low relative speed between the laser gun and the work piece. The processing speed can also thus be optimally adapted to the time constant of the heat absorption of the material. Given a longer operating time, too much energy uselessly flows off into the environment.

The housing 35 is closed gas-tight with a cover and a seal, neither being shown in the Figures. A cylindrical tube 51 is flanged to the housing 35 in the region of the bore 47 and is sealed via a seal 52. The cylindrical tube contains as an optical transmission unit two tubes 53 and 54 each having a respective optical imaging system that image eight laser beam bundles $F_{D1}$ through $F_{D4}$ and $F_{R1}$ through $F_{R4}$ at the radiation exit 10 (FIG. 1) onto the processing surface in the correct scale. Two optical imaging systems are preferably arranged following one another, since an extremely great structural length or a very small distance between the objective lens and the processing surface would otherwise derive, both being disadvantageous since a long beam path must be folded with mirrors and too small a spacing between objective lens and processing surface could lead to a high risk of contamination for the objective lens.

The beam path is shown as a side view in FIG. 4. The fundamental beam path is shown in FIG. 20 as a plan view for the beam packet $F_{HD1}$ through $F_{HD4}$. The wavelength-dependent mirrors, the modulators and the strip mirrors are not shown therein. The Figures mainly show plano-convex lenses; however, it is also possible to utilize other lens forms such as, for example, biconvex or concave-convex lenses or lenses having an spherical shape in all figures. Lens systems that are respectively composed of a plurality of lens combinations can also be employed.

In order to transmit the laser energy as efficiently as possible and keep the heating of the optical components within limits, all optical surfaces occurring in the various embodiments of the laser radiation source are anti-reflection coated with outmost quality for the wavelength range coming into consideration. The optical imaging systems can preferably be telecentrically implemented.

There are also other advantageous solutions for the transmission unit in order to shorten the structural length of the transmission unit and thereby nonetheless achieve a large spacing between the objective lens and the processing surface, as is shown in even greater detail in, among others, FIGS. 4b and 4c. The lenses 55 and 56 can be connected to the tube 53 by screwed connections or by gluing; however, they can also be preferably metallized at their edges and soldered to the tube 53. The same is true of the lenses 57 and 61 in the tube 54. A gas-tight seal of the lenses and a good heat transmission from the lenses to the tubes thus derives. The tube 54 is preferably terminated gas-tight relative to the cylindrical tube 51 with a seal 62. With respect to tightness and cleanliness, the same conditions apply to the space 63 as apply to the space 44 and, likewise, to the spaces 64 and 65 within the tubes 53 and 54. The chambers 66 and 67 are preferably connected to the spaces 44 and 63 via bores 71. The tubes 53 and 54 can preferably comprise openings 72.

Figure 39:
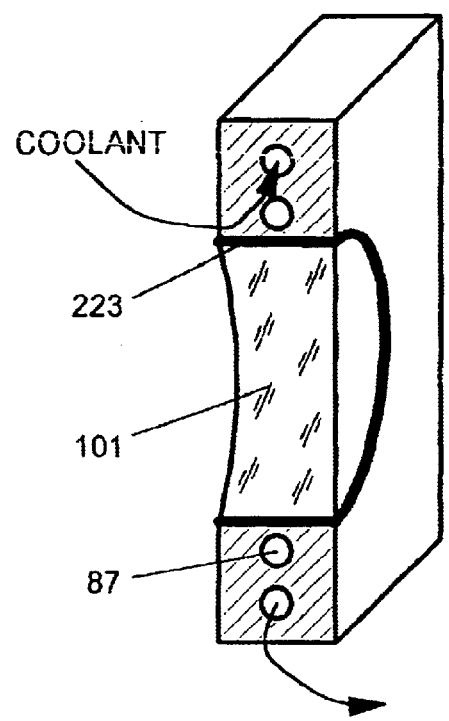
FIG. 39 shows a lens that has coolant flowing around it.
Figure 39A:
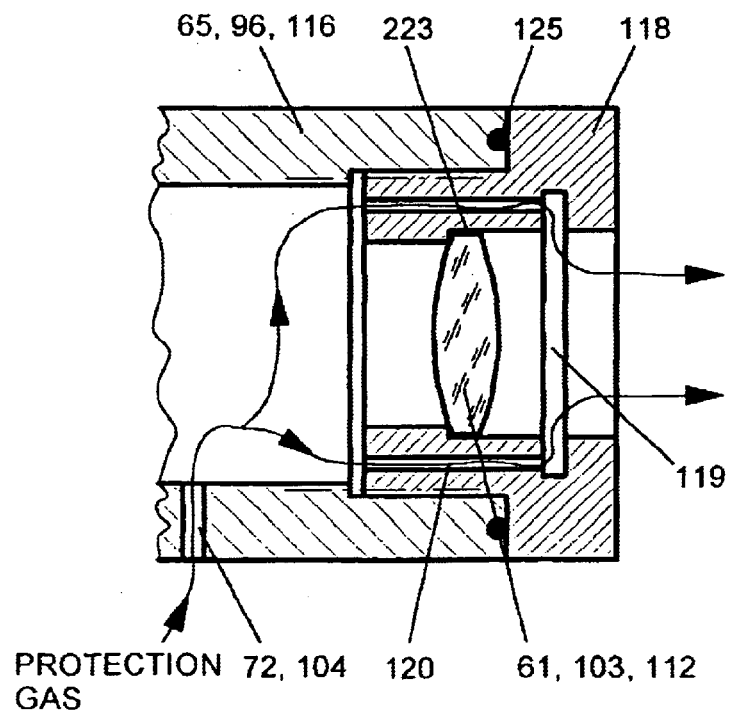
FIG. 39a is a section through a mount for an objective lens.

An intercept arrangement 73 for neutralizing the laser radiation that is not intended to produce any processing effect on the processing surface and that comprises a high-reflectivity mirror 74 and a dispersion lens (concave lens) 75 projects into the space 63. The principle of the intercept arrangement 73 is described in greater detail in FIG. 18. The intercept arrangement 73 is introduced with a seal 76, and the concave lens 75, which can also be replaced by some other optical element, for example a glass plate, is glued into the intercept arrangement or is preferably metallized at an image edge zone and soldered to the intercept arrangement for better heat elimination. The space 63 is thus closed off gas-tight from the environment. What derives as a result of the described techniques is that the entire interior of the laser gun is sealed gas-tight from the environment. The spaces 44, 63, 64 and 65 and the chambers 66 and 67, i.e. the entire interior of the laser gun, can be preferably evacuated or filled with a protective atmosphere. The spaces and chambers should be as free as possible of components that output gases or particles because dirt could otherwise settle on the highly stressed optical surfaces, which would lead to a pre-mature failure of the arrangement. The seals to be employed should not give off any particles or gases. Ultimate cleanliness of the parts to be assembled and of the environment has great value associated with it during assembly until the laser gun has been closed. After the closing of the laser gun 23, an evacuation of the entire interior can be undertaken via the valve 77 or a protective atmosphere can be filled in. The advantage of filling the interior with protective atmosphere is that it is simpler to replenish in that a gas bottle (not shown) is connected to the valve 77 during operation via a pressure-reducing valve, gas being capable of being refilled into the housing therefrom as needed. Another advantage is that, when a terminator is to be removed from the housing for the replacement of a fiber laser and is to be replaced by another or when the housing or, respectively, the cylindrical tube must be opened by the user for some reason or other, a slight quantity of the protective atmosphere can be allowed to flow through the housing during the procedure in order to thus prevent the penetration of dirt particles into the protected space. A slight quantity of the gas can also be allowed to constantly flow through the housing and escape such through openings, preferably in the proximity of the objective lens. This flow also prevents a contamination of the objective lens by dirt particles that are released during the processing event (FIG. 39a). The evacuation or the filling with protective atmosphere can also be foregone when a shorter service life of the laser radiation source is accepted.

It is advantageous in the arrangement according to FIG. 4 that the angle between the beam packets of the original beam direction $l_0$ of the acousto-optical modulator and the beam direction $l_1$ that is diffracted off is noticeably increased by the imaging system composed of the lenses 55 and 56, so that it is simple to intercept the unwanted radiation packet of the deflected beam direction with the highly reflective mirror 74 at the intercept arrangement 73. The mirror 74 is preferably fabricated of metal and is provided with a highly reflective layer in order to keep the heating as a consequence of absorbed laser energy low. For better heat elimination, it is connected via a strong flange of the intercept arrangement 73 to the tube 51. However, the intercept arrangement can also be foregone when the highly reflective mirror is replaced with an optical component such as, for example, a lens that slightly modifies the optical properties of the laser radiation to be intercepted such that the focus of the radiation that is diffracted off is different from the focus of the radiation employed for processing the material. If the radiation to be intercepted would then also be conducted onto the processing surface, the radiation to be intercepted would not have the required power density in order to erode material but would be uselessly absorbed and reflected. The advantage of the arrangement according to FIG. 4 is that low demands are made of the optical components in the two tubes. The two tubes could also be implemented completely the same. Another advantage is that the axes of the terminators 26 lie parallel to one another. The distance between the objective lens 61 and the processing surface 81 dare not be too small, so that particles that fly off from the material surface do not proceed onto the objective lens. When it is contaminated, it then absorbs the laser energy that passes, is destroyed, and is thus unuseable. In order to prevent the contamination, a special mouthpiece 82 is arranged between the objective lens 61 and the processing surface 81, this being described in greater detail under FIG. 34.

The laser gun 23 of the laser radiation source is rotatable around the optical axis that is identical to the axis of the cylindrical tube 51, 95 within the arrangement for processing materials (FIG. 3), for example on a prism 83, and is seated displaceable in the direction of the optical axis and fixed in its position with a strap retainer 85 or with a plurality of strap retainers. As a result thereof, an exact adjustment of the laser gun to the processing surface 81 is possible. A plate 86 that comprises openings 87 through which a coolant can be pumped is located outside the prism 83. The job of this plate 86 is to intercept and divert the laser energy intercepted from the beam path of the transmission unit, this being shown in greater detail in FIG. 18. A heat dam that, however, is not shown in the FIGS., is located between the plate 86 and the tube 51, 95, 113. The plate is connected to the tube 51, 95, 113 via insulating flanges 91. The flanges 91 also prevent the emergence of laser radiation.

Figure 35:
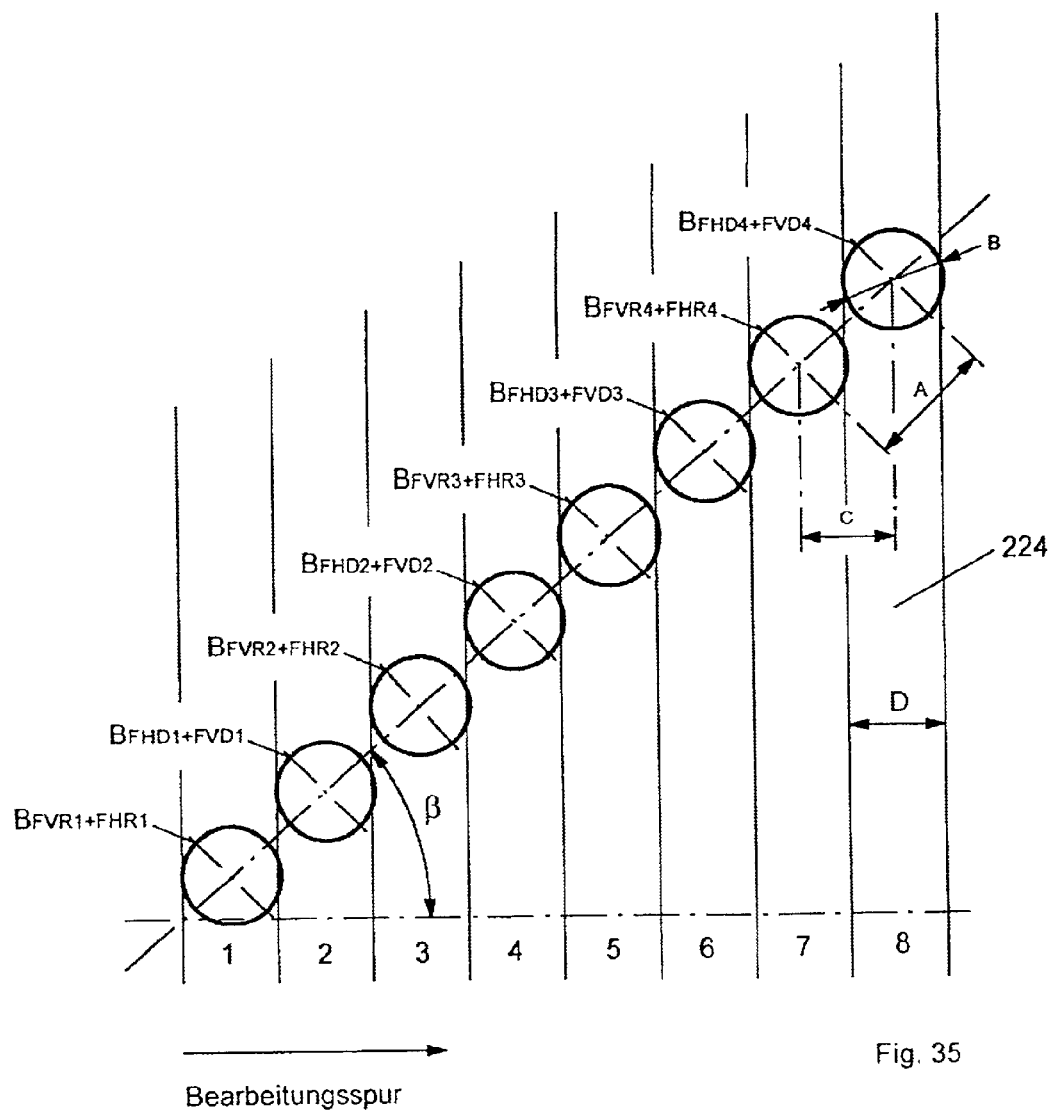
FIG. 35 shows a turning of the laser gun for setting the track spacings.

By turning the laser gun 23 around its optical axis, the track spacing of the laser tracks on the processing surface 81 can be modified, this being shown in greater detail in FIG. 35. It lies within the scope of the preferred embodiments that the turning of the laser gun for setting the track spacing as well as the setting of its spacing from the processing surface can be implemented not only exclusively manually but with the assistance of a suitable, preferably electronic control and/or regulation. Suitable measuring devices (not shown) can also be provided for this purpose, these being located in the proximity of the processing surface and being capable of being approached by the laser gun as needed. A further possibility for adjusting the track spacing is described in FIGS. 36, 36a, 36b, 36c and 37. A manually or motor-adjustable vario-focusing optics can also be utilized for setting the track spacing. Such a vario-focusing optics, in addition to permanently arranged lenses, preferably has two movable lens systems, whereby an adjustment of the first lens system mainly effects an adjustment of the imaging scale, with which the track spacing can be influenced, and whereby an adjustment of the second lens system mainly effects an adjustment of the focusing. An iterative setting can be undertaken for optimizing track spacing and best focus. It is also possible to arrange a displaceable lens (not shown) having a long focal length, preferably between the lenses 57 and 61, with which the focusing of the processing points on the processing surface can be finely readjusted without having to displace the radiation source because the resultant focal length of two lenses is dependent on their spacing.

Figure 8:
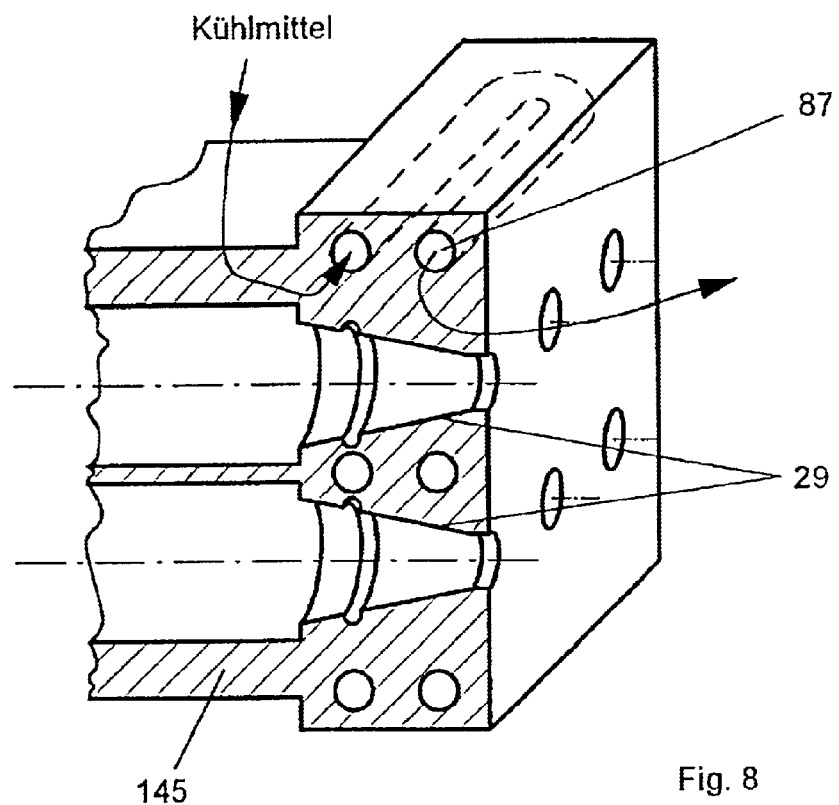
FIG. 8 is an example of a multiple mount for a plurality of terminators.

As a result of the high laser power, the optical elements in the beam path will heat, since they absorb a part, even though a slight part, of the laser energy. Preferably, the critical optical components are therefore not made of glass but of a material having better thermal conductivity, for example of sapphire. The waste heat, given metallization of the connecting surfaces of the optical components, is eliminated by the solder connections to the mounts and to the housing. For better heat output, the housing is implemented with cooling fins 92 that can be cooled by a ventilator (not shown). A permeation of the housing 35 as well as of the other component parts of the laser radiation source with bores is also possible, particularly in the critical regions at the lens mounts and mounts for the terminators 26, a coolant being capable of being pumped therethrough, as shown in FIGS. 8 and 39.

Since, as presented above, extremely high laser powers are required in processing of materials, it is critical to the preferred embodiments to keep the number of optical elements, particularly lenses, in the beam path as low as possible in order to keep the optical losses and the risk of contamination of the optics, which would always lead to a premature failure, as low as possible. It is also lies within the scope of the preferred embodiments that the objective lens (61, 103 and 112) is equipped with an interchangeable mount so that it can be quickly replaced by the user of the laser radiation source as needed, whether because it has been contaminated during operation or because a different imaging scale is requested. In this case, it is advantageous that the bore 72 and the tube 54 is not implemented.

It also lies within the scope of the preferred embodiments that techniques are undertaken in the optical beam path so that no laser energy can proceed back into the lasers. It is shown in FIG. 3 that the laser radiation impinges the material to be processed not perpendicularly but at an angle, so that the radiation reflected at the material surface cannot proceed back into the laser radiation source. It is also shown in FIGS. 4, 4b, 4c and FIG. 18 that the laser radiation to be destroyed can be conducted by an obliquely placed concave lens 75 into a sump composed of an obliquely placed plate 86 that can be cooled. Instead of the concave lens of 75, some other optical component, for example a plate or a diaphragm, can also be inventively employed. The effective diameter of this optical component is thereby dimensioned such that the laser radiation conducted into the sump can just pass, whereas radiation that is reflected back from the sump or is dispersed back, is largely retained, so that no energy can proceed back into the laser. The surface of the plate 86, which is shown as a planar surface in the Figures, can also be implemented crowned or hollow and can be preferably roughened in order to absorb a maximum of radiation and reflect or, respectively, disperse a minimum of radiation.

It is also shown for two planes in FIG. 38 that, as a result of a slight parallel offset of the beam axes of the beam bundles emerging from the terminator, an oblique incidence onto all effected lens surfaces can be achieved. This also applies for the arrangement having one or more planes. The acousto-optical modulator 34 is already rotated by the angle $\alpha_B$ relative to the axis of the beam bundle; however, it can also be additionally rotated by the angle $\gamma$ relative to the symmetry axis of the beam bundle or an arrangement according to FIG. 24 can be employed wherein the axes of the ray beams emerging from the terminators proceed at an angle relative to one another. It has been shown in practice that angular differences of 1 through 2 degrees between the perpendicular onto the optical surface and the axis of the beam bundle are already adequate in order to achieve protection against radiation reflected back into the laser.

It lies within the scope of the preferred embodiments to select embodiments of the optical, mechanical and electrical arrangement for FIG. 4 deviating from the described embodiment. For example, the beam packets $F_{D1}$ through $F_{D4}$ and $F_{R1}$ through $F_{R4}$ could be focused onto the processing surface by a shared lens, similar to that shown in FIG. 31, which in fact yields a very high powered density but cannot present the shape of the processing spot as well since all processing points lie on one another and are united to form a common spot.

FIG. 4b shows another laser gun for a laser radiation source that differs from the laser gun shown in FIG. 4 on the basis of a housing 93, terminators 94, a cylindrical tube 95, a tube 96 and on the basis of a highly reflective mirror 97.

The housing 93 has mounts 29 fitting the terminators 94. The terminators 94 preferably correspond to those of FIGS. 10, 10a and 10b; the axes of the beam bundles do not proceed parallel in the corresponding beam packets. Rather, they proceed somewhat toward the center of the concave lens 101, which is shown in the plan view 21. However, all other terminators according to FIGS. 5, 5a, 5b, 5c; 6, 6a; 7, 9, 9a; 11, 11a and 12 can also be employed when it is insured that the mounts 29 therefore are arranged at a corresponding angle The transmission unit is located in the tube 96, this transmission unit being composed of three lenses, namely a dispersion lens, i.e. a concave lens 101, and two positive lenses, i.e. convex lenses 102 and 103, whereby the convex lens 103 is preferably implemented as an interchangeable objective lens. For the mounting of the lenses with respect to tightness and heat elimination, what was stated as to FIG. 4 and FIG. 4a applies, as it does for the selection of material with respect to the heat conduction.

The tube body 96 can be evacuated in the space between the lenses 101 and 102 or can be filled with a protective atmosphere or, preferably, be connected to the space 105 via a bore 104, said space 105 being in turn connected via a bore 106 to the space 107. The space 107 is connected to the space 111 via the bore 47, said space 111 being in turn terminated gas-fight, as described under FIG. 4 and FIG. 4a. The space between the lenses 102 and 103 can be connected via a bore (not shown) to the space 105, particularly when the mount of the objective is closed gas-tight or, as described under FIG. 4, when a slight amount of the protective atmosphere constantly flows through the laser gun and emerges in the proximity of the objective lens, this, however, not being shown in FIG. 4b. The entire interior of the laser gun, composed of the spaces 111, 105, 107, is preferably evacuated or filled with a protective atmosphere or, respectively, flooded by a protective atmosphere, as was described in detail under FIG. 4 and FIG. 4a. The undesired beam bundles are intercepted with a highly reflective mirror 97; in contrast to FIG. 4, however, no lens system is present that has an angle-enlarging effect, so that the distance between the highly reflective mirror and the modulators is kept correspondingly large here in order to achieve an adequate spatial separation of the beam packets $l_0$ and $l_1$. Nonetheless, the entire structural length of the laser gun is similar here to the arrangement of FIG. 4. The optical beam path of the transmission unit in FIG. 4 represents a side view. FIG. 21 indicates a fundamental beam path for a plan view relating to FIG. 4b. The beam path of the lenses 101 and 102 corresponds to that of an inverted Galileo telescope; however, it can also be implemented as an inverted Kepler telescope when the concave lens 101 having a short focal length is replaced by a convex lens. Such telescopes are described in the textbook "Optik" by Klein and Furtak, Springer 1988, pages 140 through 141. The advantage of the arrangement according to FIG. 4b is that only three lenses are required for the transmission unit. The disadvantage, to wit that the ray beams of the individual terminators do not proceed parallel, is eliminated by terminators according to FIGS. 10, 10a and 10b.

A lens 55 could also be employed in order to deflect the beam bundles into the desired direction, as was shown in FIG. 20. The individual laser beam bundles would then proceed parallel to one another between the terminators 26 and the lens 55, that is arranged as in FIG. 4, and no difference from FIG. 4 derives with respect to the housing and the terminators or, respectively, their arrangement. Since, however, the lens 55 also exercises a collecting effect on the individual beam bundles in addition to the deflecting effect, the same conditions as in FIG. 21 would not arise at the location of the concave lens 101. This, however, can be compensated by a different adjustment of the spacing of the fiber 28 or, respectively, of the laser fiber 5 from the lens 133 or by a modification of the lens 133 in the terminators 26, i.e. the ray cone of the laser beam bundle from the individual terminators would be respectively set such that a sharp image respectively derives on the processing surface at the location of the points $B_1$ through $B_n$.

According to the preferred embodiments, it is also possible to combine the lenses 102 and 103 to form a single, combined lens. A transmission unit having only two lenses then derives. It is also possible to arrange a displaceable lens (not shown) with a long focal length between the lenses 101 and 102, the focusing of the processing points on the processing surface being capable of being finely readjusted therewith without displacing the radiation source. A vario-focusing optics can also be employed, as was mentioned under FIG. 4.

Figure 34:
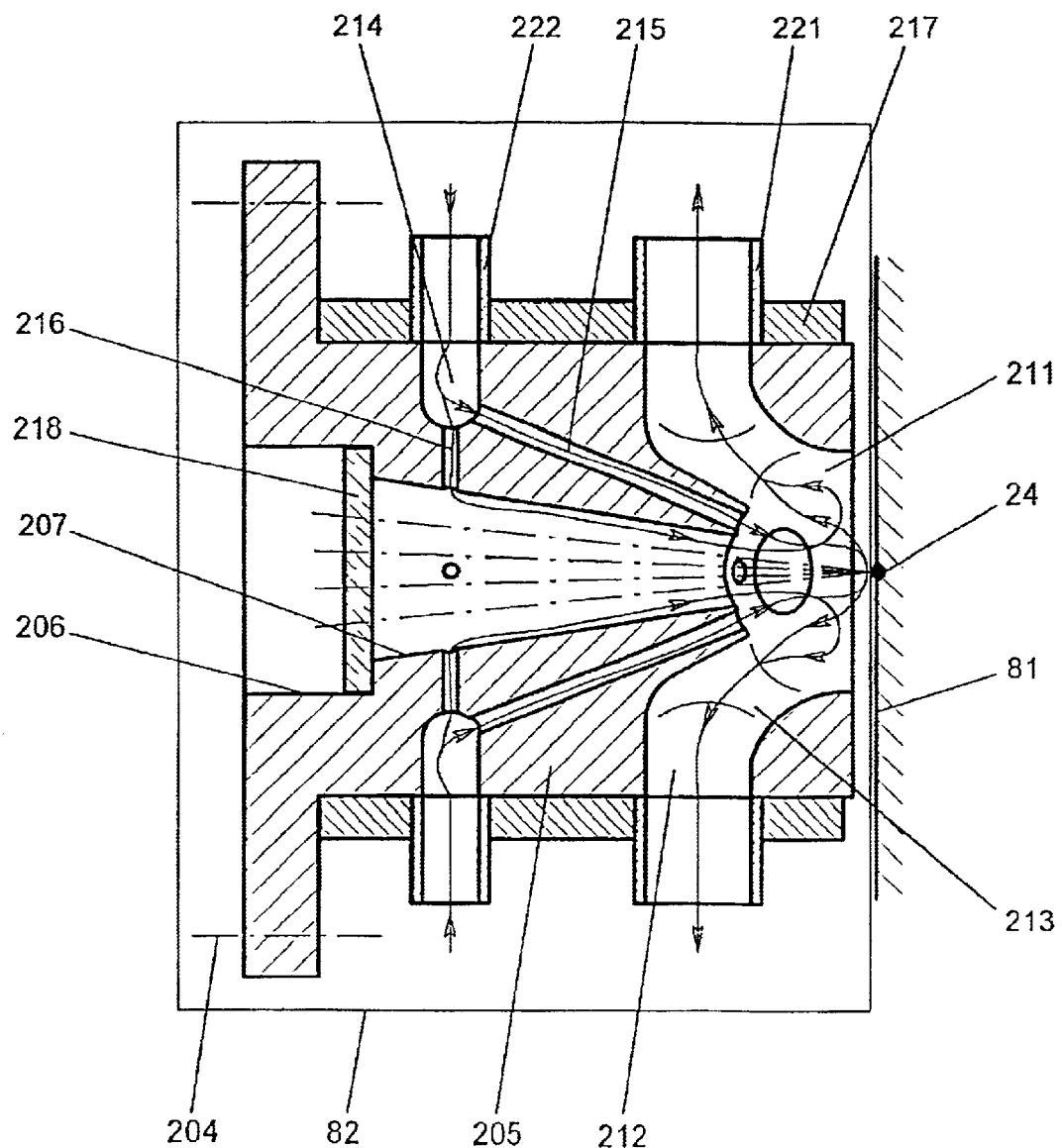
FIG. 34 shows a mouthpiece for the laser gun with connections for compressed air and for extracting the material released by the beam.

A special mouthpiece 82 is provided at the laser gun 23 that is intended to prevent a contamination of the objective lens 112 and that is described in greater detail under FIG. 34.

FIG. 4c shows a laser gun that is even more significantly compactly implemented than that of FIG. 4 and FIG. 4a. In combination with a mirror arrangement, an objective lens 112 is employed as transmission unit and this can be interchanged for achieving different imaging scales. As already described under FIG. 4, a vario-focusing optics can also be employed. However, an imaging can occur with the mirror arrangement by itself without additional objective lens 112.

FIG. 4c differs from FIG. 4b in terms of the following points: The cylindrical tube 95 is replaced by an eccentric tube 113. The tube body 96 is preferably replaced by a plate 114 having a concave mirror 115 and a mount 116 with an objective lens 112 and a highly anti-reflection coated plate 117. The intercept unit 73 is given an arced (convex) mirror 121 above the highly reflective mirror 97. The eccentric tube is connected to the housing 93 at one side. A seal 52 sees to the required tightness. The plate 114 is introduced into the eccentric tube 113, said plate 114 containing a passage for the beam packets $l_0$ and $l_1$ and carrying the concave mirror 115 whose dissipated heat can thus be diverted well to the eccentric tube. The eccentric tube has two axes that are preferably parallel to one another, namely, first the symmetry axis of the entering beam packets having the direction $l_0$ that are directed onto the arced mirror and, second, the axis between concave mirror and objective lens 112 that can be considered as an optical symmetry axis for the emerging laser radiation.

The beam path is folded with the two mirrors 121 and 115. The arced mirror 121 is preferably fabricated of metal. It is intimately connected to the highly reflective mirror 97 and is preferably fabricated of one piece therewith. The convex surface of the arced mirror can be spherically or spherically shaped. The mirror 115 is concavely shaped, i.e. a concave mirror. Its surface can be spherically shaped but is preferably shaped. It is preferably composed of metal. Metal has the advantage of good elimination of the waste heat. A considerable advantage given manufacture of metal also derives in the production of surfaces, which, in this case, can be produced by known diamond polishing lathing methods, as can also spherical and planar surfaces. As a result thereof, the highly reflective mirror 97 and the arc mirror 121 can be manufactured of one piece and, preferably, in one work pass having the same shape of the surface and can be mirrored in common, which is particularly simple in terms of manufacture and very advantageous for the positional stability of the arced mirror. In the modulation of the laser energy with the acousto-optical modulator, it impinges either the arc mirror 121 or the highly reflective mirror 97. The waste heat that is produced remains the same in any case and the arced mirror stays at its temperature and, thus, its position, which is very important since it is preferably implemented with a short focal length and the imaging quality of the arrangement is therefore very dependent on its exact position. In this case, the arced mirror 121 has advantageously co-assumed the function of the highly reflective mirror 97. The highly reflective mirror 97 can, however, also have some other form of surface than the arced mirror 121 and, for example, can be a plane mirror.

The beam path is similar to that of an inverted mirror telescope after Herschel that, however, contains a convex lens instead of the arced mirror and that is described in greater detail in FIG. 22. Mirror telescopes are described on page 152 in the "Lehrbuch der Experimentalphysik Band III, Optik" by Bergmann-Schäfer, $7^{th}$ edition De Gruyter 1978. The arced mirror can also be replaced by a concave mirror having a short focal length. As a result thereof, the structural length would be slightly enlarged and different ray cones of the ray bundles emerging from the terminator would have to be set in order to obtain a sharp image in the image plane. The arced mirror could also be replaced by a convex lens having a short focal length. Another folded mirror would then have to be utilized in order to preserve the compact structure. The intercept arrangement 73 is attached gas-tight to the eccentric tube via a seal 76 the undesired laser energy, as described under FIGS. 4, 4b and 18, being diverted via said intercept arrangement 73 to a cooling plate 86 with bores 87 and being neutralized. It is also possible to already intercept the undesired laser radiation from the beam packet $l_1$ at the location of plate 114 and neutralize it.

The space 111 in the housing 93 is connected to the cavity 123 via the bore 122. Both spaces can be evacuated, filled with a protective atmosphere, or flooded by a protective atmosphere, as already described. The mount 116 that accepts the interchangeable objective lens 112 is attached to the end of the eccentric tube 113 that resides opposite the housing 93. A seal 124 closes the cavity 123 gas-tight. The mount can also accept an anti-reflection coated plate 117 whose edge is preferably metallized and that is preferably soldered gas-tight to the mount. Its job is to keep the cavity 123 gas-tight when the objective lens was removed for cleaning or when an objective lens having a different focal length is to be introduced in order to generate a different imaging scale. The space between the objective lens 112 and the highly anti-reflection coated plate 117 can also be connected to the space 123 via bore (not shown), particularly when the entire laser gun, as described under FIG. 4, constantly has a protective atmosphere flowing through it, this emerging in the proximity of the objective lens 112, which is shown in FIG. 39a. The highly anti-reflection coated plate 117, however, can also contain optical correction functions, as known for the Schmidt optics known from the literature, in order to thus improve the optical imaging quality of the arrangement. However, it is also possible to omit the highly anti-reflection coated plate, particularly when it contains no optical correction function and the objective lens was introduced gas-tight or a protective atmosphere flowing therethrough sees to it that no dirt can enter into the space 123 when the objective lens is replaced. A special mouthpiece 82 is provided at the laser gun 23, this being intended to prevent a contamination of the objective lens 112 and being described in greater detail under FIG. 34.

The eccentric tube can be provided with cooling fins 92 over which a ventilator (not shown) can blow in order to eliminate the waste heat to the environment better. The laser gun is rotatably seated in a prism around the axis between concave mirror and objective lens in order, as described under FIG. 4, to make the track spacing adjustable and in order to set the correct distance from the processing surface 81. The laser gun can be fixed with a strap retainer 85.

It is possible to arrange a displaceable lens (not shown) having a long focal length between, preferably, the concave mirror 115 and the objective lens 112, the focusing of the processing points onto the processing surface being capable of being finely readjusted therewith without displacing the laser gun. However, a variable focusing optics (zoom lens) can also be utilized, as was described under FIG. 4. All descriptions that were provided for FIGS. 4, 4a and 4b also apply analogously.

Figure 5:
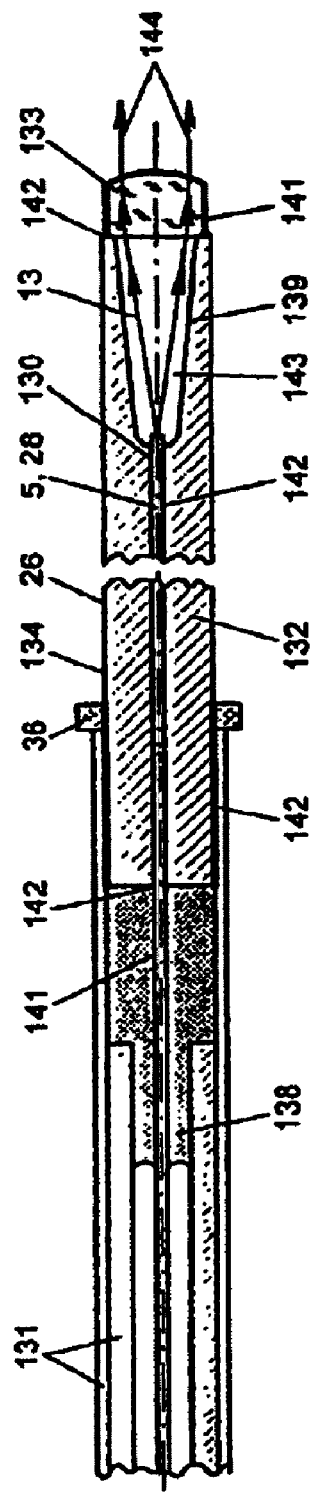
FIG. 5 is an example of a terminator for the ouffeed of the radiation from a fiber or, respectively, from the fiber of a fiber laser.

FIG. 5 shows a preferred embodiment of a terminator 26 for a fiber 28 or laser fiber 5, which is also a fiber. Plug-type connections for optical fibers for low powers are known in optical communications technology, in sensor applications and measurement technology; these, however, are not suitable for high powers because too much heating occurs, this leading to destruction. For example, such laser diode collimator systems, beam shaping optics and coupling optics are described in the catalog 1/97 of Schäfter & Kirchhoff, Celsiusweg 15, 22761 Hamburg, pages A1 through A6. However, the power of these systems is limited to 1000 mW and is thus below the demands for the desired applications in processing materials by a factor of 100 because an adequate heat elimination is not assured. Further, these systems are relatively large in diameter, so that no high packing density of the laser outputs can be achieved. Another great disadvantage is that these systems are not adequately sealed; they would get dirty very quickly and burn up due to an increased absorption of the laser radiation. Last but not least, it should also be mentioned that the precision of the mount for fibers and the lens are inadequate for the desired application. Terminators according to this patent application are therefore significantly more advantageous. Such terminators can be advantageously employed for coupling laser radiation out of a fiber 5, 28, as disclosed in the German Patent Application P 198 40 935.4 of the assignee "Abschlussstück für Lichtleiffasern".

Figure 7:
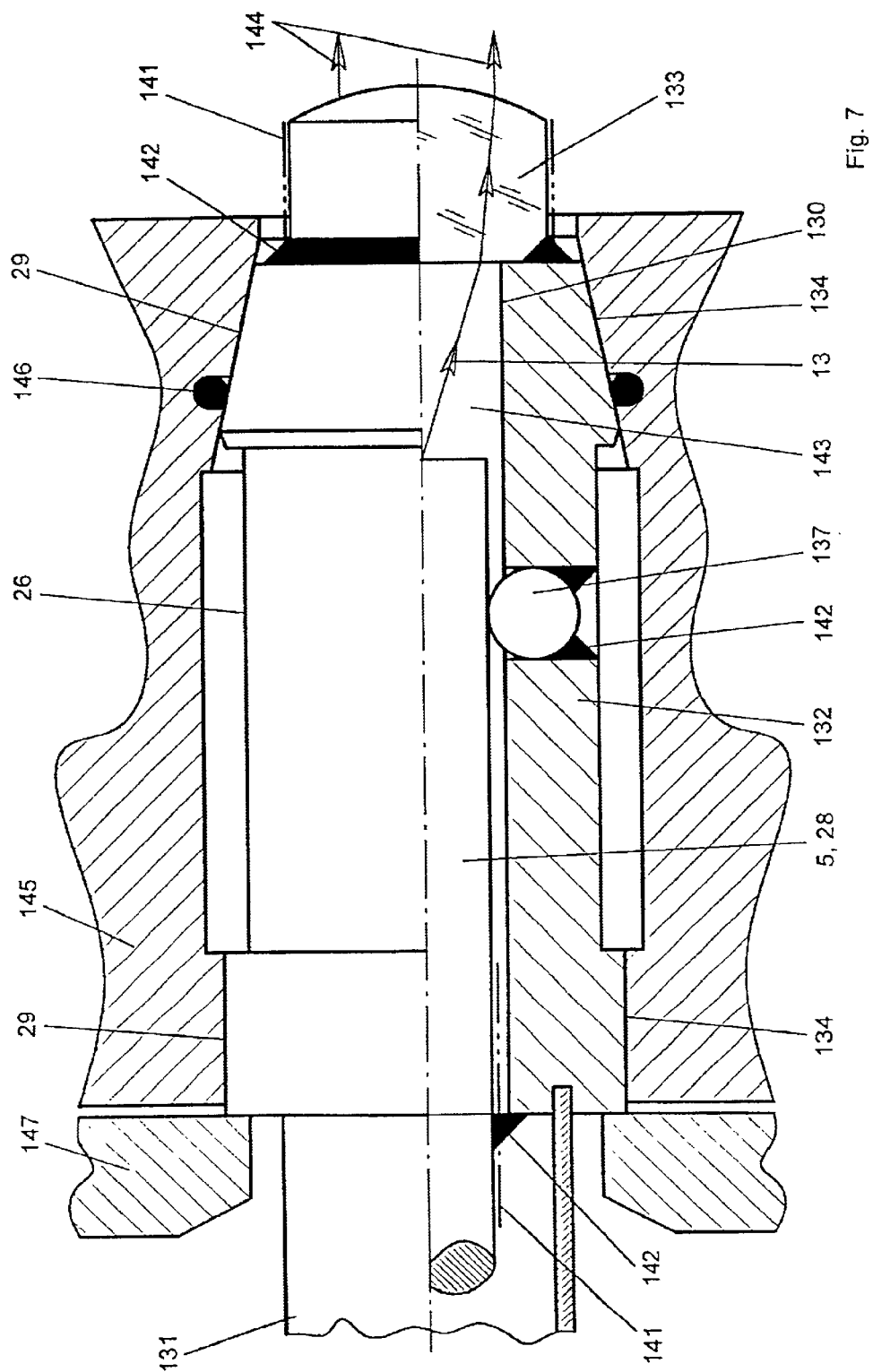
FIG. 7 is an example of an embodiment of a terminator having a conical fit for insertion into a mount.

This terminator 26 can be fundamentally used for all applications wherein the matter of concern is that the ray bundle emerging from a fiber 5, 28 be precisely coupled with a releasable connection. It is likewise possible with the assistance of this terminator to produce a precise, releasable connection of the fiber 5, 28 to the remaining optics. The terminator is composed of an oblong housing 132 that comprises a through cylindrical opening 130 extending in axial direction. The housing is preferably manufactured of prefabricated, for example drawn material that can preferably be composed of glass. The laser fiber 5 of the fiber laser is preferably stripped off its cladding at its ultimate end and is preferably roughened at its outside surface, this being disclosed in German Patent Application P 197 23 267, so that the remaining pump radiation leaves the laser fiber before the entry of the laser fiber into the terminator. The fiber 5, 28 can also be additionally surrounded by a single-layer or multi-layer protective sheath 131 that can be connected to the housing 132 of the terminator, for example with a glued connection 142. The housing 132 comprises fits 134 with which the housing can be exactly introduced in a mount 29 (FIG. 5a, FIG. 7, FIG. 8, FIG. 14). The fits can thereby extend over the entire length of the housing (FIGS. 5b, 9, 10); however, it can also be attached in limited regions of the housing (FIGS. 5, 6, 7). One or more seals 36 can be provided that, for example, are connected to the housing 132 with glue connections 142. The job of the seals is to enable a gas-tight connection of the terminators to the mounts 29. The housing can have a different diameter, for example a smaller diameter, in the region of the protective cladding 131 and of the seal 36 than in the region of the fits. At the end of the housing 132, the end of the fiber 28 or, respectively, of the laser fiber 5 is accepted and conducted within the housing in the opening 130. A lens 133 having a short focal length is secured to the other end of the housing 132, whereby the housing can comprise a conical expansion 139 so as not to impede the laser radiation 13. Means can be provided for adjusting the position of the fiber 5, 28 within the terminator in order to adjust the position of the fiber relative to the lens 133 within the terminator and with reference to the fits 134, as shown in FIGS. 5b, 5c, 6, 6a, 7, 9, 9a, 10a, 10b, 11, 11a and 12. The radial position of the fiber 5, 28 can also be defined by the cylindrical opening 130, whereby the fiber is axially displaceable within the opening. The position of the lens 133 can either be adequately precisely mounted during assembly or can be axially and/or radially adjusted and fixed with suitable means (not shown) with reference to the fiber 5, 28 and to the fits 134, whereby the fiber can also be axially displaced (FIG. 5b). The adjustments are advantageously undertaken with a measuring and adjustment device. What the adjustment is intended to achieve is that the beam bundle 144 emerging from the lens 133 is brought into a predetermined axial and focus position with a defined cone relative to the fits 134. After a fixing of the fiber 5, 28 within the housing 132 and of the lens 133 at the housing, the measuring and adjustment device is removed. Inventively, it is also possible to provide the end of the fiber 5, 28 with a suitable coating, for example a correspondingly thickly applied metallization 141, in the region of the terminator before assembly in order to further improve the durability of the adjustment. The fixing of the fiber 5, 28 within the housing 132 can occur with suitable means such as gluing, soldering or welding. An elastic compound 138 that represents an additional protection for the fiber is preferably provided at the transition between the housing 132 and the protective sheath 131. It is also possible to fashion and align the lens 133 by corresponding shaping and vapor-deposition of a corresponding layer, preferably at its side facing toward the fiber end, such that it co-assumes the function of the outfeed mirror 12 for the fiber laser.

Figure 5A:
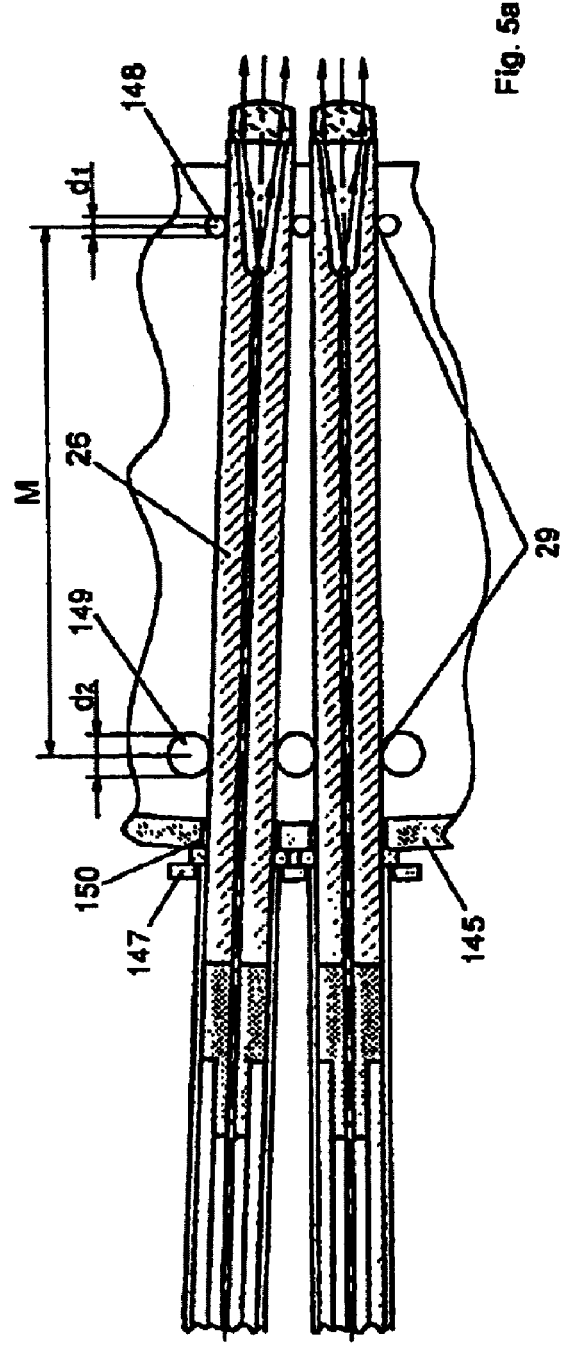
FIG. 5a is an example of a multiple arrangement for a plurality of terminators.
Figure 9:
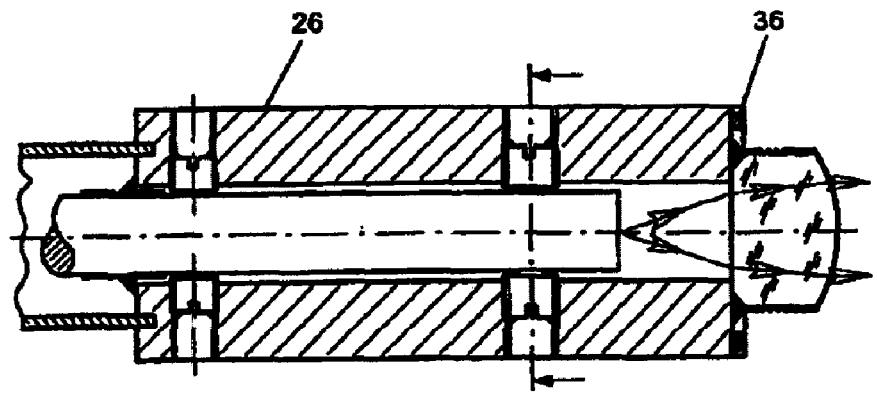
Figure 9A:
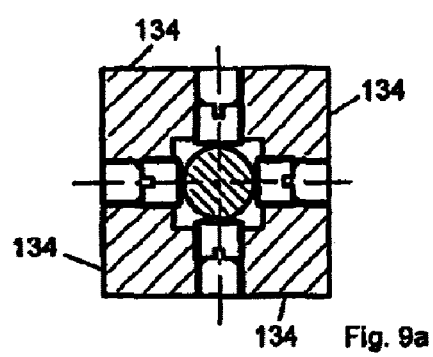
Figure 11:
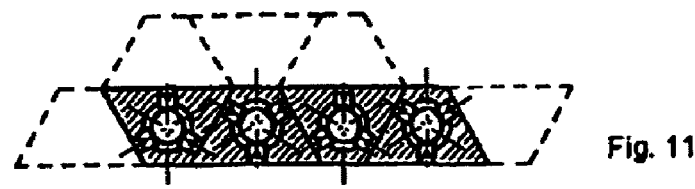
Figure 11A:
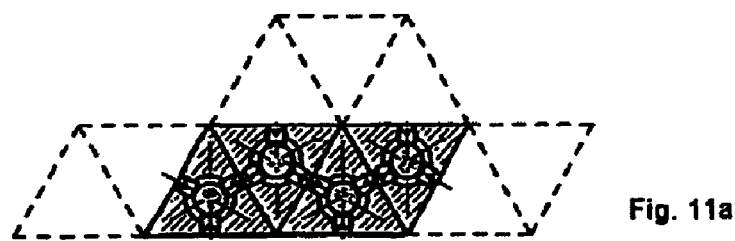
Figure 12:
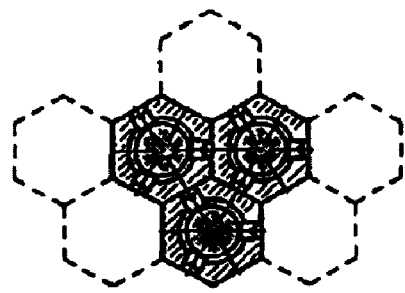
Figure 23:
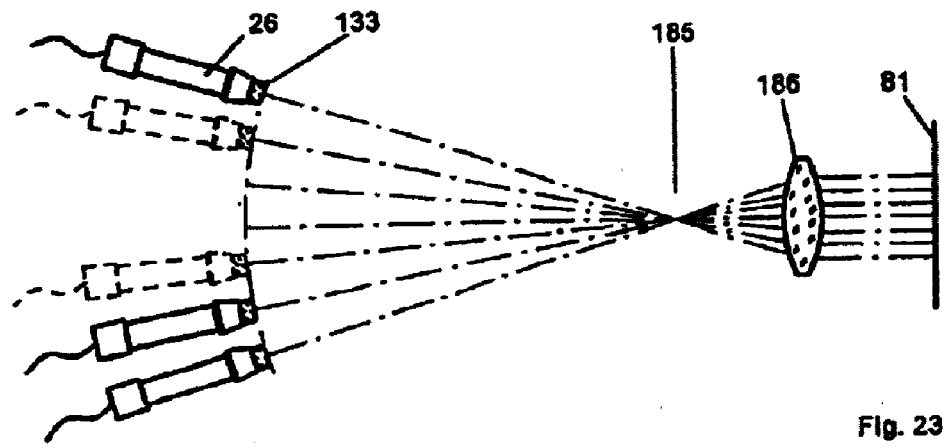
Figure 24:
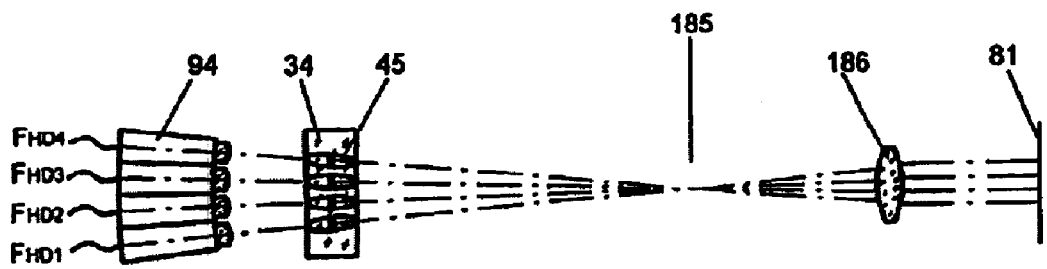
Figure 24A:
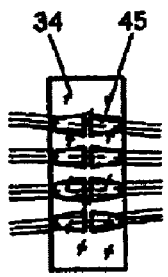
Figure 26:
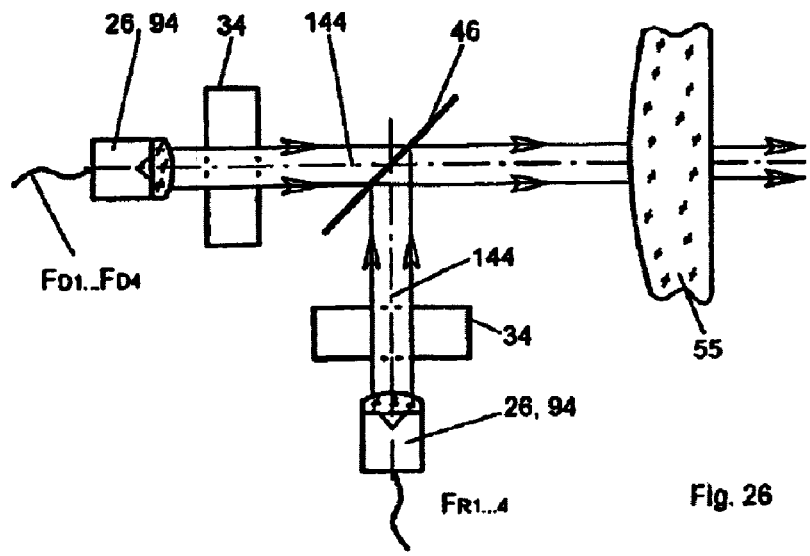
Figure 26A:
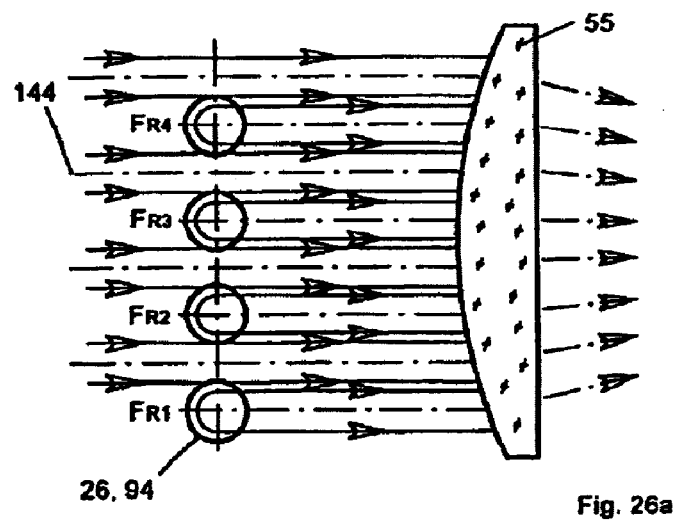
Figures 27, 27A, 27B:
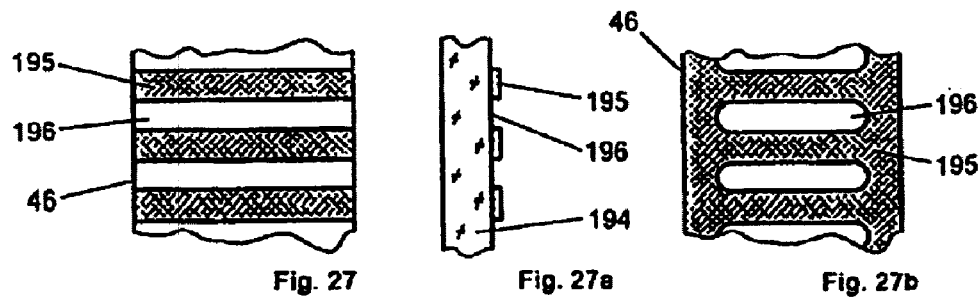
Figure 28:
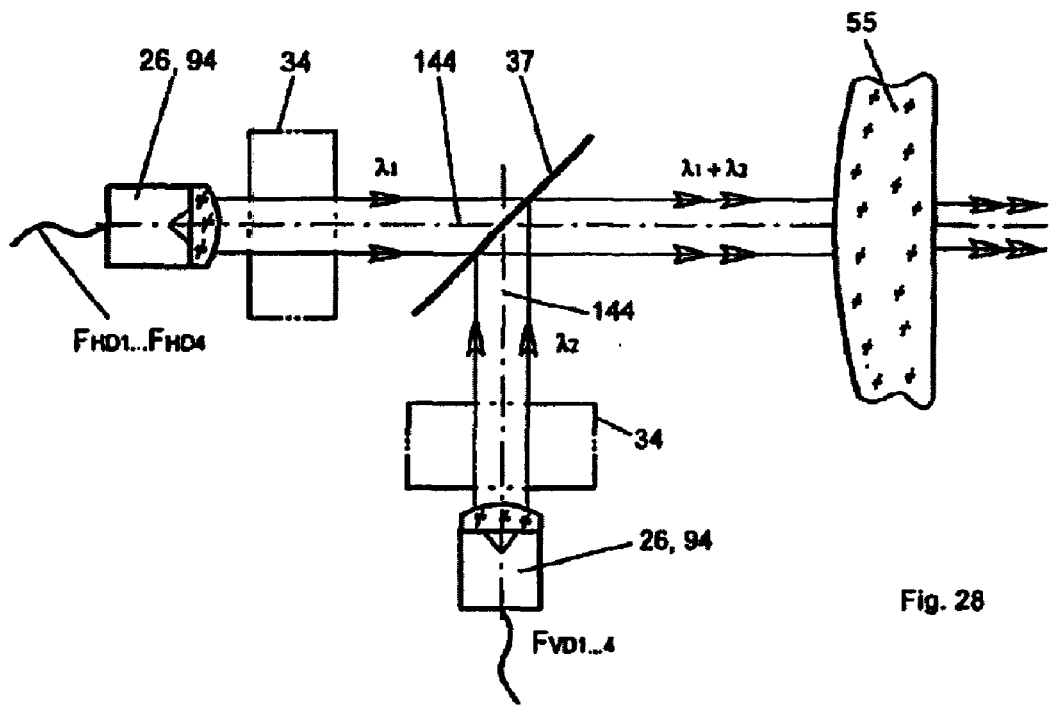
Figure 28A:
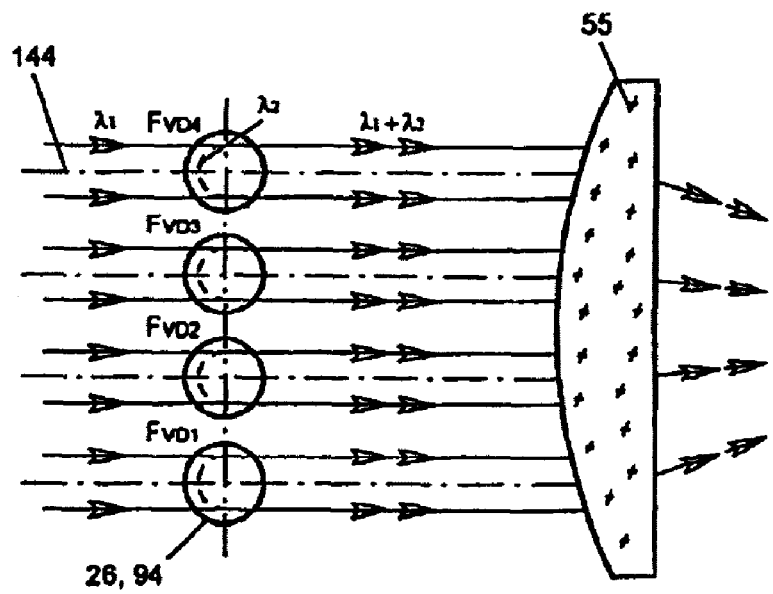
Figure 34:
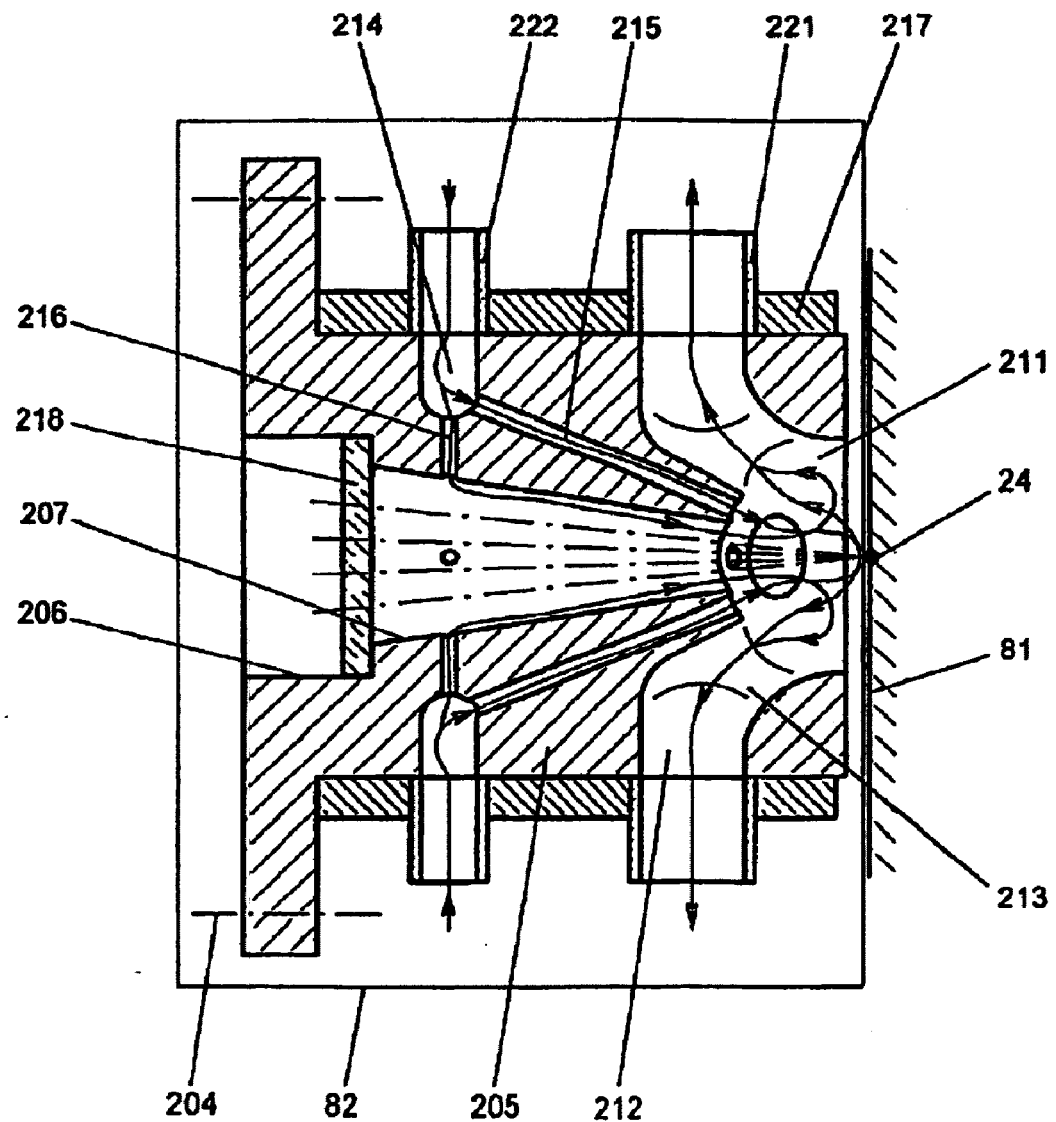
Figure 1:
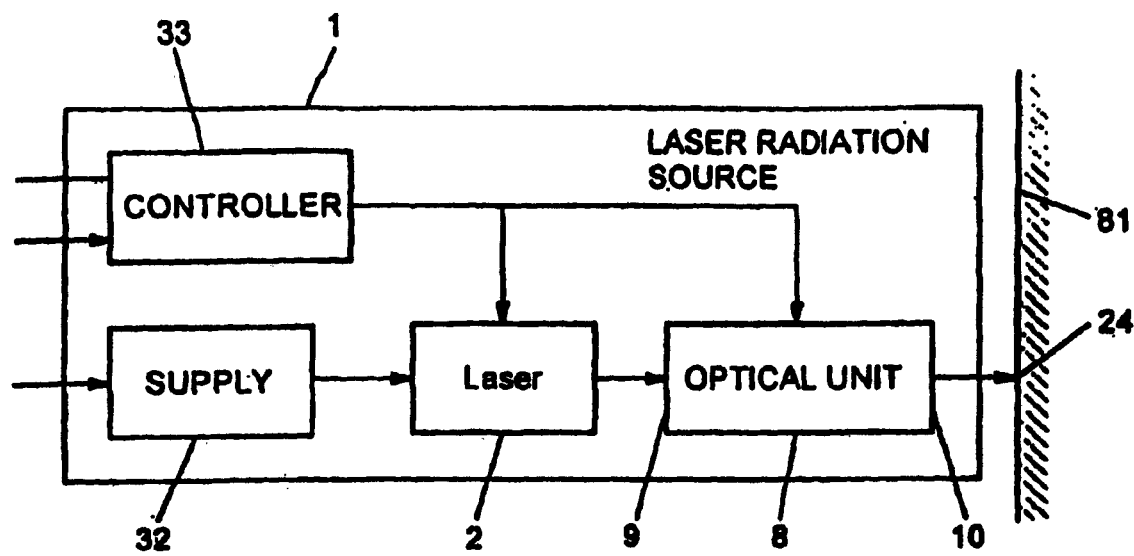
Figure 2:
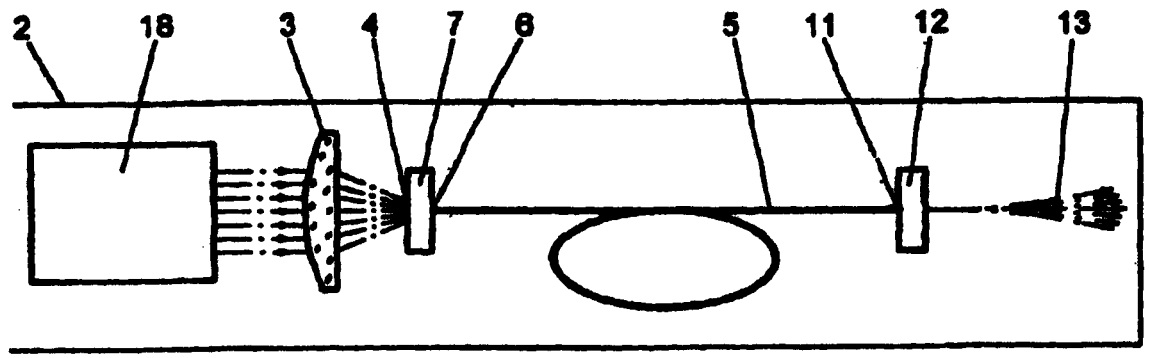
Figure 2A:
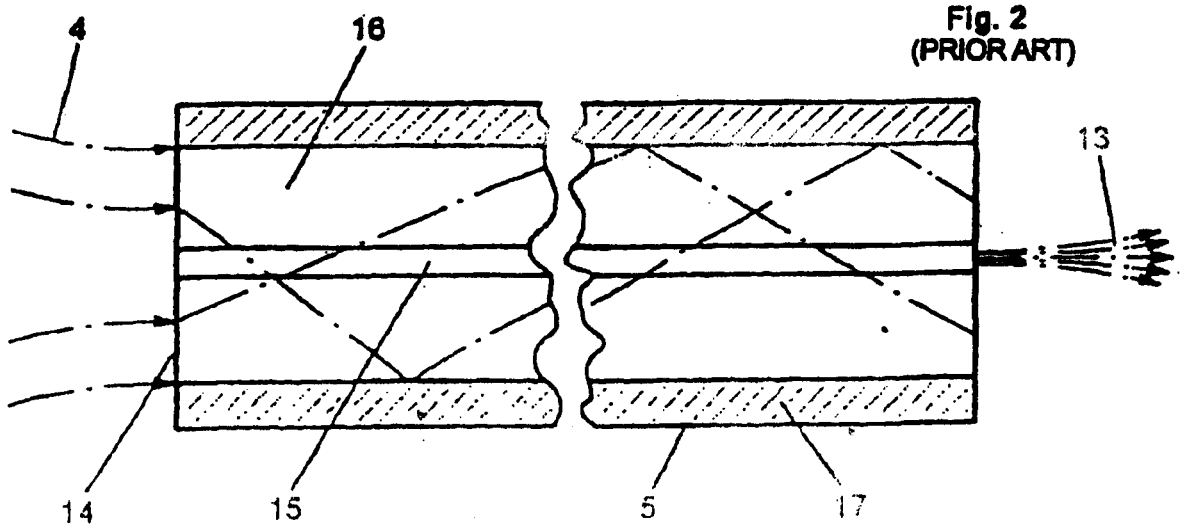
Figure 4:
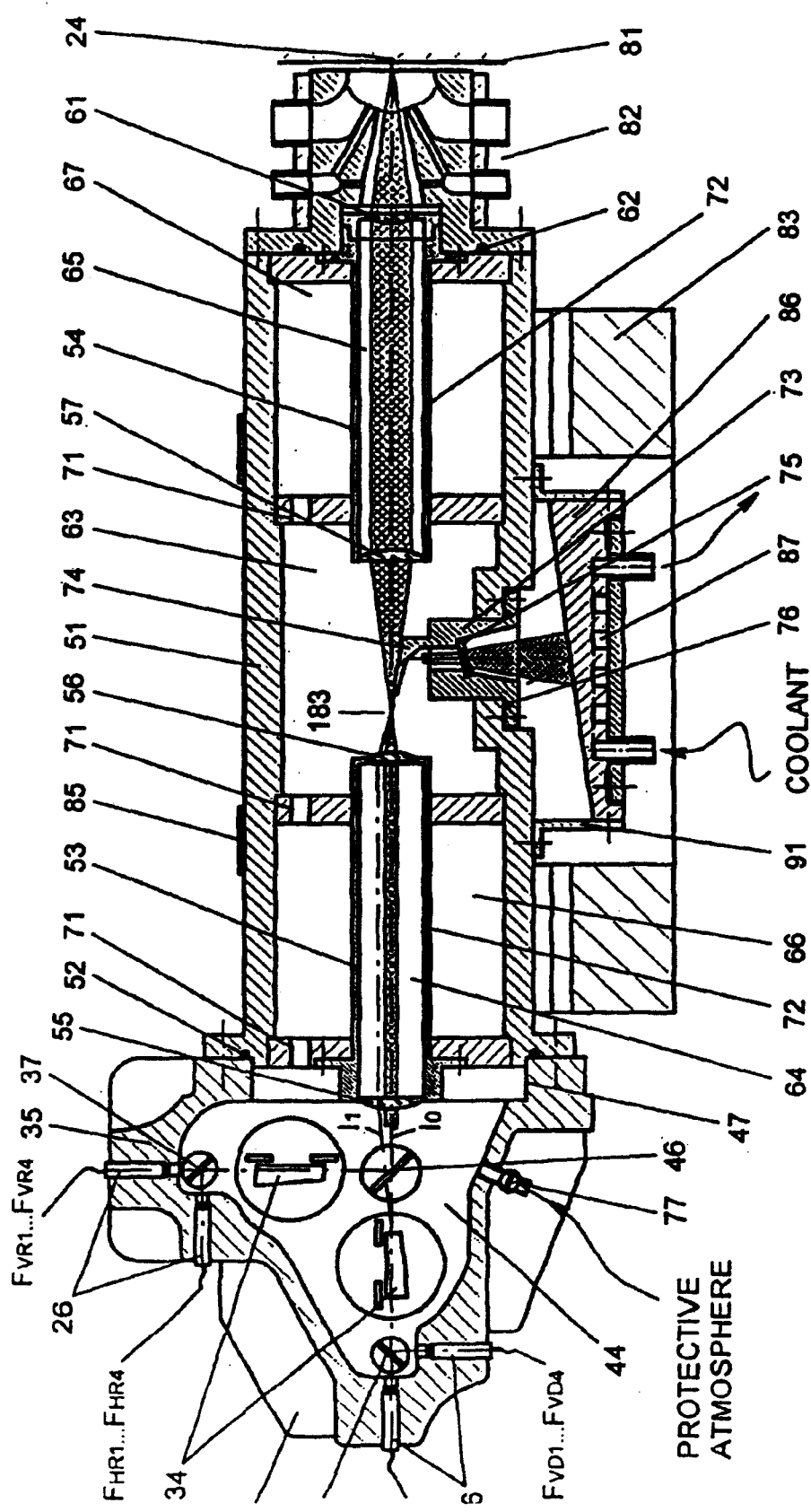
Figure 4B:
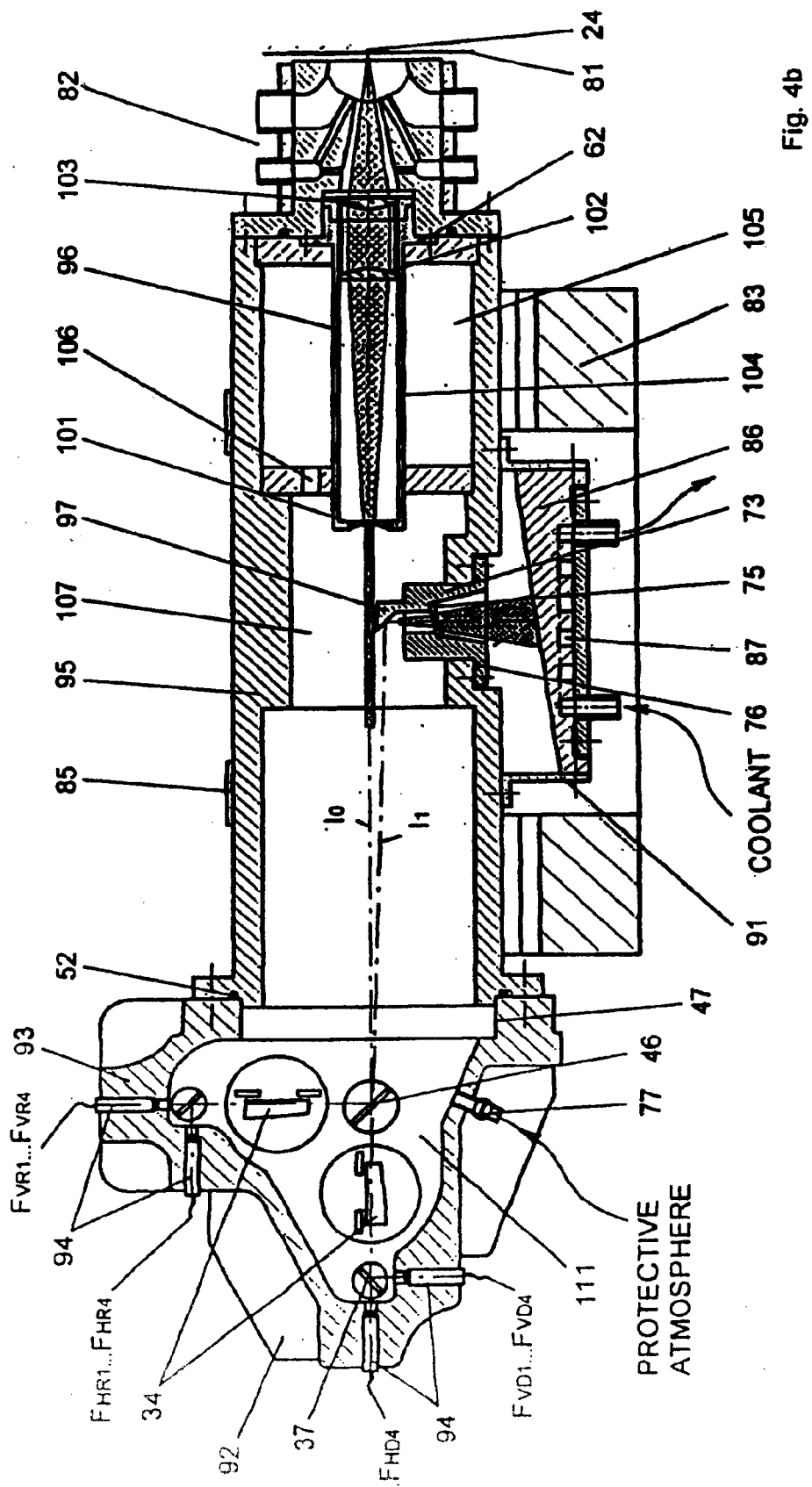
Figure 8:
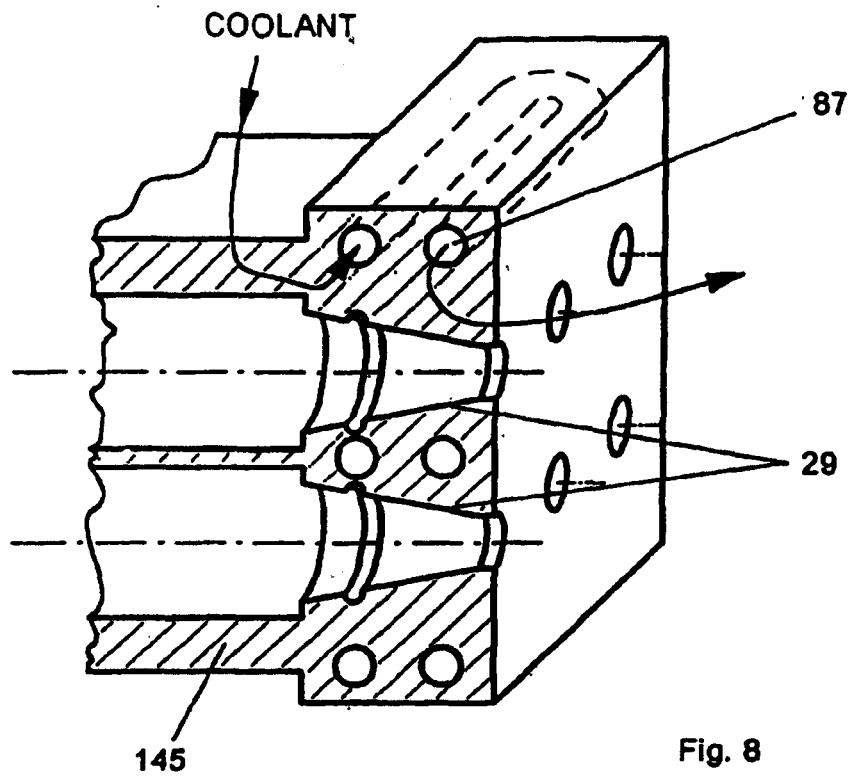
Figure 8A:
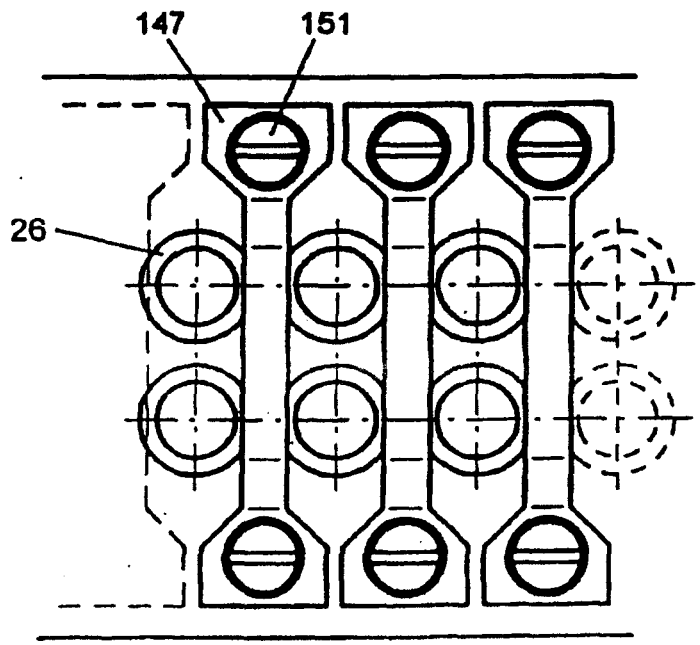
Figure 32:
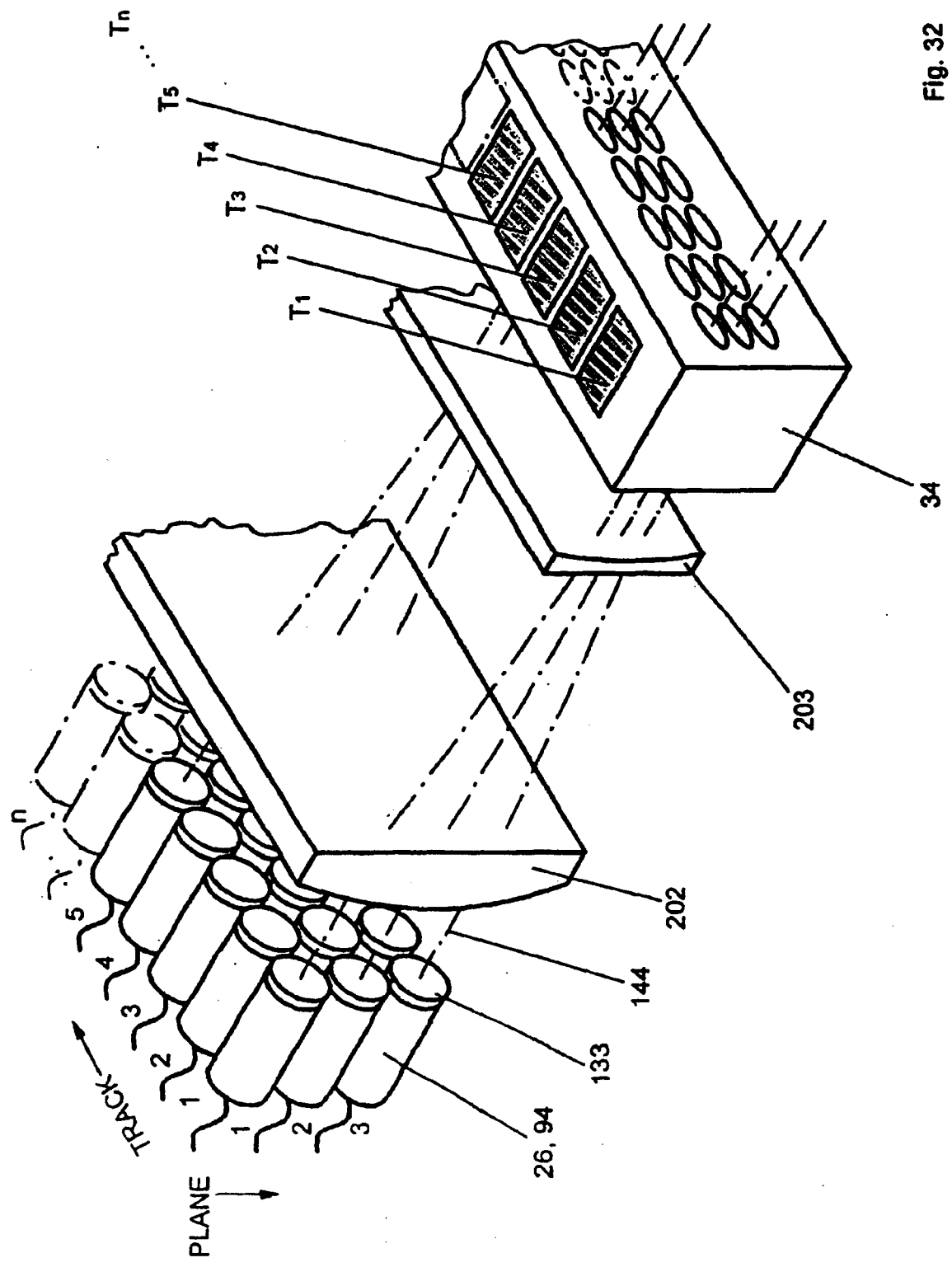

FIG. 5a shows a multiple arrangement of fiber laser outputs with the terminators from FIG. 5. Bores 150 for the acceptance of two terminators 26 for two tracks are provided in a housing 145. Further, respectively three pins 148 and 149 are attached in rows such within the housing 145 in extension of the bores that they represent a lateral limitation as mount 29 for the terminators and see to a precise guidance and alignment of the terminators. The diameters of the pins 148 are referenced $d_1$ and are preferably identical to one another. The diameters of the pins 149 are referenced $d_2$ and are preferably likewise identical to one another. If the diameters of the pins 148 were the same as the diameters of the pins 149, the axes of the ray beams of both tracks would lie parallel to one another in the plane of the drawing since the terminators 26 comprise cylindrical fits 134. In FIG. 5*a*, however,.the diameters of the pins 149 are shown larger than the diameters of the pins 148, this resulting in the axes of the two ray beams proceeding at an angle relative to one another in the plane of the drawing. The angle between the ray beams is dependent on the diameter difference $d_2$–$d_1$ and on the center-to-center spacing M of the two pin rows. The terminators are conducted through the housing 145 at the underside in one plane and are conducted from above through a cover (not shown) of the housing that is secured to the housing and can close it gas-tight with a seal (not shown). The housing 145 can be part of a receptacle for an optical unit for shaping the laser radiation. The terminators are secured to the housing 145 with clips 147 and screws (not shown), whereby the seals 36 see to a gas-tight closure. The arrangement is not limited to two tracks; further bores 150 can be provided and further pins 148 and 149 can be introduced in order to insert further terminators for further tracks. The arrangement is not limited to the one plane as described; further bores 150 can be inserted into the housing 145 in further tracks and in one or more further planes, these lying above or below the plane of the drawing, and the pins 148 and 149 are lengthened to such an extent that they represent mounts 29 for all tracks and all planes. Pins 148 and 149 are likewise employed for producing a defined spacing between the planes. In this case, the pins proceed horizontally between the terminators. For example, the horizontally arranged pins 149 proceed between the wall of the housing 145 wherein the bores 150 lie and the row of illustrated, vertically arranged pins 149. The horizontally arranged pins 148 preferably proceed at a spacing M parallel to the horizontally arranged pins 149. Horizontally arranged pins are not shown in FIG. 2*a*. The pins 148, 149 are preferably fabricated of drawn steel wire; however, they can also be composed of other materials, for example of drawn glass. An advantage given the arrangement with a plurality of tracks and/or planes in the illustrated way is that the pins 148, 149 exhibit a certain flexibility. As a result thereof, it is possible to press the entire packet of the terminators together in the direction of the tracks and in the direction of the planes such that the terminators 26 with their fittings 134 lie against the pins without spacing, this being desirable for achieving utmost precision.

FIG. 5*b* shows a terminator 26, whereby means for adjusting the position of the fiber 5, 28 within the terminator are provided in order to be able to adjust the position of the fiber 5, 28 relative to the lens 133 within the terminator and with respect to the fittings 134. The position of the lens can also be adjusted. The adjustments are advantageously undertaken with an adjustment device. Adjustment screws 135, 136 (FIGS. 5*b*, 5*c*, 9, 9*a*, 10*a*, 10*b*, 11, 11*a*, 12) and/or balls 137 (FIGS. 6, 6*a*, 7) can be provided for the adjustment of the position of the fiber 5, 28 in the housing 132. The fiber 28 or laser fiber 5 can also be axially displaced within the adjustment screws 135, 136 or balls 137. The position of the lens 133 can either be adequately precisely mounted during assembly or axially and/or radially adjusted and fixed by means (not shown) with reference to the fiber 5, 28 and with reference to the fittings 134, whereby the fiber can also be axially displaced. The adjustments are advantageously undertaken with a measuring and adjustment device. What the adjustment is intended to achieve is that the beam bundle 144 emerging from the lens 133 is brought into a predetermined axial and focus position with a defined cone on the basis of a relative adjustment of lens 133 and fiber 5, 28 toward the fits 134. After a fixing of the fiber 5, 28 within the housing 132 and of the lens 133 to the housing, the measuring and adjustment device is removed. That stated under FIG. 5 for this and the other embodiments continues to apply, for example regarding the metallization 141, the elastic compound 138 and the employment of the lens 133 as laser mirror.

FIG. 5*c* shows a cross-section through the terminator 26 in the region of the adjustment screws, from which it can be seen that preferably three adjustment screws 135 are provided distributed over the circumference, the fiber 28 or, respectively, the laser fiber 5 being adjustable in fine fashion in the housing therewith. Further, further adjustment screws 136, as shown in FIG. 5*b*, can be provided within the terminator at the end of the terminator at which the fiber 28 or, respectively, the laser fiber 5 enters. These adjustment screws are designed like the adjustment screws 135. When only one set of adjustment screws 135 is employed, the fiber 28 or the laser fiber 5 can only be adjusted with respect to the angle. When two sets of adjustment screws are employed, they can also be displaced parallel to their axis. The fixing of the fiber 5, 28 within the housing 132 can occur with suitable means such as gluing, soldering or welding.

FIG. 6 shows an embodiment of the terminator 26 wherein small balls 137 of metal or, preferably, metallized glass are employed instead of adjustment screws, these being brought into their position in the housing and being subsequently glued or soldered. A plurality of sets of balls can also be applied.

FIG. 6*a* shows a cross-section through the terminator in the region of the balls 137.

In order to prevent the optical surfaces on the optical fiber and the side of the lens 133 that faces toward the optical fiber from contaminating biparticles in the ambient air, the connections in FIGS. 5, 5*b*, 5*c*, 6, 6*a*, 7, 9, 10, 11, 11*a* and 12 between the lens 133 and the housing 132 as well as between the adjustment screws 135 and 136 or, respectively, the balls 37 and the housing 132 can be hermetically closed. This can occur with suitable glued or soldered connections 142. When a soldered connection is preferred, the glass parts are previously metallized at the corresponding locations 141. In order to achieve a greater strength, the glued or soldered connections can also entirely or partially fill the remaining gap between the fiber 28, the laser fiber 5 and the housing 132, or the protective sheath 131 in the proximity of the terminator, this being shown, by way of example, in FIG. 5. It is also possible to durably evacuate the interior 143 of the housing or fill it with a protective atmosphere.

FIG. 7 shows a further embodiment of a terminator 26 that is introduced in a housing 145 with a mount 29. Given this embodiment, the front, outer fitting 134 in the region of the lens 133 is conically implemented for better sealing and for better heat elimination. Additionally, a seal 146 can be provided that instead of being attached to the lens-side end of the terminator as shown, can also be attached to the fiber-side end thereof.

FIG. 8 shows mounts 29 in a housing 145 for a plurality of conically implemented terminators 26 according to FIG. 7. Such mounts are advantageous when a plurality of outputs of fibers or fiber lasers are to be arranged next to one another or next to one another and above one another. The axes of the mounts can thereby be arranged such that the axes of the beam bundles emerging from the terminators of the terminators lying side-by-side and/or above one another proceed parallel to one another or at an angle. In order to eliminate the waste heat, the housing 145 can be provided with bores through which a coolant is conducted.

Figure 8A:
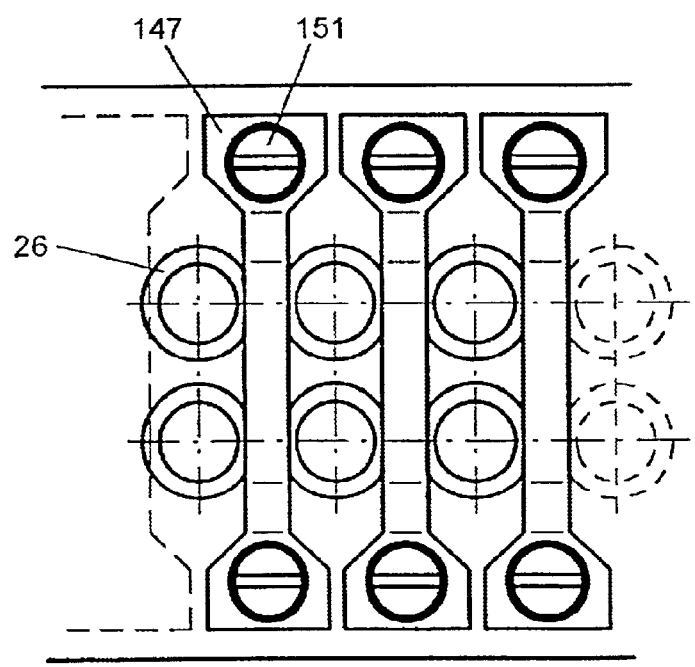
FIG. 8a shows the rear fastening of the terminators according to FIG. 8.

FIG. 8a shows the rear fastening of the terminators 26 in the housing 145. For fixing the terminators 26, 94, clips 147 are provided that fix the ends of the terminators with screws 151 in the housing at the locations at which the fibers respectively enter into the housing of the terminators 26, 94.

Figure 9:
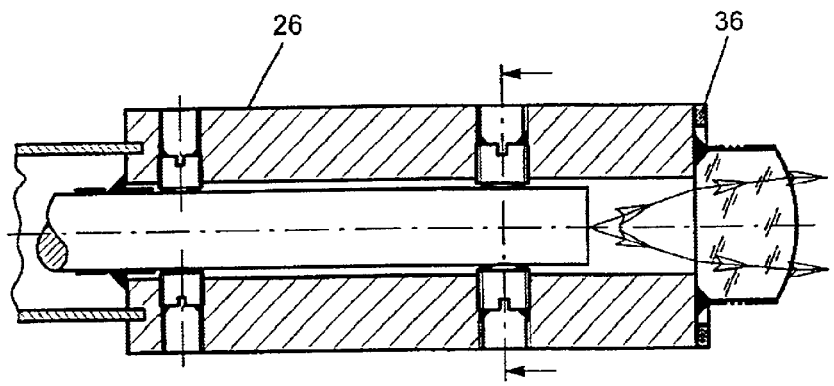
FIG. 9 is an example of an embodiment having quadratic cross-section.
Figure 9A:
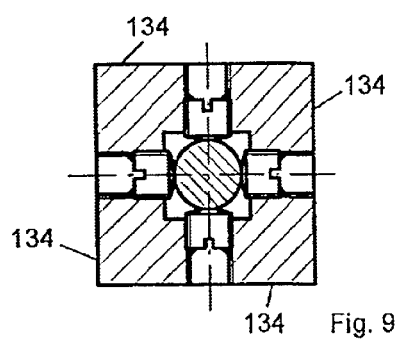
FIG. 9a is a cross-section through the terminator according to FIG. 9.

FIG. 9 shows an embodiment of a terminator 26 having a quadratic or rectangular cross-section, whereby all outside surfaces lie opposite one another proceed parallel and can be fittings 134. FIG. 9a shows a cross-section through the terminator 26 according to FIG. 9 having a quadratic cross-section.

Figure 10:
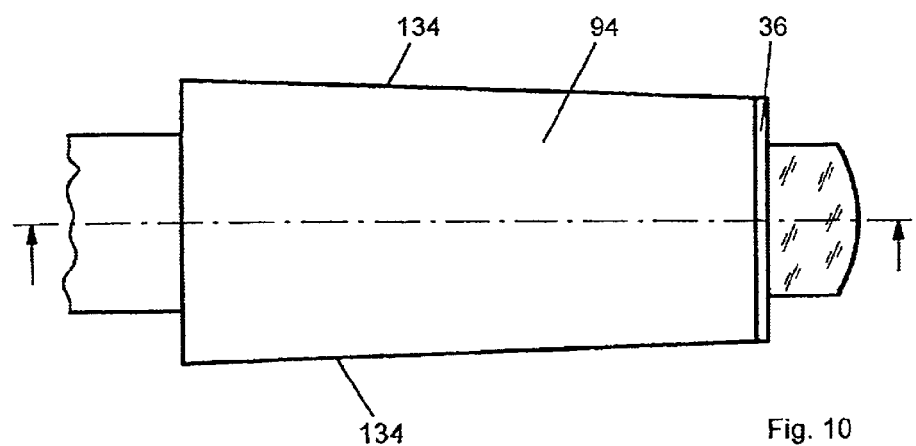
FIG. 10 is an example of a terminator having rectangular cross-section and a trapezoidal plan view.

FIG. 10 shows an embodiment of the terminator 94 with rectangular cross-section, whereby two outside surfaces lying opposite one another proceed trapezoidally and two outside surfaces lying opposite one another proceed parallel to one another. The outside surfaces can be fittings 134.

Figure 10A:
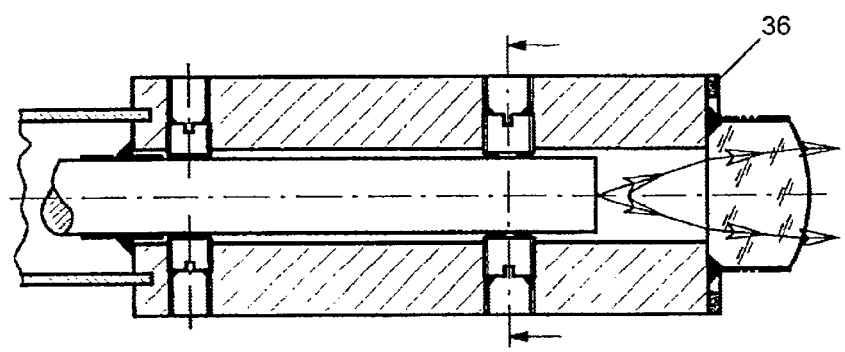
FIG. 10a is a longitudinal section through the terminator according to FIG. 10.
Figure 10B:
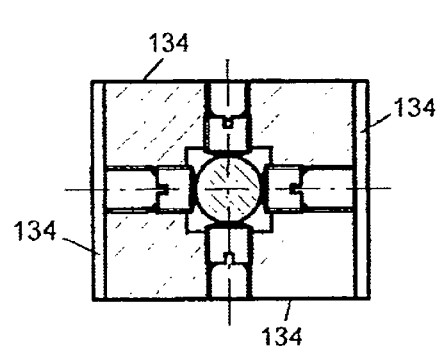
FIG. 10b is a cross-section through the terminator according to FIG. 10.

FIG. 10a shows a longitudinal section and FIG. 10b a cross-section through the terminator according to FIG. 10.

Figure 11:
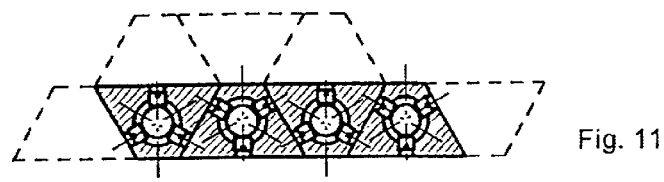
FIG. 11 is an example of a terminator having trapezoidal cross-section.

FIG. 11 shows terminators 26 having trapezoidal cross-sections, so that a row of terminators arises by successive turning of the terminators by 180□ when a plurality of terminators are joined to one another, whereby the center points of the terminators lie on a central line. When desired, a plurality of such rows can be arranged above one another, which is indicated with broken lines in FIG. 11.

Figure 11A:
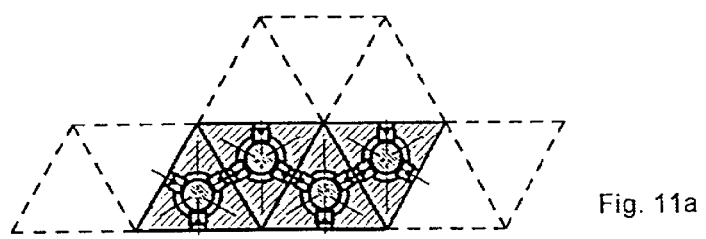
FIG. 11a is an example of a terminator having triangular cross-section.

FIG. 11a shows terminators 26 with a triangular cross-section that can likewise be arranged in a plurality of rows above one another, this being indicated with broken lines.

Figure 12:
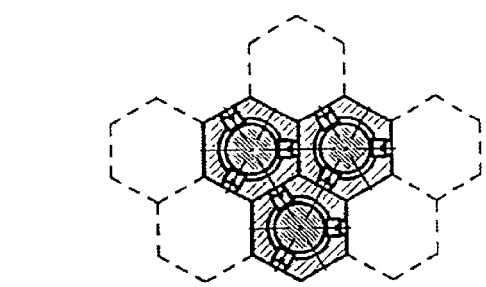
FIG. 12 is an example of a terminator having honeycomb-shaped cross-section.

FIG. 12 shows terminators 26 having a hexagonal cross-section that can be arranged honeycomb-like for increasing the packing density.

The inventive terminators advantageously enable the laser radiation source to be built of individual modules.

FIG. 13 shows an applied example of the terminator 26 or 94 given a fiber 28 or a laser fiber 5 that have both ends provided with a respective, terminator.

According to the preferred embodiments, it is possible to preferably implement the lens 133 at its side facing toward the fiber end on the basis of a corresponding shape being and vapor-deposition of a corresponding layer such that it co-assumes the function of the ouffeed mirror 12. According to the preferred embodiments, it is also possible to implement the lens 3, 154 by corresponding shaping and vapor-deposition of a corresponding layer that it co-assumes the function of the infeed mirror 7.

It is fundamentally possible to combine a plurality of the terminators described above in a plurality of tracks side-by-side and above one another in a plurality of planes to form a packet.

It is also possible to implement the shape of the terminators differently from that shown in the Figures, for example that a cylindrical shape according to FIG. 6 is lent trapezoidal or rectangular fits according to FIG. 9 or FIG. 10.

FIG. 14 shows a coupling of the laser fiber 5 to a pump source with the terminator 26 via the housing 152 in which the pump source 18 is accommodated in a recess 153, preferably gas-tight. A seal 146 assures that the terminator 26 likewise terminates gas-tight, so that no dirt particles can penetrate into the recess from the outside and, as needed, it can be evacuated or filled with a protective atmosphere. A constant current of a protective atmosphere can also flow through the recess 153, particularly given temporary removal of the terminator 26. The radiation of the pump source 18 is focused onto the pump cross-section of the laser fiber 5 via a lens 154. The pump source can be composed of one or more laser diodes; however, it can also be composed of an arrangement of one or more lasers, particularly fiber lasers as well, whose output radiation was united such with suitable means that a suitable pump spot arises.

FIG. 15 shows the branching of the output radiation from the laser fiber 5 of a fiber laser with a fused fiber coupler 155. Such fused fiber couplers are described for single-mode fibers on Page G16 of the catalog of Spindler and Hoyer specified in greater detail under FIG. 20 and can be directly fused to the output of the laser fiber 5 after correspondingly precise alignment. In this case, thus, the terminator 26, 94 is connected to a passive single-mode fiber or, respectively, to a different fiber 28 and not directly to a fiber laser with the active laser fiber 5. There are also other possibilities of splitting the laser beam into a plurality of sub-beams such as, for example, beam splitter mirrors or holographic beam splitters. The advantage of the described fused fiber coupler, however, is that the laser radiation can be brought to the processing point guided within fibers insofar as possible, this leading to a considerable simplification of the arrangement.

FIG. 16 shows the uniting of the radiation from the laser fibers 5 of two fiber lasers via a fused fiber coupler 156. The cross-sections of the two input fibers are united to form one fiber in the fused fiber coupler 156. For example, the diameter of the fibers at the two inputs of the fused fiber coupler amounts to 6 $\mu$m and the core diameter of the two laser fibers to be fused on likewise amounts to 6 $\mu$m. A core diameter of the single-mode fiber at the output of the fused fiber coupler thus becomes 9 $\mu$m, which still allows a faultless guidance of a single mode for the corresponding wavelength. The diameter at the output of the fused fiber coupler, however, can also be greater than 9 $\mu$m, and more than two outputs of fiber lasers or, respectively, fibers can be united. The terminator 26, 94 in this case is thus connected to a passive single-mode fiber or other passive fiber 28 and not to a fiber laser with the active laser fiber 5.

However, all other types of light waveguides can be welded to the fiber laser or coupled thereto in some other way, for example via optics.

One or more passive single-mode fibers or one or more other passive fibers 28 can also be coupled to an individual fiber laser instead of a brancher according to FIG. 15 or a combiner according to FIG. 16, being coupled via optics in order to then connect the terminator to this single-mode fiber or other fiber.

However, it is also possible to unite the outputs of a plurality of fiber lasers or single-mode fibers or other suitable fibers into which laser radiation can be coupled via wavelength-dependent or polarized beam combiners or other suitable techniques, and to in turn couple into single-mode fibers or other fibers that can be provided with a respective, corresponding terminator at one or both ends.

The described possibilities of branching and uniting fibers can be particularly advantageously employed when the modular structure is applied to the laser radiation source.

Figure 17:
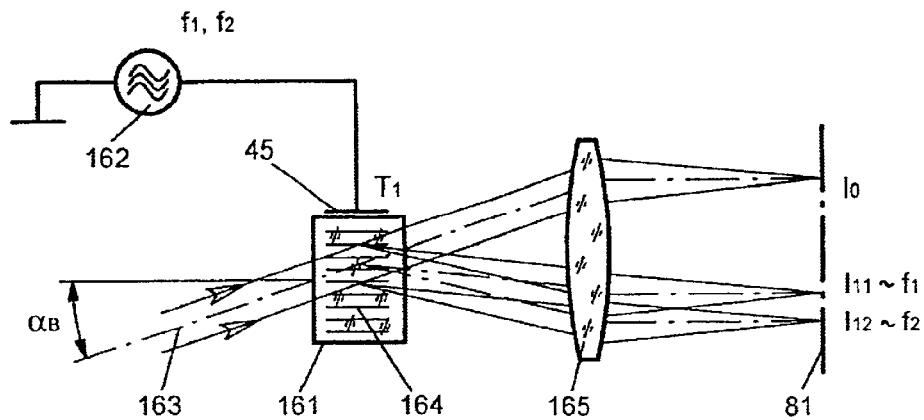
FIG. 17 is a schematic illustration of the beam path through an acousto-optical deflector or, respectively, modulator.

FIG. 17 shows the principle of an acousto-optical deflector. A piezo-electric transducer 45 is applied on a substrate 161 that is also referred to as crystal, said piezo-electric transducer 45 being supplied with electrical energy from a high-frequency source 162. The laser beam 163 incident at a Bragg angle $\alpha_B$ is deflected out of its direction proportionably to the frequency of the high-frequency source by interaction with the ultrasound field 164 within the crystal. When the beam that is not deflected and that passes through the modulator in a straight line is referenced $l_0$ (beam of the zero order), then the frequency $f_1$ yields a direction $l_{11}$ (first beam of the first order), and the frequency $f_2$ yields a direction $l_{12}$ (second beam of the first order). Both frequencies can also be simultaneously present and the beams $l_{11}$ and $l_{12}$ arise simultaneously, these being capable of being modulated by varying the amplitudes of the high-frequency sources. An optimum transmission efficiency for the infed radiation respectively derives when the Bragg angle amounts to half the angle between the direction of the beam bundle $l_0$ and the direction of the deflected beam bundle. For use as acousto-optical modulator, only one of the sub-beams is used. It is mostly effective for processing materials to employ the beam of the zero order because it has the higher power. However, it is also possible to use one or more beams of the first order. The energy of the beams that is not used is neutralized in that, for example, it is converted into heat on a cooling surface. Only one piezo-electric transducer 45 is provided in FIG. 17, for which reason only one laser beam 163 can be deflected or modulated. However, a plurality of piezo-electric transducers can also be attached on the same substrate in order to thus simultaneously provide a plurality of laser beams, i.e. a plurality of channels, with different deflection or modulation signals. The individual channels are referenced $T_1$ through $T_n$. When, as shown in FIG. 17, the acousto-optical modulator is placed into a focal point of the lens 165 and the beam path is implemented nearly parallel through the acousto-optical modulator, the beams in the other focal point of the lens 165 are focused on the processing surface arranged here, and the beam axes between the lens 165 and the processing surface 81 proceed parallel and impinge the processing surface perpendicularly. Such an arrangement is called telecentric; the advantage is that the spacing between the beam axes remains constant when the position of the processing surface changes. This is of great significance for a precise processing of material.

Figure 18:
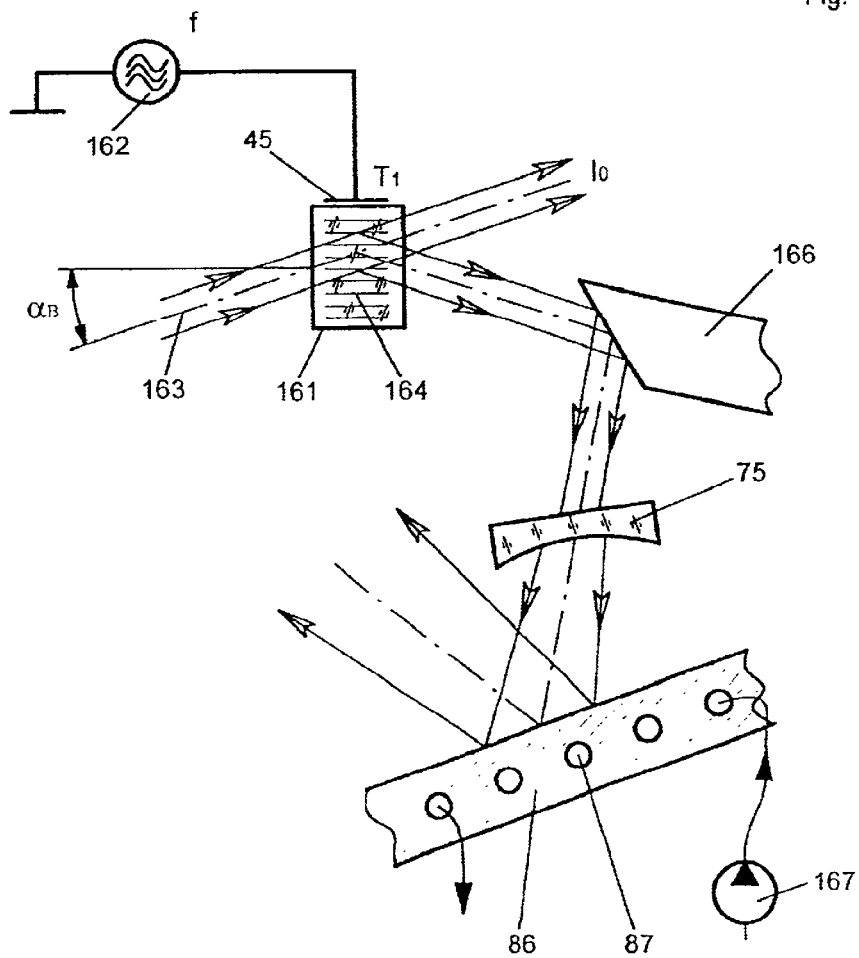
FIG. 18 shows blanking out unwanted sub-beams of an acousto-optical deflector or, respectively, modulator.

FIG. 18 shows how the unused beam is neutralized. The unused beam is intercepted and deflected via a highly reflective mirror 166, which is preferably manufactured of metal for better heat elimination, is dispersed by a concave lens 75 and is directed onto an obliquely arranged plate 86 having bores 87 such that no energy can be reflected back into the laser. The plate 86 and, potentially, the mirror 166 are also cooled via a cooling system that is operated by a pump 167. It is also possible to utilize a convex lens on a glass plate instead of the concave lens. The convex lens, particularly when a dispersion of the beam bundle to be neutralized can be undertaken with other techniques, which can occur, for example, by special shaping of the highly reflective mirror 166, is described under FIG. 4c. The concave lens 75 can also be omitted when one foregoes the advantage of the complete sealing of the laser gun. The plate 86 is shown with a planar surface at an angle. A plate having an arc or a cavity can also be employed. The surface can be roughened in order to absorb the laser energy well which is conducted to the coolant.

Figure 19A:
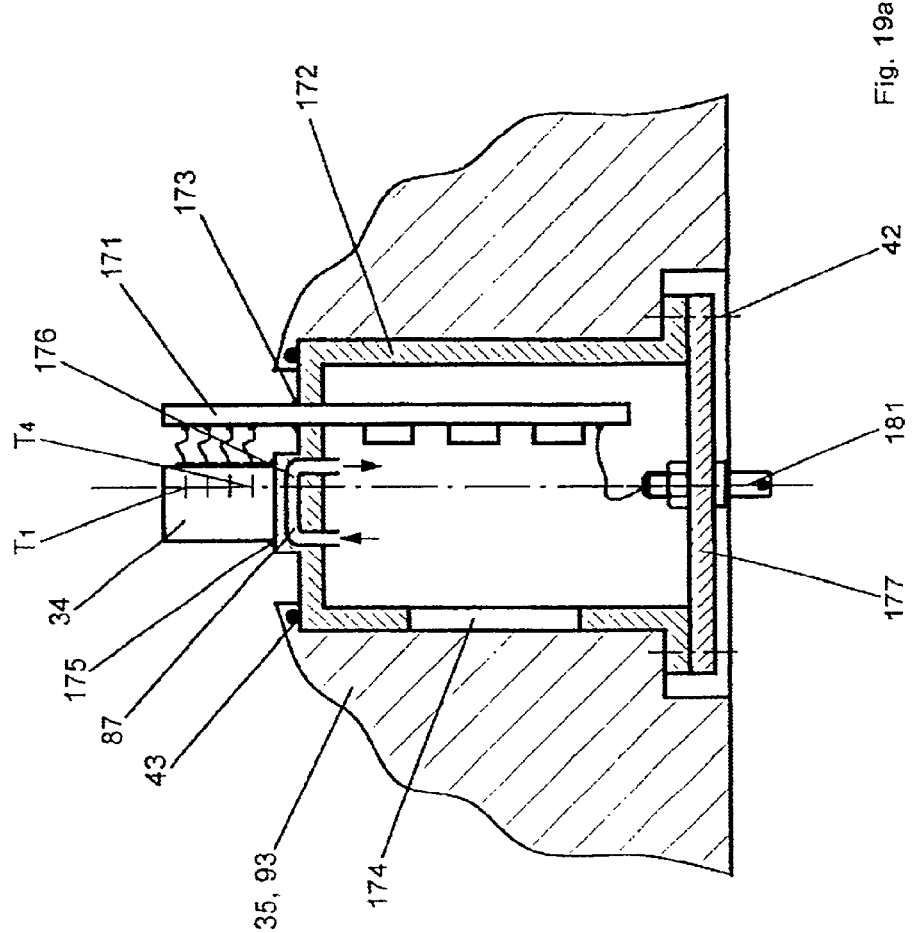
FIG. 19a is a section through the modulator according to FIG. 19.
Figure 19:
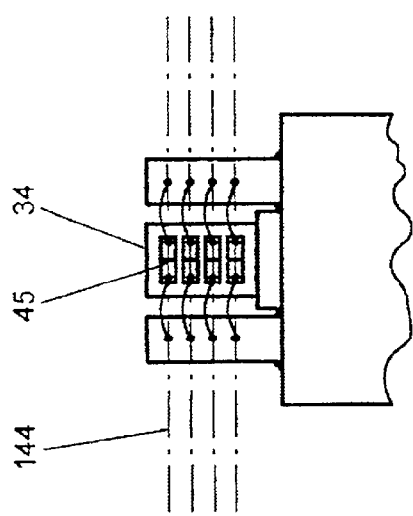
FIG. 19 is a plan view onto a four-channel acousto-optical modulator.
Figure 25:
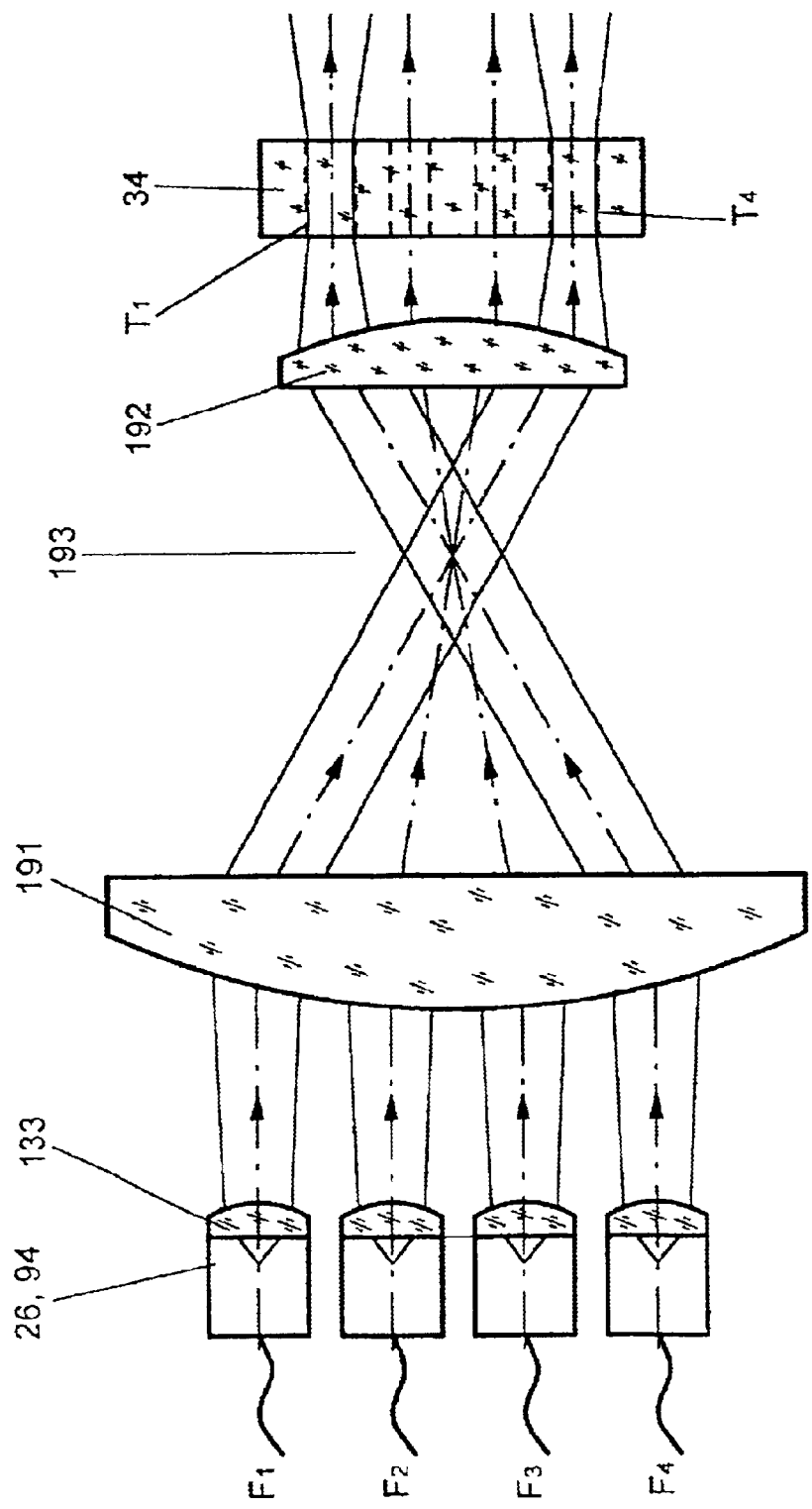
FIG. 25 is an intermediate imager for matching the fiber lasers or, respectively, their terminators to, for example, the modulator.

It is advantageous for an arrangement having a plurality of tracks to arrange a plurality of such modulators on a common crystal 34 according to FIGS. 19 and 19a. The individual modulators cannot be arranged arbitrarily close to one another because of too much heating. A modulator of Crystal Technology Incorporated, Palo Alto, USA, is especially suited for the arrangement, this being distributed under the designation MC 80 and containing five separate deflection or modulator channels. In this case, the spacing of the channels is predetermined at 2.5 mm, whereby the beam diameter is recited as 0.6 mm through 0.8 mm. A similar product by the same company is equipped with ten channels having a spacing of 2.5 mm. The spacing of the channels of 2.5 mm requires the diameter or the edge length of the terminators 26,94 is implemented smaller than 2.5 mm. When the terminator 26, 94, however, is greater in diameter or in edge length than the spacing of the channels in acousto-optical deflector or modulator, an adaptation can be undertaken with an intermediate imaging, as shown in FIG. 25. Such a multi-channel deflector or modulator can also be employed in the exemplary embodiments according to FIGS. 4, 4a, 4b, 4c, 36, 36a and 37. Dependent on the requirement of the application, all channels need not be used. Only four channels are shown in the illustrated applied examples.

Instead of the acousto-optical modulator, however, it is also possible to utilize other modulators, for example what are referred to as electro-optical modulators. Electro-optical modulators are described under the terms "laser modulators", "phase modulators" and "Pockels cells" on pages F16 through F33 of the overall catalog G3, Order No. 650020 of Laser Spindler & Hoyer, Göttingen. Multi-channel electro-optical modulators have also been possibly employed, which is shown in the publication "Der Laser in der Druckindustries" by Werner Hülsbuch, Verlag W. H ülsbusch, Constance, page 523, FIGS. 8–90a. When a one-channel or multi-channel electro-optical modulator is employed in combination with a birefringent material, then each laser beam can be split into two beams that can be separately modulated via further modulators. Such an arrangement is also referred to as an electro-optical deflector in the literature.

Figure 18A:
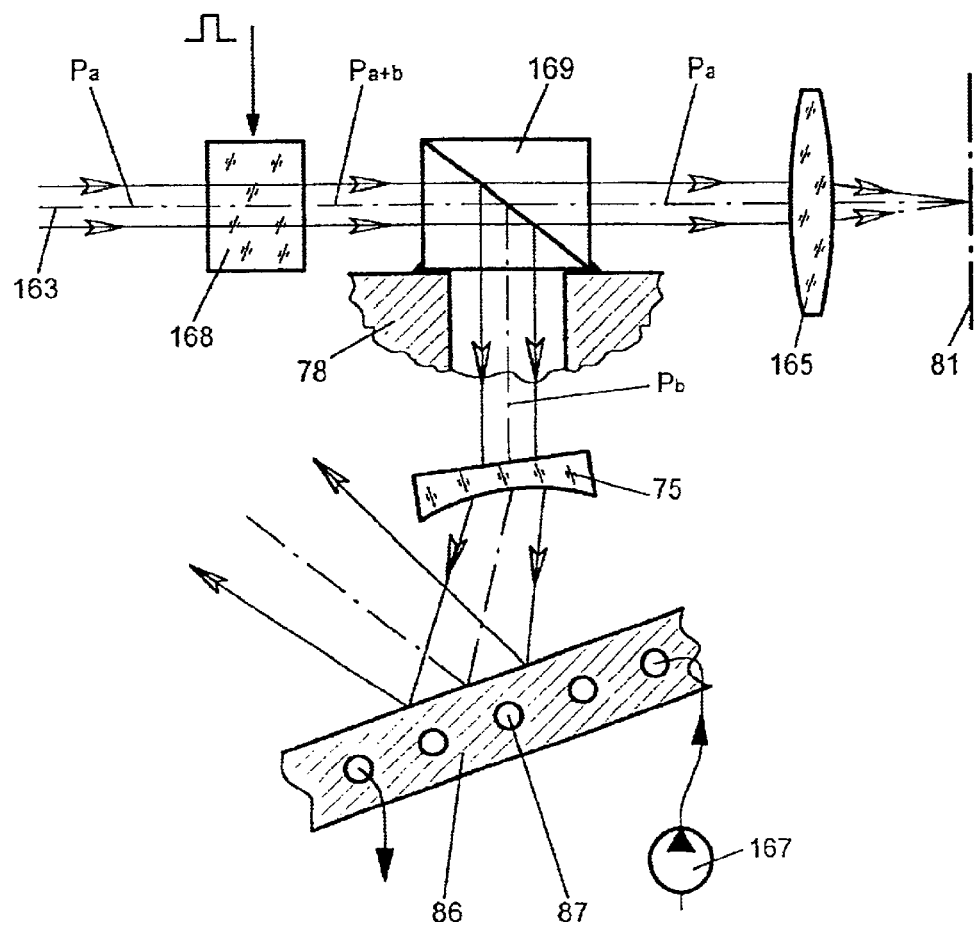
FIG. 18a is an arrangement having an electro-optical modulator.

FIG. 18a shows an arrangement having an electro-optical modulator 168. In an electro-optical modulator, for example, the polarization direction of the laser radiation that is not wanted for processing is separated from the incident beam bundle 163, and turned ($P_b$), and subsequently, the laser radiation $P_b$ not wanted for the processing is separated off in a polarization-dependent beam splitter, which is also referred to as polarization-dependent mirror 169, and is conducted into a sump, for example into a heat exchanger that can be composed of a cooled plate 86. The radiation $P_a$ wanted for processing is not turned in terms of polarization direction and is supplied to the processing surface via the lens 165. In the exemplary embodiments according to FIGS. 4, 4b and 4c, the single-channel or multi-channel acousto-optical modulators 34 can be replaced by corresponding, single-channel or multi-channel electro-optical modulators. In the exemplary embodiments according to FIGS. 4, 4b and 4c, the highly reflective mirror 74, 97 can likewise be replaced by the polarization-dependent mirror 169 (FIG. 18a), wherefrom an intercept arrangement 78 derives, and whereby the polarization-dependent mirror extends into the beam path desired for the processing.

The fiber laser can also be directly modulated. Such directly modulatable fiber lasers that have a separate modulation input available to them are offered, for example, by IPG Laser GmbH D-57299 Burbach, under the designation "Modell YLPM Series". The advantage is that the acousto-optical modulators and the corresponding electronics for the high-frequency sources can be omitted. Moreover, the transmission unit can be simplified, as shown in FIG. 23.

FIG. 19 shows a plan view onto an acousto-optical deflector or modulator. It is mentioned in the description of FIGS. 4, 4b and 4c that the space 44 or 111 according to FIGS. 4, 4b and 4c wherein the modulators are arranged should be optimally free of those components that give off particles or gases because particles could thus settle onto the highly stressed optical surfaces, which would lead to the pre-mature failure of the arrangement., For this reason, the electrical components of the arrangement in FIGS. 19 and 19a are arranged on a separate printed circuit board 171 that merely has two arms projecting into the sealed space and produces the electrical connections to the piezo-electrical transducers 45. The printed circuit board 171 is sealed relative to the modulator housing 172, preferably with a solder location 173. The end face of the printed circuit board is preferably sealed by a metal band (not shown) that is soldered on in the region of the space 44 or 111. The printed circuit board is implemented in multi-layer fashion in order to shield the individual high-frequency channels by interposed connections to ground. Instead of a printed circuit board, some other line arrangement can also be utilized. For example, each radio frequency channel can be connected by its own shielded line. The modulator housing 172 contains an access opening 174 to the electrical components. The modulator crystal 34 can be metallized at its base area and is preferably secured on the modulator housing with a solder point or a glued connection 175. A connection 176 to a cooling system can be located directly under the fastening location in order to carry the waste heat off via the openings 87 with a coolant. The modulator housing 172 is preferably closed by a cover 177 that carries the electrical terminals 181 and also contains the connections for the cooling system, but this is not shown. A seal 43 sees to it that the modulator housing 172 is inserted gas-tight into the housing 35 or 93 of FIGS. 4, 4a, 4b and 4c and is secured with the connection 42.

It is possible to secure the electro-optical modulator 168 to the modulator housing (172) in a similar way and to contact it via the printed circuit board 171.

FIG. 20 indicates that the basic beam path for the exemplary embodiment of FIG. 4 for the beam bundles 144 of the corresponding fiber lasers $F_{HD1}$ through $F_{HD4}$. The beams bundles of the fiber lasers $F_{VD1}$ through $F_{VD4}$ proceed partially congruently with the indicated rays but, inventively, have a different wavelength and, as can be seen from FIG. 4a, are united via a wavelength-dependent mirror 37 (not shown in FIG. 20) with the beam packet $F_{HD1}$ through $F_{HD4}$ to form the beam packet $F_{D1}$ through $F_{D4}$. Further, FIG. 20 does not show the beam packets of the fiber lasers $F_{VR1}$ through $F_{VR4}$ and $F_{HR1}$ through $F_{HR4}$ that, as can be seen from FIG. 4a, are likewise combined via a wavelength-dependent mirror to form the beam packet $F_{R1}$ through $F_{R4}$. As can be seen from the arrangement of the strip mirror 46 in FIG. 4a, the beam bundles of the beam packet $F_{R1}$ through $F_{R4}$ in FIG. 20 would proceed offset by half a track spacing from the indicated rays. Instead of containing the indicated four beam bundles, thus the complete beam path contains a total of eight beam bundles that yield a total of eight separate tracks on the processing surface. FIG. 20 only shows the two beam bundles 144 of the fiber lasers F $F_{HD1}$ and $F_{HD4}$. As already mentioned under FIG. 4, however, a plurality of tracks can also be arranged; for example, the plurality of tracks on the processing surface can also be increased to sixteen separately modulatable tracks. On the basis of a digital modulation of the respective laser, i.e. the laser is operated in only two conditions as a result of turn-on and turn-off, this arrangement enables an especially simple control and a good shaping of the processing spot on the processing surface. This digital type of modulation requires only an especially simple modulation system.

A distinction between more than 100 tonal value levels is required in high-grade multi-color printing in order to obtain adequately smooth color progressions; more than 400 tonal value stages would be optimum. When, for example, a cup in rotogravure wherein the volume of the cups determines the amount of ink applied onto the material being printed is composed of 8×8 or 16×16 small individual cups and the cup depth is kept constant, the processed surface can be quantitized into 64 or 256 stages. When, however, the cup depth is controlled by additional, analog or digital amplitude modulation or by a pulse-duration modulation of the laser energy, the volume of the cups can be arbitrarily finely quantized even given a low plurality of tracks. If, for example, the cup depth were digitally controlled in only two stages, as described in greater detail under FIG. 28, a cup could be composed of 8×8 individual cups given eight tracks, these potentially having respectively two different depths. For example, the volume of the cups in this case could be quantized in 128 stages without losing the advantage of purely digital modulation, which yields a considerable advantage for the stability of the method. Given 16 tracks and 2 stages in the cup depth, the number of digitally possible quantization stages already amounts to 512. It is also possible to generate the cups in two processing passes in order to increase the number of tonal value steps.

The modulators 34 as well as the strip mirror 46 are not shown in FIG. 20. For a better illustration, the cross-section of the beam bundle 144 from the terminator of the fiber laser $F_{HD1}$ that is congruent with the ray beam $F_{D1}$ after passing the wavelength-dependent mirror is designed with a hatching. Like all other illustrations, this illustration is not to scale. The two illustrated beam bundles 144 yield the processing points $B_1$ and $B_4$ on the processing surface 81 that contribute to the built-up of the processing spot 24 and generate corresponding processing tracks on the processing surface 81. The axes of the terminators 26 and of the beam bundles 144 of the individual fiber lasers proceed parallel to one another in FIG. 20. The beam cones of the terminators, i.e. the shape of the ray beam 144, are shown slightly divergent. In the Figure, a beam narrowing within the lens 133 is assumed in the Figure. The divergence angle is inversely proportional to the diameter of the beam bundle in the corresponding beam narrowing. The position of the beam narrowing and its diameter, however, can be influenced by varying the lens 133 in the terminator 26, 94 and/or its distance from the fiber 28 or from the laser fiber 5. The calculation of the beam path occurs in the known way. See the technical explanations on pages K16 and K17 of the general catalog G3, Order No. 650020 of Laser Spindler & Hoyer, Göttingen. The objective is that the processing points $B_1$ through $B_n$ of the processing surface 81 respectively become beam narrowings in order to obtain the highest power density in the processing points. With the assistance of the two lenses 55 and 56, beam narrowings and track spacings from the object plane 182 wherein the lenses 133 of the terminators 26 lie are imaged in demagnified fashion in an intermediate image plane 183 corresponding to the ratio of the focal lengths of the lenses 55 and 56. When, in this case, the distance of the lens 55 from the terminator 26 and from the crossing point 184 is equal to its focal length and when the distance of the lens 56 from the intermediate image plane 183 is equal to its focal length and equal to its spacing from the crossing point 184, what is referred to as a telecentric imaging is obtained, i.e. the axes of the beam bundles belonging to the individual tracks begin to proceed parallel in the intermediate image plane. The divergence, however, has been noticeably increased. The preferably telecentric imaging has the advantage that the diameters of the following lenses 57 and 61 need only be insignificantly larger than the diameter of a beam bundle. The lenses 57 and 61 demagnify the image from the intermediate image plane 183 in a second stage onto the processing surface 81 in the described way. A preferably telecentric imaging, namely that the axes of the individual beam bundles proceed parallel between the objective lens 61 and the processing surface 81, has the advantage here that changes in spacing between the processing surface and the laser gun produce no change in the track spacing, which is very important for a precise processing. The imaging need not necessarily occur in two stages with two lenses each; there are other arrangements that can also generate parallel beam axes between objective lens and processing surface, as shown in FIGS. 21 and 22. Deviations in the parallelism of the beam axes between the objective lens 61 and the processing surface 81 can also be tolerated as long as the result of the processing of the material is satisfactory.

FIG. 21 shows a fundamental beam path for the exemplary embodiment of FIG. 4b. The illustration is not to scale. As was already the case in FIG. 20, the two beam bundles 144 of the lasers $F_{HD1}$ and $F_{HD4}$ are only a matter of a sub-set of the beam bundles of all existing lasers in order to explain the principle. In contrast to FIG. 20, however, the axes of the individual beam bundles of the terminators in FIG. 21 are not parallel but are arranged at an angle relative to one another, which is shown in greater detail in FIG. 24, and which is advantageously achieved by terminators 94 according to FIGS. 10, 10a and 10b. As a result of this arrangement, the individual beam bundles 144 would cross similar to the case in FIG. 20 without a lens 55 being required. In the region of the imaginary crossing point, the dispersive lens with a short focal length, i.e. a concave lens 101 is inserted, this bending of the incoming rays off and rendering of the beam bundles divergent is shown, i.e. widening them. The convex lens 102 is preferably arranged in the intersection of the axial rays and, together with the lens 101, forms an inverted Galileo telescope. As a result thereof, for example, parallel input beam bundles are converted into parallel output beam bundles having an enlarged diameter between the lenses 102 and 103. The desired parallelism of each input beam bundle can, as already described, be undertaken by a suitable selection of focal length and spacing of the lens 133 from the fiber 28 or laser fiber 5 in the terminators 26, 94. The objective lens 103 focuses the enlarged beam bundle onto the processing surface 81 at the processing points $B_1$ through $B_4$ that contribute to the build-up of the processing spot 24 and generate corresponding processing tracks on the processing surface 81. The imaging scale can be modified in a simple way by modifying the focal length of the lens 103. It is therefore advantageous when the lens 103 is implemented as an interchangeable objective lens. As already described, however, a vario-focusing optics can also be employed. When the position of the lens 103 is selected such that the distance between the lenses 102 and 103 corresponds to the focal length of the lens 103, the axes of the beam bundles between the lens 103 and the processing surface are parallel and yield constant spacings of the tracks of the processing surface, even given a modified distance between the laser gun and the processing surface.

FIG. 22 indicates the fundamental beam path for the exemplary embodiment of FIG. 4c. Like all other figures, the illustration is not to scale. The beam path is very similar to that of FIG. 21, with the difference that an arced mirror 121 is employed instead of the lens 101 and a concave mirror 115 is employed instead of the lens 102. The beam path is considerably shorter due to the folding that derives. The beam path approximately corresponds to that of an inverted mirror telescope. Mirror telescopes are independent of the wavelength which is advantageous given employment of lasers having different wavelength. The imaging errors can be reduced by employing surfaces or with an optical correction plate 117 that, however, is not shown in FIG. 22. It is advantageous when the focal length of the objective lens 112 is equal to its spacing from the concave mirror. The axes of the ray bundles are then parallel between the lens 112 and the processing surface 81 and yield constant spacings of the tracks on the processing surface, even given a modified distance between the laser gun and the processing surface. Moreover, an advantageously large spacing of the objective lens from the processing surface derives. As described a vario-focusing optics can also be utilized.

FIG. 23 shows an arrangement having a plurality of lasers, whereby the individual laser outputs in the form of the terminators 26 are arranged on a circular segment and aim at a common cross-over point 185. This arrangement is particularly suitable for directly modulatable lasers since a very low expense then results. In such an arrangement, the imaging on the processing surface 81 can occur with only a single lens 186. However, an arrangement according to FIG. 4b or 4c can also be employed for imaging. The ray cones of the beam bundles from the terminators are set such that a beam narrowing and, thus, a sharp image derives for all lasers on the processing surface 81. Preferably, the spacings between the cross-over point 185 and the lens 186 as well as between the lens 186 and the processing surface 81 are of the same size and correspond to the focal length of the lens 186. In this case, the axes of the individual ray bundles between the lens 186 and the processing surface 81 are parallel and yield constant spacings between the processing tracks, even given a modified distance between the laser gun and the processing surface. Although not shown, a plurality of levels of lasers can also be arranged above one another in order to increase the power density and the power of the laser radiation source. The planes of the lasers are preferably arranged parallel to one another. As shown in FIGS. 29 and 31, it then derives that the individual ray bundles from the individual planes meet on a spot in the processing points on the processing surface 81 and thus generate an especially high power density.

Figure 24A:
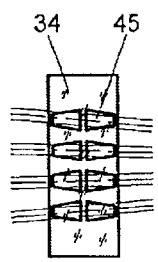
FIG. 24a is a version for FIG. 24.

FIG. 24 shows a modification relating to FIG. 23. Four fiber lasers $F_{HD1}$, $F_{HD2}$, $F_{HD3}$. $F_{HD4}$ have their terminators 94, which are described in greater detail in FIGS. 10, 10a and 10b, joined to one another on a circular segment. The terminators 94 are particularly suited for joining to one another as a result of their shape. Since no directly modulatable-fiber lasers are employed here, a four-channel acousto-optical modulator 34 is inserted. The piezoelectric transducers 45 can, as shown in FIG. 24, likewise be arranged on a circular segment. As shown in FIG. 24a, however, they can also be arranged parallel as long as the ray bundles are still adequately acquired by the acoustic field of the piezo-electric transducers 45. Instead of the lens 186, a transmission unit as described in FIGS. 4b and 4c is advantageously employed.

FIG. 25 indicates a demagnifiying intermediate imager with the lenses 191 and 192, so that the distance between the individual terminators 26, 94 can be greater than the distance between the individual modulator channels T1 through T4 on the multi-channel acousto-optical modulator 34. The imaging ratio corresponds to the relationship of the focal lengths of the two lenses 191 and 192. The intermediate image is preferably telecentrically designed in that the distance of the lens 191 from the lenses 133 of the terminators 26 or 94 and from the cross-over point 193 is equal to its focal length, and in that the distance from the crossing point 193 to the lens 192 as well as the distance of the lens 192 from the modulator crystal 34 is equal to its focal length. By adjusting the distance between the two lenses, however, one can also achieve that the rays emerging from the lens 192 no longer proceed parallel but at an angle relative to one another in order to connect the beam path according to FIG. 21 or 22 thereto. An intermediate image according to FIG. 25 can also be employed in combination with an arrangement of the terminators on a circular segment according to FIGS. 23 and 24.

The intermediate imager (191, 192) is shown in FIG. 25 between the terminators (26, 94) and the modulator (34). However, a wavelength-dependent or polarization-dependent mirror 37 can also be arranged preceding or following the intermediate imager in the beam direction. An intermediate imager (191, 192) can also be arranged in the beam path following the modulator, before or after the strip mirror 46. Preferably, the intermediate imager in the beam path is inserted at the locations referenced "E" in FIG. 4a.

Figure 26:
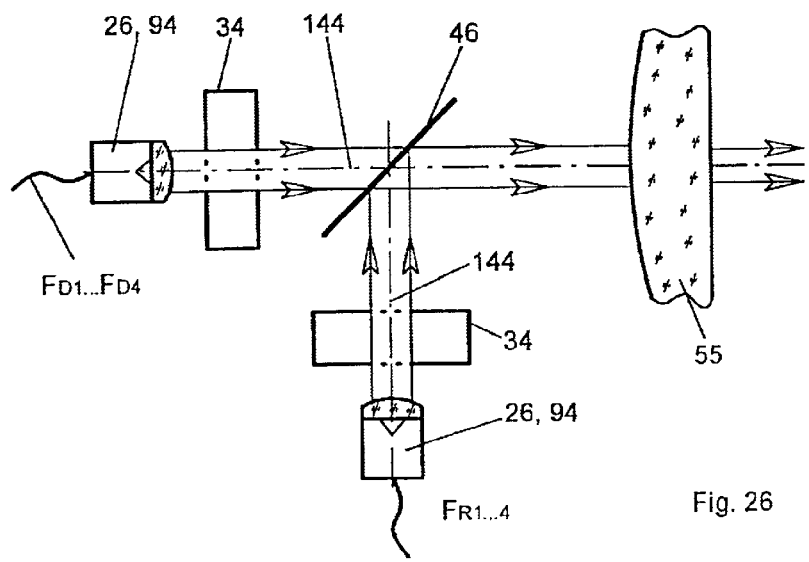
FIG. 26 shows the merging of twice four tracks of the beam path from terminators with a strip mirror arrangement.
Figure 26A:
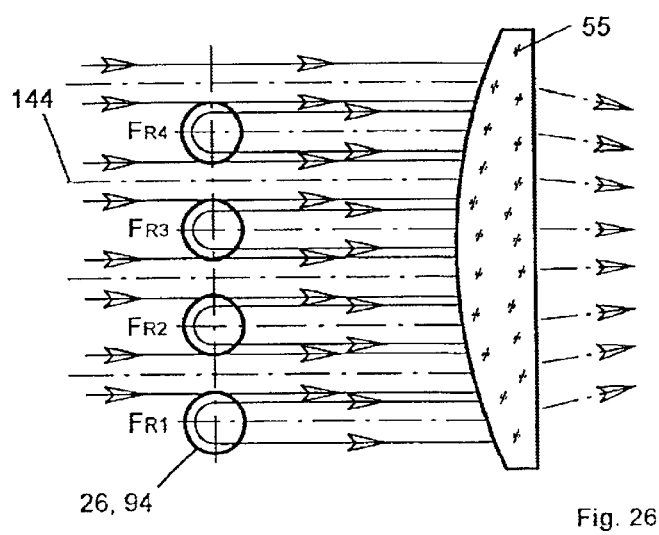
FIG. 26a is a plan view for FIG. 26.
Figure 27:
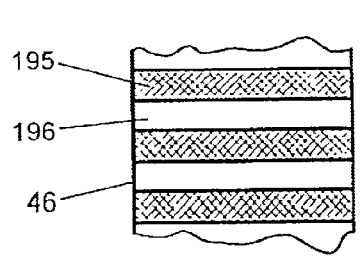
FIG. 27 is a view of a strip mirror.
Figure 27A:
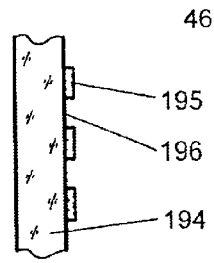
FIG. 27a is a sectional drawing through the strip mirror according to FIG. 27.

FIGS. 26 and 26a show how the distance between the tracks in the processing plane can be reduced. FIG. 26 is a side view and FIG. 26a is the appertaining plan view. Since the beam bundles 144 emerging from the terminators 26, 94 have a smaller diameter than the housing of the terminators, interspaces remain that are not utilized. Moreover, the minimum distances between the tracks and the maximum diameters of the beam bundles are prescribed by the multichannel acoustic-optical modulators 34. In order to decrease the distances between the tracks, a strip mirror 46 is provided that is transparent and mirrored in alternating fashion in stripe-shaped fashion at intervals. The strip mirror 46 and the modulators are not shown in FIG. 26a. Such a strip mirror 46 is shown in FIGS. 27 and 27a, whereby FIG. 27a shows a side view of FIG. 27. Highly reflective strips 195 are applied on a suitable substrate 194 that is transparent for laser radiation. The interspaces 196 as well as the backside are preferably provided with a reflection-reducing layer. The beam bundles 144 from the terminators 26, 94 of the fiber lasers $F_{D1}$ through $F_{D4}$ pass unimpeded through the transparent part of the strip mirror 46. The beam bundles 144 from the terminators 26, 94 of the fiber lasers $F_{R1}$ through $F_{R4}$ are arranged such that they are reflected at the strips of the strip mirror such that that they lie in a row with the ray bundles $F_{D1}$ through $F_{D4}$. The distance between the tracks has thus been cut in half.

Figure 27B:
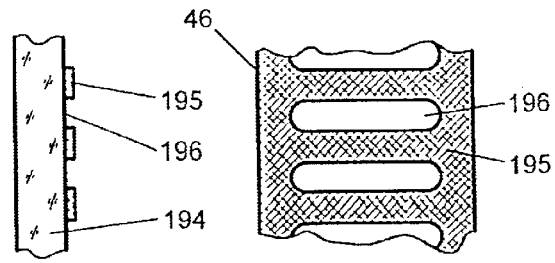
FIG. 27b is another example of a strip mirror.

FIG. 27b shows a strip mirror 46, whereby the substrate of the mirror was removed in the interspaces 196, and the entire, remaining surface is preferably highly reflectively mirrored, so that strips 195 derive. In this case, the strip mirrors can be preferably manufactured of metal, which is especially advantageous given high powers and the heating connected therewith.

An arrangement having strip mirrors can be combined very well with an arrangement having wavelength-dependent mirrors, as shown, for example, in FIGS. 4, 4a, 4b, 4c. The further beam path according to FIG. 20 can be connected via the lens 55. The axes of the individual terminators 26, 94, however, can also be arranged at an angle, as shown in FIGS. 23 and 24. In this case, the further beam path can proceed according to FIG. 21 or 22 and the lens 55 is omitted.

FIGS. 28 and 28a show how fiber lasers of different wavelength, for example Nd:YAG lasers having 1060 nm and those having a different doping with 1100 nm are combined with one another via a wavelength-dependent mirror 37. The wavelength difference can be less but can also be greater.

The modulators and the wavelength-dependent mirror are not shown in FIG. 28a. Preferably, wavelength-dependent mirrors are optical interference filters that are manufactured by vapor-deposition of suitable dielectric layers onto a substrate that is transparent for the corresponding wavelengths and can have very steep filter edges as high-pass or low-pass filters. Wavelengths up to the filter edge are allowed to pass; wavelengths beyond the filter edge are reflected. Band-pass filters are also possible. Likewise, lasers of the same wavelength but a different polarization direction can be combined via polarized beam combiners, preferably polarization prisms. A combination of polarized beam combiners and wavelength-dependent mirrors is also possible. In FIG. 28, the beam bundles 144 emerging from the terminators 26, 94 of the fiber lasers $F_{HD1}$ through $F_{HD4}$ with the wavelength $\lambda_1$, pass unimpeded through a wavelength-dependent mirror 37, whereas the beam bundles $F_{VD1}$ through $F_{VD4}$ having the wavelength $\lambda_2$ are reflected at it and, thus, the two beam bundles are united in one another following the mirror. Each beam bundle can be separately modulated via a respective multi-channel, acousto-optical modulator 34. Since respectively two lasers of different wavelengths process the same track in the same processing point on the processing surface, a digital amplitude modulation in 2 stages is possible in a simple way in order, for example, to control the depth of the cups when producing printing forms for rotogravure when the two participating beam bundles are respectively merely turned on or off. However, a shared modulator for the two united beam bundles can also be employed. In this case, the modulator is arranged between the wavelength-dependent mirror 37 and the lens 55, as shown in FIGS. 4, 4a, 4b, 4c. The further beam path of the transmission unit according to FIG. 20 connects via the lens 55. However, the axes of individual terminators 26, 94 can also be arranged at an angle relative to one another, as shown in FIGS. 23 and 24. In this case, the further beam path can proceed according to FIG. 21 or 22 and the lens 55 can be omitted.

FIG. 29 shows how fiber lasers with their terminators 26, 94 (FIG. 31) can be arranged in a plurality of planes. Three planes of terminators that are connected to fiber lasers lie above one another. The first track is referenced $F_1$ for the first plane, with $F_2$ for the second plane and with $F_3$ for the third plane. The numerals 11, 12 and 13 reference the first plane of the further tracks. The axes of the beam bundles 144 emerging from the terminators are directed parallel to one another in the individual planes. The axes of the beam bundles of the individual tracks can proceed parallel to one another, as shown in FIG. 20, or at an angle relative to one another according to FIG. 23 or 24.

In FIG. 30, the terminators 26, 94 (FIG. 31) of, for example, seven fiber lasers $F_1$ through $F_7$ are arranged in a hexagon such that the axes of their ray bundles 144 are parallel to one another. To this end, terminators according to FIG. 12 can be advantageously employed. As a result thereof, the smallest possible diameter of a common ray bundle composed of seven individual ray bundles derives.

Figure 32:
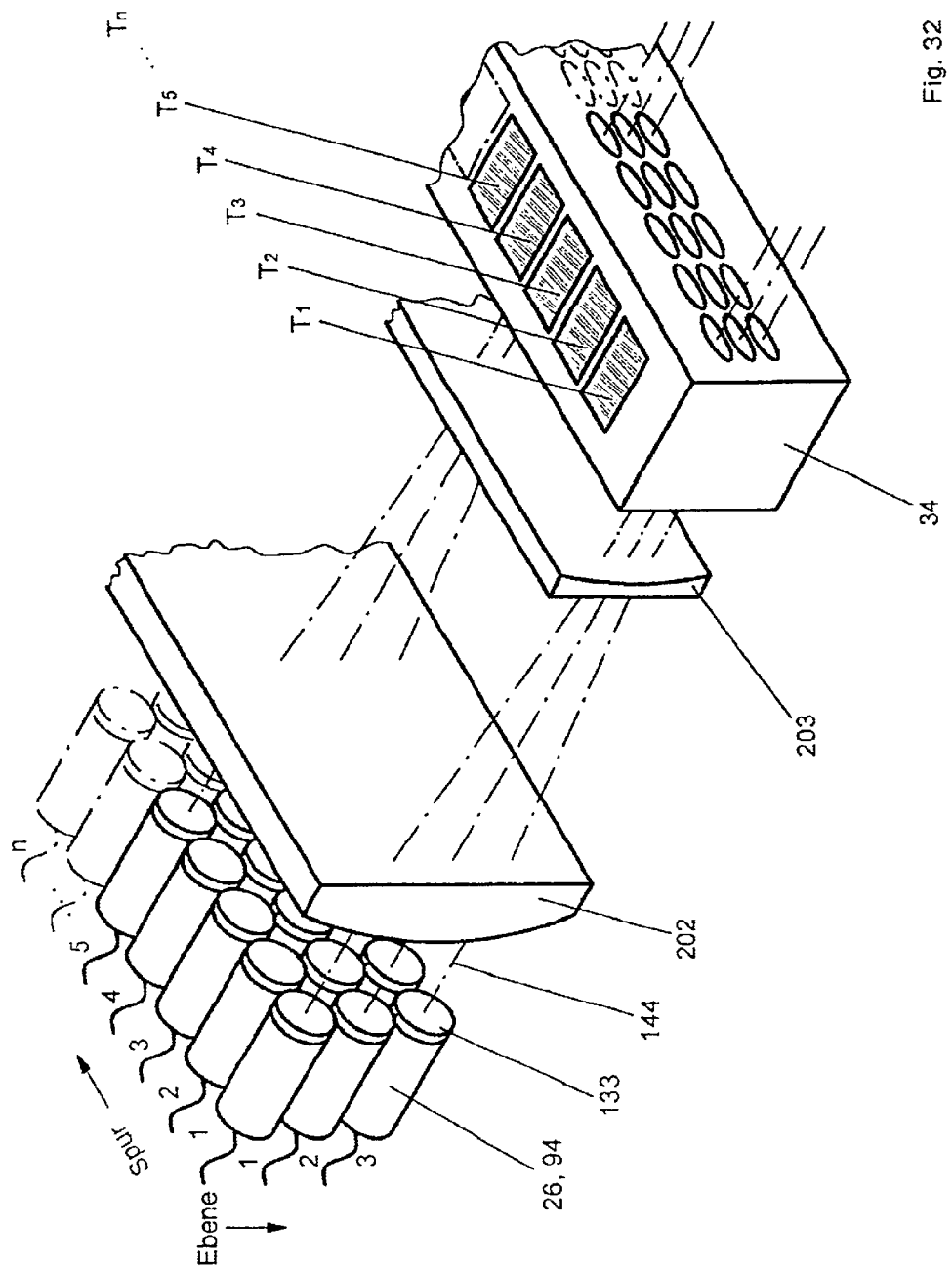
FIG. 32 is an arrangement having a plurality of terminators in a plurality of tracks and a plurality of levels having a cylindrical optics for matching, for example, to the modulator.
Figure 33:
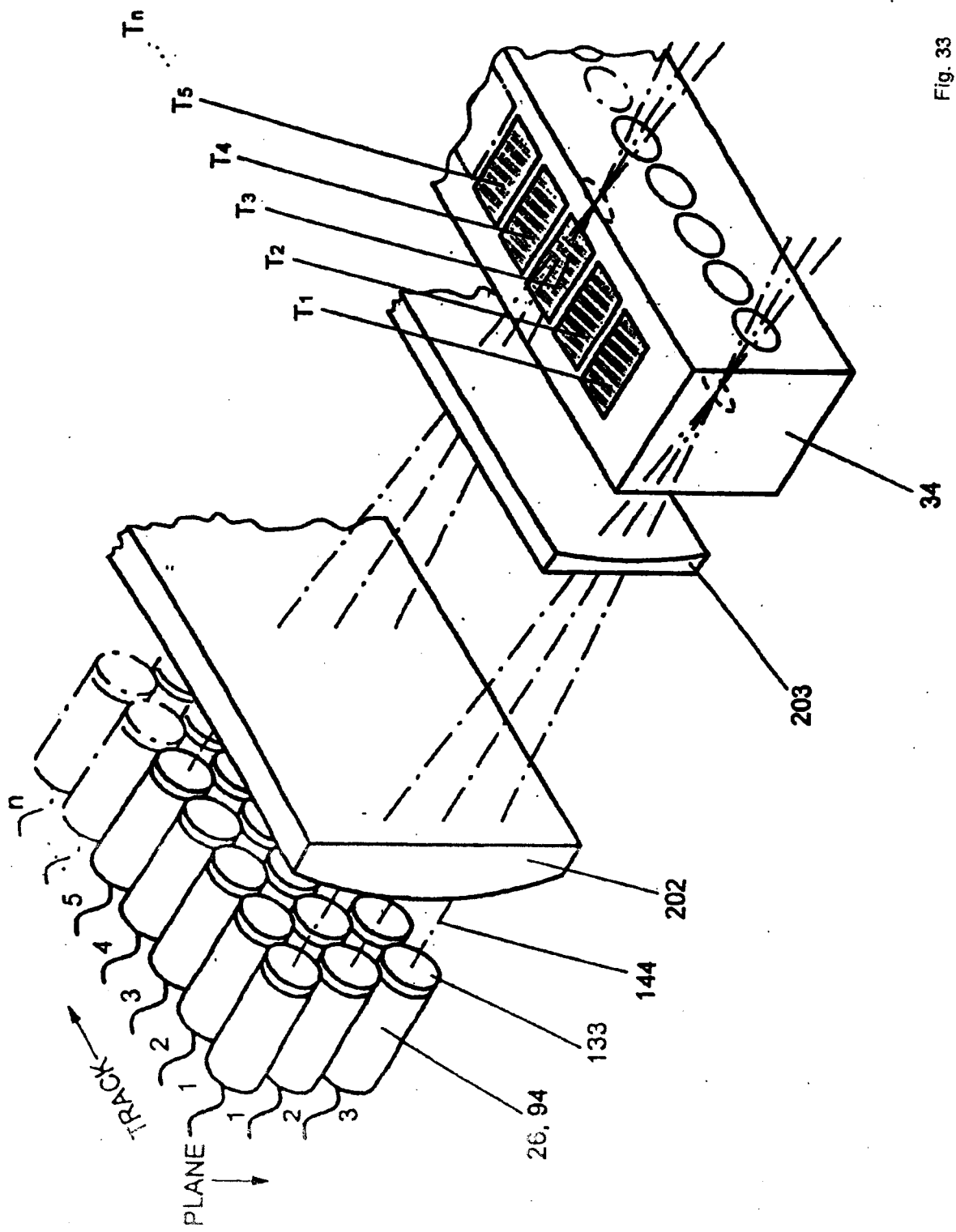
FIG. 33 is a modification of FIG. 32.
Figure 35:
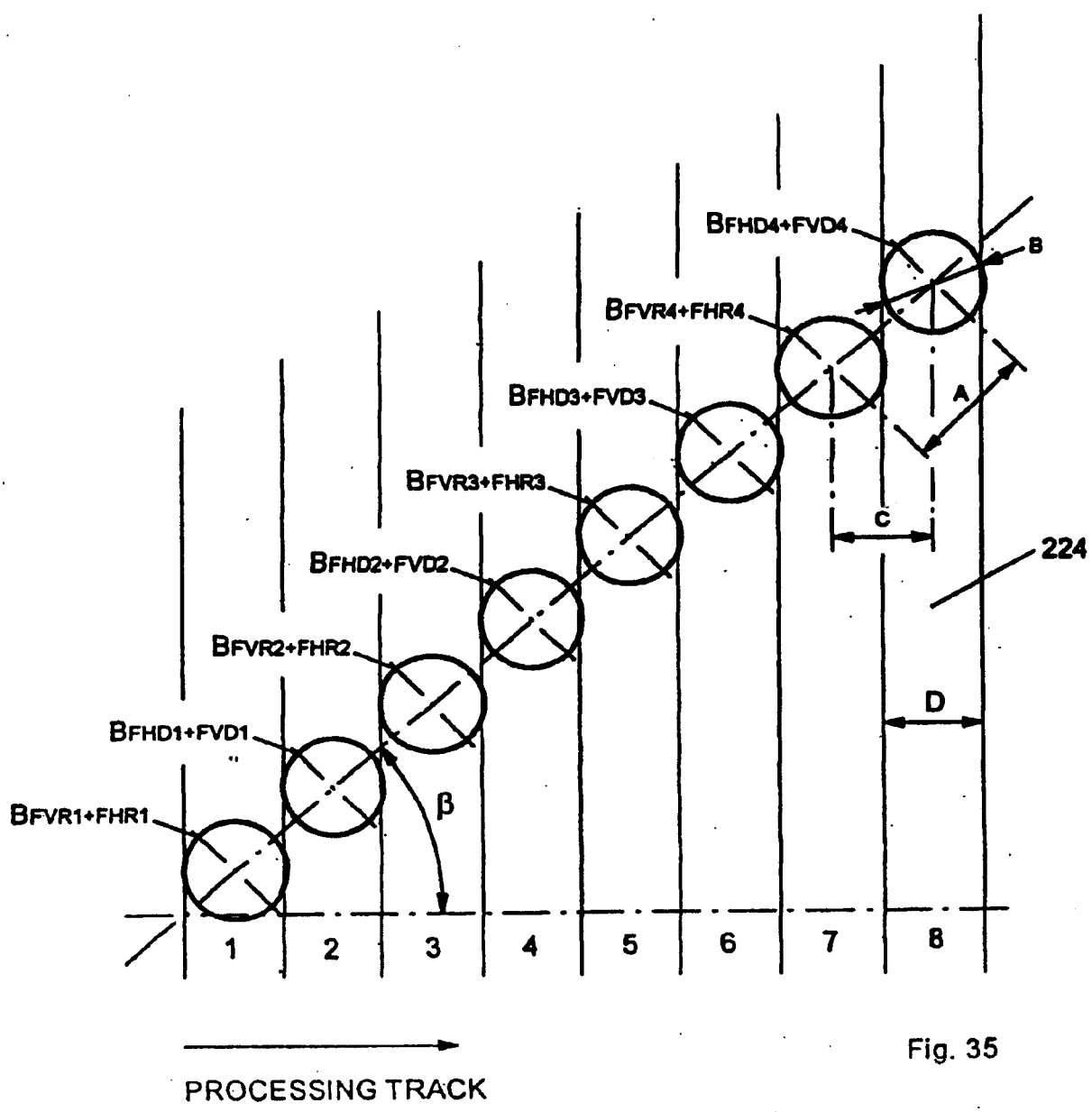
Figure 36A:
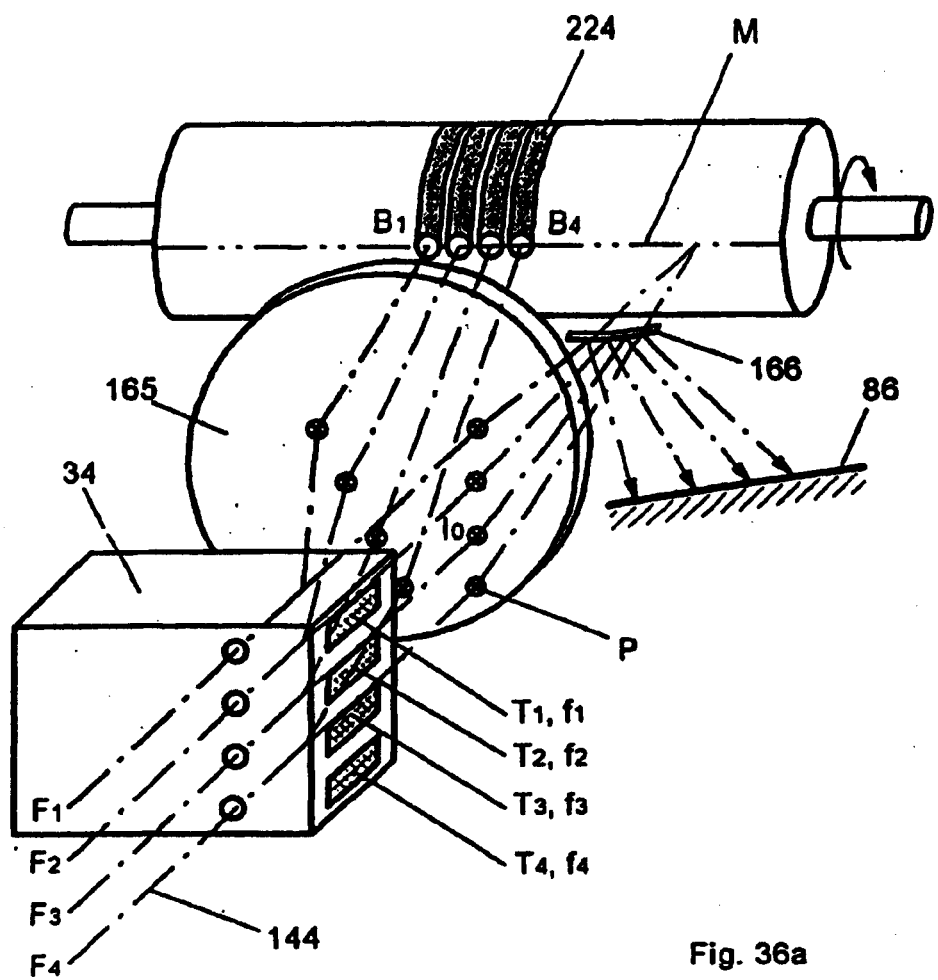
Figure 36:
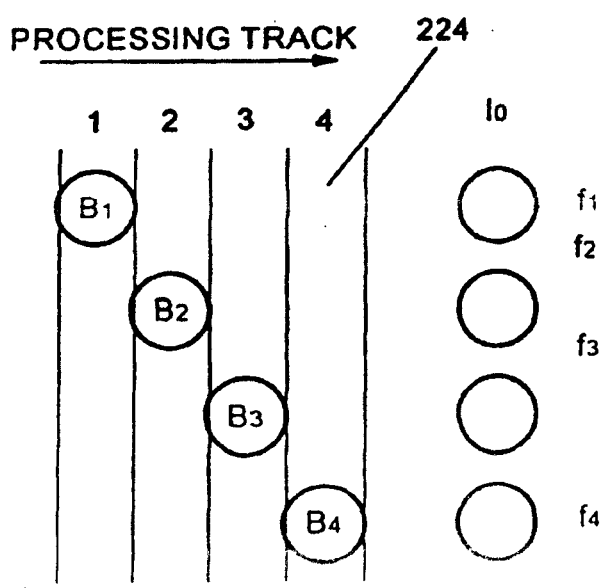
Figure 37:
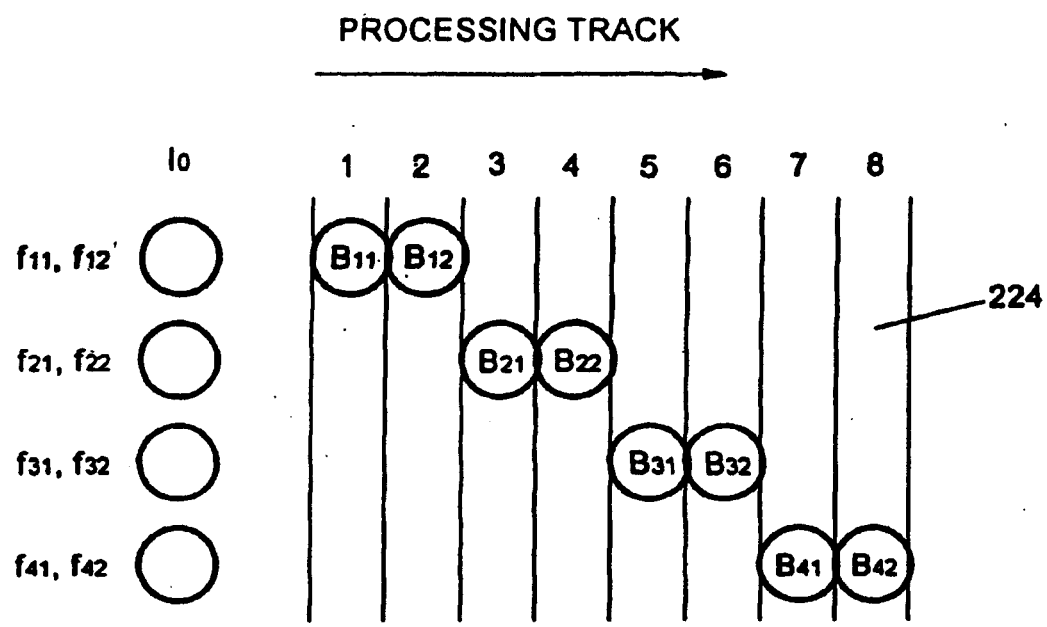
Figure 40:
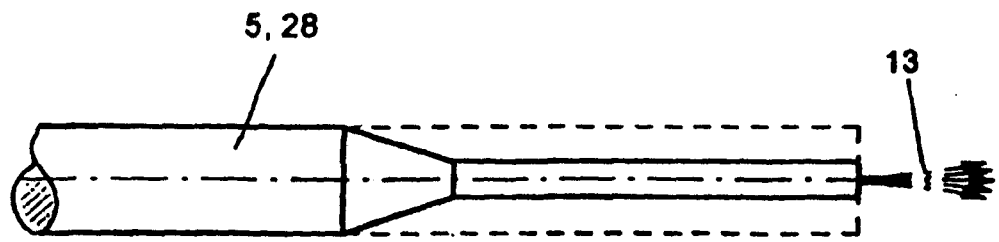
Figure 40A:
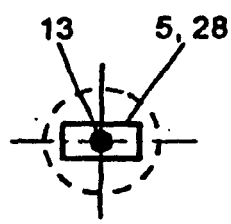
Figure 40B:
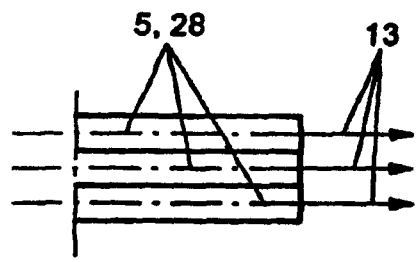
Figure 40C:
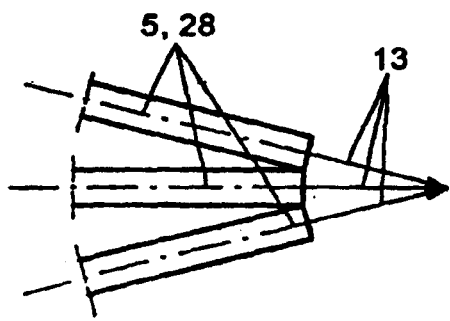
Figure 40D:
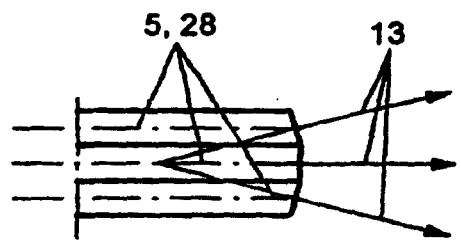
Figure 41:
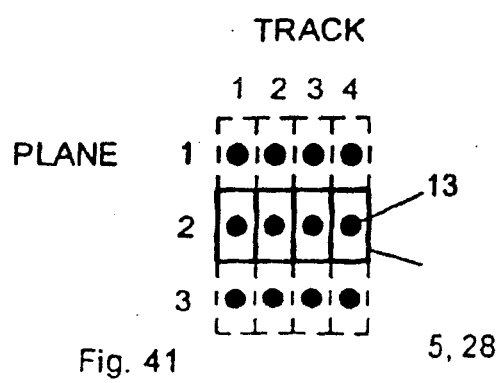

First, FIG. 31 is first a sectional view through the three planes of the first track of FIG. 29. A lens 107 collects all incoming parallel rays in its focal point 201 on the processing surface 81. As a result thereof, power and power density are multiplied by the plurality of lasers united in the focal point, i.e. are tripled given three planes. When the axes of the beam bundles emerging from the terminators 26, 94 proceed parallel to one another for tracks and planes, the beam bundles of all tracks would likewise be additionally united in the focal point, and a common processing point would arise on the processing surface that generates a processing track. When the axes of the beam bundles emerging from the terminations 26 proceed under an angle as shown in FIG. 23 or 24, every track of termination will generate a processing point, which generates a processing track I.e., the same number of processing tracks are registered next to one another as there are tracks of terminators. The power of the beam beams of the various planes is superimposed in the respective processing point and the power density is tripled in the illustrated example. The individual fiber lasers can thereby be directly modulated; however, external modulators can also be employed. FIGS. 32 and 33 describe how a multiple-channel acousto-optical modulator corresponding to the number of tracks can be preferably employed for the simultaneous modulation of all ray bundles of the various planes.

FIG. 31 is also a sectional view through the bundle arrangement according to FIG. 30. It is known that parallel ray bundles that are incident into a lens have a common focus. Page 13, FIG. 2.21 in the book "Optik und Atomphysik" by R. W. Pohl, 13$^{th}$ edition, 1976, Springer Verlag shows such an arrangement. Further, DE-A-196 03 111 discloses an arrangement wherein, as can be seen from FIG. 1 therein, the radiation from a plurality of laser diodes is respectively coupled into a single-mode fiber, the radiation at the output of each fiber is collimated to a respective, parallel beam bundle, and all parallel beam bundles are directed onto a common spot with a shared lens in order to achieve an increased power density. Compared to the arrangement shown in FIG. 31 with fiber lasers, however, this arrangement has serious disadvantages. When radiation is to be efficiently coupled into single-mode fibers, single-mode laser diodes are required for this purpose so that the aperture of the single-mode fibers is not overfilled and the total radiation can be transmitted into the core of the single-mode fiber. Single-mode laser diodes, however, can only be manufactured with extremely limited power because the loadability of the minute laser mirrors represents a technological barrier. Single-mode laser diodes are therefore only available up to an output power of approximately 200 mW and are far more expensive per watt than multi-mode diodes that are offered with radiation powers of up to several kilowatts. Given single-mode fibers for 800 nm wavelength, the product of core diameter and numerical aperture amounts to approximately 5 $\mu$m×0.11=0.55 $\mu$m, whereas this lies at 300 $\mu$m×0.4=120 $\mu$m given a fiber laser having a typical diameter of the pump fiber of 300 $\mu$m and a numerical aperture of 0.4, which amounts to a factor of 220. When the area ratio of the two fibers is considered, then a factor of $(300/5)^2$=3600 derives. Even when a reduction of the laser radiation by the factor of the absorption efficiency of approximately 0.6 is assumed given the fiber laser, this being the efficiency with which the pump radiation is converted into laser radiation, the power of the laser radiation that can be achieved at the output of a fiber laser is several orders of magnitude higher than the power at the output of a single-mode fiber. Even if single-mode diodes or other laser radiation sources having very high power were available, it would nonetheless not be possible to couple this satisfactorily into single-mode fibers, since the fibers would burn given the slightest misadjustment at the fiber entry. This problem does not exist given fiber lasers since a relatively large fiber diameter is available for the pumping and the energy is transmitted into the single-mode core of the laser fibers only within the laser fiber, which is possible unproblemmatically and with good efficiency.

The lens 197 in FIG. 31 unites the entire power of all seven beam bundles $F_1$ through $F_7$ of the corresponding fiber lasers in its focal point 201 which represents the processing spot 24 on the processing surface 81. The power and the power density in the focal point thus become higher by the factor of 7 than is the case given an individual beam bundle. When, for example, 100 W are required in order to generate a required power density on the processing surface, then seven lasers having a radiant power of approximately 15 watts each suffice in this case. However, more than seven lasers can be provided. The lasers can preferably be directly modulated. However, it is also possible to modulate all seven beam bundles separately or overall with an external modulator or to supply a plurality of such bundle arrangements to a multi-channel modulator in such a way that the modulator channels are preferably arranged in the focal point of a uniting lens 197 that is allocated to each bundle. It is also possible to couple the multiplied power of each and every bundle into fibers before or after the modulation. Further, such bundle arrangements can be advantageously utilized in laser guns according to FIGS. 4, 4a, 4b, 4c.

It is advantageous to separately modulate the individual lasers. This is especially suitable when a high number of lasers is employed, since, for example, a quantized modulation that is similar to an analog modulation, a quasi-analog modulation of the united laser radiation is then enabled by digital modulation of the individual lasers. However, it is also possible to modulate the beam bundles 144 of all lasers in common, for example with an acousto-optical modulator. In this case, the ultrasound field of the modulator cell must exhibit such a size that the overall beam bundle shown in FIG. 30 can be modulated. However, the switching time of the acousto-optical modulator becomes so great as a result thereof that the shape of the cups to be engraved is disturbed as a consequence of the rotational movement of the drum containing the processing surface. However, it is possible to entrain the laser beam with a deflection motion in the direction of the rotary motion of the printing cylinder to be engraved during the engraving and to thereby achieve a processing spot 24 that is stationary on the processing surface. The deflection motion can occur with the same acousto-optical modulator with which the amplitude modulation occurs. However, another acousto-optical cell can also be utilized, the deflection occurring therewith.

FIG. 32, in a farther-reaching example, shows how the power density on the processing surface can be considerably increased by providing terminators 26, 94 with the corresponding fiber lasers in a plurality of planes, but a modulation of all beam bundles 144 belonging to a track can be simultaneously implemented with a single-multi-channel, acousto-optical modulator 34 corresponding to the plurality of tracks. In this example, the terminators are arranged in three planes of n tracks each that lie above one another. The power of all ray bundles 144 of all planes should be largely focused in a processing point in the processing surface for each track in order to achieve a high power density. The terminators 26, 94 are arranged parallel to one another in tracks and planes, since the terminators 26 are joined to one another in close proximity. As shown, terminators having a round cross-section can be employed for this purpose; preferably, however, terminators having a quadratic cross-section according to FIGS. 9 and 9a are utilized. Given the parallel arrangement of the tracks, the illustrated imaging system having the cylindrical lenses 202 and 203, also refer to as cylinder optics, can, for example, be added analogous to an arrangement like that of FIG. 4. When the individual tracks are to proceed at an angle according to FIG. 23 or 24, terminators 94 according to FIGS. 10, 10a and 10b are preferably employed. In this arrangement, too, the beam bundles of the individual planes remain parallel; the fits of the terminators 94 should proceed parallel in the side view of FIG. 10a for this purpose. When the axes of the ray bundles for the tracks proceed at an angle relative to one another, the cylinder optics having the lenses 202 and 203 can be added, for example analogous to the arrangements according to FIG. 4b or 4c. The beam bundles 144 emerging from the terminators are directed onto the convex cylinder lens 202 that would combine the rays in its focus to form a line having the length of the beam diameter. A concave cylinder lens 203 having a shorter focal length then the cylinder lens 202 is attached such in the region of the focus of the cylinder lens 202, 203 having a long focal length such that its focus coincides with the focus of the cylinder lens 202. As a result thereof, the rays that leave the lens 203 become parallel again. The spacings between the individual planes, however, have been reduced by the ratio of the focal lengths of the two cylinder lenses compared to the spacings that the beam bundles had when they left the terminators 26, 94. The spacings of the beam bundles have remained unmodified in the direction of the tracks since the cylinder lenses exhibit no refractive effect in this direction. As a result thereof, elliptical beam cross-sections derive in the modulator. The purpose of this arrangement is to make the overall height of the three ellipses lying above one another so small that it approximately corresponds to the major axis of the ellipses in order to create conditions in the channels of the acousto-optical modulator similar to those achieved given a round beam cross-section so that, for example, similarly short switching times can be achieved.

FIG. 33 shows that, however, the spacing of the two cylinder lenses can also be modified somewhat so that all three elliptical beam bundles overlap in the modulator, this is in fact yielding a shorter switching time in the acousto-optical modulator but also yielding an increased power density in the modulator crystal. The cylinder lens 203 can also be omitted for this purpose.

The cylinder optics (202, 203) is shown in FIG. 25 between the terminators (26, 94) and the modulator 3. However, a wavelength-dependent or polarization-dependent mirror 37 can also be arranged preceding or following the cylinder optics in beam direction. A cylinder optics (202, 203) can also be introduced in the beam path following the modulator, preceding or following the strip mirror 46. Preferably, the intermediate image is inserted in the beam path at the locations references "E" in FIG. 4a.

For removing the material eroded from the processing surface, FIG. 34 shows a mouthpiece 82 whose main job is to use a directed flow to take care that optimally no clouds of gases and/or eroded material form in the optical beam path between objective lens and processing surface 81, these clouds absorbing a part of the laser energy and depositing on the processing surface and thus negatively influencing the work result.

As a result of its specific shaping, the mouthpiece 82 prevents the described disadvantages. Preferably, it is secured to the laser gun with connections 204 that are simple to release, so that it can be removed and cleaned in a simple way and also enables a simple cleaning as well as a simple replacement of the objective lens (not shown) 61, 103, 112.

A cylindrical bore 206 for adaptation to the objective lens and a preferably conical bore 207 as passage for the beam bundle as well as another preferably cylindrical bore that represents the processing space 211 are located in a preferably cylindrical base member 205. The distance of the base member 205 from the processing surface 81 should not be excessively great. The processing points (not shown) for producing the individual processing tracks on the material to be processed lie in the processing spot 24. A broad, all around extraction channel 212 is preferably located in the base member, this channel 212 being connected to the processing space 211 via a plurality of extraction channels 213 that should have a large cross-section. Preferably, 3 through 6 extraction channels 213 are present. A further, preferably all around admission channel 214 is located in the base member, this channel 214 being connected via nozzle bores 215 to the processing space 211 and to the conical bore 207 via smaller bypass bores 216. 3 to 6 nozzle bores 215 and 3 to 20 bypass bores 216 are preferably distributed over the circumference of the admission channel 214. All bores can be offset relative to one another and relative to the extraction channels 213 on the circumference. Further bypass bores can also be attached and directed onto the objective lens. This, however, is not shown. The base member is surrounded by a ring 217 applied gas-tight that contains a plurality of extraction connectors 221 in the region of the channel 212 to which extraction hoses are connected, these being conducted via an extraction filter to a vacuum pump. The extraction hoses, the extraction filter and the vacuum pump are not shown in FIG. 34. In the region of the channel 214, the ring contains at least one admission connector 222 via which compressed air filtered with an admission hose is supplied. The quantity of admitted air can be set with a valve such that it is just adequate in order to adequately rinse the processing space and such that it generates a slight air stream along the conical bore via the bypass bores that largely prevents a penetration of particles into the conical bore. The admission hose, the valve and the filter are not shown in FIG. 34. The nozzle bores 215 are directed such onto the processing spot 24 such that the clouds of gas, solid and molten material arising in the processing are quickly blown out of the beam path so that these absorb as little laser energy as possible and cannot negatively influence the processing result. Oxidation-promoting or oxidation-inhibiting gases or other gases can also be blown in with the admission air, these having a positive influence on the processing process. A slight quantity of air from the environment co-flows through the processing space to the extraction channels through the gap between the processing surface and the base member 205; this, however, is not shown. The filter in the extraction line is attached easily accessible in the proximity of the mouthpiece and sees to keeping the vacuum pump clean. It is also possible to introduce the filter directly in the extraction channel 212. As described under FIG. 39a, it is useful when a protective atmosphere is additionally conducted over the objective lens. If the mouthpiece 82 becomes too hot due to the laser radiation reflected from the processing surface and the air that flows through does not suffice for cooling, then the mouthpiece can be provided with additional bores through which a coolant is pumped; this, however, is not shown in the FIGS. A glass plate 218 that is highly anti-reflection coated on both sides and is simple to change can also be located within the cylindrical bore 205, this glass plate 218 keeping dirt particles away from the objective lens. The shape of the mouthpiece can also deviate from the form that is described and shown. For example, the bores need not be cylindrically or conically implemented, as described; they can be varied in shape. Likewise, for example, the nozzle bores and extraction channels can assume arbitrary shapes and can also be asymmetrically arranged. For example, the nozzle bores in FIG. 34 can be arranged more in the upper part of the FIG., whereas the extraction channels lie more in the lower part of the Figure. For example, the nozzle bores and/or the bypass bores can also be foregone. The shape of the mouthpiece can also be modified, particularly when the shape of the processing surface and the type of relative motion between processing surface and laser radiation source demand this. It is conceivable to utilize a modified form of the described mouthpiece when the material to be processed is located, for example, on a planar surface instead of on a drum surface, and the laser radiation is conducted past this line-by-line. In this case referred to as flatbed arrangement, which is shown in greater detail in FIGS. 43, 43a and 43b, the mouthpiece is implemented elongated corresponding to the line length and is provided with an elongated processing space corresponding to its length. The mouthpiece is equipped with nozzle bores and extraction channels from one or from both sides. In this case, the glass plate would be given a rectangular shape and would extend over the entire length of the arrangement. In this case, FIG. 34 could be analogously considered as a cross-section of the elongated mouthpiece. Even when the material to be processed is located in a hollow cylinder, which is not shown in detail in FIGS. 44a and 44b, a similar mouthpiece can be produced in that the mouthpiece described for the flatbed arrangement is adapted in the longitudinal direction to the shape of the hollow cylinder such that a slight gap between the processing surface and the mouthpiece derives over the entire length. The glass plate would be given a rectangular shape in this case and would be curved over the entire length of the arrangement.

A generally known scraper device that, however, is not shown in the figures can be located in the proximity of the mouthpiece but need not necessarily be connected to it or to the laser gun. For example, the job of the scraper device is to scrape off the ejects arising at the edges of the cups during the processing process at rotogravure forms. Further, a brush device (not shown) can preferably be located in the proximity of the laser gun, this brushing, out the cups that have been cut and ridding them of adhering dirt. Further, a measuring device (not shown) can be preferably inventively located at the laser gun, this measuring the position and/or the volume of the cups immediately after they are produced. In contrast to cups that have been manufactured by electromechanical engraving or with a single laser beam, the volume can be inventively more precisely identified for cups that are produced with the inventive laser radiation source and have steep edges and constant depth, in that the area of the cup is determined with a specific, fast camera and the volume is derived therefrom. It is thereby advantageous to measure a series of cups in order to reduce measuring errors. It lies within the framework of the preferred embodiments that specific control fields are engraved in a region of the rotogravure cylinder, this being provided for monitoring measurements and/or for monitoring prints. A rated/actual comparison can be produced with this measured quantity for the generated cups and with the cup size prescribed for this location. The result can then be employed in order to correct the position and/or the volume of the subsequently produced cups.

FIG. 35 shows the conditions on the processing surface. The processing points are identified with the indices that indicate the ray bundles of the fiber lasers according to FIGS. 4, 4a, 4b and 4c that produce them. For example, the ray bundles of the fiber lasers $F_{VR1}$ and $F_{HR1}$ generate the processing point $B_{FVR1+FHR1}$ in common to the diameter of the processing points is referenced B, and their spacing is referenced A. In the multi-channel, acousto-optical modulator described under FIGS. 19 and 19a, the allowable diameter of the beam bundle 144 is smaller than the spacing of the channels of the modulator. The diameter of the ray bundle 144 in the terminators 26, 94 cannot be made just as large as the outside diameter of the terminators without great expense. It follows therefrom that A is thus greater than B. This leads to undesired interspaces at the processing tracks 224 that derive as a result of the relative motion between the material to be processed and the laser gun. The processing tracks have a track width D that corresponds with the diameter of the processing points B and are referenced as 1 through 8 in FIG. 35. In order to reduce these interspaces, two beam packets were already nested inside one another with the strip mirror, as described under FIGS. 4, 4a, 26 and 26a, in order to cut the interspaces in half. In order to reduce the remaining interspaces even more, or to entirely avoid them or cause the processing tracks 224 to overlap, the laser gun can be turned such compared to the relative motion direction between the material to be processed and the laser gun such that the tracks come closer to one another, this being shown in FIG. 35. In order, for example, to achieve a spacing C of the processing tracks 224 that is equal to the diameter B of the processing points, the laser gun must be turned by the angle β according to the relationship cos β=B/A. Distortions in the image information arise on the processing surface due to the rotation of the laser gun, since the starts in the individual processing tracks are now shifted relative to one another. These distortions, however, are already compensated in the editing of the processing data. It is also possible to undertake this compensation by an adjustable, different delay of the signals in the individual data channels immediately before the modulation or to simply accept the distortions. Further possibilities for setting and reducing the spacings of the processing tracks are presented in FIGS. 36, 36a, 36b, 36c and 37.

Figure 36A:
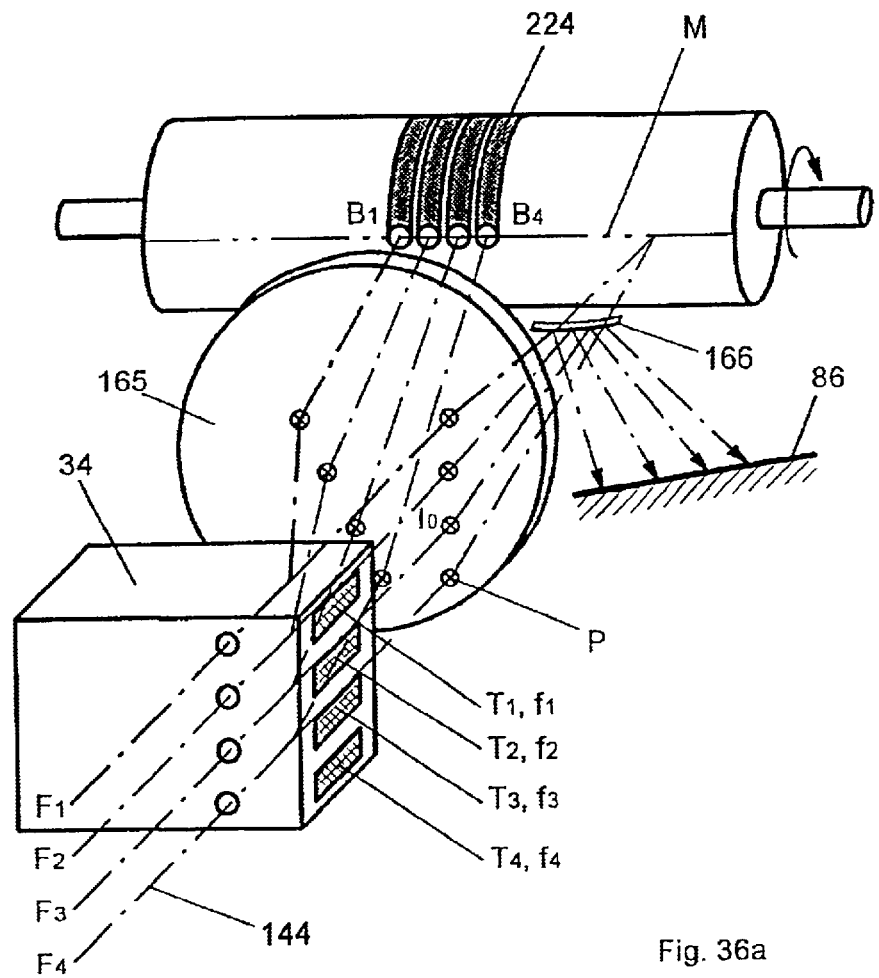
FIG. 36a is a spatial presentation of an acousto-optical multiple deflector or multiple modulators.
Figure 36:
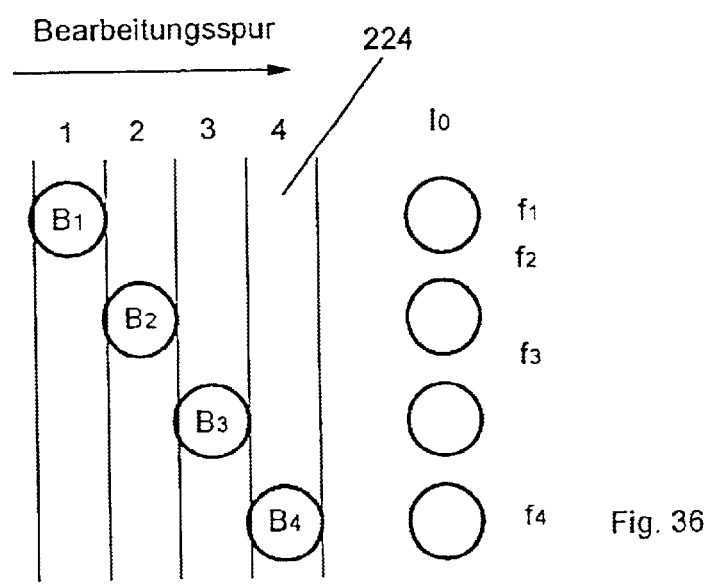
FIG. 36 is an illustration for generating four tracks with an acousto-optical multiple deflector or multiple modulator.

FIG. 36 shows the principle of how processing points $B_1, \ldots B_4$ derive on the processing surface 81 when the individual channels are charged with different frequencies $f_1$ through $f_4$ in a multi-channel acousto-optical modulator 34 having four separate channels. For example, the modulator channel $T_1$ (FIG. 36a) is thereby supplied with a frequency $f_1$, whereby $f_1$ is provided with a higher frequency compared to $f_4$ in the modulator channel $T_4$ (FIG. 36a), so that a greater spacing of $l_0$ derives for the processing track 1 than for the processing track 4. The channels $T_2$ and $T_3$ are provided with corresponding frequencies $f_2$ and $f_3$ in order to achieve the illustrated arrangement of the processing tracks 224. However, the frequencies can also be arranged such that the frequency $f_1$ is lower then the frequency $f_4$. It is also possible to arbitrarily allocate the frequencies $f_1$ through $f_4$ to the individual modulator channels $T_1$ through $T_4$. In this case, a lens 165 as shown in FIG. 17 and FIG. 36a is not absolutely necessary; rather, the laser radiation emerging from the terminators can be focused such that a sharp image derives in the processing points on the processing surface.

How the beam bundles focused by the lens 165 impinge the generated line M of the drum is shown in FIG. 36a with reference to an example (not to scale) with the rotating drum on which the processing surface 81 lies. The position of the puncture points P of the ray axes with the plane of the lens 165 thereby corresponds to the principle of FIG. 36. For that purpose, the modulator 34 with the channels $T_1$ through $T_4$ is correspondingly arranged relative to the beam bundles 144 of the fiber lasers $F_1$ through $F_4$. What is achieved by a suitable selection of the frequencies $f_1$ through $f_4$ is that the partial rays that generate the processing points $B_1$ through $B_4$ lie at desired distances from one another in the direction of the generated line M. This has the advantage that the position of each processing point and, thus, of each processing track 224 can be individually set by adjusting the corresponding frequency. A particular advantage of the arrangement derives when, as indicated in FIG. 17, the multi-channel acousto-optical modulator is arranged approximately in the one and the processing surface is arranged approximately in the other focal point of the lens 165, and the axes of the beam bundles of the fiber lasers $F_1$ through $F_4$ are arranged approximately in parallel planes. The processing points $B_1$ through $B_4$ then lie in a row on the generated line M (FIG. 36a), and the axes of the partial rays that form the processing points are parallel and reside perpendicularly on the processing surface (FIG. 17). Another advantage of the arrangement is that the Bragg angle for optimizing the efficiency can be individually set for each modulator channel, but this is not shown in the Figures. In this example, the, deflected rays are used for processing material, whereas the non-deflected rays $l_0$ are blanked out by an intercept arrangement similar to that shown in FIG. 18. In contrast to the arrangement in FIG. 18, it is shown here that the mirror 166 acting as intercept arrangement can also be arranged between the lens 165 and the processing surface. As described under FIG. 4, however, the intercept arrangement can also be foregone when a symmetrical or asymmetrical defocusing reduces the radiation that is contained in $l_o$ and is unwanted for processing in terms of its power density to such an extent that no processing effect is produced when it is directed onto the processing surface.

Figure 36B:
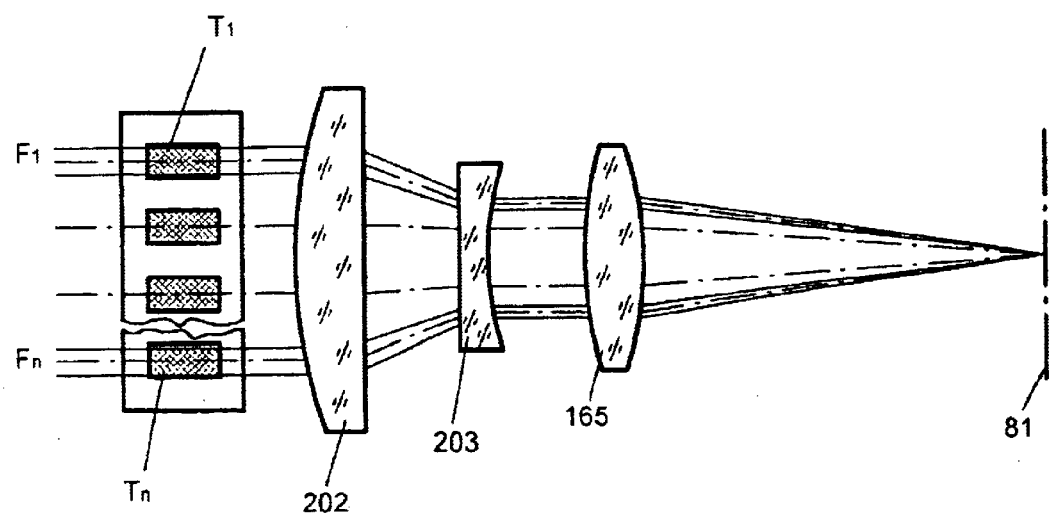

FIG. 36b shows an expanded embodiment of FIG. 36a in a side view. The lenses 202 and 203 are inserted between the multi-channel modulator with the channels $T_1$ through $T_n$, said lenses 202 and 203 being preferably cylinder lenses and forming a cylinder optics, as described under FIG. 32 and FIG. 33. This cylinder optics demagnifies the distance between the channels $T_1$ and $T_n$ at the location of the lens 166 and, given a predetermined focal length of the lens 165, thus, the angle at which the rays of the individual channels $T_1$ through $T_n$ impinge the processing surface, is particularly significant given a great number of channels and significantly favors the costs for the lens 165, which can also be a system composed of a plurality of lenses, as well as its makeability.

Figure 36C:
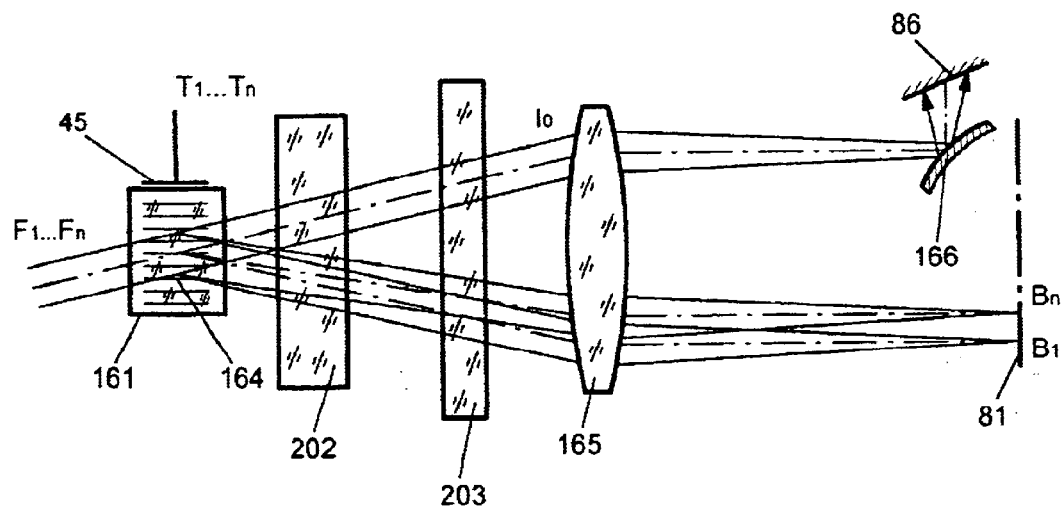
FIG. 36c is a plan view of FIG. 36b.

FIG. 36c shows a plan view relating to FIG. 36b, from which it can be seen that the cylinder optics exhibits essentially no effect in this view. The ray bundles $F_1$ through $F_n$ coupled into the acousto-optical modulator 161 are in fact shown under the same Bragg angle; however, they can also, however, be coupled in individually differently under the respectively optimum Bragg angle.

FIG. 37 emphasizes another advantage of the arrangements according to FIGS. 36, 36a, 36b and 36c, namely that respectively two processing points $B_{11}$, $B_{12}$ through $B_{41}$, $B_{42}$ can now be generated instead of the processing points $B_1$ through $B_4$ by simultaneous application of two different frequencies to the respective modulator channels. Instead of four processing tracks, eight separately modulatable processing tracks 224 have now arisen without increasing the number of lasers and/or the number of modulator channels. It lies within the scope of the preferred embodiments to also employ more than two frequencies per modulator. Twelve different frequencies with a single modulator channel have already been realized for a similar purpose. Another advantage in the generation of processing points with acousto-optical deflection is the possible shift of the processing points at high deflection speed. By modifying the applied frequencies, individual or all processing tracks 224 can be very quickly displaced relative to their previous position and there is thus a further possibility of beneficially influencing the position and shape of the cups. With this technique, in particular, the position of the processing tracks can be correspondingly readjusted to a rated quantity with high precision. Precisions of a fraction of a track width are thereby possible. The actual position of the individual processing tracks can be precisely determined with a known, interferometrically functioning measuring system in that, for example, the actual position of the laser radiation source is registered during the processing event and a correction signal for the required displacement and readjustment of the processing tracks is generated by comparison to the rated position of the processing tracks. This can be of interest particularly when a seamless joint is to be made to a processing pattern that already exists or when a pattern that already exists is to be post-processed. Another enormous advantage of the arrangement is that the Bragg angle can be individually set for optimizing the efficiency for each modulator channel, which, however, is not shown in the Figures. Up to now, acousto-optical arrangements wherein a plurality of sub-beams are generated from a laser beam by applying a plurality of frequencies wherein all of these have a shared Bragg angle for all sub-beams, has not yet made a breakthrough in processing of materials because the efficiency is too low. When, however, a combination of a number of laser beams having respectively individually set Bragg angle and a number of acousto-optically generated sub-beams per laser beam is selected as proposed, then a clearly higher efficiency can be achieved, so that a great plurality of simultaneously acting processing tracks can be realized for processing material.

As described under FIGS. 18 and 18a, however, single-channel or multi-channel electro-optical modulators can also be utilized in conjunction with a birefringent material in order to split each laser beam into two beams that can be separately modulated via further electro-optical or acousto-optical modulators.

It has been emphasized that the processing of the material in FIGS. 36, 36a, 36b, 36c and 37 should occur with the deflected laser beams and that the radiation contained the non-deflected ray laser beam is to be neutralized, so that no processing effect is produced. This, however, is not absolutely necessary, and instances are conceivable wherein one works conversely. A further advantage of the arrangement shall therefore be cited and explained with reference to FIG. 36a wherein one wishes to employ the radiation contained in the laser beams $l_0$ for processing material, the mirror 166 is removed. The entire radiant power from all four lasers $F_1$ through $F_4$ thus derives on the generated line in a spot. More than four times the power density thus derives in the spot compared to the previous processing points $B_1$ through $B_4$, and it can be assumed that no processing effect arises in $B_1$ through $B_4$ given specific materials and process parameters. Ie., the processing surface simultaneously serves as a sump for the radiation that is not intended to produce any processing effect. This is advantageous since a thermal equilibrium occurs on the processing surface since the entire laser energy is supplied to the processing surface in every case. It lies within the scope of the preferred embodiments that fewer or more than four lasers with corresponding modulator channels are utilized and that the difference in the power density between the radiation that is intended to produce a processing effect and the radiation that should not produce any processing effect is increased per modulation channel by employing more than one frequency per modulator channel. It also lies within the framework of the preferred embodiments that the described principle can be advantageously applied when the laser beam incident into the acousto-optical modulator has high divergence, as is the case, for example, when the acousto-optical modulator in an arrangement according to FIG. 31 is to be arranged in the proximity of the focal point 201 or in arrangements wherein the laser has an especially great divergence. In FIG. 31, for example, the axis of the beam bundle emerging from the laser $F_2$ is intended to represent the position of the optimum Bragg angle for a specific frequency. In this case, the Bragg condition is met far more poorly for the one frequency for the rays at the edge of the ray bundle, for example of the lasers $F_1$ and $F_3$, than for the central rays of, for example, the laser $F_2$, and only a slight part of the radiation is deflected, which means low contrast for the modulator. When, however, a plurality of frequencies are simultaneously applied to the acousto-optical modulator and when these frequencies are selected such that they are optimum both for the outer as well as for the middle incident beam bundle with respect to the Bragg angle, the highest possible contrast derives and the highest possible difference in the power density arises on the processing surface between the radiation that is intended to produce a processing effect and the radiation that should not produce any processing effect.

FIG. 38 shows how a smart arrangement of the components in the optical beam path can see to it that the laser beam bundles never perpendicularly impinge the optical surfaces. This prevents a part of the radiation from being reflected from these surfaces back into the lasers. When energy proceeds back into a laser, an excitation occurs in the laser and the laser begins to oscillate in terms of the amplitude of the radiation that is output. The output power is thus no longer constant and patterns are formed in the process surface that can make the result unuseable. FIG. 38 shows the axial rays of two planes; the lasers, however, can also be arranged in one or more planes as long as the symmetry axis for the two axes that are shown is not used. For reasons of function, the acousto-optical modulator is already turned by the angle $\alpha_B$. In order, however, to be certain that energy is not reflected back into the laser as a consequence of the changing ultrasound field, the modulator can be additionally turned by the angle γ, as shown in FIG. 38. Another possibility for avoiding oscillations of the laser is the insertion of one or more optical components at suitable locations in the beam path that only allow laser radiation to transmit in one direction. For example, what are referred to as Faraday isolators can be employed for this purpose, as described under FIG. 20 in the catalog of Spindler and Hoyer on page F2. Such isolators are not shown in the Figures.

FIG. 39 shows a lens 101 whose mount contains bores 87 that preferably surround the lens in a plurality of turns and have a coolant flowing through them. Given high-power arrangements, the absorption of the optical medium of the lenses cannot be left out of consideration. Moreover, a slight part of the radiation is dispersed by every optical surface even given the best anti-reflection coated and is absorbed by the mount parts. A cooling of the lens mounts is therefore meaningful. It has already been mentioned that materials having high thermal conductivity and low absorption such as, for example, sapphire are advantageous for the most stressed lenses. Sapphire also has the advantage that the lens surface does not scratch when cleaning due to the greater hardness of the material. One should also see to a good contacting of the optical medium with the mount. This is advantageously achieved by a metallization of the edge zone of the optical element and by a soldering 223 to the mount. Metallic solders contain a better heat conduction than glass solders.

It is also possible to cool the critical component parts of the laser gun 23 and of the pump source 2 with the assistance of what are referred to as micro-channel coolers, as described in the article "Lasers in Material Processing" in the publication SPIE Proceedings, Vol. 3097, 1997.

FIG. 39*a* shows a section through a mount 118 for the objective lens 61, 103, 112 that, for example, is secured with a thread to the tube body 95, 96 or to the mount 116 and is sealed with a seal 125. The objective lens can be glued into the mount or, preferably can be metallized at its edge and soldered into the mount. The mount can be provided with one or more bores 120 through which a protective atmosphere that comes from the interior of the optical unit 8 flows and, for example using a channel 119, is conducted via the side of the objective lens 61, 103, 112 pointing toward the processing surface in order to prevent a contamination of the objective lens by particles of material or by gases that are released during the processing.

Figure 40:
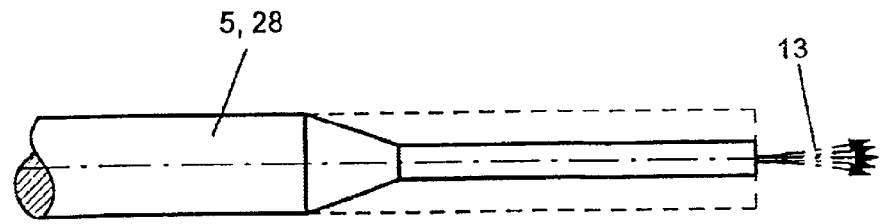
FIG. 40 shows a fiber laser or a fiber that have been clearly reduced in cross-section at their exit end.

FIG. 40 describes a further possibility for preparing fiber lasers or optical fibers, preferably single-mode fibers, for an arrangement in tracks and planes with small spacing. The fiber 28 or laser fiber 5 is ground on all sides at the last end to such an extent that a side length arises that is reduced to such an extent that the exit points of the laser radiation 13 lie at a required, slight spacing. In this case, the terminators 26, 94 can be omitted, and an especially simple structure derives. The surfaces that reside opposite can thereby proceed in pairs parallel to one another or at an angle, or one pair proceeds parallel and the other pair proceeds at an angle relative to one another, as was already described for the terminators under FIGS. 9 and 10.

Figure 40A:
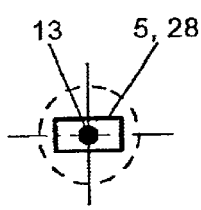
FIG. 40a is a plan view onto the end of the fiber laser or the fiber according to FIG. 40.

FIG. 40*a* shows a plan view onto, or a cross-section through the ground laser fiber. The cross-section can preferably be rectangular or quadratic; however, it can also have all other shapes.

Figure 40B:
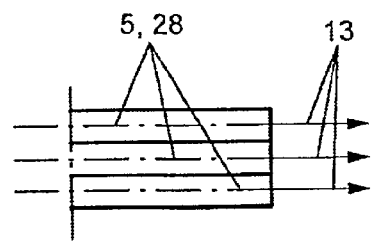
FIG. 40b is a side view of the fiber end wherein the axes of the emerging beam bundles proceed nearly parallel.

FIG. 40*b* shows a side view of the fiber bundle wherein the fibers were processed similar to FIG. 40, so that the axes of the individual beam bundles 13 proceed nearly parallel.

Figure 40C:
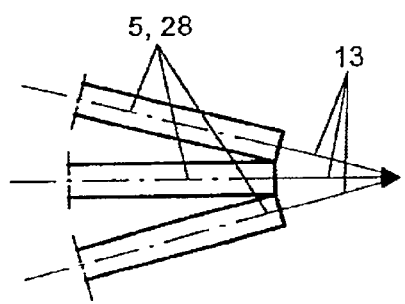
FIG. 40c is a side view of the fiber end wherein the axes of the emerging beam bundles overlap outside the fiber bundle.

FIG. 40*c* represents a side view of the fiber bundle wherein the fibers were processed wedge-shaped, so that the axes of the individual ray bundles 13 intersect outside the fiber bundle.

Figure 40D:
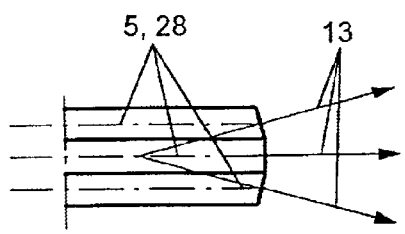
FIG. 40d is a side view of the fiber end wherein the axes of the emerging beam bundles overlap within the fiber bundle.

FIG. 40*d* again shows a side view of the fiber bundle wherein the axes of the individual fibers in fact proceed parallel but the exit faces of the individual fibers are arranged at different angles ε relative to the fiber axis, so that the axes of the individual ray bundles 13 intersect within the fiber bundle.

Figure 41:
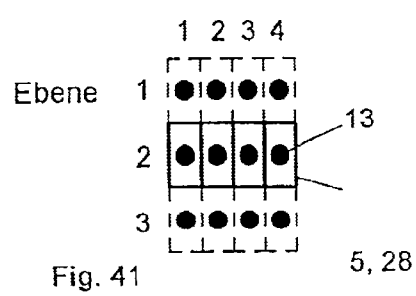
FIG. 41 shows an arrangement of fiber lasers or fibers according to FIG. 40 in a plurality of tracks and levels.

FIG. 41 shows how a receptacle with four tracks can be produced from ground fibers or laser fibers according to FIG. 40 and FIG. 40*a*, FIG. 40*b*, FIG. 40*c*, 40*d*. A receptacle in a plurality of planes is shown in broken lines in FIG. 41 in the form of two further planes. The receptacle is also not limited to four tracks and three planes; the laser outputs can be arranged in an arbitrary number of tracks and planes according to this principle. On the basis of a corresponding shaping when grinding the fibers, it is possible to determine the spacings between the exit points of the laser radiation 13. For example, the spacing can be implemented such that the laser radiation of the individual plans overlaps on the processing surface 81 such that only tracks derive or such that the individual tracks overlap so that only planes derive. The spacings between the exit points of the laser radiation 13, however, can also be selected such that the laser rays of all tracks and all planes overlap in a point on the processing surface. For this purpose, the fiber lasers or optical fibers can also be arranged in a bundle.

The principle of the described arrangement of laser outputs in a plurality of planes or in a plurality of tracks or in a plurality of tracks and in a plurality of planes or overlapping in a point also applies to the laser rays incident on the processing surface 81. A plurality of tracks or a plurality of levels or a plurality of tracks and a plurality of levels of laser beams can likewise be arranged on the processing surface according to this ordering principle or the laser beams can be arranged overlapping in a point.

The arrangement according to FIGS. 40, 40*a*, 40*b*, 40*c*, 40*d* and 41 is particularly suited for directly modulatable lasers. However, external modulators can also be employed. The emerging beam bundles can be imaged into the processing surface with the known arrangements; however, a receptacle can also be implemented, whereby the beam bundles are directly directed onto the processing surface, i.e. without transmission unit, in that, for example, the outputs of a laser radiation source according to FIG. 41 are brought extremely close to the processing surface or lie on the surface of the material in sliding fashion, this yielding an especially simple arrangement. Such a method can be employed, for example, when changes in the surface of the material are to be excited by energy irradiation or when a material transfer is to be undertaken. In the example of a material transfer, a thin film is placed onto the material to be provided with images that, for example, can be a printing cylinder, an offset plate, an intermediate carrier or the material to be printed itself, a layer being applied to the underside of said thin film that faces to the material to be provided with images and that is stripped by energy irradiation and can be transferred onto the material to be provided with images.

Figure 42A:
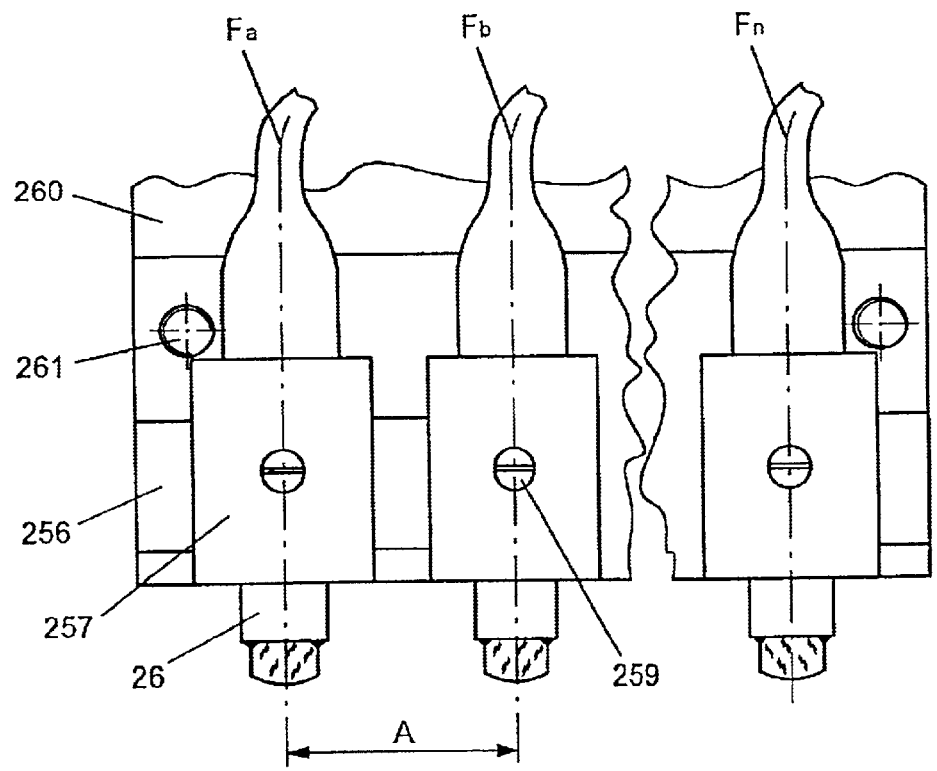
FIG. 42a shows a further embodiment according to FIG. 42.
Figure 42B:
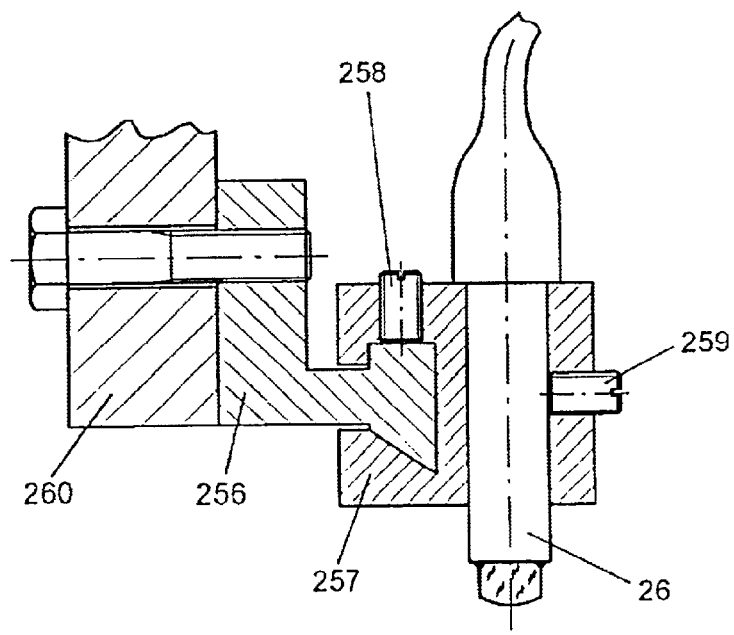
Figure 42C:
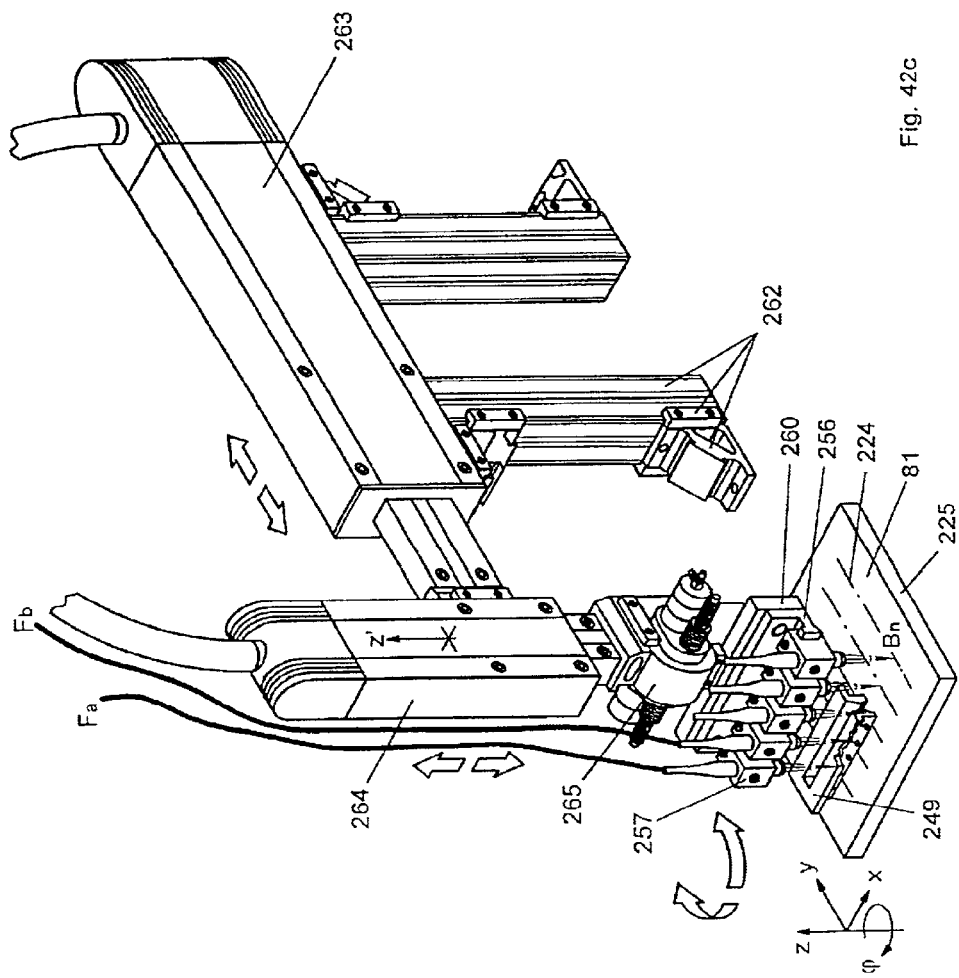
FIG. 42c is an illustration of a robot.
Figure 1:
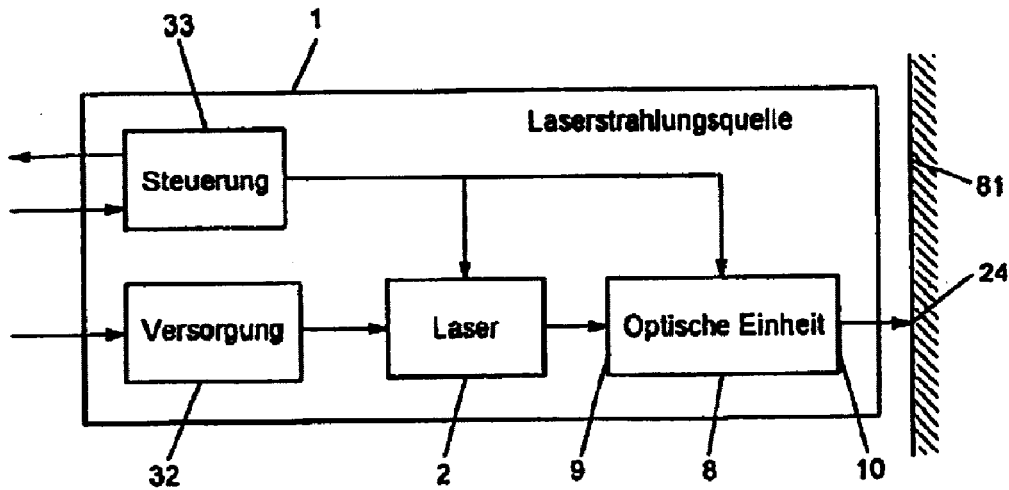
Figure 2:
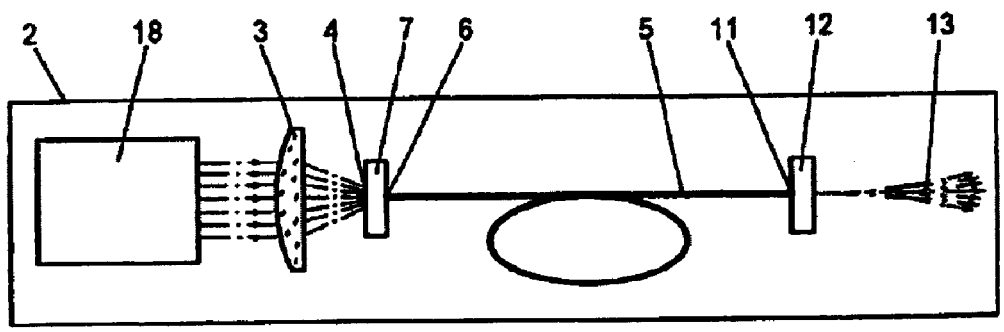
Figure 2A:
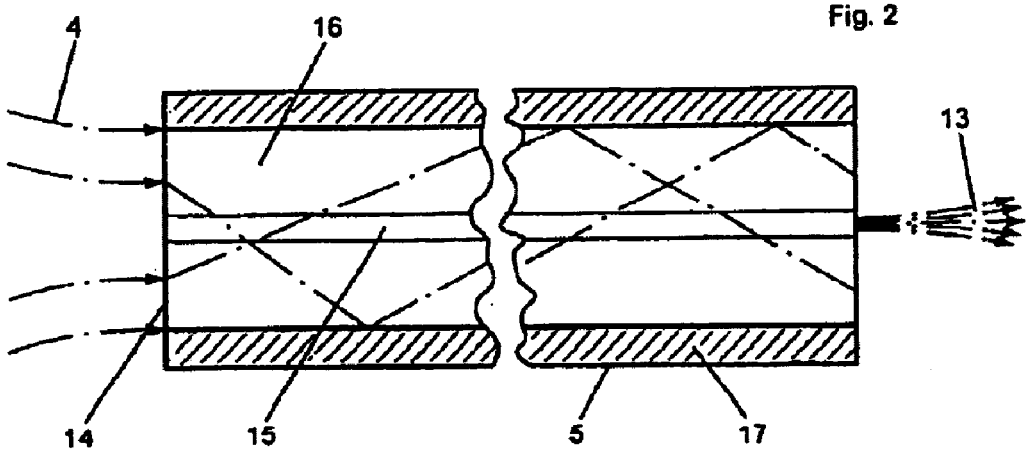
Figure 3:
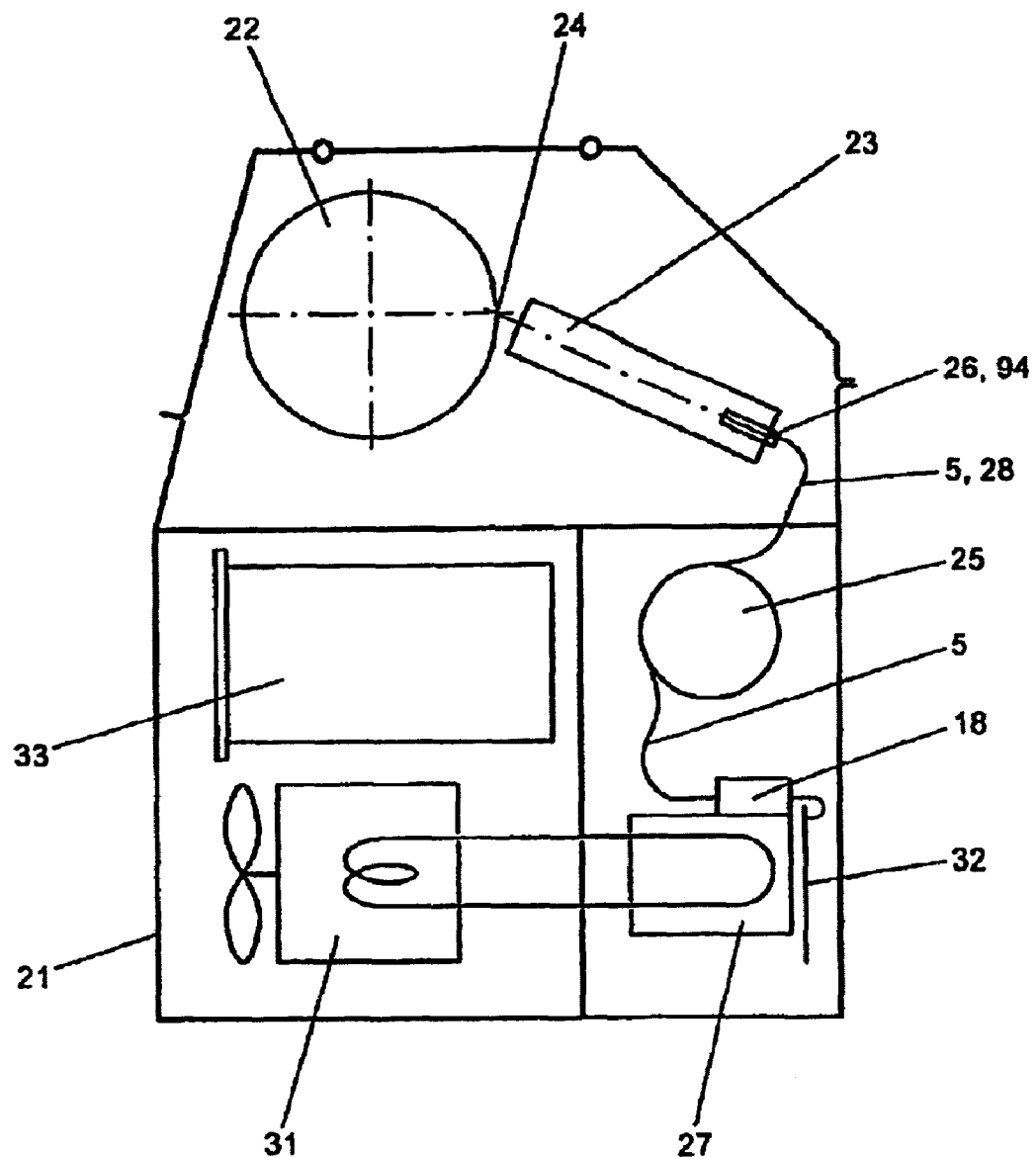

FIG. 42 shows another embodiment of the laser radiation source that can be employed for multi-channel cutting and incising of, for example, semiconductor materials and as disclosed in German Patent Application P 198 40 936.2 of the assignee "Anordnung zum mehrkanaligen Schneiden und Ritzen von Materialien mittels Laserstrahlen" running parallel with and filed simultaneously with the present patent application. The terminators 26, 94 of the fibers or, respectively, fiber lasers $F_a$ through $F_n$ have ray bundles 144 that are focused with the lens 133 at a predetermined distance from the terminator. The diameter of the processing points $B_a$ through $B_n$ amounts, for example, to 20 $\mu$m; however, it can also lie thereabove or therebelow. Further, the terminators are arranged on a profiled rail 256 described in greater detail in FIGS. 42 and 42*b* such that their mutual spacing "A" can be set to arbitrary values until the terminators meet one another. The profile rail is preferably secured to an arm of a robot (FIG. 42*c*) and can, for example, be moved in the directions x, y, z relative to ta table 225 with actuating drives that are shown in FIG. 42*c*. Moreover, the profiled rail can be turned relative to the table by an angle $\phi$ having the axis z=(FIG. 42*c*), which can also be utilized for determining the mutual spacing of the processing tracks. In the exemplary embodiments according to FIGS. 4, 4*b*, 4*c*, 43,44, the laser gun is turned around the axis of the tube 51, 95, 113 in order to vary the spacings between the processing tracks. Further, the table can be moved in the directions x, y, z and can be turned by an angle $\phi$ with the axis z. The material to be processed, for example one or more, what are referred to as "wafers" separated from a drawn semiconductor ingot, can be secured on the table 225 with clamp or suction devices (not shown). For example, fine, parallel tracks as needed, for example, for contacting photo-voltaic cells, can be incised into the semiconductor material with the laser energy in the individual processing points $B_1$ through $B_n$. However, fine bores can also be introduced into the semiconductor material or it can be cut with the laser in order, for example, to thus separate electrical circuits from one another. An arrangement for removing the material 249 (FIG. 42*c*) eroded from the processing surface is attached close to the processing surface 81 for each processing track 224 separately or for a plurality of processing tracks 224 in common, the functioning of said arrangement being described in detail in FIG. 34. When the profiled rail with the terminators is turned relative to the table in order to modify the spacing between the processing tracks, it is expedient to compensate the distortion of the pattern to be registered that arises due to the relative rotation by a pre-distortion of the pattern to be applied and/or to compensate it with a time control of the data stream. On the basis of the turning, it is also possible to intentionally provide different line spacings given relative motions in x-direction and in y-direction. For contacting of the photo-voltaic cells, for example, two different line patterns are required: a first pattern wherein the incised lines following the metallization produce the contact to the semiconductor material should have spacings of a few millimeters between the individual lines and should, for example, proceed in the x-direction. Further, what are referred to as bus bars are required that proceed at a right angle relative to the contact lines and connect these to one another. These lines forming the bus bars should, for example, proceed in the y-direction and lie close to one another so that they act like a closed band following the metallization. Such a pattern can be very simply manufactured in that the profiled rail with the terminators is turned to such an extent until the desired pattern results. Due to the parallel arrangement of a plurality of fiber laser outputs, the time required for the processing can be considerably shortened; for example, ten laser outputs can be employed in parallel for the incising of the photo-voltaic elements 10, this increasing the output by the factor of 10.

The described arrangement for cutting and incising is not only suitable for processing semiconductor materials but can be employed for all materials wherein the precise production of patterns is important such as, for example, in manufacturing printing forms.

FIG. 42*a* and the corresponding sectional view of FIG. 42*b* show how the terminators 26 of the individual fiber lasers $F_a$ through $F_n$ are secured. The profiled rail 256 is secured to a carrier 260 with connections 261, the carrier potentially being, for example, the arm of a robot. The terminators 26 are accepted in mounts 257 and fixed with screw 259. The mounts 257 are provided with a profile mating with the profiled rail 256, are placed in a row onto the profiled rail 256, are set at predetermined intervals "A" from one another and are fixed with the screws 259. Due to an inventively small structure of the terminators 26 and of the mounts 257, a very slight spacing "A" is possible. The profiled rail with the terminators can be conducted across the processing surface with the robot for the purpose of processing the material, as shown in FIG. 42 and described in detail. The required movements for producing the processing tracks can be executed by the table 225 described in FIG. 42 that can also be carried out by the arm of the robot.

Preferably, the arm of the robot can also undertake a rotatory motion around the rotational axis z= of the arrangement that is approximately parallel to the axis of the terminators. With this rotation and a relative displacement between the arm of the robot and the table 225, it is possible to modify the spacing of the processing tracks generated on the processing surface 81 and to preferably set them smaller than corresponds to the dimension "A" that has been set.

FIG. 42c indicates an example of the robot that can be constructed, for example, of components of Montech-Deutschland GmbH, Postfach 1949, 79509 Lörrach. A horizontal-linear unit 263 is secured on a stand system "Quickset" 262, the unit 263 in turn accepting a vertical-linear unit 264 having a rotatory drive 265. The actual robot arm 260 is seated at the rotatory drive, the profiled rail 256 being secured to the arm 260 with the connection 261. Another horizontal-linear unit is possible but not shown.

The various motion directions of the table 225 can be realized with the same element, whereby the motion directions can also be partly allocated to the table and partly to the profiled rail. The housing for the acceptance of individual components, the cooling system, the control for the lasers, the pump sources for the fiber lasers, and the terminators 26, 94 are shown, the arrangement for removing the material eroded from the processing surface and the machine control for the drives are not shown in the Figures.

FIG. 43 shows a further flatbed arrangement with the laser radiation source. The material to be processed with the processing surface 81 is located on a table 247 that is seated on guides 251 and can be moved in the feed direction u precisely with a spindle 252. The spindle 252 is placed into rotation by a motor 254 via a gearing 253 that is driven proceeding from a control electronics 255. The laser radiation emerging from the laser gun 23 generates the processing points $B_1$ through $B_n$ in an intermediate image plane 228 (not shown here) that, for example, is shown in FIG. 44. The laser radiation is conducted via deflection mirror 241 and an optics 242 belonging to an optical unit onto a rotating mirror 243 that, for example, can have one mirror face that, however, can also be designed as a rotating mirror having a plurality of mirror faces and that is placed into a rotatory motion by a motor 244 driven proceeding from the control electronics 255. The rotating mirror 243 steers the laser radiation over the processing surface line-by-line in arrow direction v. An optics 245 belonging to the optical device is located between the rotating mirror and the processing surface, the job of the optics 245 being to generate a sharp processing spot on the processing surface over the entire line length, this processing spot being potentially composed of a plurality of processing points $B_1'$ through $B_n'$=that are shown in FIG. 43. As a result of the rotation of the rotating mirror, the processing points generate processing tracks 224 on the processing surface 81 as shown, for example, in FIGS. 35, 36 and 37. Preferably, a long deflection mirror 246 is provided between the processing surface 81 and the optics 245 in order to achieve a compact structure. The laser gun 23 is preferably turned in the prism 248 such that the processing tracks have the desired spacing from one another on the processing surface, this being shown in FIG. 35. The fixing of the laser gun can occur with a strap retainer (not shown). An arrangement 249 for removing the material eroded from the processing surface is attached close to the processing surface 81 over the entire line length, the arrangement 249 being capable of being provided with a glass plate 230 over the entire length and being shown in greater detail in FIG. 43b. In FIG. 43, a laser gun with the lenses 102 and 103 according to FIG. 4b and a beam path illustrated in FIG. 20 can be provided; however, all other types of laser guns can also be used. Further, a plurality of laser radiation sources can be attached in such a flat bed arrangement in order to speed the processing procedure up. A second laser radiation source with the corresponding optics and the arrangement 249 for removing the material eroded from the processing surface can be attached opposite the illustrated arrangement such that further processing tracks derive on the processing surface.

It lies within the framework of the preferred embodiments that the rotating mirror can also be replaced by an oscillating mirror. It also lies in the scope of the preferred embodiments that the rotating mirror can be replaced by two oscillating mirrors, whereby the oscillatory direction of the one mirror, called "mirror u", lies on the processing surface 81 in the direction referenced u, and whereby the oscillating direction of the other mirror called "mirror v", lies on the processing surface 81 in the direction referenced v.

An arrangement having oscillating mirrors is especially well-suited for fast incising of photo-voltaic cells, as was described in detail under FIG. 42. The cell to be incised is placed onto the table 247 with, for example, a loading device that is not shown in FIG. 43 and is brought into the correct position. The laser gun 23 is turned such that the desired spacings in the processing tracks arise in the two processing directions u and v. In a first processing event, for example, mirror u draws the contact lines, whereas mirror v undertakes the correct positioning of the contact line packets. In a second processing event, mirror v draws the bus bars, whereas mirror u undertakes the correct positioning of the line packets. In these processing events, the photo-voltaic cell is not moved. It lies within the scope of the preferred embodiments that the table 247 can be replaced by a magazine (not shown) wherein a specific number of photo-voltaic cells are delivered for processing, that the processing of the respective cell occurs directly in the magazine, and that the processed cell is automatically removed from the magazine after the processing and is transferred into a second magazine, whereby the next, unprocessed cell for processing moves forward to take the place of the removed cell.

As a result of the extremely high beam quality of the laser radiation source that derives due to the fiber laser working diffraction-limited, a nearly parallel laser beam bundle can be generated, as shown in FIG. 43 between the optics 242 and rotating mirror 243 and as can also be seen in FIG. 4 between the lenses 57 and 61. Consequently, it is also possible to remove the optics 245, the rotating mirror 243 and the deflection mirror 246 in FIG. 43 and replace them by a deflection mirror (not shown) that deflects the nearly parallel laser beam bundle emerging from the optics 242 in the direction of the processing surface 81 and onto an objective lens (not shown) having a short focal length that is implemented similar to the objective lenses 61, 103 or 112.

The deflection mirror and the objective lens are inventively combined with one another to form a unit and slide back and forth on a guide rail (not shown) in the direction v, so that a number of parallel processing tracks corresponding to the number of channels in the laser radiation source are registered on the processing surface (81) similar to previously with the rotating mirror 243 and the optics 245.

The guide rail is implemented as a bearing having very low friction, for example as an air bearing or as a magnetic bearing. The drive of the unit composed of the objective lens and the deflection mirror in the direction v and back respectively occurs with a thrust into the corresponding direction that, for example, is carried out by a preferably contact-free electromagnetic system, whereby the energy acquired from the deceleration of the moving unit is partially re-employed for the drive. Parts of the guide rail, deflection mirror and objective lens are, for example, accommodated in a closed space that contains windows for the entry and the exit of the laser radiation and can be evacuated in order to reduce frictional losses. The drive and guide rail represent a linear drive for the unit composed of the objective lens and the deflection mirror.

It lies within the framework of the preferred embodiments that the respective, true position of the moving unit can be determined for correction purposes via, for example, an optical reference track. An arrangement 249 serves for the removal of the material eroded from the processing surface 81. The advantage of such an arrangement is that it can be very cost-beneficially realized for long path lengths and high resolutions, and that it can be set to various formats by displacement of the one and/or other drive. A plurality of such units can also be arranged in parallel in order to increase the processing speed.

FIG. 43a shows a simplification of the arrangement according to FIG. 43 in that the two lenses 102 and 103 have been removed from the laser gun. Given a corresponding spacing of the laser gun from the deflection mirror 241, the divergent laser ray bundles emerging from the lens 101 are focused onto the processing surface 81 with the lenses 241 and 245 and generate the processing points $B_1$ through $B_n$ that are identical to the processing points $B_1'$ through $B_n'$=in this case.

FIG. 43b shows the arrangement 249 for removing the material eroded from the processing surface in greater detail. The functioning has been described in detail in FIG. 34.

FIG. 44 shows a hollow bed arrangement for processing material with the laser radiation source. Hohlbett arrangements are known; for example, two arrangements having hollow bed are described in the publication "Der Laser in der Druckindustrie" by Werner Hülsbuch, Verlag W. Hülsbusch, Konstanz, pages 461 and 562. The material to be processed with the processing surface 81 is located in a cylinder or, preferably, a part of a cylinder 236 having the radius R. This arrangement is referred to as a hollow bed on whose axis a bearing 229 with a rotating mirror 233 is arranged. The rotating mirror can, for example, have one mirror face but can also be designed with a plurality of mirror faces and can be placed into rotation by a motor 234 and be arranged on a carriage (not shown) displaceable in the direction of the cylinder axis relative to the cylinder 236. An optics 231 belonging to an optical device and a mirror 232 are arranged as well on the carriage (not shown) in the proximity of the processing surface 81. Further, a deflection mirror 227 and the laser gun 23 as well as an arrangement 235—close to the processing surface 81—for removing the material eroded from the processing surface, which is described in greater detail in FIG. 34, are located on the carriage. The ray bundles 226 emerging from the laser gun generate processing points $B_1$ through $B_n$ in an intermediate image plane 228 that are transmitted onto the processing surface 81 with the deflection mirror 227, the mirror optics 231, 232 and the rotating mirror 233. Here, they generate the processing points $B_1'$ through $B_n'$=. The processing points $B_1'$ through $B_n'$=that form the processing spot generate processing tracks 224 (FIGS. 35, 36 and 37) across the entire line length that are registered sharply focused over the entire line length as a result of the constant radius of the hollow bed. The advantage of the illustrated arrangement is that a compact structure can be achieved. In particular, the illustrated arrangement enables a small angle δ between the axis of the ray bundle incident onto the rotating mirror 233 and the ray bundle that is reflected by the rotating mirror onto the processing surface, which is desirable for low distortion in the recording geometry on the processing surface. The laser gun is preferably seated in a prism (not shown) and is secured with a fastening strap (likewise not shown). The laser gun can be turned around its axis and can be displaced in the axial direction. As a result of the rotation, the distance between the processing tracks can be modified, this being shown in FIG. 35. The spacing from the processing surface can be modified by the displacement. An arrangement 235 for removing the material eroded from the processing surface is attached over the entire line length close to the processing surface 81, the arrangement 235 being capable of being designed similar to what is shown in FIG. 43b, whereby it is implemented in curved fashion corresponding to the radius R of the cylinder 236 and can be provided with a curved glass plate 237 (not shown) over the entire length, the functioning thereof having been described in detail under FIG. 34. In FIG. 44, a laser gun having the lenses 102 and 103 according to FIG. 4b and a beam path shown in FIG. 20 are provided. However, all other types of the inventive laser gun can be utilized. Further, a plurality of laser radiation sources can also be attached in such a hollow bed arrangement in order to speed the processing event up. For example, a second rotating mirror and a second laser radiation source as well as a second arrangement 235 for removing the material eroded from the processing surface can be attached opposite the illustrated arrangement such that further processing tracks derive on the processing surface.

FIG. 44a shows a simplification of the arrangement according to FIG. 44, in that the two lenses 102 and 103 were removed from the laser gun. Given a corresponding spacing of the laser gun from the deflection mirror 227, the divergent laser ray beams emerging from the lens 101 are focused onto the processing surface 81 with the lens 231 and generate the processing points $B_1$ through $B_n$ that are identical to the processing points $B_1'$ through $B_n'$=in this case.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

I claim as my invention:

1. A method for generating laser beams for engraving cups in a processing surface of a material, comprising the steps of:

providing at least one diode-pumped fiber laser;

providing each fiber laser with at least one output;

arranging in a first ordering pattern at least two of said outputs;

at least one of shaping and aligning the laser beams emerging from the outputs of the individual fiber lasers such that they impinge onto said processing surface in a second ordering pattern to engrave said cups by eroding a material of said processing surface, said laser beams having a power density and energy sufficiently high for eroding said material to create said cups; and wherein the material comprises copper on a cylinder of a rotogravure engraving machine.

2. A method for engraving cups in a copper material surface of a printing form, comprising the steps of:

providing at least one fiber laser;

providing each fiber laser with at least one output;

arranging in a first ordering pattern at least two of said outputs; and at least one of shaping and aligning laser beams emerging from the outputs such that they impinge onto said copper material surface in a second ordering pattern to engrave said cups by eroding the copper material, said laser beams having a power density and energy sufficiently high for eroding said copper material to create said cups.

3. The method according to claim 1 wherein the copper is melted and evaporated to create said cups.

4. A printing form engraving machine, comprising:

a printing form having a copper surface;

at least one fiber laser;

each fiber laser comprising at least one output;

at least two of said outputs being arranged in a first ordering pattern;

laser beams emerging from the outputs of the individual fiber lasers being at least one of shaped and aligned such that they impinge onto said copper surface in a second ordering pattern for engraving said cups; and said emerging laser beams having a power density and energy which are sufficiently high to erode copper from said copper surface for creating said cups.

5. Engraving machine according to claim 4 wherein the copper is on a surface of a rotary drum of a rotogravure engraving machine.

6. The system according to claim 4 wherein said outputs are focused onto a spot having less than a 10 µm diameter.

7. A laser radiation source for generating laser beams for processing material by engraving cups in a processing surface thereof, comprising:

at least one diode-pumped fiber laser;

each fiber laser comprising at least one output;

at least two of said outputs being arranged in a first ordering pattern;

the laser beams emerging from the outputs of the individual fiber lasers being at least one of shaped and aligned such that they impinge onto said processing surface in a second ordering pattern for engraving said cups; said emerging laser beams having a power density and energy sufficiently high to erode material from said processing surface for creating said cups; and said material comprises copper on a rotating cylinder of a rotogravure engraving machine.

8. An apparatus for processing material with laser radiation in order to engrave cups in at least one processing surface of the material, comprising:

at least one laser radiation source for generating laser beams for processing the at least one processing surface by engraving the cups therein;

the laser radiation source comprising at least one diode-pumped fiber laser;

each fiber laser comprising at least one output;

at least two of said outputs being provided;

the outputs of the fiber lasers being arranged in a first ordering pattern;

the laser beams emerging from the outputs of the individual fiber lasers being at least one of shaped and directed such that they impinge said processing surface in a second ordering pattern;

the laser beams having a power density and energy sufficiently high to erode the material to engrave said cups;

a controller for controlling the laser radiation source;

at least one material carrier for the processing surface;

a unit for generating at least one relative movement between the laser beams and the processing surface; and the material comprises copper on a cylinder of a rotogravure engraving machine.

9. A rotogravure engraving system for engraving half-tone cups for receiving printing fluid into a printing form comprising a rotable rotogravure printing drum having a round outer metal peripheral processing surface, comprising:

a mounting which receives said rotatable printing drum;

at least one fiber laser comprising a pump source and a laser fiber having an outfeed end and a core surrounded by a pump core, said pump source being positioned at said laser fiber, and said laser fiber outputting a continuous wave laser beam;

a laser gun having a focusing optics and mounted for lateral movement alongside said rotatable drum, the laser beam output from said laser fiber outfeed end being delivered to said focusing optics;

a modulator which controls the laser beam; and the laser beam output from said laser fiber being diffraction-limited to permit said focusing optics to focus the laser beam as said drum is rotating onto said metal processing surface as a spot having a spot size sufficiently small to create the half-tone cups for printing fine structure rotogravure images or text by removing metal material from said processing surface.

10. A system according to claim 9 wherein the spot size is equal to or less than approximately 10 micrometers in diameter.

11. A system according to claim 9 wherein the laser beam at the spot has a power of at least approximately 100 watts at full beam intensity.

12. A system according to claim 9 wherein the laser beam at said spot has a power density of at least approximately $10^7 W/cm^2$ at full beam intensity.

13. A system according to claim 9 wherein said pump source comprises at least one laser diode.

14. A system according to claim 9 wherein:

a housing is provided having said rotatable printing drum mounting;

the pump source and an end of said laser fiber opposite said outfeed end are mounted in a fixed position with respect to said housing;

the laser gun is mounted for lateral movement along an axis parallel to a rotational axis of said rotatable drum; and said laser gun having at an output end adjacent said drum said focusing optics and at an input end said modulator, said laser fiber outfeed end being connected to said input end of said laser gun and moveable as said laser gun moves.

15. A system according to claim 14 wherein said laser fiber ouffeed end is secured at said input end of said laser gun.

16. A system according to claim 14 wherein said laser fiber has a length which is significantly greater than a distance between said pump source and said input end of said laser gun where said laser fiber ouffeed end is connected.

17. A system according to claim 14 wherein said laser fiber is flexibly arranged in a pattern with bends to take up an excess length of said laser fiber between said laser gun and said pump source.

18. A system according to claim 14 wherein said housing has a controller, and wherein at a top side of said housing said rotatable drum is positioned along with said laterally moveable laser gun.

19. A system according to claim 14 wherein the housing has at an upper side said rotatable drum and said movable laser gun positioned adjacent thereto, and wherein a lower portion of said housing has a controller, modulation signal unit, and a cooling system, the cooling system being connected to cool said pump source, and wherein said laser fiber extends between said pump source fixedly mounted in said lower portion of said housing up to said laser gun at said upper portion of said housing.

20. A system according to claim 14 wherein the laser fiber ouffeed end is directly connected at the input end of the movable laser gun and proceeds in a pattern with bends back to the pump source at a fixed location on the housing.

21. A system according to claim 9 wherein a reflection surface is positioned to deflect the laser beam when it is intended that it not strike said processing surface.

22. A system according to claim 21 wherein said reflection surface is positioned after an output of said modulator and is angled so as to direct said laser beam deflected by the reflection surface to said sump, said sump being attached to said laser gun radially outwardly from a longitudinal axis of said laser gun.

23. A system according to claim 21 wherein said relection surface is positioned on said laser gun with respect to a longitudinal axis of said laser gun between an output of said modulator and a diffraction optics in said laser gun.

24. A system according to claim 9 wherein a sump is positioned to receive the laser beam when it is intended that it not strike said processing surface.

25. A system of claim 24 wherein a reflectior surface is positioned to deflect said laser beam to said sump when it is intended that the laser beam should not strike said processing surface.

26. A system according to claim 25 wherein said reflection surface and sump are positioned on said laser gun.

27. A system according to claim 9 wherein a diffraction optics is provided between said focusing optics and an output of said modulator.

28. A system according to claim 27 wherein said diffraction optics is mounted in said laser gun, and, relative to a traveling direction of the laser beam, said diffraction optics causes a laser beam output from said modulator to diverge prior to passing through said focusing optics.

29. The system of claim 9 wherein the modulator is located on said laser gun.

30. A system according to claim 9 wherein said pump source comprises a plurality of laser diodes followed by an optics which directs outputs from said plurality of laser diodes to an end of said laser fiber opposite said outfeed end.

31. A system according to claim 9 wherein said laser fiber has a reflection surface at an end opposite said outfeed end.

32. A system according to claim 9 wherein said laser fiber has an outfeed reflection surface at said outfeed end.

33. A system according to claim 9 wherein at said outfeed end said laser fiber has a terminator with an optics adjacent an input of said modulator which converts the laser beam exiting the laser fiber with diverging rays to parallel rays which enter at the input of the modulator.

34. A system according to claim 33 wherein said terminator is adjustably attached to said laser fiber at said outfeed end to set a distance between an outfeed end of said core of said laser fiber and said optics.

35. A system according to claim 9 wherein said modulator comprises an acousto-optical modulator which receives an acoustical control signal having a frequency which controls a deflection angle of the laser beam output from said modulator.

36. A system according to claim 9 wherein said modulator comprises an acousto-optical modulator and an amplitude of an acoustical control signal fed to said modulator controls an amplitude of the laser beam exiting from the modulator.

37. A system according to claim 9 wherein said modulator comprises an acousto-optical modulator on said laser gun and is positioned such that an acoustical control signal fed to said modulator controls an output angle of said laser beam from said modulator by a frequency of said acoustical control signal to selectively strike said processing surface through said focusing optics.

38. A system according to claim 9 wherein said modulator comprises an acousto-optical modulator positioned in said laser gun such that given no acoustical control signal fed to said modulator the output laser beam from the modulator hits said reflection surface and given presence of the acoustical signal with a prescribed frequency said laser beam output from said modulator passes through said focusing optics and hits said processing surface.

39. A system according to claim 9 wherein said focusing optics focuses the laser beam onto said processing surface to form a laser spot at said processing surface having a diameter equal to or less than approximately 10 $\mu$m.

40. A system according to claim 9 wherein said metal surface of said rotogravure drum in which the half-tone cups are engraved by said laser beam comprises copper.

41. A system according to claim 9 wherein said metal surface of said rotogravure drum in which the half-tone cups are engraved by said laser beam comprises chrome.

42. A system according to claim 9 wherein said laser beam output by the laser gun is oriented so that the laser beam strikes said processing surface of said cylindrical drum at an angle which is less than 90° relative to a tangent perpendicular to said rotational axis of said drum where said laser beam strikes said processing surface.

43. A system according to claim 9 wherein said laser fiber converts a relatively large diameter of a pump spot at an end opposite the outfeed end to a relatively much smaller diameter of the output laser beam from said core at said outfeed end of said laser fiber.

44. A system according to claim 9 wherein said laser fiber at said outfeed end connects through a passive fiber to said laser gun.

45. A system according to claim 9 wherein said laser fiber at said outfeed end has a terminator, said terminator having an open portion with one end of said open portion having an end of said laser fiber core and pump core positioned thereat and at an opposite end of said open portion an optics positioned in front of said modulator.

46. A system according to claim 9 wherein a plurality of laser fibers are provided between said pump source and said laser gun, and a coupler which combines outfeed ends of said plurality of laser fibers being connected to said laser gun.

47. A system according to claim 9 wherein a plurality of fiber lasers are provided.

48. A system according to claim 9 wherein said laser fiber connects to a coupler having at its output end a plurality of passive fibers, output ends of said passive fibers being connected to said laser gun.

49. A system according to claim 9 wherein said modulator comprises an electro-optical modulator which changes a polarization direction of a laser beam passing therethrough, and wherein a polarization direction sensitive mirror follows said electro-optical modulator so that depending upon a polarization direction, the mirror either transmits a laser beam which is communicated to said focusing optics and then to said processing surface, or deflects the laser beam.

50. A system according to claim 9 wherein a plurality of said laser fibers are provided connected to said laser gun for outputting onto said processing surface a plurality of said laser beams.

51. A system according to claim 50 wherein said plurality of laser beams are focused to a common spot.

52. A system according to claim 50 wherein said plurality of laser beams are arranged to provide spots along a line next to one another on said processing surface.

53. A laser system according to claim 9 wherein a plurality of said laser guns are provided spaced from each other adjacent to said rotatable drum and in a direction along said rotational axis of said drum, each laser gun being fed by at least one laser fiber.

54. A system according to claim 9 wherein in said laser gun between said focusing optics and said processing surface a base member having an inner cavity is provided with a transparent plate through which said laser beam passes on its way to said processing surface through said cavity, and after said transparent plate at least one extraction channel which extracts unwanted eroded material from said cavity.

55. A system according to claim 9 wherein said laser beam striking said processing surface creates at least a portion of said half-tone cup as the rotatable drum rotates.

56. A system according to claim 9 wherein said laser beam striking the processing surface is amplitude modulated to cause a changing intensity of said laser light beam for causing different amounts of said metal surface to be eroded depending on an intensity of said laser light beam.

57. A system according to claim 9 wherein the half-tone cups have a penetration depth which changes dependent upon a tone value gradation desired for said half-tone cup.

58. A system according to claim 9 wherein said half-tone cups produced by said laser beam have 256 tone value gradations.

59. The system according to claim 9 wherein an intensity of said laser beam controlled by said modulator is in accordance with an 8 bit signal fed to said modulator.

60. A system according claim 9 wherein said laser beam is controlled so that a maximum depth of said half-tone cups is approximately 40 µm.

61. A system according to claim 9 wherein said laser beam is controlled such that a minimum depth of said half-tone cups is approximately 3 µm.

62. A system according to claim 9 wherein a modulation control of said laser beam allows adjusting a depth of said cups within a fraction of a micrometer.

63. A system according to claim 9 wherein the laser beam output by the laser gun engraves the half-tone cups with a resolution on the printing form drum of at least at least one of 4,900 cups per cm² and 70 lines per cm screen resolution.

64. A system according to claim 9 wherein the modulator is located on the laser gun and an optics is provided such that parallel rays of the laser beam leaving the modulator diverge and when the laser beam passes through the focusing optics rays of the laser beam converge.

65. A system according to claim 9 wherein the rotatable drum comprises a chrome-plated copper surface.

66. A system according to claim 9 wherein the continuous wave laser beam erodes the rotating drum processing surface to create said cups.

67. A system according to claim 9 wherein a plurality of screens are simultaneously produced on the drum with each screen being produced by a separate laser gun.

68. A system according to claim 9 wherein the processing surface comprises one of the metals copper and chrome.

69. A system according to claim 9 wherein the laser beam impinging on the processing surface creates the cup such that a shape of the cup is created independently of a size of the cup at the processing surface.

70. A system according to claim 9 wherein the laser beam impinging on the processing surface creates an area of the cup at the processing surface which is independent of its depth.

71. A system according to claim 9 wherein the laser fiber has an absorption efficiency of more than 60%.

72. A system according to claim 9 wherein the laser fiber core has a diameter which creates a laser radiation beam at its outfeed end having a diameter of approximately 10 µm or less.

73. A system according to claim 9 wherein said rotatable drum has a rotational axis which is horizontal.

74. A rotogravure engraving system for engraving half-tone cups for receiving printing fluid into a printing form comprising a rotable rotogravure printing drum having a round outer metal peripheral processing surface, comprising:
   a housing having a mounting which receives said rotatable printing drum;
   at least one fiber laser comprising a pump source and a laser fiber having an outfeed end and a core surrounded by a pump core, said pump source being positioned at said laser diode, said laser fiber outputting a continuous wave laser beam, and said pump source and an end of the laser fiber opposite the outfeed end being fastened at a fixed position in said housing;
   a laser gun having a focusing optics and mounted for lateral movement alongside said rotatable drum, the outfeed end of said laser fiber being secured at an input of said laser gun;
   a modulator in said laser gun which controls the laser beam; and
   the laser beam output from said laser fiber being diffraction-limited to permit said focusing optics to focus the laser beam as said drum is rotating onto said metal processing surface as a spot having a spot size sufficiently small to create the halftone cups for printing fine structure rotogravure images or text by removing metal material from said processing surface.

75. A rotogravure engraving system for engraving half-tone cups for receiving printing fluid into a printing form comprising a rotable rotogravure printing drum having a round outer metal peripheral processing surface, comprising:
   a mounting which receives said rotatable printing drum;
   at least one fiber laser comprising a pump source and a laser fiber having an outfeed end and a core surrounded by a pump core, said pump source being positioned at said laser fiber, and said laser fiber outputting a laser beam;
   a laser gun having a focusing optics and mounted for lateral movement alongside said rotatable drum, the laser beam output from said laser fiber outfeed end being delivered to said focusing optics;
   a modulator which controls at least an intensity of the laser beam; and
   the laser beam output from said laser fiber being diffraction-limited to permit said focusing optics to focus the laser beam as said drum is rotating onto said metal processing surface as a spot having a spot size sufficiently small to create the halftone cups for printing fine structure rotogravure images or text by removing metal material from said processing surface, and wherein the processing surface is comprised of at least one of the metals copper and chrome.

76. A method for engraving half-tone cups for receiving a printing fluid into a rotogravure printing form, comprising the steps of:
providing a mounting which receives the printing form comprising a rotatable rotogravure printing drum having a round outer metal peripheral processing surface;
providing at least one fiber laser comprising a pump source and a laser fiber comprising an outfeed end, the pump source being positioned at said laser fiber, and the laser fiber comprising a core surrounded by a pump core;
providing a laser gun mounted for lateral movement alongside said rotatable drum, said laser gun having a focusing optics, and a laser beam output by said laser fiber outfeed end being deliverable to said focusing optics;
providing a modulator to control the laser beam; and
while rotating said drum, outputting from said laser fiber the laser beam which is a continuous wave beam and which is diffraction-limited to permit said focusing optics to focus the laser beam onto said processing surface as a spot having a spot size sufficiently small to create the rotogravure half-tone cups in said metal processing surface for printing fine structure rotogravure images or text by removing metal material from said processing surface.

77. A method according to claim 76 wherein the spot size is equal to or less than approximately 10 micrometers diameter.

78. A method according to claim 76 wherein the laser beam at the spot has a power of at least approximately 100 watts at full beam intensity.

79. A method according to claim 76 wherein the laser beam at said spot has a power density of at least approximately $10^7$ W/cm$^2$ at full beam intensity.

80. A method according to claim 76 wherein said pump source comprises at least one laser diode.

81. A method according to claim 76 including the steps of:
providing a housing for said rotatable printing drum mounting;
mounting the pump source and an end of said laser fiber opposite said outfeed end in a fixed position with respect to said housing;
mounting the laser gun for lateral movement along an axis parallel to a rotational axis of said rotatable drum; and
providing said laser gun at an output end adjacent said drum with said focusing optics, and at an input end said modulator, and providing said laser fiber outfeed end connected to said input end of said laser gun so that as the laser gun moves the laser fiber outfeed end also moves.

82. A method according to claim 81 wherein said laser fiber outfeed end is secured at said input end of said laser gun and moves along with said laser gun during said engraving of said half-tone cups.

83. A method according to claim 76 wherein a reflection surface is positioned in said laser gun after an output of said modulator, a sump is positioned on said laser gun, and as the drum, is being engraved, a laser beam from said modulator is deflected by said mirror to said sump.

84. a method according to claim 76 including providing an optics between said focusing optics and an output of said modulator so that parallel rays from said modulator diverge prior to the laser beam entering the focusing optics.

85. A method according to claim 76 including providing a plurality of laser diodes followed by an optics which directs outputs from said plurality of laser diodes to an end of said laser fiber opposite said outfeed end.

86. A method of claim 76 including the step of providing said laser fiber with a length sufficiently greater than a distance between said pump source and an input end of said laser gun where said laser fiber outfeed end is connected.

87. A method according to claim 76 wherein at said outfeed end of said laser fiber an optics is provided so that the laser beam entering an input to said modulator has parallel rays.

88. A method according to claim 76 including the step of connecting said laser fiber at said outfeed end through a passive fiber to said laser gun.

89. A method according to claim 76 wherein said modulator comprises an acoustical-optical modulator mounted in said laser gun and providing an acoustical control signal having a frequency which controls a deflection angle of thee laser beam output from said modulator.

90. A method according to claim 76 wherein an amplitude of a control signal fed to said modulator controls an amplitude of the laser beam exiting from the modulator.

91. A method according to claim 76 wherein said modulator comprises an acousto-optical modulator mounted in said laser gun and is positioned such that an acoustical control signal fed to said modulator controls by its frequency an output angle of said laser beam from said modulator to selectively strike said processing surface through said focusing optics.

92. A method according to claim 76 wherein said half-tone cups are engraved by said laser beam in a copper processing surface.

93. A method according to claim 76 wherein said half-tone cups are engraved by said laser beam in a chrome processing surface.

94. A method according to claim 76 including the step of having said laser beam strike said processing surface of said cylindrical drum at an angle which is less than 90 degrees relative to a tangent perpendicular to a rotational axis of said drum where said laser beam strikes said processing surface.

95. A method according to claim 76 including the step of providing a plurality of laser fibers.

96. A method according to claim 76 wherein an optics is provided so that diverging rays of the laser beam exiting the core of the laser fiber enter the modulator parallel.

97. A method according to claim 76 wherein said modulator comprises an electro-optical modulator which changes a polarization direction of the laser beam passing there through, and wherein a polarization direction sensitive mirror follows said electro-optical modulator.

98. A method according to claim 76 wherein said laser gun outputs onto said processing surface a plurality of said laser beams.

99. A method according to claim 98 wherein said plurality of laser beams are focused to a common spot.

100. A method according to claim 76 wherein a plurality of laser beams are output by said laser gun to provide spots along a line next to one another on said processing surface.

101. A method according to claim 76 wherein a plurality of moveable laser guns are provided spaced apart from each other adjacent to said rotatable drum and in a direction along a rotational axis of said drum.

102. A method according to claim 76 wherein said laser beam striking the processing surface is amplitude modulated to cause a changing intensity of said laser light beam for causing different amounts of said metal surface to be eroded depending on an intensity of said laser beam.

103. A method for engraving half-tone cups for receiving a printing fluid into a rotogravure printing form, comprising the steps of:
providing a mounting which receives the printing form comprising a rotatable rotogravure printing drum having a round outer metal peripheral processing surface which is at least one of copper and chrome;
providing at least one fiber laser comprising a pump source and a laser fiber comprising an outfeed end, the pump source being positioned at said laser fiber, and the laser fiber comprising a core surrounded by a pump core;
providing a laser gun mounted for lateral movement alongside said rotatable drum, said laser gun having a focusing optics, and a laser beam output by said laser fiber outfeed end being deliverable to said focusing optics;
providing a modulator to control an intensity of the laser beam; and
while rotating said drum, outputting from said laser fiber the laser beam which is diffraction-limited to permit said focusing optics to focus the laser beam onto said processing surface as a spot having a spot size with a power density therein of at least approximately $10^7$ W/cm$^2$ at maximum beam intensity and sufficiently small to create the rotogravure half-tone cups in said metal processing surface for printing fine structure rotogravure images or text by removing metal material from said processing surface.

104. A flexo printing system for use in creating a fine structure for images or text on a processing surface of a flexo printing form mounted on a rotatable drum having a round outer peripheral surface, comprising:
a mounting which receives said rotatable drum;
at least one fiber laser comprising a pump source and a laser fiber having an outfeed end and a core surrounding by a pump core, said pump source being positioned at said laser fiber, and said laser fiber outputting a continuous wave laser beam;
a laser gun having a focusing optics and mounted for lateral movement alongside said rotatable drum, the laser beam output from said laser fiber outfeed end being delivered to said focusing optics;
a modulator which controls the laser beam; and
the laser beam output from said laser fiber being diffraction-limited to permit said focusing optics to focus the laser beam as said drum is rotating onto said processing surface as a spot having a spot size sufficiently small to create said fine structure for images or text by removing material from said processing surface.

105. A system according to claim 104 wherein the spot size is equal to or less than approximately 10 micrometers in diameter.

106. A system according to claim 104 wherein the laser beam has a power of at least approximately 100 watts.

107. A system according to claim 104 wherein the spot size is equal to or less than approximately 10 micrometers and the laser beam has a power of at least approximately 100 watts.

108. A system according to claim 104 wherein the laser beam at said spot has a power density of at least approximately $10^7$ W/cm$^2$.

109. A system according to claim 104 wherein said pump source comprises at least one laser diode.

110. A system according to claim 104 wherein:
a housing is provided having said rotatable drum mounting;
the pump source and an end of said laser fiber opposite said outfeed end are mounted in a fixed position with respect to said housing;
the laser gun is mounted for lateral movement along an axis parallel to a rotational axis of said rotatable drum; and
said laser gun having at an output end adjacent said drum said focusing optics and at an input end said modulator, said laser fiber outfeed end being connected to said input end of said laser gun and moveable as said laser gun moves.

111. A system according to claim 110 wherein said laser fiber outfeed end is secured at said input end of said laser gun.

112. A system according to claim 110 wherein said laser fiber has a length which is significantly greater than a distance between said pump source and said input end of said laser gun where said laser fiber outfeed end is connected.

113. A system according to claim 110 wherein said laser fiber is flexibly arranged in a pattern with bends to take up an excess length of said laser fiber between said laser gun and said pump source.

114. A system according to claim 110 wherein said housing has a controller, and wherein at a top side of said housing said rotatable drum is positioned along with said laterally moveable laser gun.

115. A system according to claim 110 wherein the housing has at an upper side said rotatable drum and said movable laser gun positioned adjacent thereto, and wherein a lower portion of said housing has a controller, modulation signal unit, and a cooling system, the cooling system being connected to cool said pump source, and wherein said laser fiber extends between said pump source fixedly mounted in said lower portion of said housing up to said laser gun at said upper portion of said housing.

116. A system according to claim 110 wherein the laser fiber outfeed end is directly connected at the input end of the movable laser gun and proceeds in a pattern with bends back to the pump source at a fixed location on the housing.

117. A system according to claim 104 wherein a reflection surface is positioned to deflect the laser beam when it is intended that it not strike said processing surface.

118. A system according to claim 117 wherein said reflection surface is positioned on said laser gun with respect to a longitudinal axis of said laser gun between an output of said modulator and a diffraction optics in said laser gun.

119. A system according to claim 117 wherein said modulator comprises an acousto-optical modulator positioned in said laser gun such that given no acoustical control signal fed to said modulator the output laser beam from the modulator hits said mirror and given presence of the acoustical signal with a prescribed frequency said laser beam output from said modulator passes through said focusing optics and hits said processing surface.

120. A system according to claim 104 wherein a sump is positioned to receive the laser beam when it is intended that it not strike said processing surface.

121. A system of claim 120 wherein a reflection surface is positioned to deflect said laser beam to said sump when it is intended that the laser beam should not strike said processing surface.

122. A system according to claim 121 wherein said reflection surface and sump are positioned on said laser gun.

123. A system according to claim 120 wherein said relection surface is positioned after an output of said modulator and is angled so as to direct said at least a portion of said laser beam deflected by the reflection surface to said sump, said sump being attached to said laser gun radially outwardly from a longitudinal axis of said laser gun.

124. A system according to claim 104 wherein a diffraction optics is provided between said focusing optics and an output of said modulator.

125. A system according to claim 124 wherein said diffraction optics is mounted in said laser gun, and, relative to a traveling direction of the laser beam, said diffraction optics causes a laser beam output from said modulator to diverge prior to passing through said focusing optics.

126. The system of claim 104 wherein the modulator is located on said laser gun.

127. A system according to claim 104 wherein said pump source comprises a plurality of laser diodes followed by an optics which directs outputs from said plurality of laser diodes to an end of said laser fiber opposite said outfeed end.

128. A system according to claim 104 wherein said laser fiber has a reflection surface at an end opposite said outfeed end.

129. A system according to claim 104 wherein said laser fiber has an outfeed reflection surface at said outfeed end.

130. A system according to claim 104 wherein at said outfeed end said laser fiber has a terminator with an optics adjacent an input of said modulator which converts the laser beam exiting the laser fiber with diverging rays to parallel rays which enter at the input of the modulator.

131. A system according to claim 130 wherein said terminator is adjustably attached to said laser fiber at said outfeed end to set a distance between an outfeed end of said core of said laser fiber and said optics.

132. A system according to claim 104 wherein said modulator comprises an acousto-optical modulator which receives an acoustical control signal having a frequency which controls a deflection angle of the laser beam output from said modulator.

133. A system according to claim 104 wherein said modulator comprises an acousto-optical modulator and an amplitude of an acoustical control signal fed to said modulator controls whether or not the laser beam exists from the modulator.

134. A system according to claim 104 wherein said modulator comprises an acousto-optical modulator on said laser gun and is positioned such that an acoustical control signal fed to said modulator controls an output angle of said laser beam from said modulator by a frequency of said acoustical control signal to selectively strike said processing surface through said focusing optics.

135. A system according to claim 104 wherein said focusing optics focuses the laser beam onto said processing surface to form a laser spot at said processing surface having a diameter equal to or less than approximately 10 $\mu$m.

136. A system according to claim 104 wherein said laser beam output by the laser gun is oriented so that the laser beam strikes said processing surface at an angle which is less than 90° relative to a tangent perpendicular to said rotational axis of said drum where said laser beam strikes said processing surface.

137. A system according to claim 104 wherein said laser fiber converts a relatively large diameter of a pump spot at said infeed end to a relatively much smaller diameter of the output laser beam from said core at said outfeed end of said laser fiber.

138. A system according to claim 104 wherein said laser fiber at said outfeed end connects through a passive fiber to said laser gun.

139. A system according to claim 104 wherein said laser fiber at said outfeed end has a terminator, said terminator having an open portion with one end of said open portion having an end of said laser fiber core and pump core positioned thereat and at an opposite end of said open portion an optics positioned in front of said modulator.

140. A system according to claim 104 wherein a plurality of laser fibers are provided between said pump source and said laser gun, and a coupler which combines outfeed ends of said plurality of laser fibers being connected to said laser gun.

141. A system according to claim 140 wherein a plurality of fiber lasers are provided.

142. A system according to claim 104 wherein said laser fiber connects to a coupler having at its output end a plurality of passive fibers, output ends of said passive fibers being connected to said laser gun.

143. A system according to claim 104 wherein said modulator comprises an electro-optical modulator which changes a polarization direction of a laser beam passing therethrough, and wherein a polarization direction sensitive reflection surface follows said electro-optical modulator so that depending upon a polarization direction, the reflection surface either transmits a laser beam which is communicated to said focusing optics and then to said processing surface, or deflects the laser beam.

144. A system according to claim 104 wherein said laser gun outputs onto said processing surface a plurality of said laser beams.

145. A system according to claim 144 wherein said plurality of laser beams are focused to a common spot.

146. A system according to claim 144 wherein said plurality of laser beams are arranged to provide spots along a line next to one another on said processing surface.

147. A laser system according to claim 104 wherein a plurality of said laser guns are provided spaced from each other adjacent to said rotatable drum and in a direction along said rotational axis of said drum, each laser gun being fed by at least one laser fiber.

148. A system according to claim 104 wherein in said laser gun between said focusing optics and said processing surface a base member having an inner cavity is provided with a transparent plate through which said laser beam passes on its way to said processing surface through said cavity, and after said transparent plate at least one extraction channel which extracts unwanted eroded material from said cavity.

149. A system according to claim 104 wherein said laser beam striking said processing surface has a sufficient power density to melt the processing surface as the rotatable drum rotates.

150. A system according to claim 104 wherein a plurality of screens are simultaneously produced on the drum with each screen being produced by a separate laser gun.

151. A system according to claim 104 wherein the laser beam on the process surface melts material to create the structure on the processing surface.

152. A system according to claim 104 wherein the laser fiber has an absorption efficiency of more than 60%.

153. A system according to claim 104 wherein the laser fiber core has a diameter which creates a laser radiation beam at its outfeed end having a diameter of approximately 10 $\mu$m or less.

154. A system according to claim 104 wherein the modulator is located on the laser gun and an optics is provided such that parallel rays of the laser gun leaving the modulator diverge and when the laser beam passes through the focusing optics rays of the laser beam converge.

155. A system according to claim 104 wherein said laser gun outputs a plurality of side-by-side laser beams along a line to remove material on said processing surface of said flexo printing form as said drum is rotated.

156. A system according to claim 155 wherein said laser gun has a beam splitter which splits the laser beam from said laser fiber into said plurality of laser beams.

157. A system according to claim 156 wherein said beam splitter comprises a coupling having an input connecting to an outfeed end of said laser fiber, and at an output of said coupling a plurality of passive fibers output said plurality of side-by-side laser beams.

158. A system according to claim 155 wherein a plurality of said fiber lasers are provided with a plurality of corresponding laser fibers having their respective outfeed ends connected to the laser gun.

159. A system according to claim 155 wherein a laser beam from said outfeed end of said laser fiber is coupled to said modulator, said modulator comprising an acousto-optical modulator having an acoustical control signal fed thereto having a plurality of frequencies so that said acousto-optical modulator creates said plurality of said laser beams fed through said focusing optics to said processing surface.

160. A system according to claim 155 wherein a plurality of modulators are provided each having an input receiving a laser beam from a respective laser fiber of a plurality of fiber lasers connecting to said laser gun.

161. A system according to claim 155 wherein a plurality of fiber lasers having a respective plurality of laser fibers connect to said laser gun and wherein an acousto-optical modulator which is common to all laser beams output from said respective laser fibers is provided.

162. A system according to claim 155 wherein said laser gun is tiltable so that a line of laser spots strike said processing surface at an angle to adjust a spacing between laser spots on the processing surface.

163. A system according to claim 155 wherein said modulator comprises a multi-channel acousto-optical modulator having a control signal with different frequencies fed to it, said frequencies being selected to create spots on said processing surface corresponding to said plurality of laser beams.

164. A system according to claim 163 wherein said frequencies control a spacing between laser spots on the processing surface.

165. A system according to claim 164 wherein an amplitude of each of the plurality of signals controls whether or not the associated laser beam is output or not from the modulator.

166. A flexo printing system for use in creating a fine structure for images or text on a processing surface of a flexo printing form mounted on a rotatable drum having a round outer peripheral surface, comprising:
a mounting which receives said rotatable drum;
at least one fiber laser comprising a pump source and a laser fiber having an outfeed end and a core surrounded by a pump core, said pump source being positioned at said laser fiber, and said laser fiber outputting a continuous wave laser beam;
a laser gun having a focusing optics and mounted for lateral movement alongside said rotatable drum, the laser beam output from said laser fiber outfeed end being delivered to said focusing optics;
a beam splitter which creates a plurality of laser beams from said at least one laser beam and a modulator system which individually modulates each of said laser beams; and
the laser beam output from said laser fiber being diffraction-limited to permit said focusing optics to focus the plurality of laser beams as said drum is rotating onto said processing surface as a plurality of spots along a line, the spots having a spot size sufficiently small to create said fine structure for images or text by removing material from said processing surface.

167. A flexo printing system for use in creating a fine structure for images or text on a processing surface of a flexo printing form mounted on a rotatable drum having a round outer peripheral surface, comprising:
a mounting which receives said rotatable drum;
a plurality of fiber lasers each comprising a pump source and a laser fiber having an outfeed end and a core surrounded by a pump core, said pump source being positioned at said laser fiber, and said laser fibers each outputting a respective continuous wave laser beam;
a laser gun having a focusing optics and mounted for lateral movement alongside said rotatable drum, the laser beams output from said respective laser fiber outfeed ends being delivered to said focusing optics;
a modulator system which separately controls each of the laser beams; and
the laser beams output from said laser fibers each being diffraction-limited to permit said focusing optics to focus the laser beams as said drum is rotating onto said processing surface as a plurality of spots along a line, the spots having a spot size sufficiently small to create said fine structure for images or text by removing material from said processing surface.

168. A method for removing material at a processing surface of a flexo printing form for creating a fine structure image or text on a processing surface thereof, comprising the steps of:
providing a mounting with a rotatable drum thereon having the flexo printing form mounted therearound;
providing at least one fiber laser comprising a laser diode pump source and a laser fiber having an outfeed end and a core surrounded by a pump core, said pump source being positioned at said laser fiber, and said laser fiber outputting a continuous wave laser beam when pumped;
providing a laser gun mounted for lateral movement alongside said rotatable drum, said laser gun having a focusing optics;
providing a modulator to control the laser beam; and
outputting the laser beam as a diffraction-limited laser beam from the laser fiber to permit said focusing optics to focus the laser beam as said drum is rotating onto said processing surface as a spot having a spot size sufficiently small to create said fine structure for images or text by removing the material from said processing surface.

169. A method according to claim 168 wherein the spot size is equal to or less than approximately 10 micrometers diameter.

170. A method according to claim 168 wherein the laser beam at the spot has a power of at least approximately 100 watts.

171. A method according to claim 168 wherein the laser beam at said spot has a power density of at least approximately $10^7$ W/cm$^2$ at the spot.

172. A method according to claim 168 wherein said pump source comprises at least one laser diode.

173. A method according to claim 168 including the steps of providing a housing for said rotatable drum mounting;

mounting the pump source and an end of said laser fiber opposite said outfeed end in a fixed position with respect to said housing;

mounting the laser gun for lateral movement along an axis parallel to a rotational axis of said rotatable drum; and providing said laser gun at an output end adjacent said drum with said focusing optics, and at an input end said modulator, and providing said laser fiber outfeed end connected to said input end of said laser gun so that as the laser gun moves the laser fiber outfeed end also moves.

174. A method according to claim 173 wherein said laser fiber outfeed end is secured at said input end of said laser gun and moves along with said laser gun during said structuring of the processing surface.

175. A method according to claim 173 wherein a reflection surface is positioned in said laser gun after an output of said modulator, the sump is positioned on said laser gun, and as the flexo printing form is being structured, the laser beam from said modulator is deflected by said reflection surface to said sump.

176. A method according to claim 168 including providing an optics between said focusing optics and an output of said modulator so that parallel rays from said modulator diverge prior to the laser beam entering the focusing optics.

177. A method according to claim 168 including providing a plurality of laser diodes followed by an optics which directs outputs from said plurality of laser diodes to an end of said laser fiber opposite said outfeed end.

178. A method of claim 168 including the step of providing said laser fiber with a length sufficiently greater than a distance between said pump source and an input end of said laser gun where said laser fiber outfeed end is connected.

179. A method according to claim 168 wherein at said outfeed end of said laser fiber an optics is provided so that the laser beam entering an input to said modulator has parallel rays.

180. A method according to claim 168 including the step of connecting said laser fiber at said outfeed end through a passive fiber to said laser gun.

181. A method according to claim 168 wherein said modulator comprises an acoustical-optical modulator mounted in said laser gun, and providing an acoustical control signal having a frequency which controls a deflection angle of the laser beam output from said modulator.

182. A method according to claim 168 wherein an amplitude of a control signal fed to said modulator controls whether or not the laser beam exits from the modulator.

183. A method according to claim 168 wherein said modulator comprises an acousto-optical modulator mounted in said laser gun and positioned such that an acoustical control signal fed to said modulator controls by its frequency an output angle of said laser beam from said modulator to selectively strike said processing surface through said focusing optics.

184. A method according to claim 168 including the step of having said laser beam strike said processing surface of said cylindrical drum at an angle which is less than 90° relative to a tangent perpendicular to a rotational axis of said drum where said laser beam strikes said processing surface.

185. A method according to claim 168 including the step of providing a plurality of laser fibers.

186. A method according to claim 168 wherein an optics is provided so that diverging rays of the laser beam exiting the core of the laser fiber enter the modulator parallel.

187. A method according to claim 168 wherein said modulator comprises an electro-optical modulator which changes a polarization direction of the laser beam passing therethrough, and wherein a polarization direction sensitive reflection surface follows said electro-optical modulator.

188. A method according to claim 168 wherein said laser gun outputs onto said processing surface a plurality of said laser beams.

189. A method according to claim 188 wherein said plurality of laser beams are focused to a common spot.

190. A method according to claim 188 wherein said plurality of laser beams result in spots along a line next to one another on said processing surface.

191. A method according to claim 168 wherein a plurality of moveable laser guns are provided spaced apart from each other adjacent to said rotatable drum and in a direction along a rotational axis of said drum.

192. A method according to claim 168 wherein said laser gun outputs a plurality of side-by-side laser beams to provide laser spots along a line to remove material on said processing surface of said flexo printing form as said drum is rotated.

193. A method according to claim 192 wherein said laser gun has a beam splitter which splits the laser beam from said laser fiber into said plurality of laser beams.

194. A method according to claim 192 wherein a plurality of said fiber lasers are provided with a plurality of corresponding laser fibers having their respective outfeed ends connected to the laser gun.

195. A method according to claim 192 wherein a modulation system is provided for individually modulating each of the laser beams.

196. A method according to claim 192 wherein said laser gun is tiltable so that said line of laser spots strikes the processing surface at an adjustable angle to adjust a spacing between the laser spots on the processing surface.

197. A method according to claim 192 wherein said modulator comprises a multi-channel acousto-optical modulator having a plurality of signals with different frequencies fed to it by an acoustical control signal, said frequencies being selected to create said plurality of laser beams.

198. A method according to claim 197 wherein said frequencies control a spacing between the laser spots on the processing surface.

199. A method according to claim 197 wherein an amplitude of the signal with different frequency controls whether or not the associated laser beam is output or not from the modulator.

200. A method for removing material at a processing surface of a flexo printing form for creating a fine structure for images or text on a processing surface thereof, comprising the steps of:

providing a mounting with a rotatable drum thereon having the flexo-printing form mounted thereon;

providing at least one fiber laser comprising a laser diode pump source and a laser fiber having an outfeed end and a core surrounded by a pump core, said pump source being positioned at said laser fiber, and said laser fiber outputting a continuous wave laser beam when pumped;

providing a laser gun mounted for lateral movement alongside said rotatable drum, said laser gun having a focusing optics, and said laser gun outputting a plurality of laser beams along a line;

providing a modulator system which controls each of the laser beams independently; and each of the laser beams being diffraction-limited to permit said focusing optics to focus each of the respective laser beams as said drum is rotating onto said processing surface as a plurality of spots along the line, the spots having a spot size sufficiently small to create said fine structure for images or text by removing the material from said processing surface.

201. An offset printing system for use in creating a fine pattern for images or text on a processing surface of an offset printing form mounted on a rotatable drum having a round outer peripheral surface, comprising:

a mounting which receives said rotatable drum;

at least one fiber laser comprising a pump source and a laser fiber having an outfeed end and a core surrounding by a pump core, said pump source being positioned at said laser fiber, and said laser fiber outputting a continuous wave laser beam;

a laser gun having a focusing optics and mounted for lateral movement alongside said rotatable drum, the laser beam output from said laser fiber outfeed end being delivered to said focusing optics;

a modulator which controls the laser beam; and the laser beam output from said laser fiber being diffraction-limited to permit said focusing optics to focus the laser beam as said drum is rotating onto said processing surface as a spot having a spot size sufficiently small to create said fine pattern for images or text by processing material on said processing surface.

202. A system according to claim 201 wherein the spot size is equal to or less than approximately 10 micrometers in diameter.

203. A system according to claim 201 wherein the laser beam has a power of at least approximately 100 watts.

204. A system according to claim 201 wherein the laser beam at said spot has a power density of at least approximately $10^7$ W/cm$^2$.

205. A system according to claim 201 wherein said pump source comprises at least one laser diode.

206. A system according to claim 201 wherein:

a housing is provided having said rotatable drum mounting;

the pump source and an end of said laser fiber opposite said outfeedd end are mounted in a fixed position with respect to said housing;

the laser gun is mounted for lateral movement along an axis parallel to a rotational axis of said rotatable drum; and said laser gun having at an output end adjacent said drum said focusing optics and at an input end said modulator, said laser fiber outfeed end being connected to said input end of said laser gun and moveable as said laser gun moves.

207. A system according to claim 206 wherein said laser fiber outfeed end is secured at said input end of said laser gun.

208. A system according to claim 206 wherein said laser fiber has a length which is significantly greater than a distance between said pump source and said input end of said laser gun where said laser fiber outfeed end is connected.

209. A system according to claim 206 wherein said laser fiber is flexibly arranged in a pattern with bends to take up an excess length of said laser fiber between said laser gun and said pump source.

210. A system according to claim 206 wherein said housing has a controller, and wherein at a top side of said housing said rotatable drum is positioned along with said laterally moveable laser gun.

211. A system according to claim 206 wherein the laser fiber outfeed end is directly connected at the input end of the movable laser gun and proceeds in a pattern with bends back to the pump source at a fixed location on the housing.

212. A system according to claim 201 wherein a reflection surface is positioned to deflect the laser beam when it is intended that it not strike said processing surface.

213. A system according to claim 212 wherein said inflection surface is positioned on said laser gun with respect to a longitudinal axis of said laser gun between an output of said modulator and a diffraction optics in said laser gun.

214. A system according to claim 212 wherein said modulator comprises an acousto-optical modulator positioned in said laser gun such that given no acoustical control signal fed to said modulator the output laser beam from the modulator hits said reflection surface and given presence of the acoustical signal with a prescribed frequency said laser beam output from said modulator passes through said focusing optics and hits said processing surface.

215. A system according to claim 201 wherein a sump is positioned to receive the laser beam when it is intended that it not strike said processing surface.

216. A system of claim 215 wherein a reflection surface is positioned to deflect said laser beam to said sump when it is intended that the laser beam should not strike said processing surface.

217. A system according to claim 216 wherein said reflection surface and sump are positioned on said laser gun.

218. A system according to claim 216 wherein said reflection surface is positioned after an output of said modulator and is angled so as to direct said at least a portion of said laser beam deflected by the reflection surface to said sump, said sump being attached to said laser gun radially outwardly from a longitudinal axis of said laser gun.

219. A system according to claim 201 wherein a diffraction optics is provided between said focusing and an output of said modulator.

220. A system according to claim 219 wherein said diffraction optics is mounted in said laser gun, and, relative to a traveling direction of the laser beam, said diffraction optics causes a laser beam output from said modulator to diverge prior to passing through said focusing optics.

221. The system of claim 201 wherein the modulator is located on said laser gun.

222. A system according to claim 201 wherein said pump source comprises a plurality of laser diodes followed by an optics which directs outputs from said plurality of laser diodes to an end of said laser fiber opposite said outfeed end.

223. A system according to claim 201 wherein said laser fiber has a reflection surface at an end opposite said outfeed end.

224. A system according to claim 201 wherein said laser fiber has an outfeed reflection surface at said outfeed end.

225. A system according to claim 201 wherein at said outfeed end said laser fiber has a terminator with an optics adjacent an input of said modulator which converts the laser beam exiting the laser fiber with diverging rays to parallel rays which enter at the input of the modulator.

226. A system according to claim 225 wherein said terminator is adjustably attached to said laser fiber at said outfeed end to set a distance between an outfeed end of said core of said laser fiber and said optics.

227. A system according to claim 201 wherein said modulator comprises an acousto-optical modulator which receives an acoustical control signal having a frequency which controls a deflection angle of the laser beam output from said modulator.

228. A system according to claim 201 wherein said modulator comprises an acousto-optical modulator and an amplitude of an acoustical control signal fed to said modulator controls whether or not the laser beam exits from the modulator.

229. A system according to claim 201 wherein said modulator comprises an acousto-optical modulator on said laser gun and is positioned such that an acoustical control signal fed to said modulator controls an output angle of said laser beam from said modulator by a frequency of said acoustical control signal, to selectively strike said processing surface through said focusing optics.

230. A system according to claim 201 wherein said focusing optics focuses the laser beam onto said processing surface to form a laser spot at said processing surface having a diameter equal to or less than approximately 10 $\mu$m.

231. A system according to claim 201 wherein said laser beam output by the laser gun is oriented so that the laser beam strikes said processing surface at an angle which is less than 90° relative to a tangent perpendicular to said rotational axis of said drum where said laser beam strikes said processing surface.

232. A system according to claim 201 wherein said laser fiber converts a relatively large diameter of a pump spot at said infeed end to a relatively much smaller diameter of the output laser beam from said core at said outfeed end of said laser fiber.

233. A system according to claim 201 wherein said laser fiber at said outfeed end connects through a passive fiber to said laser gun.

234. A system according to claim 201 wherein said laser fiber at said outfeed end has a terminator, said terminator having an open portion with one end of said open portion having an end of said laser fiber core and pump core positioned thereat and at an opposite end of said open portion an optics positioned in front of said modulator.

235. A system according to claim 201 wherein a plurality of laser fibers are provided between said pump source and said laser gun, and a coupler which combines outfeed ends of said plurality of laser fibers being connected to said laser gun.

236. A system according to claim 235 wherein a plurality of fiber lasers are provided.

237. A system according to claim 201 wherein said laser fiber connects to a coupler having at its output end a plurality of passive fibers, output ends of said passive fibers being connected to said laser gun.

238. A system according to claim 201 wherein said modulator comprises an electro-optical modulator which changes a polarization direction of a laser beam passing therethrough, and wherein a polarization direction sensitive reflection surface follows said electro-optical modulator so that depending upon a polarization direction, the reflection surface either transmits a laser beam which is communicated to said focusing optics and then to said processing surface, or deflects the laser beam.

239. A system according to claim 201 wherein said laser gun outputs onto said processing surface a plurality of said laser beams.

240. A system according to claim 239 wherein said plurality of laser beams are focused to a common spot.

241. A system according to claim 239 wherein said plurality of laser beams are arranged to provide spots along a line next to one another on said processing surface.

242. A laser system according to claim 201 wherein a plurality of said laser guns are provided spaced from each other adjacent to said rotatable drum and in a direction along said rotational axis of said drum, each laser gun being fed by at least one laser fiber.

243. A system according to claim 201 wherein in said laser gun between said focusing optics and said processing surface a base member having an inner cavity is provided with a transparent plate through which said laser beam passes on its way to said processing surface through said cavity, and after said transparent plate at least one extraction channel which extracts unwanted eroded material from said cavity.

244. A system according to claim 201 wherein the housing has at an upper side said rotatable drum and said movable laser gun positioned adjacent thereto, and wherein a lower portion of said housing has a controller, modulation signal unit, and a cooling system, the cooling system being connected to cool said pump source, and wherein said laser fiber extends between said pump source fixedly mounted in said lower portion of said housing up to said laser gun at said upper portion of said housing.

245. A system according to claim 201 wherein a plurality of screens are simultaneously produced on the drum with each screen being produced by a separate laser gun.

246. A system according to claim 201 wherein the laser beam heats material on the processing surface to create said fine pattern.

247. A system according to claim 201 wherein the laser fiber has an absorption efficiency of more than 60%.

248. A system according to claim 201 wherein the laser fiber core has a diameter which creates a laser radiation beam at its outfeed end having a diameter of approximately 10 $\mu$m or less.

249. A system according to claim 201 wherein the modulator is located on the laser gun and an optics is provided such that parallel rays of the laser gun leaving the modulator diverge and when the laser beam passes through the focusing optics rays of the laser beam converge.

250. A system according to claim 201 wherein said laser gun outputs a plurality of side-by-side laser beams along a line to process material on said processing surface of said offset printing form as said drum is rotated.

251. A system according to claim 250 wherein said laser gun has a beam splitter which splits the laser beam from said laser fiber into said plurality of laser beams.

252. A system according to claim 250 wherein said beam splitter comprises a coupling having an input connecting to-an outfeed end of said laser fiber, and at an output of said coupling a plurality of passive fibers output said plurality of side-by-side laser beams.

253. A system according to claim 250 wherein a plurality of said fiber lasers are provided with a plurality of corresponding laser fibers having their respective outfeed ends connected to the laser gun.

254. A system according to claim 250 wherein a laser beam from said outfeed end of said laser fiber is coupled to said modulator, said modulator comprising an acousto-optical modulator having an acoustical control signal fed thereto having a plurality of frequencies so that said acousto-optical modulator creates said plurality of said laser beams fed through said focusing optics to said processing surface.

255. A system according to claim 250 wherein a plurality of modulators are provided each having an input receiving a laser beam from a respective laser fiber of a plurality of fiber lasers connecting to said laser gun.

256. A system according to claim 250 wherein a plurality of fiber lasers having a respective plurality of laser fibers connect to said laser gun and wherein an acousto-optical modulator which is common to all laser beams output from said respective laser fibers is provided.

257. A system according to claim 250 wherein said laser gun is tiltable so that a line of laser spots strike said processing surface at an angle to adjust a spacing between laser spots on the processing surface.

258. A system according to claim 250 wherein said modulator comprises a multi-channel acousto-optical modulator having a control signal with different frequencies fed to it, said frequencies being selected to create spots on said processing surface corresponding to said plurality of laser beams.

259. A system according to claim 258 wherein said frequencies control a spacing between laser spots on the processing surface.

260. A system according to claim 259 wherein an amplitude of each of the plurality of signals controls whether or not the associated laser beam is output or not from the modulator.

261. An offset printing system for use in creating a fine pattern for images or text on a processing surface of an offset printing form mounted on a rotatable drum having a round outer peripheral surface, comprising:
- a mounting which receives said rotatable drum;
- at least one fiber laser comprising a pump source and a laser fiber having an outfeed end and a core surrounded by a pump core, said pump source being positioned at said laser fiber, and said laser fiber outputting a continuous wave laser beam;
- a laser gun having a focusing optics and mounted for lateral movement alongside said rotatable drum, the laser beam output from said laser fiber outfeed end being delivered to said laser gun;
- a beam splitter which creates a plurality of laser beams from said at least one laser beam and a modulator system which individually modulates each of said laser beams; and
- the laser beam output from said laser fiber being diffraction-limited to permit said focusing optics to focus the plurality of laser beams as said drum is rotating onto said processing surface as a plurality of spots along a line, the spots having a spot size sufficiently small to create said fine pattern for images or text by processing material on said processing surface.

262. An offset printing system for use in creating a fine pattern for images or text on a processing surface of an offset printing form mounted on a rotatable drum having a round outer peripheral surface, comprising:
- a mounting which receives said rotatable drum;
- a plurality of fiber lasers each comprising a pump source and a laser fiber having an outfeed end and a core surrounding by a pump core, said pump source being positioned at said laser fiber, and said laser fibers each outputting a respective continuous wave laser beam;
- a laser gun having a focusing optics and mounted for lateral movement alongside said rotatable drum, the laser beam output from said respective laser fiber outfeed end being delivered to said focusing optics;
- a modulator which separately controls each of the laser beams; and
- the laser beam output from said laser fibers each being diffraction-limited to permit said focusing optics to focus the laser beams as said drum is rotating onto said processing surface as a plurality of spots along a line, the spots having a spot size sufficiently small to create said fine patterns for images or text by processing material on said processing surface.

263. A method for processing material at a processing surface of an offset printing form for creating a fine pattern for images or text on a processing surface thereof, comprising the steps of:
- providing a mounting with a rotatable drum thereon having the offset printing form mounted therearound;
- providing at least one fiber laser comprising a laser diode pump source and a laser fiber having an outfeed end and a core surrounded by a pump core, said pump source being positioned at said laser fiber, and said laser fiber outputting a continuous wave laser beam when pumped;
- providing a laser gun mounted for lateral movement alongside said rotatable drum, said laser gun having a focusing optics;
- providing a modulator to control the laser beam; and
- outputting the laser beam as a diffraction-limited laser beam from the laser fiber to pemit said focusing optics to focus the laser beam as said drum is rotating onto said processing surface as a spot having a spot size sufficiently small to create said fine pattern for images or text by processing the material on said processing surface.

264. A method according to claim 263 wherein the spot size is equal to or less than approximately 10 micrometers diameter.

265. A method according to claim 263 wherein the laser beam at the spot has a power of at least approximately 100 watts.

266. A method according to claim 263 wherein the laser beam at said spot has a power density of at least approximately $10^7 W/cm^2$ at the spot.

267. A method according to claim 263 wherein said pump source comprises at least one laser diode.

268. A method according to claim 263 including the steps of:
- providing a housing for said rotatable drum mounting;
- mounting the pump source and an end o said laser fiber opposite said outfeed end in a fixed position with respect to said housing;
- mounting the laser gun for lateral movement along an axis parallel to a rotational axis of said rotatable drum; and
- providing said laser gun at an output end adjacent said drum with said focusing optics, and at an input end said modulator, and providing said laser fiber outfeed end connected to said input end of said laser gun so that as the laser gun moves the laser fiber outfeed end also moves.

269. A method according to claim 268 wherein said laser fiber outfeed end is secured at said input end of said laser gun and moves along with said laser gun during said processing of the processing surface.

270. A method according to claim 268 wherein a inflection surface is positioned in said laser gun after an output of said modulator, the sump is positioned on said laser gun, and as the offset printing form is being structured, the laser beam from said modulator is deflected by said reflection surface to said sump.

271. A method according to claim 263 including providing optics between said focusing optics and an output of said modulator so that parallel rays from said modulator diverge prior to the laser beam entering the focusing optics.

272. A method according to claim 263 including providing a plurality of laser diodes followed by an optics which directs outputs from said plurality of laser diodes to an end of said laser fiber opposite said outfeed end.

273. A method of claim 263 including the step of providing said laser fiber with a length sufficiently greater than a distance between said pump source and an input end of said laser gun where said laser fiber outfeed end is connected.

274. A method according to claim 263 wherein at said outfeed end of said laser fiber an optics is provided so that the laser beam entering an input to said modulator has parallel rays.

275. A method according to claim 263 including the step of connecting said laser fiber at said outfeed end through a passive fiber to said laser gun.

276. A method according to claim 263 wherein said modulator comprises an acoustical-optical modulator mounted in said laser gun, and providing an acoustical control signal having a frequency which controls a deflection angle of the laser beam output from said modulator.

277. A method according to claim 263 wherein an amplitude of a control signal fed to said modulator controls whether or not the laser beam exits from the modulator.

278. A method according to claim 263 wherein said modulator comprises an acousto-optical modulator mounted in said laser gun and positioned such that an acoustical control signal fed to said modulator controls by its frequency an output angle of said laser beam from said modulator to selectively strike said processing surface through said focusing optics.

279. A method according to claim 263 including the step of having said laser beam strike said processing surface of said cylindrical drum at an angle which is less than 90° relative to a tangent perpendicular to a rotational axis of said drum where said laser beam strikes said processing surface.

280. A method according to claim 263 including the step of providing a plurality of laser fibers.

281. A method according to claim 263 wherein an optics is provided so that diverging rays of the laser beam exiting the core of the laser fiber enter the modulator parallel.

282. A method according to claim 263 wherein said modulator comprises an electro-optical modulator which changes a polarization direction of the laser beam passing therethrough, and wherein a polarization direction sensitive reflection surface follows said electro-optical modulator.

283. A method according to claim 263 wherein said laser gun outputs onto said processing surface a plurality of said laser beams.

284. A method according to claim 283 wherein said plurality of laser beams are focused to a common spot.

285. A method according to claim 283 wherein said plurality of laser beams result in spots along a line next to one another on said processing surface.

286. A method according to claim 263 wherein a plurality of moveable laser guns are provided spaced apart from each other adjacent to said rotatable drum and in a direction along a rotational axis of said drum.

287. A method according to claim 263 wherein said laser gun outputs a plurality of side-by-side laser beams to provide laser spots along a line to process material on said processing surface of said offset printing form as said drum is rotated.

288. A method according to claim 287 wherein said laser gun has a beam splitter which splits the laser beam from said laser fiber into said plurality of laser beams.

289. A method according to claim 287 wherein a modulation system is provided for individually modulating each of the laser beams.

290. A method according to claim 287 wherein said laser gun is tiltable so that said line of laser spots strikes the processing surface at an adjustable angle to adjust a spacing between the laser spots on the processing surface.

291. A method according to claim 287 wherein said modulator comprises a multi-channel acousto-optical modulator having a plurality of signals with different frequencies fed to it by an acoustical control signal, said frequencies being selected to create said plurality of laser beams.

292. A method according to claim 291 wherein said frequencies control a spacing between the laser spots on the processing surface.

293. A method according to claim 291 wherein an amplitude of the signal with each different frequency controls whether or not the associated laser beam is output or not from the modulator.

294. A method according to claim 263 wherein a plurality of said fiber lasers are provided with a plurality of corresponding laser fibers having their respective outfeed ends connected to the laser gun.

295. A method for processing material at a processing surface of an offset printing form for creating a fine pattern for images or text on a processing surface thereof, comprising the steps of:

providing a mounting with a rotatable drum thereon having the offset printing form mounted thereon;

providing at least one fiber laser comprising a laser diode pump source and a laser fiber having an outfeed end and a core surrounded by a pump core, said pump source being positioned at said laser fiber, and said laser fiber outputting a continuous wave laser beam when pumped;

providing a laser gun mounted for lateral movement alongside said rotatable drum, said laser gun having a focusing optics, and said laser gun outputting a plurality of laser beams along a line;

providing a modulator system which controls each of the laser beams independently; and each of the laser beams being diffraction-limited to permit said focusing optics to focus each of the respective laser beams as said drum is rotating onto said processing surface as a plurality of spots along the line, the spots having a spot size sufficiently small to create said fine pattern for images or text by processing the material on said processing surface.

296. An offset printing system for use in creating a fine pattern for images or text on a processing surface of an offset printing form mounted on a rotatable drum having a round outer peripheral surface, comprising:

a mounting which receives said rotatable drum;

at least one fiber laser comprising a pump source and a laser fiber having an outfeed end and a core surrounding by a pump core, said pump source being positioned at said laser fiber, and said laser fiber outputting a continuous wave laser beam;

a laser gun having a focusing optics and mounted for lateral movement alongside said rotatable drum, the laser beam output from said laser fiber outfeed end being delivered to said focusing optics, and said laser gun outputting a plurality of laser beams;

a modulator which separately controls each of the laser beams; and the laser beam output from said laser fibers each being diffraction-limited to permit said focusing optics to focus the laser beams as said drum is rotating onto said processing surface as a plurality of spots along a line, the spots having a spot size sufficiently small to create said fine pattern for images or text by processing material on said processing surface.

\* \* \* \* \*

UNITED STATES PATENT AND TRADEMARK OFFICE
CERTIFICATE OF CORRECTION

PATENT NO.     : 6,888,853 B1
DATED          : May 3, 2005
INVENTOR(S)    : Heinrich Jurgensen It is certified that error appears in the above-identified patent and that said Letters Patent is hereby corrected as shown below:

The Title page should be deleted and substituted with the attached title page.

<u>Title page,</u>
Item [56], References Cited, substitute the following references:
-- U.S. PATENT DOCUMENTS

| | | | |
|---|---|---|---|
| 3,931,458 A | * | 1/1976 | Dini..........................358/3.29 |
| RE32,139 E | * | 5/1986 | Taudt et al..................358/524 |
| 4,729,037 A | * | 3/1988 | Doelves.....................358/3.29 |
| 5,084,882 A | | 1/1992 | Hughes.......................372/6 |
| 5,202,893 A | * | 4/1993 | Kubota et al. ...............372/34 |
| 5,337,325 A | | 8/1994 | Hwang........................372/36 |
| 5,363,233 A | * | 11/1994 | Pernick......................359/316 |
| 5,369,661 A | * | 11/1994 | Yamaguchi et al. ............372/69 |
| 5,373,526 A | * | 12/1994 | Lan et al. ......................372/69 |
| 5,396,506 A | | 3/1995 | Ball............................372/6 |
| 5,416,298 A | | 5/1995 | Roberts...................219/121.68 |
| 5,430,816 A | | 7/1995 | Furuya et al. ...................385/33 |
| 5,654,125 A | | 8/1997 | Fan et al. .....................430/306 |
| 5,694,408 A | | 12/1997 | Bott et al. ......................372/6 |
| 5,719,009 A | * | 2/1998 | Fan..........................430/306 |
| 5,760,880 A | | 6/1998 | Fan et al. .....................355/67 |
| 5,780,200 A | * | 7/1998 | Kitaguchi et al. ..........430/270.1 |
| 5,798,202 A | * | 8/1998 | Cushner et al. ..............430/306 |
| 5,829,881 A | * | 11/1998 | Furlani et al. ...............384/42 |
| 5,867,305 A | * | 2/1999 | Waarts et al. ................359/341 |
| 5,900,109 A | * | 5/1999 | Sanders et al. ..............156/552 |
| 5,949,466 A | * | 9/1999 | Kerr et al. ...................347/213 |
| 5,953,036 A | * | 9/1999 | Furlani et al. ...............347/139 |
| 6,106,627 A | * | 8/2000 | Yializis......................118/724 |
| 6,136,375 A | * | 10/2000 | Bressler et al. .............427,277 |
| 6,167,075 A | * | 12/2000 | Craig et al. ..................372/75 |
| 6,283,022 B1 | * | 9/2001 | Kamen et al. ................101/129 |

FOREIGN PATENT DOCUMENTS

| | | |
|---|---|---|
| DE | 1 927 323 | 5/1969 |
| EP | 0 041 241 | 12/1981 |
| GB | 2 154 364 | 9/1985 |
| EP | 0 473 973 B1 | 3/1992 |
| WO | 95/16294 | 6/1995 |
| DE | 195 11 393 | 10/1996 |
| DE | 196 03 111 | 8/1997 |
| EP | 0 741 335 | 10/2000 |

UNITED STATES PATENT AND TRADEMARK OFFICE
CERTIFICATE OF CORRECTION

PATENT NO. : 6,888,853 B1
DATED : May 3, 2005
INVENTOR(S) : Heinrich Jurgensen

It is certified that error appears in the above-identified patent and that said Letters Patent is hereby corrected as shown below:

Title page (cont'd),

OTHER PUBLICATIONS

Optik und Atomphysik"; R. W. Pohl; 13, Auflage; Springer Verlag 1976: Sete 13; Abb 2.21
Lehrbuch der Experimentalphysik, Band III, Optik:1 Bergmann-Schaefer; 7. Auflage; De Gruyter 1978 Seite 152
Schnelles Elektronenstrahlgravierverfahren zur Gravur von Metallzylindern; W. Boppel; aus Optik 77; No. 2; 1987; Seiten 83-92
Lehrbuch Optik; Klein und Furtak: Springer 1988; Seiten 140-141
Laser in der Druckindustire; Werner Hülsbusch, Konstanz; Seite 4341; Abb. 7-28 etc. 1990
Fiber Technology Ushers In New Laser Devices – Feature: Fiber Lasers May 1991 Laser Focus World- pp. 231-238.
Leistungsskalierun von Faserlasern; Fachbereich Physik der UNI Hannover; Dipl-Phys. Zellmer; 1996
Direktes Lasergravierverfahren für metallbeschichtete Tiefdruckzylinder" Dr. phil. Nat Jacob Frauchinger, MDC Max Dätwyler AG, Darmstadt; 12. Dez. 1996
Schäfer & Kirchoff Opto-Sensorik Und Messtechnik – January 1997
Katalog Fa IPG Laser GmbH; D-57299 Burbach; (IRE-Polus Group); 1997
Gesamtkatalog G3; Best j- Nr. 650020; Fa. Laser Spindler & Hoyer, Göttlingen; Seiten F16-F33; Seite G16; Seiten K16 und K17
Optimization of micro channel heat sinks for high power diode laser in copper technology; SPIE Proceedings Vol 3097, 1997
1998 Semiconductor Laser Product Catalog-SDL Copyright 1997 SDL, Inc. pp. 40-45

* cited by examiner                                                                                          --.

Drawings,
Replace Figures 1, 3, 5, 6, 11, 24, 25, 26, 28, 29, 31, and 34 with the attached Figures 1, 3, 5, 6, 11, 24, 25, 26, 28, 29, 31, and 34 as shown on the attached pages.

Signed and Sealed this

Fifteenth Day of November, 2005

JON W. DUDAS
*Director of the United States Patent and Trademark Office*

(12) United States Patent
Jürgensen

(10) Patent No.: US 6,888,853 B1
(45) Date of Patent: May 3, 2005

(54) LASER RADIATION SOURCE

(75) Inventor: Heinrich Jürgensen, Raisdorf (DE)

(73) Assignee: Hell Gravure Systems GmbH, Kiel (DE)

(*) Notice: Subject to any disclaimer, the term of this patent is extended or adjusted under 35 U.S.C. 154(b) by 0 days.

(21) Appl. No.: 09/786,742
(22) PCT Filed: Sep. 1, 1999
(86) PCT No.: PCT/DE99/02721
§ 371 (c)(1),
(2), (4) Date: Sep. 14, 2001
(87) PCT Pub. No.: WO00/13839
PCT Pub. Date: Mar. 16, 2000

(30) Foreign Application Priority Data

Sep. 8, 1998 (DE) .................... 198 40 926

(51) Int. Cl.[7] ............... H01S 3/067; B41F 9/00; G03F 7/00; B41J 2/435
(52) U.S. Cl. .................... 372/6; 372/9; 372/24; 101/150; 101/153; 430/269; 430/300; 430/307; 347/224; 347/233; 347/238; 347/241
(58) Field of Search ................... 372/6, 9, 24, 26, 372/69; 101/150, 153; 430/269, 300, 307; 347/224, 233, 238, 241

(56) References Cited

U.S. PATENT DOCUMENTS

| | | | | |
|---|---|---|---|---|
| 3,931,458 A | * | 1/1976 | Dini .................... | 358/3.29 |
| RE32,139 E | * | 5/1986 | Taudt et al. .................... | 358/524 |
| 4,729,037 A | * | 3/1988 | Doelves .................... | 358/3.29 |
| 5,202,893 A | * | 4/1993 | Kubota et al. .................... | 372/34 |
| 5,363,233 A | * | 11/1994 | Pernick .................... | 359/316 |
| 5,369,661 A | * | 11/1994 | Yamaguchi et al. .................... | 372/69 |
| 5,373,526 A | * | 12/1994 | Lam et al. .................... | 372/69 |
| 5,654,125 A | | 8/1997 | Fan et al. .................... | 430/306 |
| 5,719,009 A | * | 2/1998 | Fan .................... | 430/306 |
| 5,760,880 A | | 6/1998 | Fan et al. .................... | 355/67 |
| 5,780,200 A | * | 7/1998 | Kitaguchi et al. .................... | 430/270.1 |
| 5,798,202 A | * | 8/1998 | Cushner et al. .................... | 430/306 |
| 5,829,881 A | * | 11/1998 | Purlani et al. .................... | 384/42 |
| 5,867,305 A | * | 2/1999 | Waarts et al. .................... | 359/341 |
| 5,900,109 A | * | 5/1999 | Sanders et al. .................... | 156/552 |
| 5,949,466 A | * | 9/1999 | Kerr et al. .................... | 347/213 |
| 5,953,036 A | * | 9/1999 | Purlani et al. .................... | 347/139 |
| 6,106,627 A | * | 8/2000 | Yializis .................... | 118/724 |
| 6,136,375 A | * | 10/2000 | Bressler et al. .................... | 427/277 |
| 6,167,075 A | * | 12/2000 | Craig et al. .................... | 372/75 |
| 6,283,022 B1 | * | 9/2001 | Kamen et al. .................... | 101/129 |

FOREIGN PATENT DOCUMENTS

EP 0 741 335 10/2000

OTHER PUBLICATIONS

Fiber Technology Ushers In New Laser Devices—Feature: Fiber Lasers May 1991 Laser Focus World—pp. 231–238.
1998 Semiconductor Laser Product Catalog—SDL Copyright 1997 SDL, Inc. pp. 40–45.

* cited by examiner

Primary Examiner—Don Wong
Assistant Examiner—James Menefee
(74) Attorney, Agent, or Firm—Schiff Hardin LLP

(57) ABSTRACT

A system and method for selectively process material on a processing surface of a printing form to create a fine structure or pattern for images or text. At least one fiber laser comprising a pump source and a laser fiber is provided. A laser gun is mounted adjacent the printing form and has at least a focusing optics. The fiber laser outputs a laser beam which is diffraction-limited to permit the focusing optics to focus the laser beam onto the processing surface of the printing form as a spot having a spot size sufficiently small to process the processing surface to create the fine structure or pattern images or text.

296 Claims, 39 Drawing Sheets

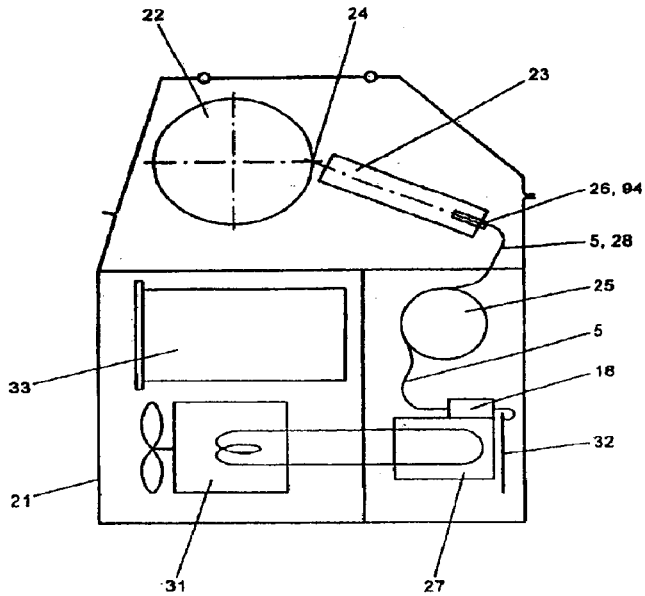

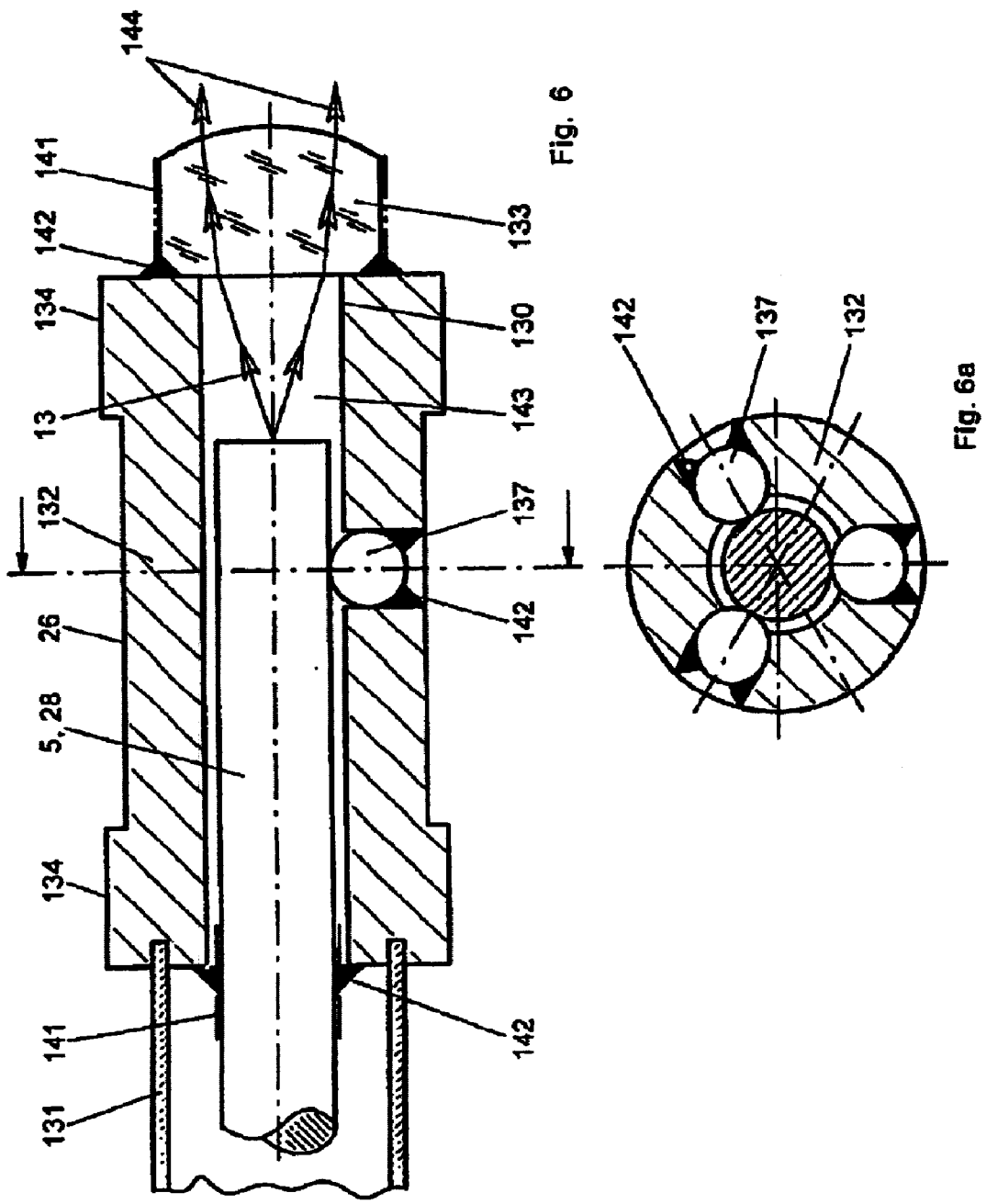

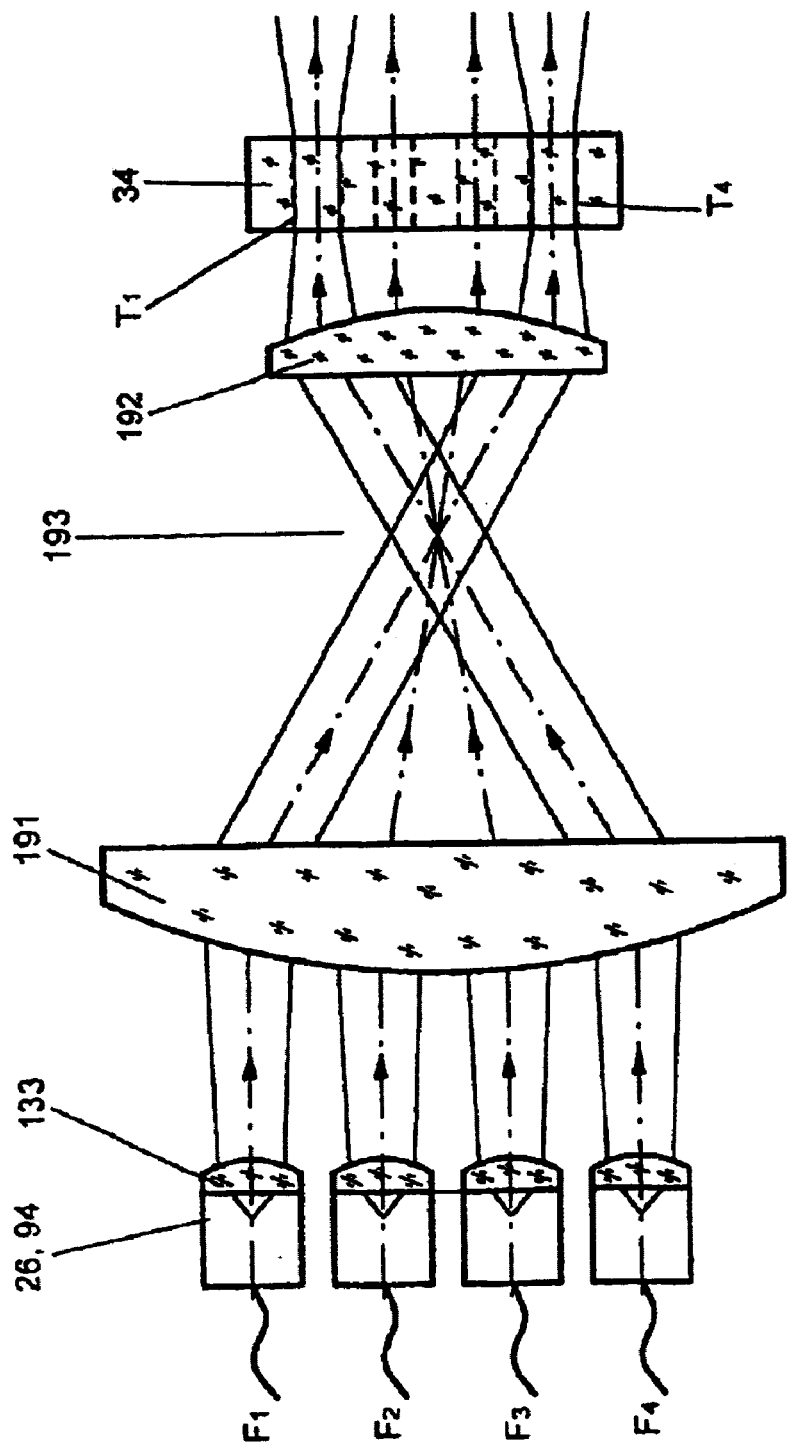

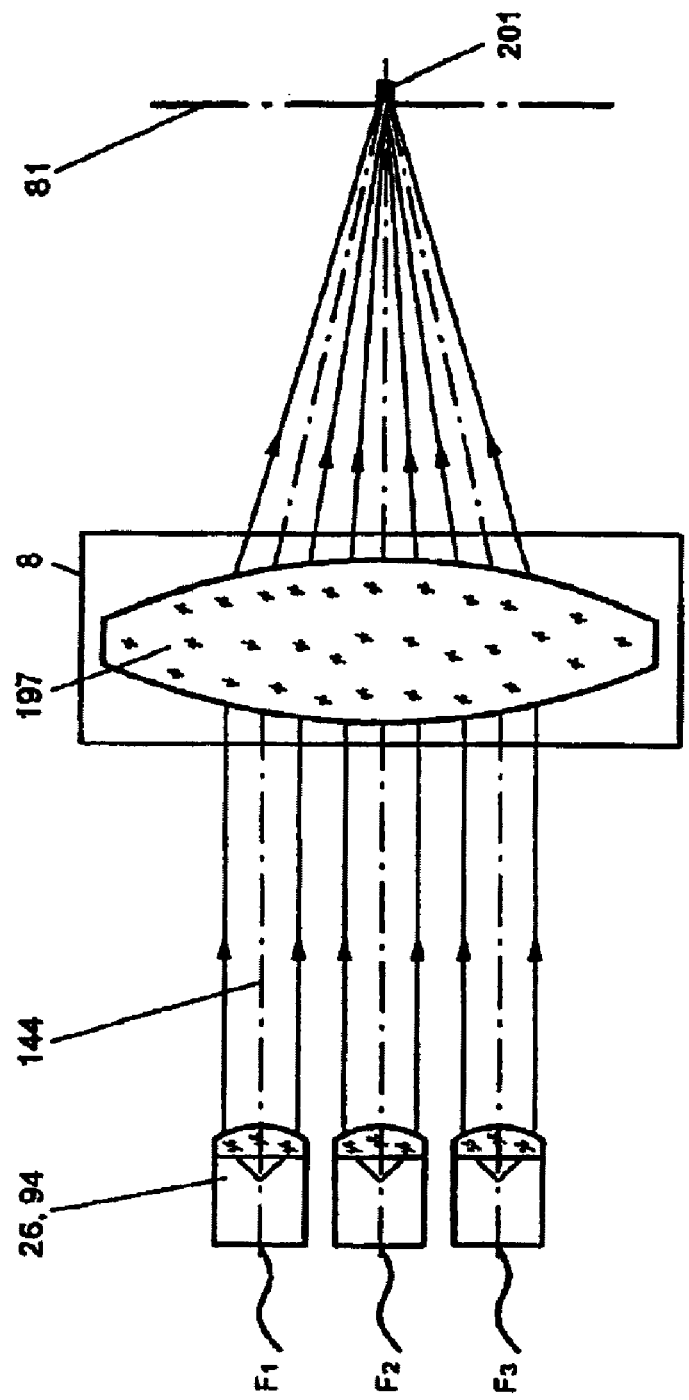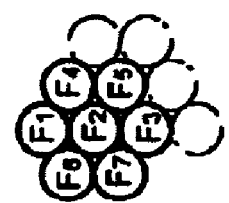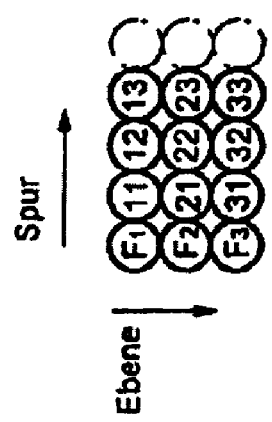

UNITED STATES PATENT AND TRADEMARK OFFICE
CERTIFICATE OF CORRECTION

PATENT NO.         : 6,888,853 B1
APPLICATION NO. : 09/786742
DATED                  : May 3, 2005
INVENTOR(S)       : Heinrich Jurgensen It is certified that error appears in the above-identified patent and that said Letters Patent is hereby corrected as shown below:

The Title page should be deleted and substituted with the attached title page.

Title page,
Item [56], References Cited, substitute the following references:
-- U.S. PATENT DOCUMENTS

| | | | |
|---|---|---|---|
| 3,931,458 A * | 1/1976 | Dini | 358/3.29 |
| RE32,139 E * | 5/1986 | Taudt et al. | 358/524 |
| 4,729,037 A * | 3/1988 | Doelves | 358/3.29 |
| 5,084,882 A | 1/1992 | Hughes | 372/6 |
| 5,202,893 A * | 4/1993 | Kubota et al. | 372/34 |
| 5,337,325 A | 8/1994 | Hwang | 372/36 |
| 5,363,233 A * | 11/1994 | Pernick | 359/316 |
| 5,369,66 1 A * | 11/1994 | Yamaguchi et al. | 372/69 |
| 5,373,526 A * | 12/1994 | Lan et al. | 372/69 |
| 5,396,506 A | 3/1995 | Ball | 372/6 |
| 5,416,298 A | 5/1995 | Roberts | 219/121.68 |
| 5,430,816 A | 7/1995 | Furuya et al. | 385/33 |
| 5,654,125 A | 8/1997 | Fan et al. | 430/306 |
| 5,694,408 A | 12/1997 | Bott et al. | 372/6 |
| 5,719,009A * | 2/1998 | Fan | 430/306 |
| 5,760,880 A | 6/1998 | Fan et al. | 355/67 |
| 5,780,200 A * | 7/1998 | Kitaguchi et al. | 430/270.1 |
| 5,798,202 A * | 8/1998 | Cushner et al. | 430/306 |
| 5,829,881 A * | 11/1998 | Furlani et al. | 384/42 |
| 5,867,305 A * | 2/1999 | Waarts et al. | 359/341 |
| 5,900,109 A * | 5/1999 | Sanders et al. | 156/552 |
| 5,949,466 A * | 9/1999 | Kerr et al. | 347/213 |
| 5,953,036 A * | 9/1999 | Furlani et al. | 347/139 |
| 6,106,627 A * | 8/2000 | Yializis | 118/724 |
| 6,136,375 A * | 10/2000 | Bressler et al. | 427,277 |
| 6,167,075 A * | 12/2000 | Craig et al. | 372/75 |
| 6,283,022 B1 * | 9/2001 | Kamen et al. | 101/129 |

UNITED STATES PATENT AND TRADEMARK OFFICE
CERTIFICATE OF CORRECTION

PATENT NO. : 6,888,853 B1
APPLICATION NO. : 09/786742
DATED : May 3, 2005
INVENTOR(S) : Heinrich Jurgensen It is certified that error appears in the above-identified patent and that said Letters Patent is hereby corrected as shown below:

Title page (cont'd),

FOREIGN PATENT DOCUMENTS

| | | |
|---|---|---|
| DE | 1 927 323 | 5/1969 |
| EP | 0 041 241 | 12/1981 |
| GB | 2 154 364 | 9/1985 |
| EP | 0 473 973 B1 | 3/1992 |
| WO | 95/16294 | 6/1995 |
| DE | 195 11 393 | 10/1996 |
| DE | 196 03 111 | 8/1997 |
| EP | 0 741 335 | 10/2000 |

OTHER PUBLICATIONS

Optik und Atomphysik"; R. W. Pohl; 13, Auflage; Springer Verlag 1976: Sete 13; Abb 2.21
Lehrbuch der Experimentalphysik, Band III, Optik:1 Bergmann-Schaefer; 7. Auflage; De Gruytcr 1978 Seite 152
Schnelles Elektronenstrahlgravierverfahren zur Gravur von Metallzylindern; W. Boppel; aus Optik 77; No. 2; 1987; Seiten 83-92
Lehrbuch Optik; Klein und Furtak: Springer 1988; Seiten 140-141
Laser in der Druckindustire; Werner Hülsbusch, Konstanz; Seite 4341; Abb. 7-28 etc. 1990
Fiber Technology Ushers In New Laser Devices – Feature: Fiber Lasers May 1991 Laser Focus World- pp. 231-238.
Leistungsskalierun von Faserlasern; Fachbereich Physik der UNI Hannover; Dipl-Phys. Zellmer; 1996
Direktes Lasergravierverfahren für metallbeschichtete Tiefdruckzylinder" Dr. phil. Nat Jacob Frauchinger, MDC Max Dätwyler AG, Darmstadt; 12. Dez. 1996
Schäfer & Kirchoff Opto-Sensorik Und Messtechnik – January 1997
Katalog Fa IPG Laser GmbH; D-57299 Burbach; (IRE-Polus Group); 1997
Gesamtkatalog G3; Best j- Nr. 650020; Fa. Laser Spindler & Hoyer, Göttlingen; Seiten F16-F33; Seite G16; Seiten K16 und K17
Optimization of micro channel heal sinks for high power diode laser in copper technology; SPIE Proceedings Vol 3097, 1997
1998 Semiconductor Laser Product Catalog-SDL Copyright 1997 SDL, Inc. pp. 40-45

* cited by examiner                                                              --.

UNITED STATES PATENT AND TRADEMARK OFFICE
CERTIFICATE OF CORRECTION

PATENT NO. : 6,888,853 B1
APPLICATION NO. : 09/786742
DATED : May 3, 2005
INVENTOR(S) : Heinrich Jurgensen It is certified that error appears in the above-identified patent and that said Letters Patent is hereby corrected as shown below:

Title page (cont'd),
Drawings,
Replace Figures 1, 3, 5, 6, 11, 24, 25, 26, 28, 29, 31, and 34 with the attached Figures 1, 3, 5, 6, 11, 24, 25, 26, 28, 29, 31, and 34 as shown on the attached pages.

This certificate supersedes Certificate of Correction issued November 15, 2005.

Signed and Sealed this

Tenth Day of October, 2006

JON W. DUDAS
*Director of the United States Patent and Trademark Office*

(12) United States Patent
Jürgensen

(10) Patent No.: US 6,888,853 B1
(45) Date of Patent: May 3, 2005

(54) LASER RADIATION SOURCE

(75) Inventor: Heinrich Jürgensen, Raisdorf (DE)

(73) Assignee: Hell Gravure Systems GmbH, Kiel (DE)

(*) Notice: Subject to any disclaimer, the term of this patent is extended or adjusted under 35 U.S.C. 154(b) by 0 days.

(21) Appl. No.: 09/786,742

(22) PCT Filed: Sep. 1, 1999

(86) PCT No.: PCT/DE99/02721
§ 371 (c)(1),
(2), (4) Date: Sep. 14, 2001

(87) PCT Pub. No.: WO00/13839
PCT Pub. Date: Mar. 16, 2000

(30) Foreign Application Priority Data

Sep. 8, 1998 (DE) .......................... 198 40 926

(51) Int. Cl.[7] .................. H01S 3/067; B41F 9/00; G03F 7/00; B41J 2/435
(52) U.S. Cl. ................ 372/6; 372/9; 372/24; 101/150; 101/153; 430/269; 430/300; 430/307; 347/224; 347/233; 347/238; 347/241
(58) Field of Search .......... 372/6, 9, 24, 26, 372/69; 101/150, 153; 430/269, 300, 307; 347/224, 233, 238, 241

(56) References Cited

U.S. PATENT DOCUMENTS

| | | | | |
|---|---|---|---|---|
| 3,931,458 A | * | 1/1976 | Dini | 358/3.29 |
| RE32,139 E | * | 5/1986 | Taudt et al. | 358/524 |
| 4,729,037 A | * | 3/1988 | Doelves | 358/3.29 |
| 5,202,893 A | * | 4/1993 | Kubota et al. | 372/34 |
| 5,363,233 A | * | 11/1994 | Pernick | 359/316 |
| 5,369,661 A | * | 11/1994 | Yamaguchi et al. | 372/69 |
| 5,373,526 A | * | 12/1994 | Lam et al. | 372/69 |
| 5,654,125 A | | 8/1997 | Fan et al. | 430/306 |
| 5,719,009 A | * | 2/1998 | Fan | 430/306 |
| 5,760,880 A | | 6/1998 | Fan et al. | 355/67 |
| 5,780,200 A | * | 7/1998 | Kitaguchi et al. | 430/270.1 |
| 5,798,202 A | * | 8/1998 | Cushner et al. | 430/306 |
| 5,829,881 A | * | 11/1998 | Furlani et al. | 384/42 |
| 5,867,305 A | * | 2/1999 | Waarts et al. | 359/341 |
| 5,900,109 A | * | 5/1999 | Sanders et al. | 156/552 |
| 5,949,466 A | * | 9/1999 | Kerr et al. | 347/213 |
| 5,953,036 A | * | 9/1999 | Furlani et al. | 347/139 |
| 6,106,627 A | * | 8/2000 | Yializis | 118/724 |
| 6,136,375 A | * | 10/2000 | Bressler et al. | 427/277 |
| 6,167,075 A | * | 12/2000 | Craig et al. | 372/75 |
| 6,283,022 B1 | * | 9/2001 | Kamen et al. | 101/129 |

FOREIGN PATENT DOCUMENTS

EP 0 741 335 10/2000

OTHER PUBLICATIONS

Fiber Technology Ushers In New Laser Devices—Feature: Fiber Lasers May 1991 Laser Focus World—pp. 231–238.
1998 Semiconductor Laser Product Catalog—SDL Copyright 1997 SDL, Inc. pp. 40–45.

* cited by examiner

*Primary Examiner*—Don Wong
*Assistant Examiner*—James Menefee
(74) *Attorney, Agent, or Firm*—Schiff Hardin LLP

(57) ABSTRACT

A system and method for selectively process material on a processing surface of a printing form to create a fine structure or pattern for images or text. At least one fiber laser comprising a pump source and a laser fiber is provided. A laser gun is mounted adjacent the printing form and has at least a focusing optics. The fiber laser outputs a laser beam which is diffraction-limited to permit the focusing optics to focus the laser beam onto the processing surface of the printing form as a spot having a spot size sufficiently small to process the processing surface to create the fine structure or pattern images or text.

296 Claims, 39 Drawing Sheets

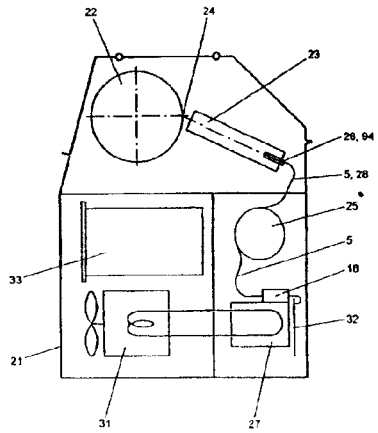

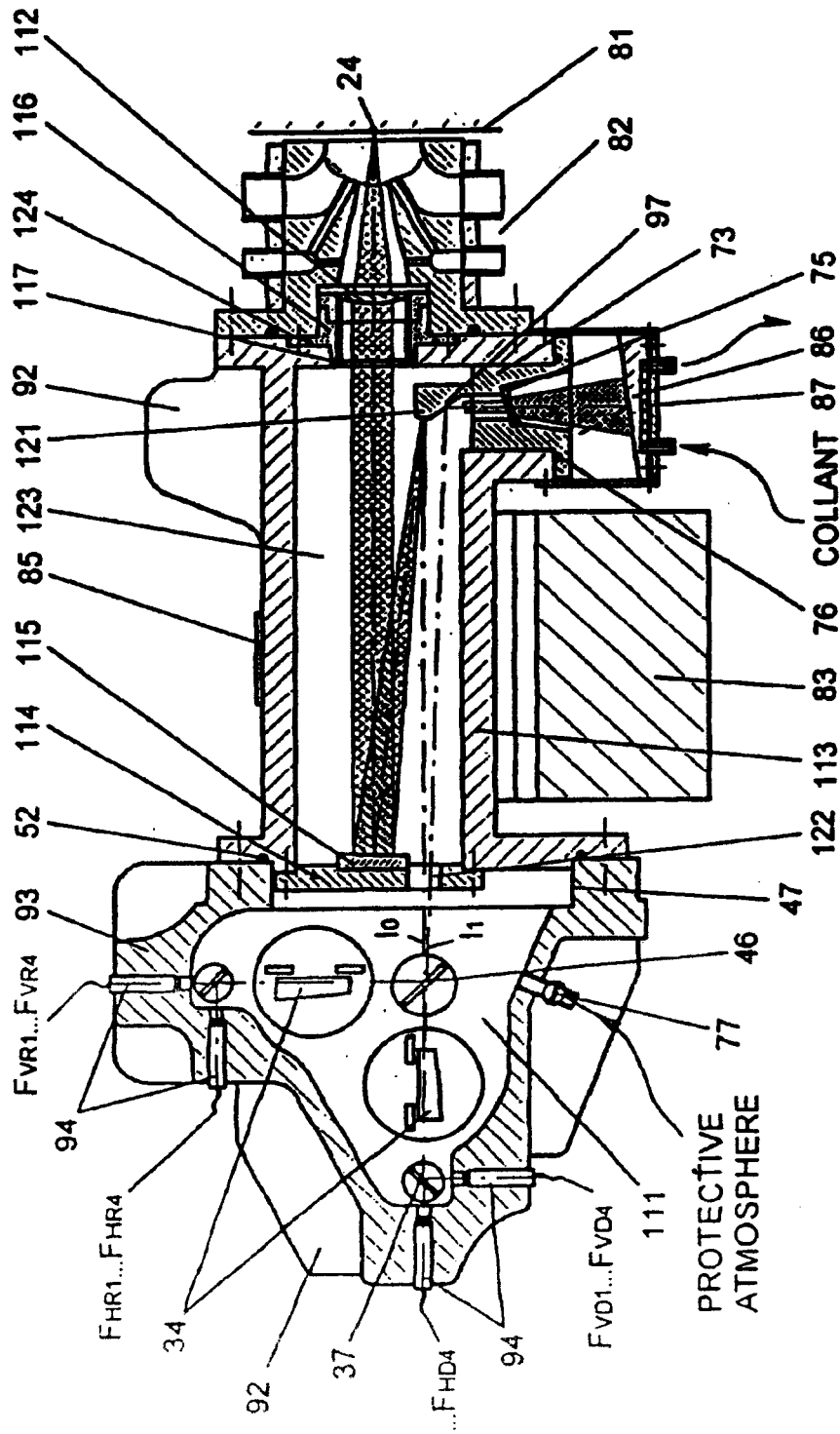

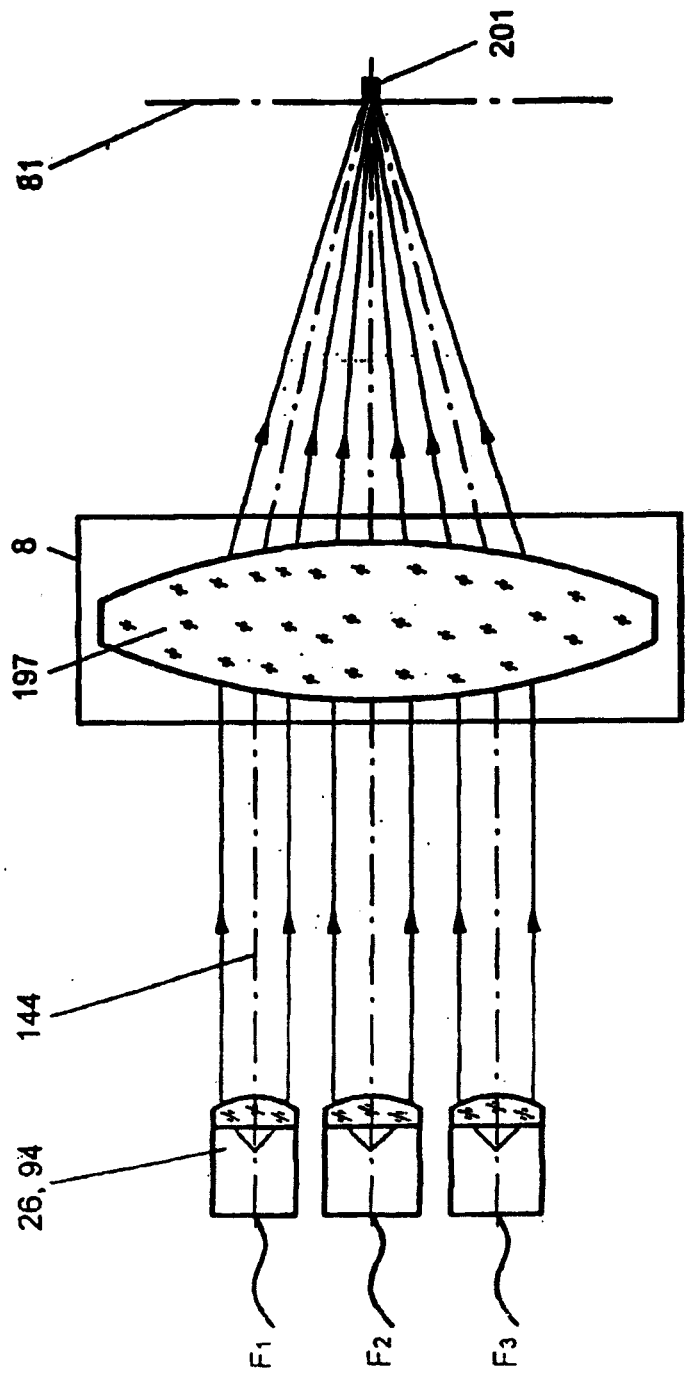
Fig. 31
Fig. 30
Fig. 29